(12) United States Patent
   Taniuchi et al.

(10) Patent No.: US 8,792,454 B2
(45) Date of Patent: Jul. 29, 2014

(54) SECURE AND SEAMLESS WAN-LAN ROAMING

(75) Inventors: Kenichi Taniuchi, Hillsborough, NJ (US); Tao Zhang, Fort Lee, NJ (US); Prathima Agrawal, New Providence, NJ (US); Ashutosh Dutta, Bridgewater, NJ (US); Sunil Madhani, Morristown, NJ (US); Shinichi Baba, Tokyo (JP); Kensaku Fujimoto, Bridgewater, NJ (US); Yasuhiro Katsube, Franklin Lakes, NJ (US); Toshikazu Kodama, Morristown, NJ (US); Yoshihiro Ohba, Fort Lee, NJ (US)

(73) Assignees: Toshiba America Resesarch, Inc., Piscataway, NJ (US); Telcordia Inc., Piscataway, NJ (US)

( * ) Notice: Subject to any disclaimer, the term of this patent is extended or adjusted under 35 U.S.C. 154(b) by 0 days.

(21) Appl. No.: 13/554,711

(22) Filed: Jul. 20, 2012

(65) Prior Publication Data

US 2012/0287904 A1    Nov. 15, 2012

Related U.S. Application Data

(60) Division of application No. 13/164,874, filed on Jun. 21, 2011, now Pat. No. 8,243,687, which is a continuation of application No. 10/895,411, filed on Jul. 21, 2004, now Pat. No. 7,978,655.

(60) Provisional application No. 60/488,809, filed on Jul. 22, 2003.

(51) Int. Cl.
   *H04W 4/00* (2009.01)
   *H04W 80/04* (2009.01)
   *H04W 84/12* (2009.01)
   *H04L 29/06* (2006.01)

(52) U.S. Cl.
   CPC ............ *H04W 80/04* (2013.01); *H04W 80/045* (2013.01); *H04W 84/12* (2013.01); *H04L 63/0272* (2013.01); *H04L 69/14* (2013.01); *H04L 29/06088* (2013.01)
   USPC ........... 370/331; 370/392; 370/389; 370/419; 370/400; 370/401; 455/432.1; 455/419; 455/433; 455/422.1; 455/437

(58) Field of Classification Search
   CPC ... H04W 80/04; H04W 80/045; H04W 84/12; H04L 63/0272; H04L 69/14; H04L 69/18; H04L 29/06088; H04L 29/06102
   USPC ................ 370/331, 392, 389, 419, 400, 401, 370/432.1, 433, 437, 435.1; 455/432.1, 455/419, 433, 422.1, 437, 439, 442, 435.1, 455/435.2, 435.3
   See application file for complete search history.

(56) References Cited

U.S. PATENT DOCUMENTS

| 6,681,259 B1 | 1/2004 | Lemilainen et al. |
| 7,165,173 B1 | 1/2007 | Herle |

(Continued)

FOREIGN PATENT DOCUMENTS

| EP | 0964597 A1 | 12/1999 |
| EP | 0998094 A2 | 5/2000 |

(Continued)

OTHER PUBLICATIONS

Notice of Reasons for Rejection for corresponding Japanese Patent Application No. 2010-041028 mailed Nov. 15, 2011.

(Continued)

*Primary Examiner* — Khai M Nguyen
(74) *Attorney, Agent, or Firm* — Banner & Witcoff, Ltd.

(57) ABSTRACT

Systems and methods are described for secure and seamless roaming between internal and external networks. Double and triple tunnels may be used to connect a mobile node to a correspondent host. A mobile node may include the ability to connect to two networks simultaneously to enable seamless roaming between networks.

9 Claims, 143 Drawing Sheets

(56) References Cited

U.S. PATENT DOCUMENTS

| | | | |
|---|---|---|---|
| 7,209,465 | B2 | 4/2007 | Matsugatani et al. |
| 7,486,951 | B2 | 2/2009 | Chen et al. |
| 7,685,317 | B2* | 3/2010 | Iyer .............................. 709/248 |
| 7,860,978 | B2 | 12/2010 | Oba et al. |
| 2002/0018456 | A1 | 2/2002 | Kakemizu et al. |
| 2002/0026527 | A1 | 2/2002 | Das et al. |
| 2002/0049059 | A1 | 4/2002 | Soininen et al. |
| 2002/0069278 | A1 | 6/2002 | Forslow |
| 2002/0075812 | A1* | 6/2002 | Corwin ......................... 370/254 |
| 2002/0080778 | A1* | 6/2002 | Matsugatani et al. ........ 370/352 |
| 2003/0007475 | A1* | 1/2003 | Tsuda et al. .................. 370/338 |
| 2003/0117978 | A1* | 6/2003 | Haddad ......................... 370/331 |
| 2004/0073642 | A1 | 4/2004 | Iyer |
| 2004/0078600 | A1 | 4/2004 | Nilsen et al. |
| 2004/0103311 | A1 | 5/2004 | Barton et al. |
| 2005/0232286 | A1 | 10/2005 | Lee et al. |
| 2007/0204155 | A1 | 8/2007 | Dutta et al. |
| 2008/0040793 | A1 | 2/2008 | Nilsen et al. |
| 2009/0271614 | A1 | 10/2009 | Oba et al. |
| 2010/0097992 | A1 | 4/2010 | Velev et al. |
| 2012/0051321 | A1 | 3/2012 | De et al. |

FOREIGN PATENT DOCUMENTS

| | | |
|---|---|---|
| EP | 1381202 | 1/2004 |
| JP | 11-355322 | 12/1999 |
| JP | 2002-044141 | 2/2002 |
| JP | 2002-199426 A | 7/2002 |
| WO | 01/31472 A1 | 5/2001 |
| WO | 02/42861 A2 | 5/2002 |
| WO | 03065654 A1 | 8/2003 |
| WO | 2005/018165 A2 | 2/2005 |
| WO | 2005/018165 A3 | 2/2005 |

OTHER PUBLICATIONS

Tsuguo Kato, "Leading-edge Technology Capable of Realizing Secure, Safe and Comfortable Ubiquitous Information Society," Research and Development, Fujitsu Limited, vol. 54, No. 4, Jul. 10, 2003.

"Guidebook of Product: Notable VPN Solution," Computer & Network LAN, Ohmsha, Ltd., Japan, Jun. 24, 2003, vol. 21, No. 7.

Hiroyuki Taniguchi, Secure Seamless Roaming System based on IP Network Service control Architecture (EaseNet), Technical Report of the Institute of Electronics, Information and Communication Engineers, Japan, Feb. 27, 2003, vol. 102, No. 693.

Notice of Reasons for Rejection in Application No. JP2006-521222 mailed Aug. 25, 2009.

Notification of the First Office Action in Chinese Application No. 2004-80017456.3 dated Feb. 29, 2008.

Notification of Second Office Action in Chinese Application No. 2004-80017456.3 dated Mar. 13, 2009.

International Preliminary Report on Patentability in Application No. PCT US2004/023502 dated Jan. 23, 2006.

International Search Report in Application No. PCT US2004-023502 mailed Jul. 5, 2005.

Office Action for corresponding European Application No. 04 778 829.4-2412 dated Oct. 5, 2011.

Written Opinion in Application No. PCT US2004/023502 received Jul. 6, 2005.

Mahonen et al, "Platform-Independent IP Transmission over Wireless Networks: the WINE Approach", IEEE Personal Communications, Dec. 2001, p. 32-40.

International Search Report dated Sep. 2, 2004.

Vipul Gupta, et al., "Secure and Mobile Networking", Balzer Scien Publishers BW, Mobile Networks and Applications 3 (1998) pp. 381-390.

G. Montenegro, et al., "Sun's SKIP Firewall Traversal for Mobile IP", The Internet Society, 1998, 20 pages.

European Office Action dated Aug. 14, 2009 in Application No. EP047788294.

Chinese Office Action dated Feb. 13, 2012 in CN Application No. 200910208858.6.

Office Action issued Dec. 4, 2013 in Chinese Application No. 20091028858.6.

Notification of the Second Office Action dated Nov. 2, 2012 in Chinese Application No. 200910208858.6.

Office Action dated Mar. 27, 2013 in European Application No. 04778829.4.

First Office Action dated Apr. 23, 2013 in Japanese Application No. 2012-030761.

Search Report and Opinion dated Jun. 3, 2013 in European Application No. 11178726.

Notification of the Third Office Action dated May 22, 2013 in Chinese Application No. 200910208858.6.

Final Rejection issued May 6, 2014 in related Chinese Application No. 200910208858.6.

* cited by examiner

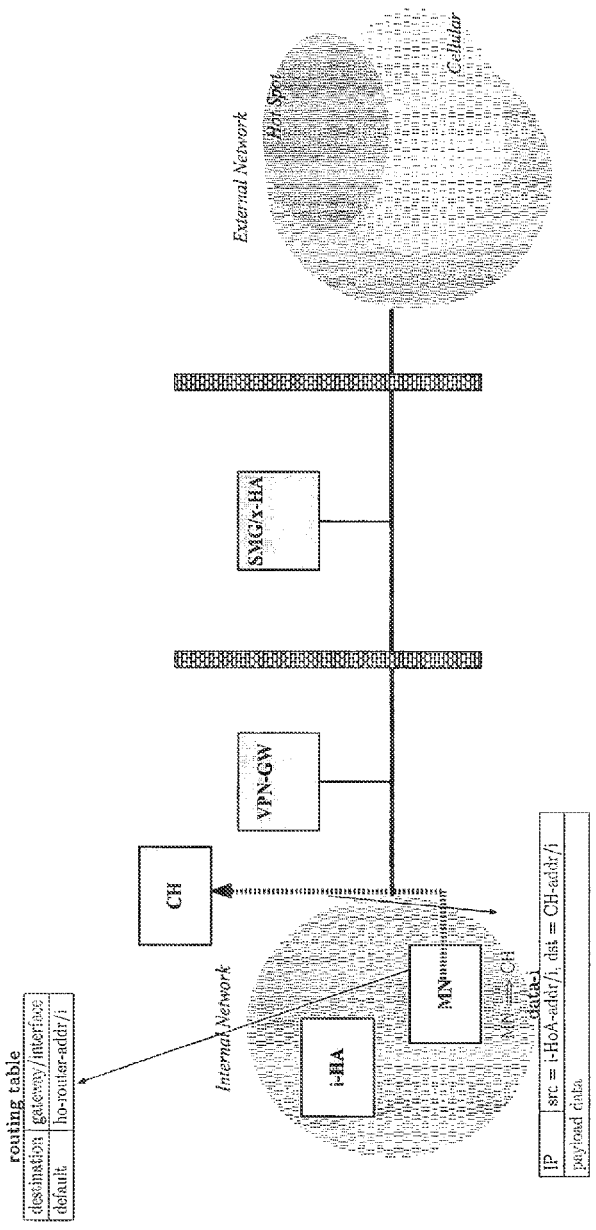

- i-MIP deregistration response

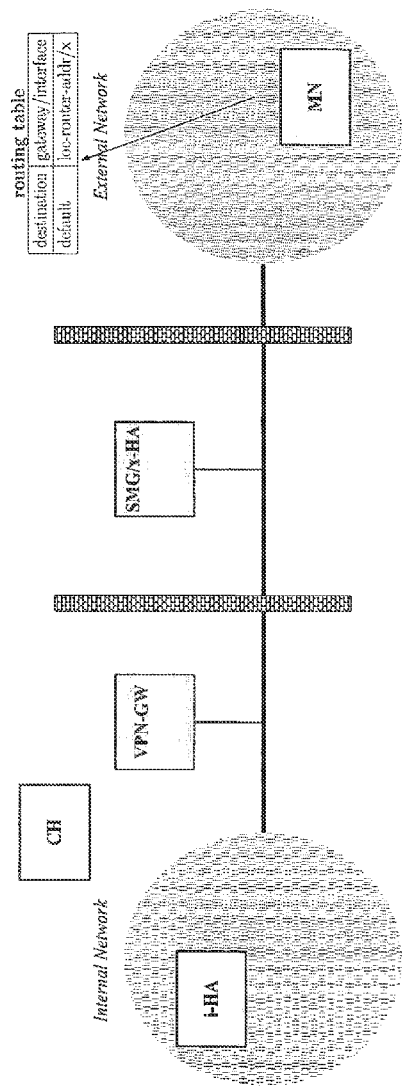

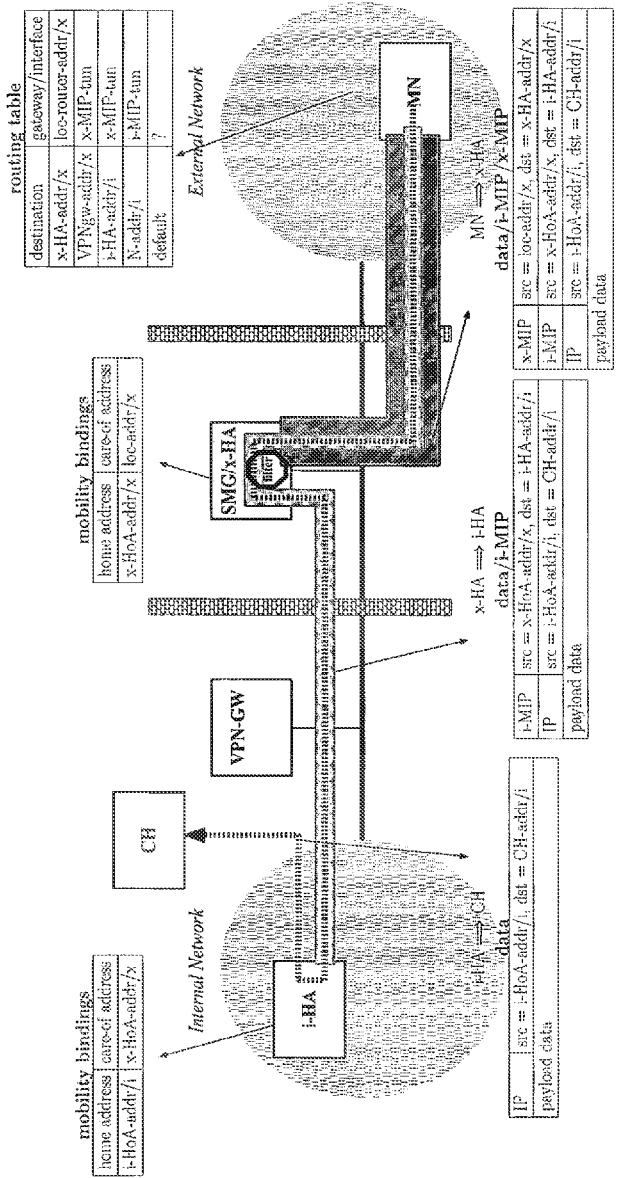

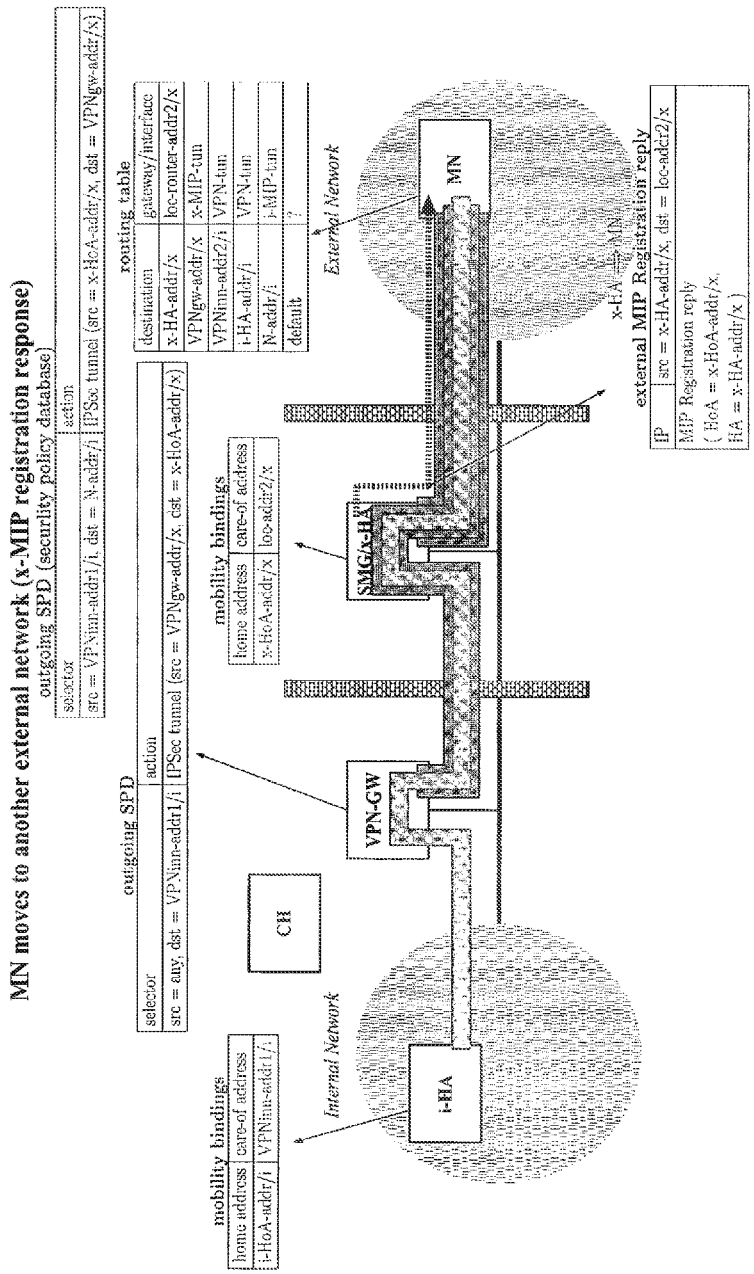

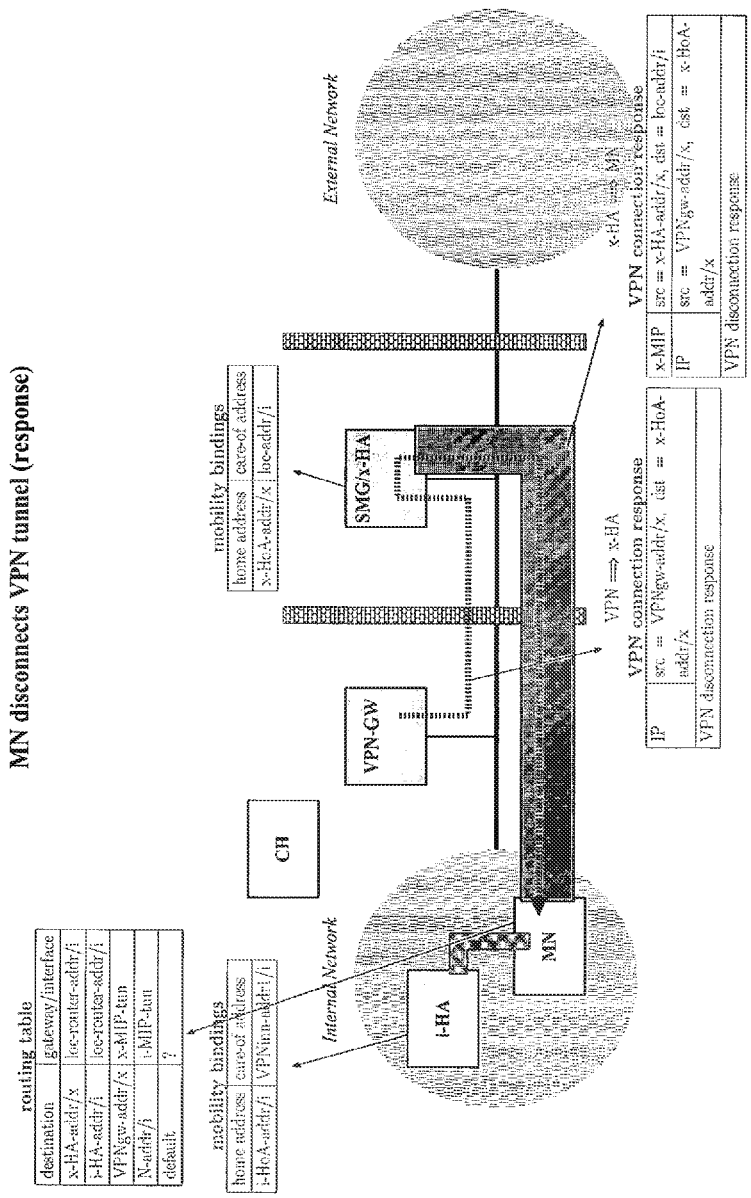

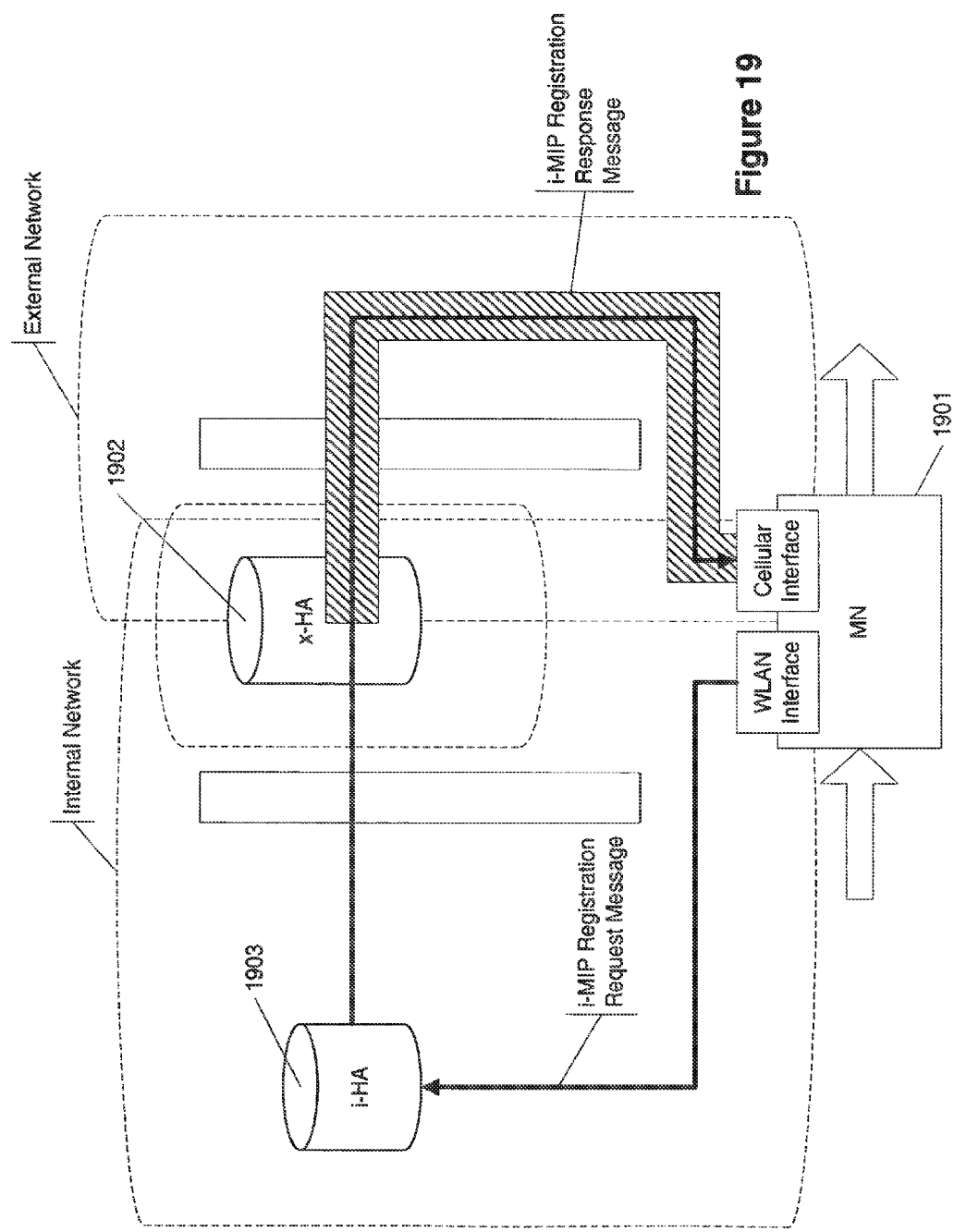

SECURE AND SEAMLESS WAN-LAN ROAMING

RELATED APPLICATION INFORMATION

This application is a divisional of U.S. Ser. No. 13/164,874, filed Jun. 21, 2011, which is a continuation of U.S. Ser. No. 10/895,411, filed on Jul. 21, 2004, which claims priority to U.S. Ser. No. 60/488,809, filed Jul. 22, 2003, entitled "Seamless and Secure WAN-LAN Roaming," whose contents are expressly incorporated herein by reference.

BACKGROUND OF INVENTION

1. Technical Field

Aspects of the present invention relate to wireless communications. More particularly, aspects of the present invention relate to maintaining connectivity while roaming between wireless networks.

2. Related Art

Different wireless technologies exist for mobile data users. Mobile data users may use cellular technologies, IEEE 802.11-based technologies, Bluetooth and other wireless technologies to connect to a network. While hand off between access points in a singular network is well known, hand off between access points running divergent wireless protocols is difficult. Here, users desire seamless mobility despite network changes. Further, so as to protect networks from unwanted intrusion, multiple firewalls may be used at locations across networks. One downside is that firewalls prevent users from freely accessing their networks. Accordingly, users need a solution that provides both mobility and secure access to their home networks.

Mobile IP systems include mobile IP client software on a user terminal and a mobile IP home agent (HA) in a network's infrastructure, the home agent controls the topological correct address of the mobile node (here referred to as a home address) and maintains a binding list (here referred to as a care-of address) with the current location of a mobile node (MN). The mobile node updates the home agent with its current care-of-address. This may happen directly or, optionally, by means of an intermediate foreign agent (FA). The home agent sets up a forward tunnel to redirect traffic from the topological he correct home address to the current care-of-address. The tunnel or arises from packet encapsulation performed by the home agent. Fort reference, any non-mobile host may be referred to as a correspondent node (CN).

Seamless IP mobility, when combined with a secure connection, allows users to access their home networks from remote locations. Remote VPN technologies permit this type of connection between a mobile node and a VPN Gateway (VPNgw) local to a correspondent node. A VPN solution includes both totaling and encryption to maintain two vacation from a secure domain to a terminal that is remotely connected from an insecure location in a different domain. The VPN solution is usually a preferred way to reach components inside the secure domain.

One approach to creating VPN tunnels across firewalls is by using an architecture as shown in FIG. 1. FIG. 1 includes the TCP IP layer 101, and internal mobile IP driver (i-MIP) 102, a VPN 103, an external mobile IP driver (x-MIP) 104, and two network interface drivers (network driver A 105 and network driver B 106). Here, TCP IP layer 101 may connect with the network drivers A 105 and B 106 by three pathways. The first pathway is through i-MIP driver 102, VPN 103, and x-MIP driver 104. This is generally the most secure remote connection available. The second pathway is through i-MIP driver 102 and x-MIP driver 104. This is also a remote connection. The third pathway is directly from TCP/IP layer 101 to x-MIP driver 104. This third connection is used when, for instance, a mobile node is inside the firewalls surrounding a correspondent node.

The approach of FIG. 1 does not readily provide seamless transitions between network driver A 105 and network driver B 106. This is because x-MIP driver 104 handles the local connection pathway as well as the other pathways. When the using the local connection path, x-MIP driver 104 is readily processing the information on that pathway. If a user then requests a VPN connection to be established, the x-MIP driver 104 would then need to drop the current connection, establish the VPN pathway, and then re-establish the connection with the network driver A 105.

Accordingly, an improved system for seamless roaming is needed.

SUMMARY

Aspects of the present invention address one or more of the above identified issues, thereby providing an environment in which wireless users may roam between networks.

BRIEF DESCRIPTION OF DRAWINGS

FIGS. 10A-10L show data signals where a mobile node is moving from an internal network to an external network in accordance with aspects of the present invention.

FIG. 19 shows data flows relating to a method of i-MIP registration using an internal network in accordance with aspects of the present invention.

DETAILED DESCRIPTION

Aspects of the present invention relate to enabling secure network roaming. It is noted that various connections are set forth between elements in the following description. It is noted that these connections in general and, unless specified otherwise, may be direct or indirect and that this specification is not intended to be limiting in this respect.

The following description is divided into the following sections to assist the reader: terms; general architecture; data flows; security concerns and responses; and detailed data flows and routing tables.

Terms

The following provides a list of terms as used in the application:

Network Nodes
  a. MN: Mobile Node
  b. CH: Correspondent Host
  c. x-HA: External Home Agent (SMG)
  d. i-HA: Internal Home Agent
  e. VPN-GW: VPN Gateway MN Network Interfaces (Including Pseudo Interfaces):
  a. phy-IF: Physical interface (wired-Ethernet or wireless interface)
  b. i-MIP-tun: Internal MIP tunneling interface (pseudo device)
  c. x-MIP-tun: External MIP tunneling interface (pseudo device)
  d. VPN-tun: VPN tunneling interface (pseudo device)

Figure 2:
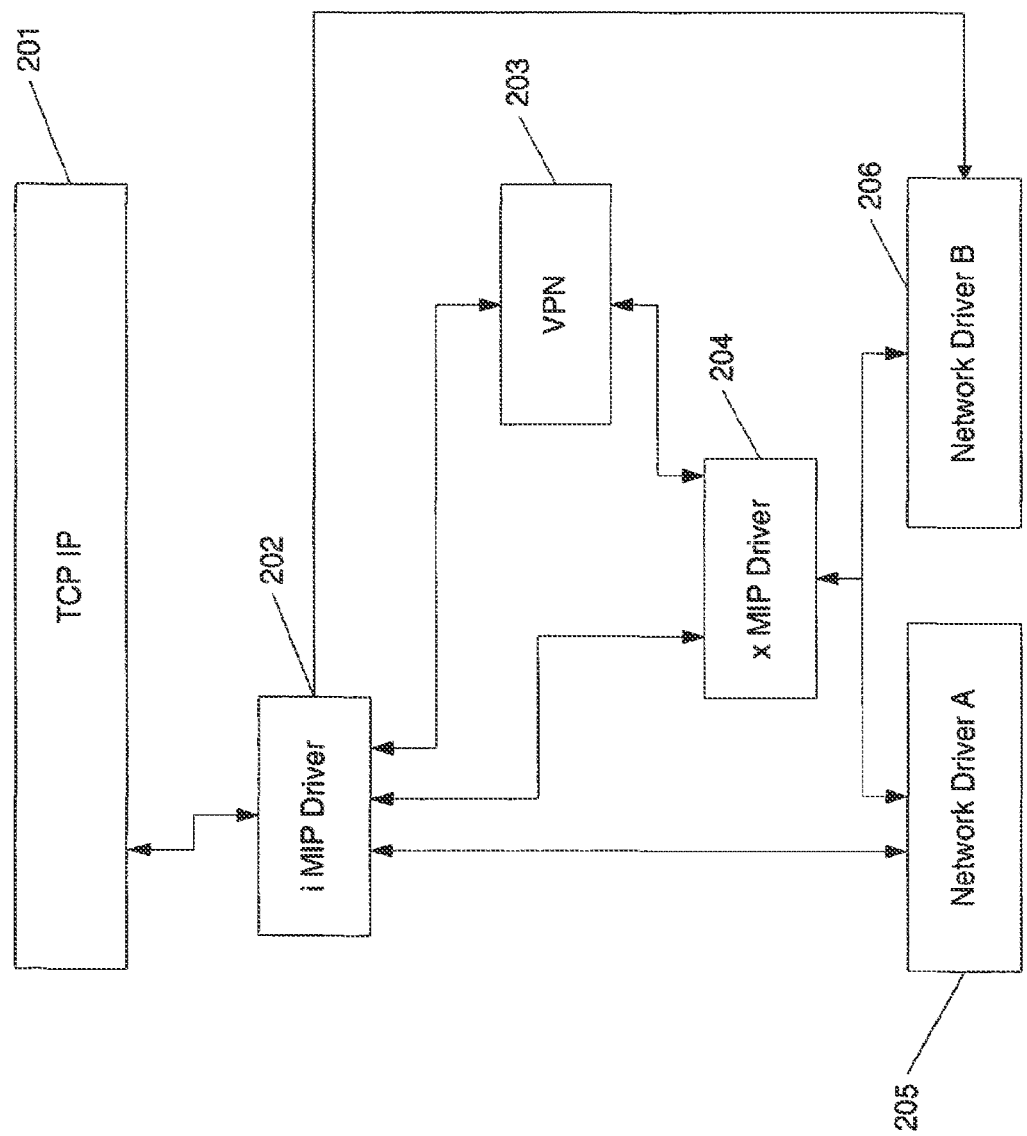
FIG. 2 shows a tunneling system in accordance with aspects of the present invention.

IP Addresses:
All IP addresses are denoted with su±x "-addr/i" or "-addr/x." Here, "A" means an internal address and "/x" means an external address. The boundary between "/i" and "/x" is set to VPN-GW, however it may be modified as desired. Messages from/to "/x" addresses may or may not be protected (for instance by encryption).
  a. cell-addr/x: Location address in cellular network
  b. hs-addr/x: Location address in a hot spot network
  c. cell-router-addr/x: Default router address in cellular network
  d. hs-router-addr/x: Default router address in a hot spot network
  e. ho-router-addr/x: Default router address in home network
  f. i-HA-addr/i: IP address of i-HA
  g. i-HoA-addr/i: Home address to be handled by i-HA
  h. x-HA-addr/x: IP address of x-HA
  i. x-HoA-addr/x: Home address to be handled by x-HA
  j. CH-addr/i: Address of CH in internal network
  k. VPNgw-addr/x: IP address of VPN gateway.
  l. VPNinn-addr1/i: VPN tunnel inner address assigned to the MN's end of the tunnel.
  m. VPNinn-addr2/i: VPN tunnel inner address assigned to the VPN's end of the tunnel.
  n. N-addr/i: Internal network address General Architecture FIG. 2 shows a general architecture for one or more aspects of the present invention. TCP/IP layer 201 exchanges information with i-MIP driver 202. i-MIP driver 202 may communicate with network drivers A 205 and B 206 directly, through x-MIP driver 204, or through the combination of VPN 203 and x-MIP driver 204. Further, FIG. 2 includes network driver A 205 and network driver B 206 which both may be accessed by i-MIP driver 202 and x-MIP driver 204.

Figure 3:
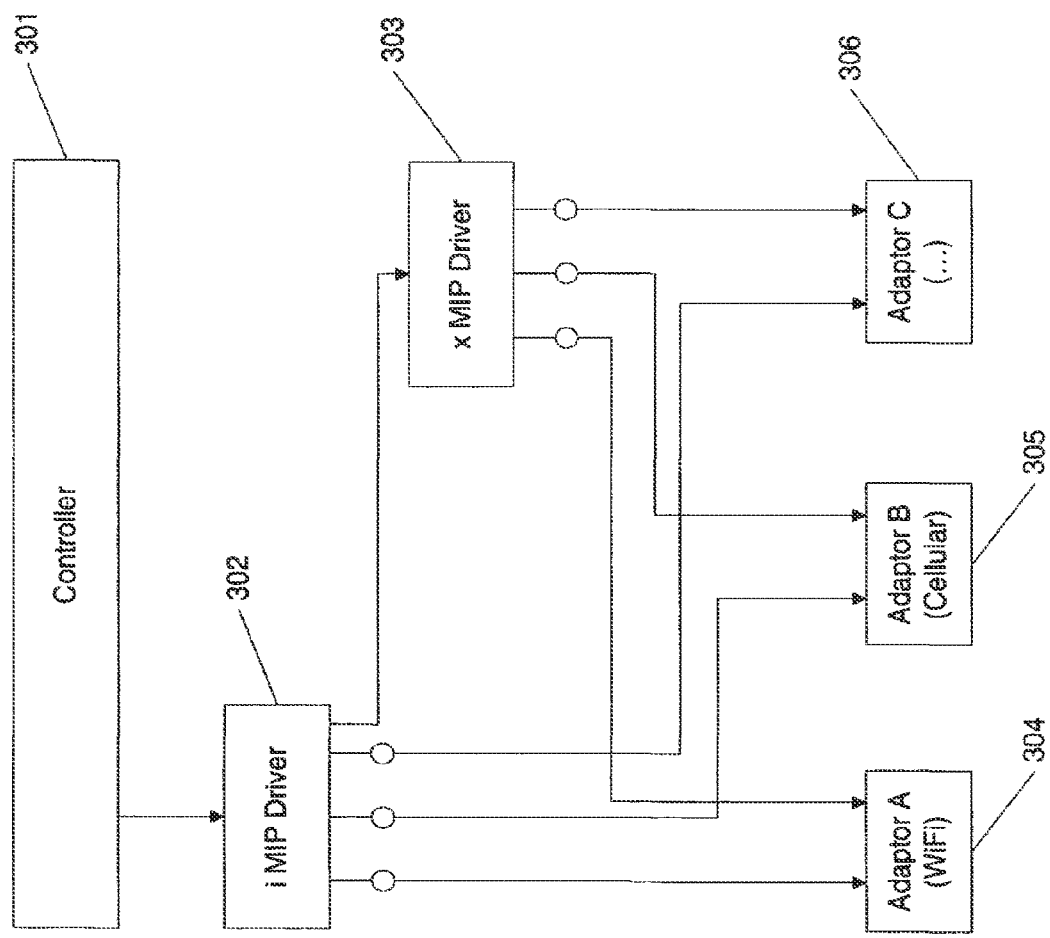
FIG. 3 shows a tunneling system in accordance with another aspect of the present invention.

FIG. 3 shows an example of interfaces on the i-MIP driver and the x-MIP driver. FIG. 3 includes controller 301, i-MIP driver 302, x-MIP driver 303, and three network adapters A-C 304-306. For purposes of illustration, the network adapters may include Wi-Fi, cellular, Bluetooth and other wireless technologies. It is noted that both Wi-Fi and cellular need not be present in the system. Alternate combinations are possible.

FIG. 3 shows i-MIP driver 302 having a number of interfaces. These interfaces allow the i-MIP driver 302 to connect to the various network adapters 304-306. x-MIP driver 303 has a similar (may or may not be identical) set of interfaces. The various interfaces allow the i-MIP driver 302 and the x-MIP driver 303 to communicate with the network adapters independently of each other. In comparison to FIG. 1, the i-MIP driver 302 may be connected directly with the network adapters 304-306. While the i-MIP driver 302 is communicating with the network adapters 304-306, the x-MIP driver 303 may be setting up a new communication pathway (or taking down a condition pathway) with another one of the network adapters 304-306 not presently accessed by i-MIP driver 302. This allows the system to create pathways to allow seamless roaming between divergent networks accessed by the network adapters 304-306.

Figure 4:
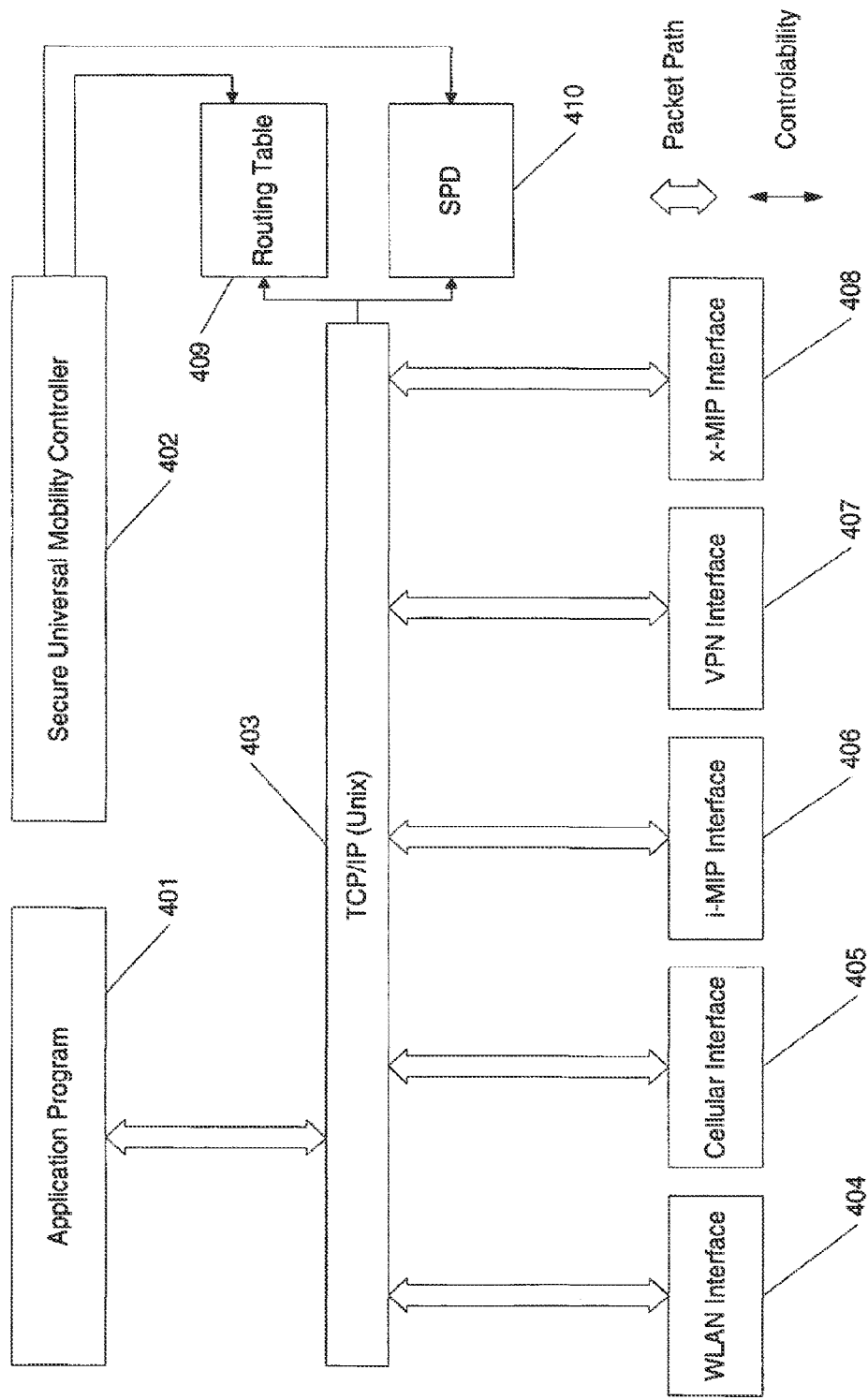
FIG. 4 shows an illustrative architecture in accordance with aspects of the present invention.

FIG. 4 shows an illustrative example of an architecture in accordance with aspects of the present invention. The architecture as shown in FIG. 4 may be a UNIX-based system. The architecture may include an application program 401, a TCP/IP layer 403, a WLAN interface 404, a cellular interface 405, a i-MIP interface 406, a VPN interface 407, and an x-MIP interface 408. In this UNIX-based example, the software includes application level programs and kernel-level modules. In an application layer, there may be several application programs can indicating with other nodes in networks.

Here, an additional program referred to as a secure universal mobility controller 402 is added to the application layer. The secure universal mobility controller 402 controls network interfaces and some kernel-level tables to manage secure universal mobility. The secure universal mobility controller 402 communicates with routing table 409 and security policy database 410.

Packet paths are shown in FIG. 4 with large arrows and control ability to paths are shown in FIG. 4 with small arrows.

The TCP/IP module 403 receives packets from application programs and network interfaces and forwards them to other applications or interfaces according to a routing table 409 and security policy database 410. The security policy database (SPD) 410 determines which IP packets should be encrypted or decrypted and how they are encrypted or decrypted. The routing table 409 determines where IP packets should be forwarded.

Some network interface drivers have physical network devices connected to actual networks, for example, wired Ethernet, wireless LAN, and cellular networks. Other network interfaces may not have physical devices, but may be able to receive packets from the TCP/IP layer, process them, and send them back to the TCP/IP layer. These network interfaces are referred to as pseudo network interfaces. These pseudo network interfaces address mobile IP or VPN issues, for example. MIP interfaces encapsulate IP packets or the capsulate IP-in-IP packets. VPN interfaces encrypt IP packets or decrypted encrypted packets.

Figure 5:
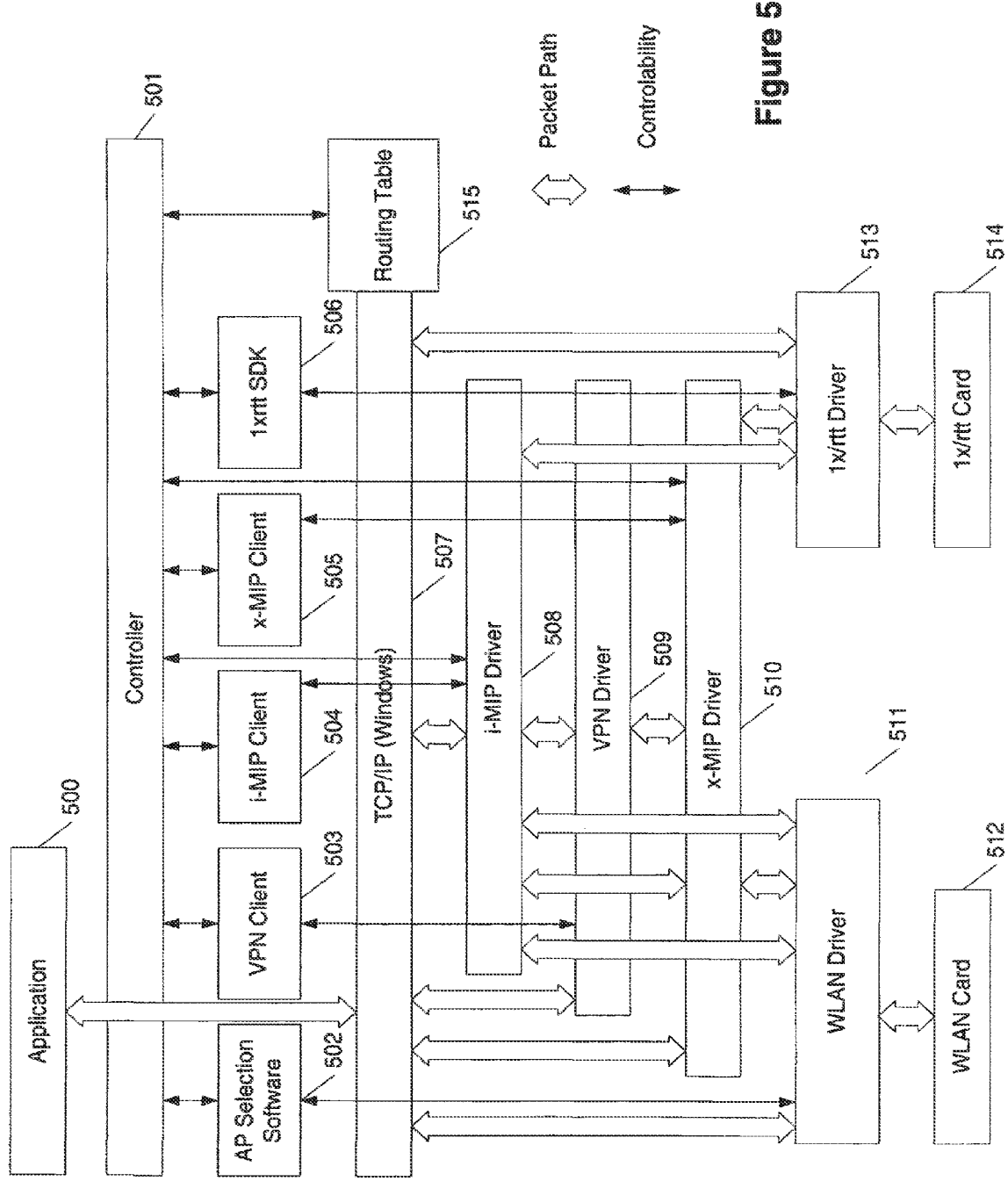
FIG. 5 shows another illustrative architecture in accordance with aspects of the present invention.

FIG. 5 shows another version of the architecture that may be used in the present the invention. Here, the TCP/IP layer may be Windows-based. FIG. 5 includes one or more applications 500 and a controller 501. Controller 501 controls various drivers and routing tables, manages the status of network concerns (such as wireless signal strength, network location, and the like). Controller 501 may or may not be separated into several processes. The separate processes may include application point (AP) selection software 502, VPN client 503, i-MIP client 504, x-MIP client 505, and other processes (for instance including 1xrtt SDK 506).

TCP/IP driver 507 may handle transport layer functions (for instance, UDP or TCP) and network layer functions (for instance, IP). Routing table 515 maintains routing information for TCP IP driver 507. Routing table 515 permits TCP/IP driver 507 the ability to know where to forward packets. i-MIP driver 508 processes i-MIP packets for receiving and sending. VPN driver 509 processes VPN packets. x-MIP driver 510 processes x-MIP packets. Network interface connection drivers (for instance, WLAN driver 511 and 1x/rtt driver 513) press packets for event respective interface devices (for instance, interface cards 512 and 514, respectively).

The above drivers may or may not be controlled by software in the application level. Packet paths are shown in FIG. 5 with large arrows and control ability to paths are shown in FIG. 5 with small arrows.

Data Flows

Figure 6:
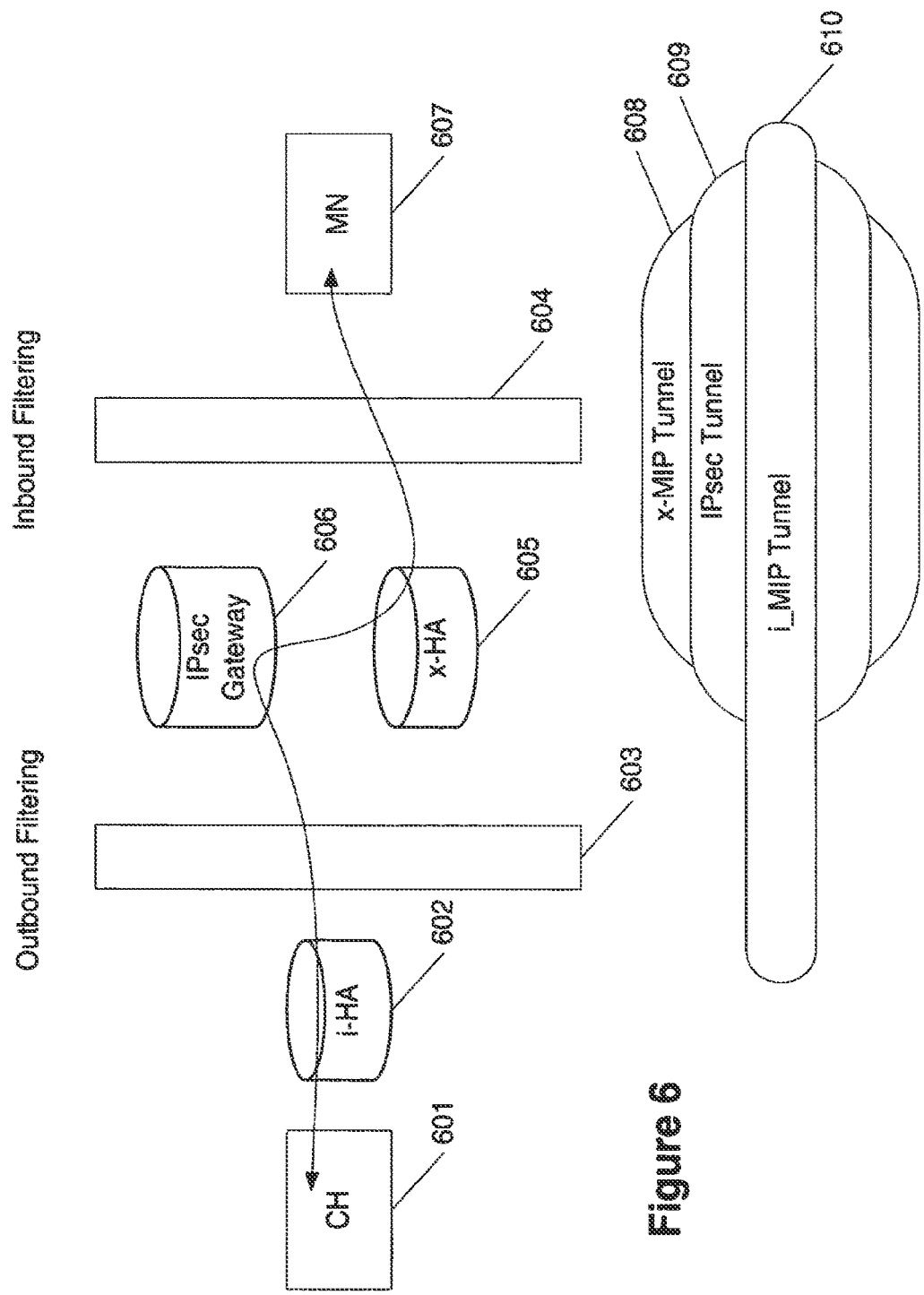
FIG. 6 shows a triple tunnel in accordance with aspects of the present invention.

FIG. 6 shows various data flows in accordance with aspects of the present invention. FIG. 6 includes a correspondent node 601 with an internal home agent i-HA 602. FIG. 6 includes two firewalls 603 and 604. Firewall 603 filters outbound packets and firewall 604 filters inbound packets. Between firewalls 603 and 604 are IPsec Gateway 606 and external home agent x-HA 605. Outside firewall 604 is mobile node 607. For simplicity, the region inside firewall 603 is referred to as an internal network. The region outside firewall 604 is referred to as an external network. The region between firewalls 603 and 604 is referred to as a demilitarized zone (DMZ).

To transmit data between mobile node 607 and correspondent host 601, various tunnels may be set up to pass information through the firewalls 603 and 604. A first tunnel may include x-MIP tunnel 608 that allows packets to be passed from mobile node 607 x-HA 605. A second tunnel may include IPsec tunnel 609. The third tunnel may include i-MIP tunnel 610.

Here, the external mobile IP (x-MIP) (from previous figures) provides external IP mobility. IPsec tunneled packets are carried in an x-MIP tunnel 608 in order to provide mobility for the IPsec tunnel 609. To this end, an external home agent (x-HA) 605 resides in the DMZ. The DMZ may be managed by the enterprise or an operator that provides an enterprise firewall service among others.

The internal mobile IP (i-MIP) (from previous figures) provides internal IP mobility. This is for supporting handoff not only in the internal network but also between the internal and external networks. For the latter reason, i-MIP is used even when mobile node (MN) 607 is in the external network. To provide i-MIP, an internal home agent (i-HA) 602 resides in the internal network.

Aspects of the present invention use IPsec to protect traffic exchanged between the internal network and an MN 607 in the external network. To this end, the IPsec gateway resides in the DMZ (between firewalls 603 and 604) or internal network (inside firewall 603).

The IPsec tunnel that was once established between the mobile node 607 and IPsec Gateway 606 may or may not remain established while the total node 607 is in the external network. The IPsec tunnel 609 may be terminated by either side of the tunnel for a number of reasons such as an inactive timeout or reaching the maximum number of simultaneous IPsec tunnels, among others.

Aspects of the present invention may or may not allow limited types of packets to be forwarded from the internal network to the MN 607 in the external network without using an IPsec tunnel so that the MN 607 can receive an incoming application call while away from the internal network without maintaining the IPsec connectivity all the time.

Figure 7:
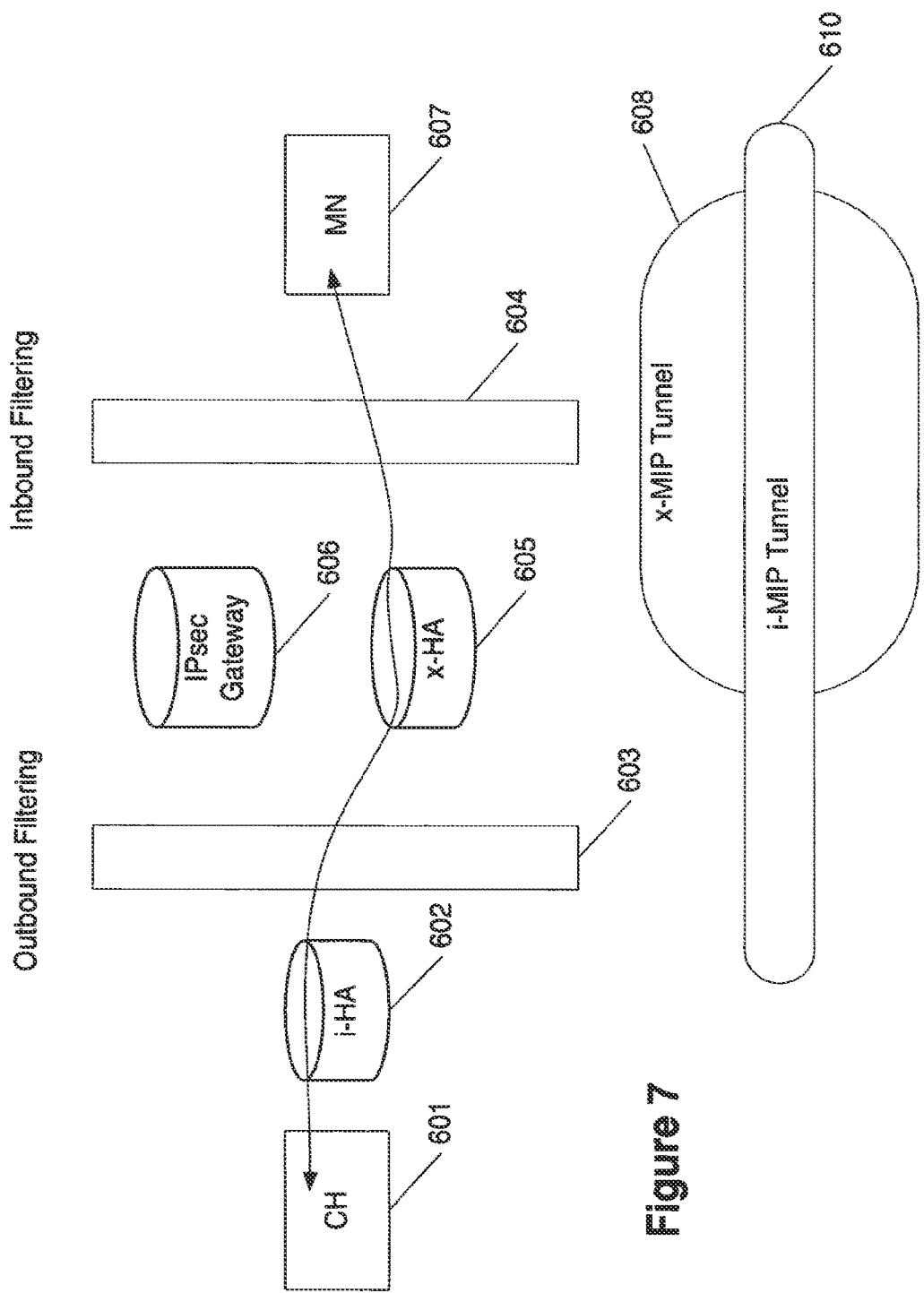
FIG. 7 shows a double tunnel in accordance with aspects of the present invention.

FIG. 7 shows an alternate approach to that of FIG. 6 where the x-MIP tunnel 608 and i-MIP tunnel 610 have been established without the IPsec tunnel of FIG. 6.

With respect to the various tunnels, the model allows two modes of operation while the MN is in the external network, depending on whether an IPsec tunnel 609 has been established or not. These include the MIP-IPsec-MIP encapsulation mode of FIG. 6 and the MIP-MIP encapsulation mode of FIG. 7, respectively.

Security Concerns And Responses

Security is important for VPN users. The following section various security threats regarding the MIP-IPsec-MIP encapsulation model of FIG. 6 and/or the MIP-MIP encapsulation model of FIG. 7.

Threat 1: DoS Attack on i-HA

Aspects of the present invention allow the MN 607 in the external network to perform i-MIP registration. Thus, if i-MIP registration is compromised, it is possible for an attacker in the external network to launch a DoS (Denial of Service) attack to modify or erase the MIP binding cache on the i-HA 602. The i-MIP registration may then be compromised if Registration Request messages are not protected by a mechanism that is as strong as typical MAC (Message Authentication Code) algorithms used for IPsec and is capable of re-keying.

Threat 2: Information Leakage

Aspects of the present invention allow some packets to be forwarded from the internal network to the MN 607 in the external network without using an IPsec tunnel 609. There is a chance that enterprise information may be sent to the external network in clear-text.

Threat 3: False Incoming Calls and Virus Infection

Aspects of the present invention allow permit the MN 607 in the external network to open one or more TCP/UDP ports to receive incoming calls from the internal network. Thus, an attacker may send bogus incoming calls on the opened ports which would make the MN 607 consume resources for processing the incoming calls and establishing an IPsec tunnel 609 to respond to the caller. Depending on how the incoming calls are processed, the MN 607 may receive a virus instead of a true incoming call and be infected with it. Such a virus may harm the various entities in to including connection hijacking and erasing hard discs and, once an IPsec tunnel is established, it could affect the entire security of the internal network.

Dealing with Threat 1:

For Threat 1, aspects may support i-MIP Registration Request messages sent by the MN 607 in the external network to always be transmitted through an IPsec tunnel to provide the same level of protection as IPsec for the Registration Request messages. If an IPsec tunnel does not exist, the MN 607 first establishes an IPsec tunnel 609 and then sends an i-MIP registration request through the tunnel 609. If the IPsec tunnel 609 is established automatically via IKE (Internet Key Exchange), re-keying is also supported via IKE. This way an acceptable level of security is provided for i-MIP Registration Request. On the other hand, a possibility exists in which an i-MIP Registration Reply message is transmitted to the MN 607 directly through the x-HA 605 when the external home address (x-HoA) is used as the external care-of address (this is the case when enabling a MIP-MIP encapsulation tunnel) and thus the i-MIP Registration Reply message is not as secure as i-MIP Registration Request message. While this may indicate a DoS attack on the MN 607, this cannot be a DoS attack on the i-HA and the model provides an acceptable level of security for Threat 1.

Dealing with Threat 2:

Aspects of the present invention generally does not allow traffic in the reverse direction (i.e., traffic originated in the external network and coming into the internal network) to enter the internal network without being protected with an IPsec tunnel 609. Thus, all traffic including both signaling and data packets use an IPsec tunnel 609, except for an i-MIP Registration Reply messages that is used for entering the MIP-MIP encapsulation mode and directly passes through x-HA 605 without being encrypted as well as the first data packet that is sent from the internal network to the MN that might be neither integrity protected nor encrypted. The i-MIP Registration Reply message contains internal topological information such as the IP address of i-HA 602 but does not contain any application data. With regard to the first data packet, it is typically a TCP-SYN or a SIP Invite message, which is used for initiating a connection and does not contain any important data. Thus, significant information leakage is not likely to occur for these messages if the firewall router in the DMZ is configured such that only limited types of packets can go out to the external network without being protected with IPsec so that Threat 2 is mitigated.

Dealing with Threat 3:

To minimize the possibility of false incoming calls, the MN 607 device can be configured with a personal firewall so that only limited types of packets may be accepted as a trigger to initiate an IPsec tunnel 609 establishment. In addition, the MN 607 can limit the rate of accepting such trigger packets to prevent the resource consumption DoS attack. To minimize the possibility of virus infection, the MN 607 may or may not use an unprotected incoming packet as a trigger to set up an IPsec tunnel and silently discard it without processing the application payload of the packet, expecting that the trigger packet will be retransmitted by the sender and that the retransmitted packet will be transmitted through the IPsec tunnel 619 once the tunnel is made and an i-MIP binding cache is updated to use the VPN care-of address as the i-MIP care-of address.

Detailed Data Flows and Routing Tables

The following section describes various scenarios including a description of various data flows and routing tables as encountered by aspects of the present invention. The following section describes both the triple tunnel set of scenarios and the double tunnel set of scenarios.

Always-Triple Scenario

For first of the described scenarios is what is referred to as the always-triple scenario. Here, a mobile node (MN) always establishes i-MIP/VPN/x-MIP triple tunnel, when it moves to an external network.

Scenarios

The following describes detailed network messages and processes in the various network nodes as including the mobile node. Various implementations of the mobile node may exist. A Windows-based and UNIX-based versions of the mobile node are described.

Scenario that MN Moves from an Internal Network to an External Network

The following scenario is one in which they mobile node moves from an internal network to an external network. FIGS. 10A-10L are used to explain the transition. Here, the system includes correspondent host 601, i-HA 602, a VPN gateway 1001 (located inside of firewall 603), external home agent 605, firewall 604 and mobile node 607. For this example, a UNIX-based a limitation for mobile node 607 is described.

In an initial state, the mobile node 607 determines where it is located. This may be done by examining network connectivity information (including but not limited to an Ethernet interface, a WLAN interface, dial-up ppp etc.), network configurations (given by DHCP, router advertisement or mobility agents) and/or WLAN/Cellular signal strength).

To explain the movement of the mobile node 607, it is assumed for this example that mobile node 607 is located in an internal network and the routing table of the mobile node is in an initial state (referencing the internal network).

Figure 10A:
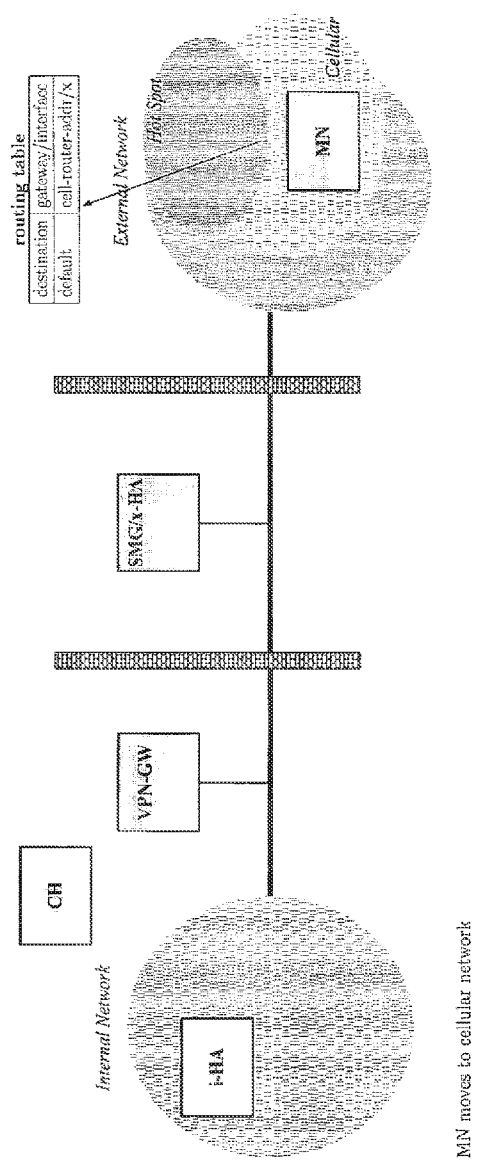

In FIG. 10A, mobile node 607 moves into a cellular network. The mobile node 607 may detect its movement according to, for instance, the strength of a WLAN signal or other location identifying techniques.

The PPP interface of mobile node 607 receives an IP address and routing information. The mobile node 607 next alters its routing table according to the information. The routing table of the mobile node 607 is shown in FIG. 10A.

Figure 10B:
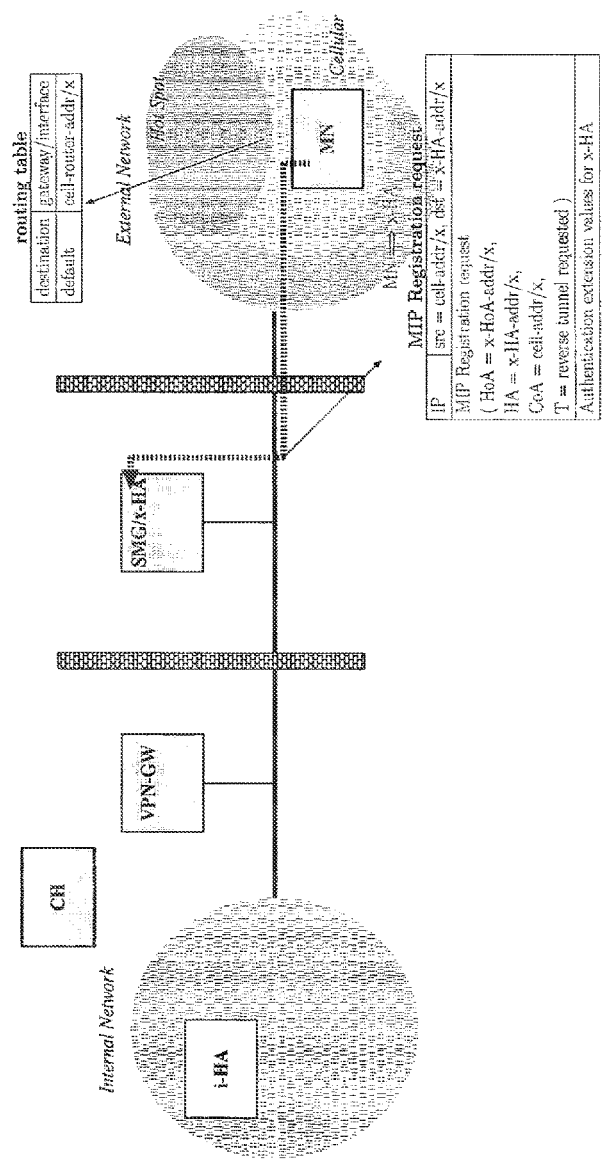
Figure 10C:
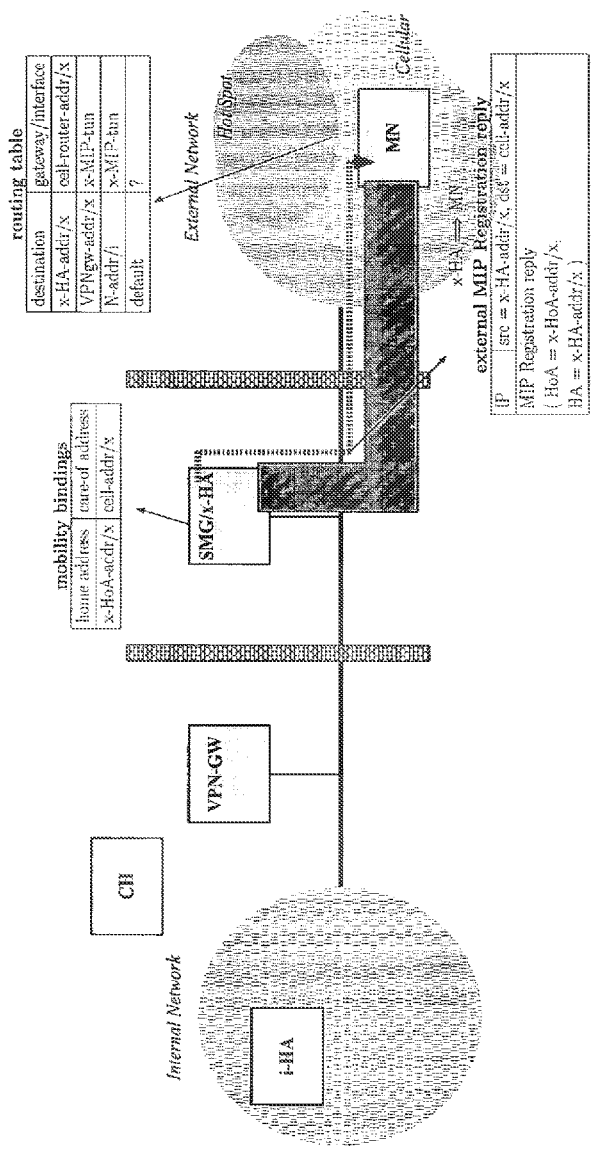

FIGS. 10B and 10C describe x-MIP registration. In FIG. 10B, the mobile node 607 cents and x-MIP registration request message to x-HA 605 and receives an x-MIP registration response message from x-HA 605. After x-HA 605 sends a successful response to mobile node 607, x-HA 605 updates its mobility bindings. After mobile node 607 receives a successful response from x-HA 605, mobile node 607 adds new entries to its routing table, if a reverse tunnel is required for x-MIP. The configuration of the external firewall may require a reverse tunnel for x-MIP. Further IP packets sent from MN to any address in the internal network is considered to be transmitted through x-MIP tunnel. FIGS. 10B and 10C show the updates to the tables.

One may also reference the Make-Before-Break section described below.

Figure 10D:
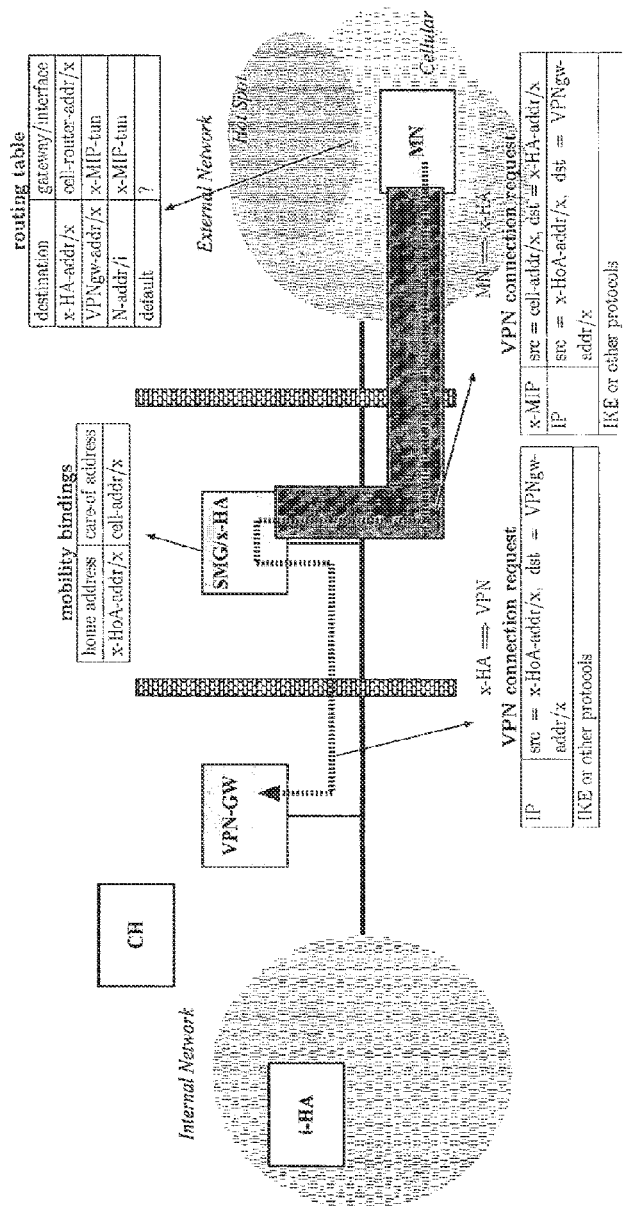
Figure 10E:
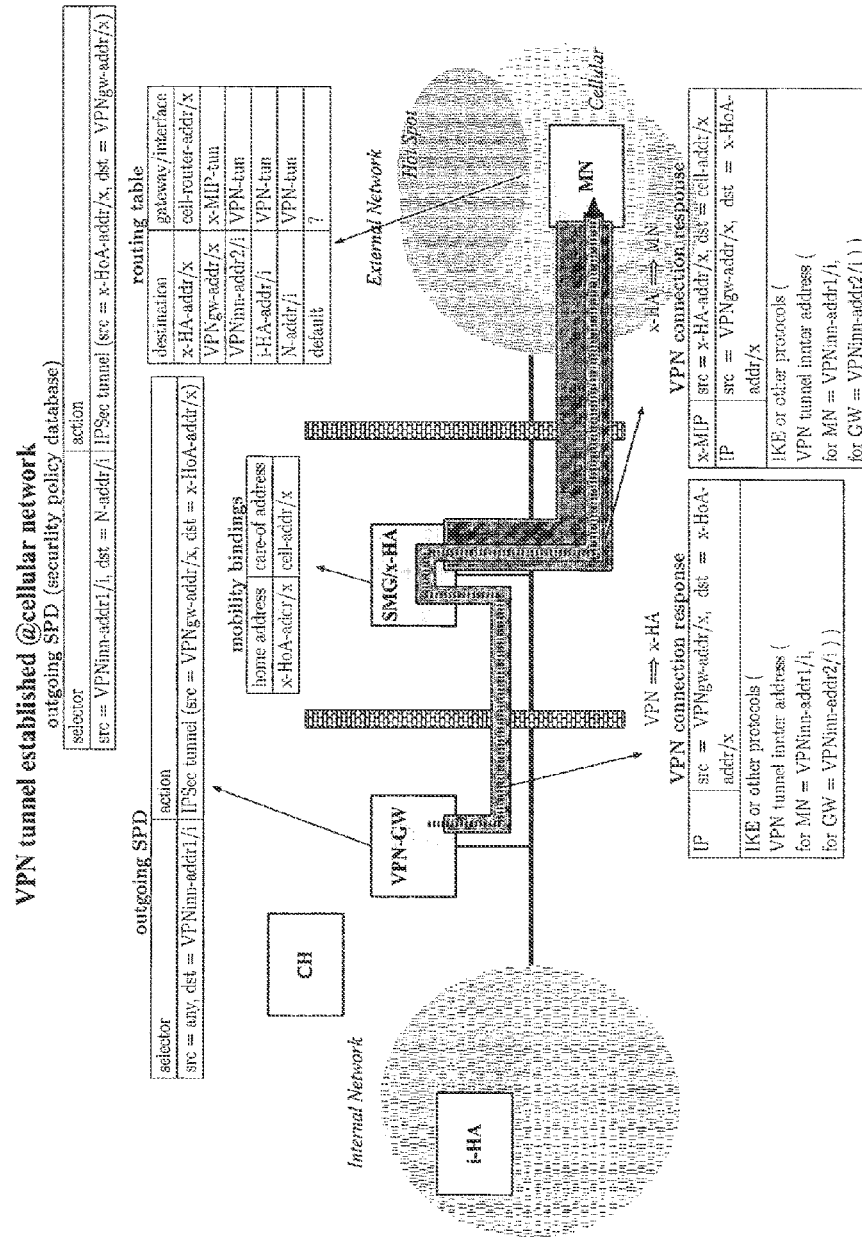

FIGS. 10D and 10E described establishing a VPN tunnel. After success of x-MIP registration, mobile node 607 requests VPN-gw 1001 to establish a VPN tunnel through the x-MIP tunnel. If a VPN is established successfully, mobile node 607 creates an entry in its security policy database and updates the routing table, so that further IP packets transmitted between mobile node 607 and the internal network (except packets directed to the VPNGW address and DMZ) are sent through VPN/x-MIP tunnel.

VPN-gw 1001 also updates its SPD to communicate with the mobile node 607. These updates are shown in FIGS. 10D and 10E.

Figure 10F:
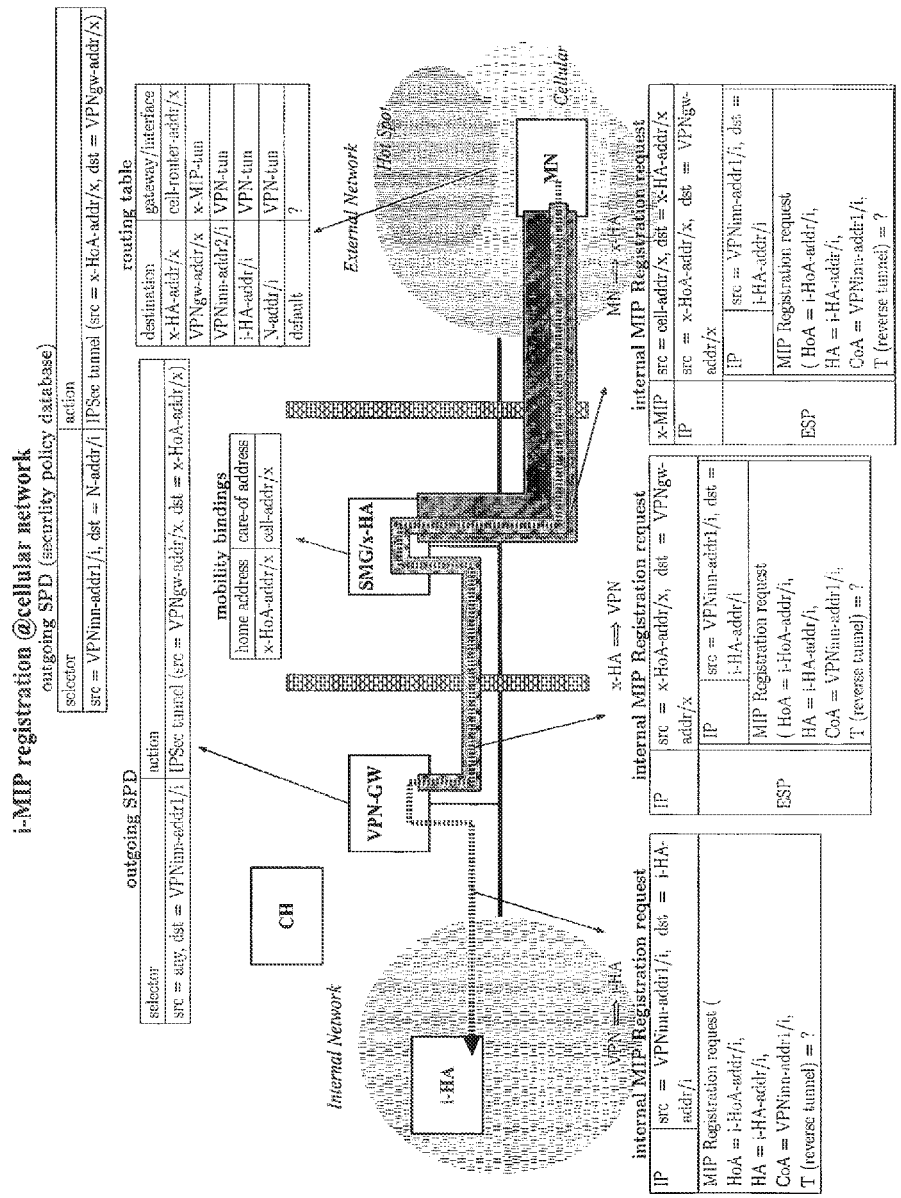
Figure 10G:
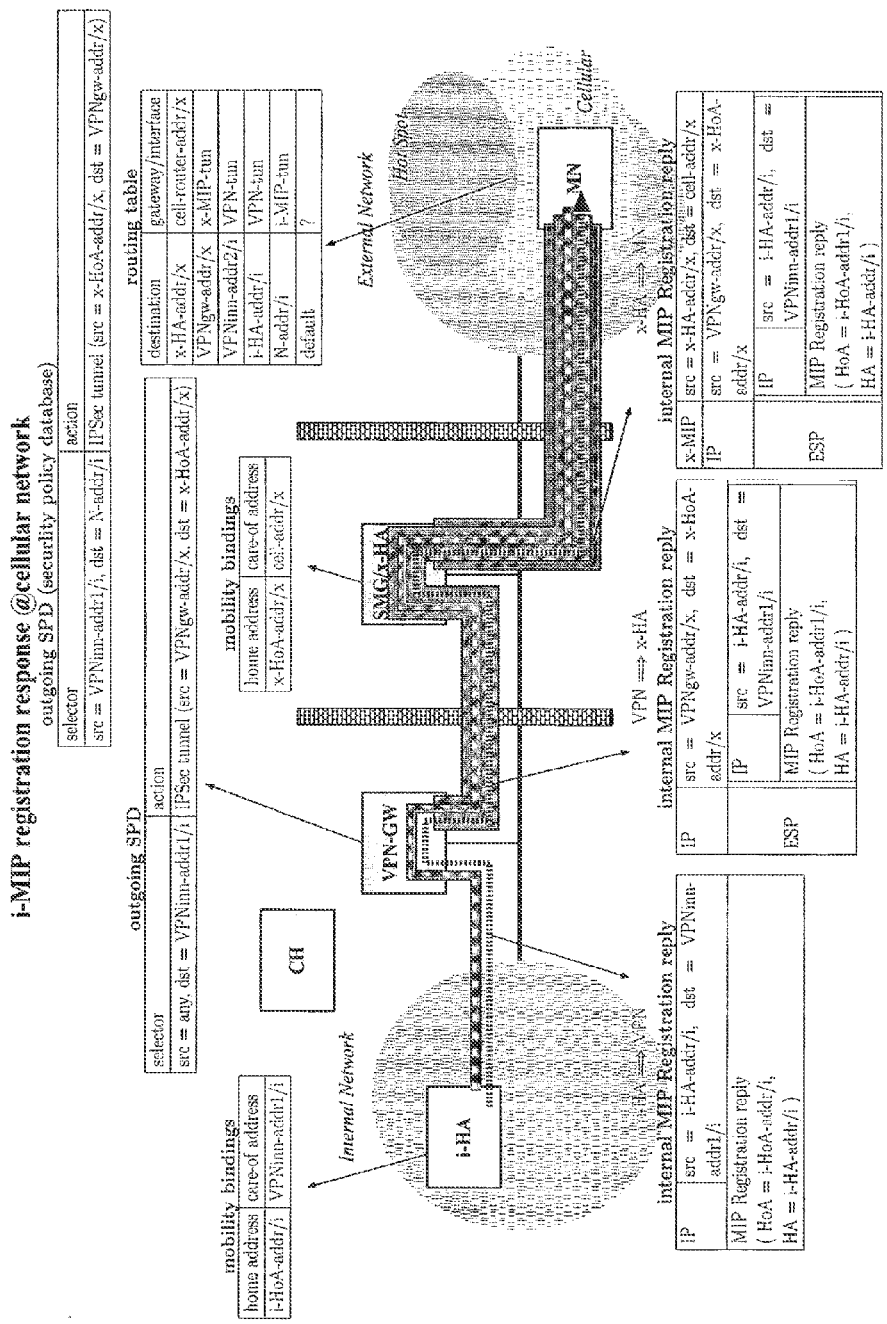

FIGS. 10F and 10G describe i-MIP registration. After successful establishment of VPN connection, mobile node 607 sends i-MIP registration request through the VPN/x-MIP tunnel. If i-HA 602 accepts the registration request, i-HA 602 updates its mobility binding table and replies to mobile node 607. After the successful response message is received by mobile node 607, mobile node 607 changes an entry of the routing table, so that further IP packets transmitted between mobile node 607 and the internal network (except the VPN-gw 1001's address, DMZ and i-MIP update packets sent to i-HA 602) are sent through the VPN/x-MIP tunnel.

FIGS. 10F and 10G show the revised tables.

Figure 10H:
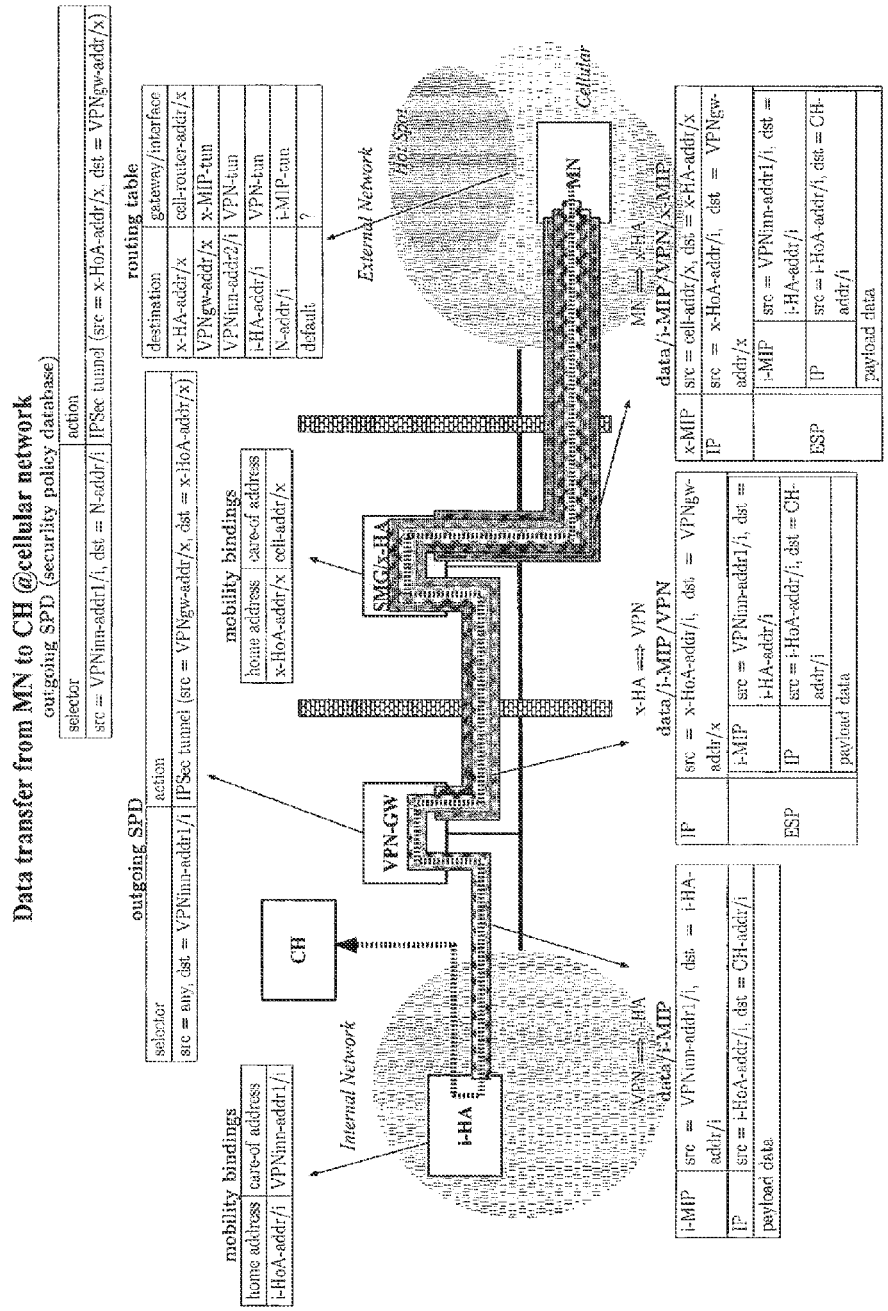

FIG. 10H describe sending data through the triple tunnel. When mobile node 607 sends a IP packet to correspondent node 601 (CH-addr/i), the IP layer of mobile node 607 refers the routing table, and finds an entry for N-addr/i. Here, mobile node 607 notices packets should be sent via the i-HA-tun interface. The i-HA-tun interface encapsulates the packet with the i-MIP header, if a reverse tunnel is required. Next, mobile node 607 refers to the routing table again. However the destination address of the packet is now i-HA-addr/i. Mobile node 607 finds an entry for i-HA-addr/i and it indicates the packet should be sent via the VPN-tun interface. The outgoing SPD may indicate that the packet sent to the internal network should be encrypted. Accordingly, the VPN-tun interface encrypts the packet, encapsulates it with IPsec ESP, and labels it to be sent for VPNgw-addr/x according to the SPD.

Now the mobile node 607 refers the routing table when new packets arrive and finds the entry for VPNgw-addr/x showing the packet should be sent via the x-MIP-tun interface. The x-MIP-tun interface encapsulates the packet with the x-MIP header, if a reverse tunnel is required. x-MIP-tun labels the packet to be sent to the x-HA-addr/x. Mobile node 607 refers the routing table and finds the entry for x-HAaddr/x. The entry indicates the packet should be sent via the cellular interface. The packet is finally sent to the cellrouter-addr/x as the first hop via the cellular interface.

FIG. 10H shows the relevant tables.

Figure 10I:
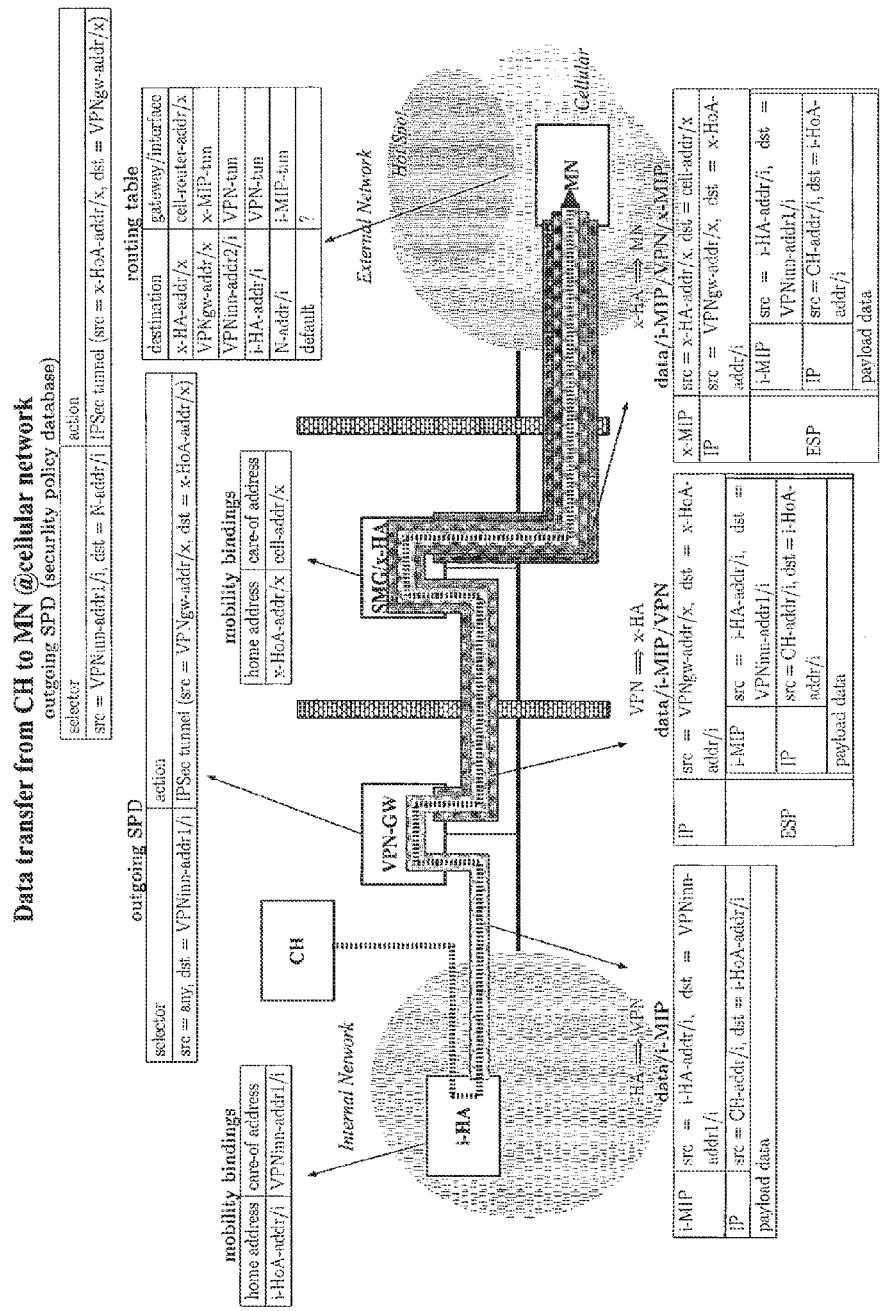

FIG. 10I is used to describe the receiving of data through the triple tunnel. When the cellular interface of mobile node 607 receives a packet through the triple tunnel, IP layer of mobile node 607 checks the outer most IP header of the packet. The protocol field of the header shows it is IP-in-IP (x-MIP) packet. Accordingly, the MIP layer decapsulates the outer most IP-in-IP header. The next IP header shows it includes IPsec ESP so the VPN interface decrypts the packet. The next IP header shows it is IP-in-IP (i-MIP) packet, so MIP layer decapsulates the packet. At last, the inner most IP header appears and the packet is received and processed by an application program.

Figure 10J:
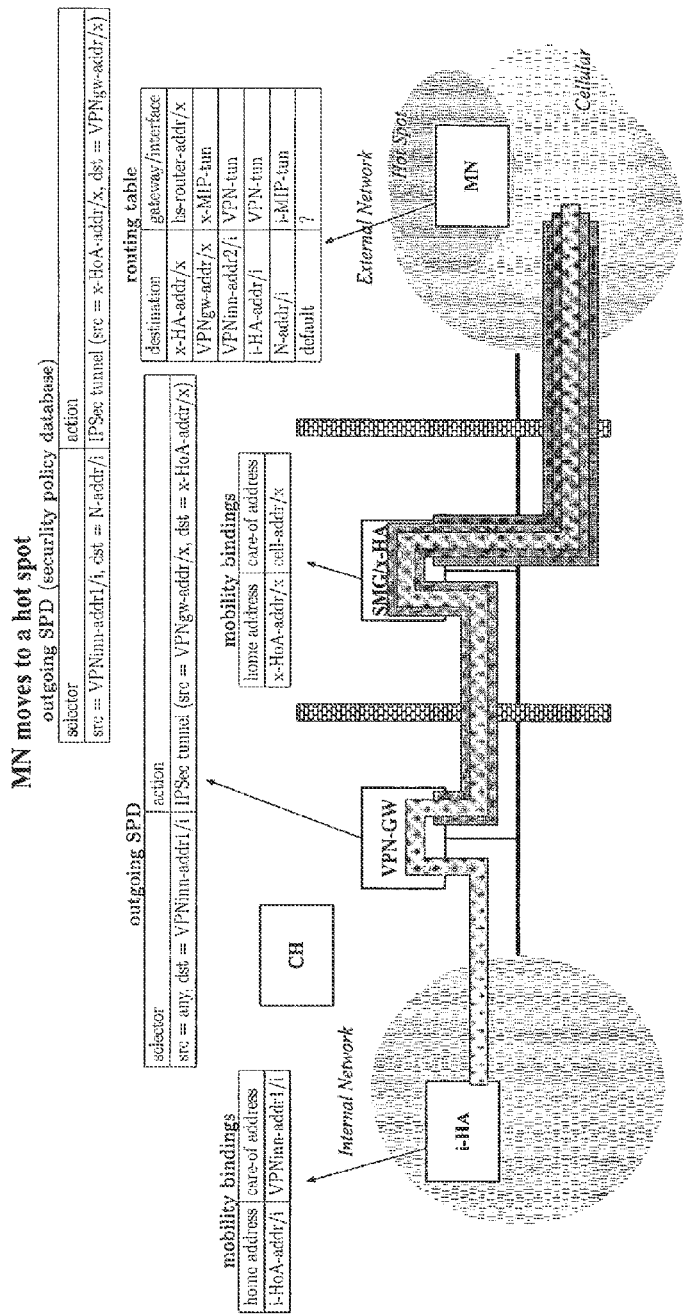

FIG. 10J shows the mobile node 607 moving to another external network (for example, a hot spot). When in the new network, the mobile node 607 detects its movement according to WLAN signal strength or other process. The WLAN network interface of mobile node 607 receives an IP address and routing information. Next, the mobile node 607 updates its routing table according to the information. This update is shown in FIG. 10J.

Figure 10K:
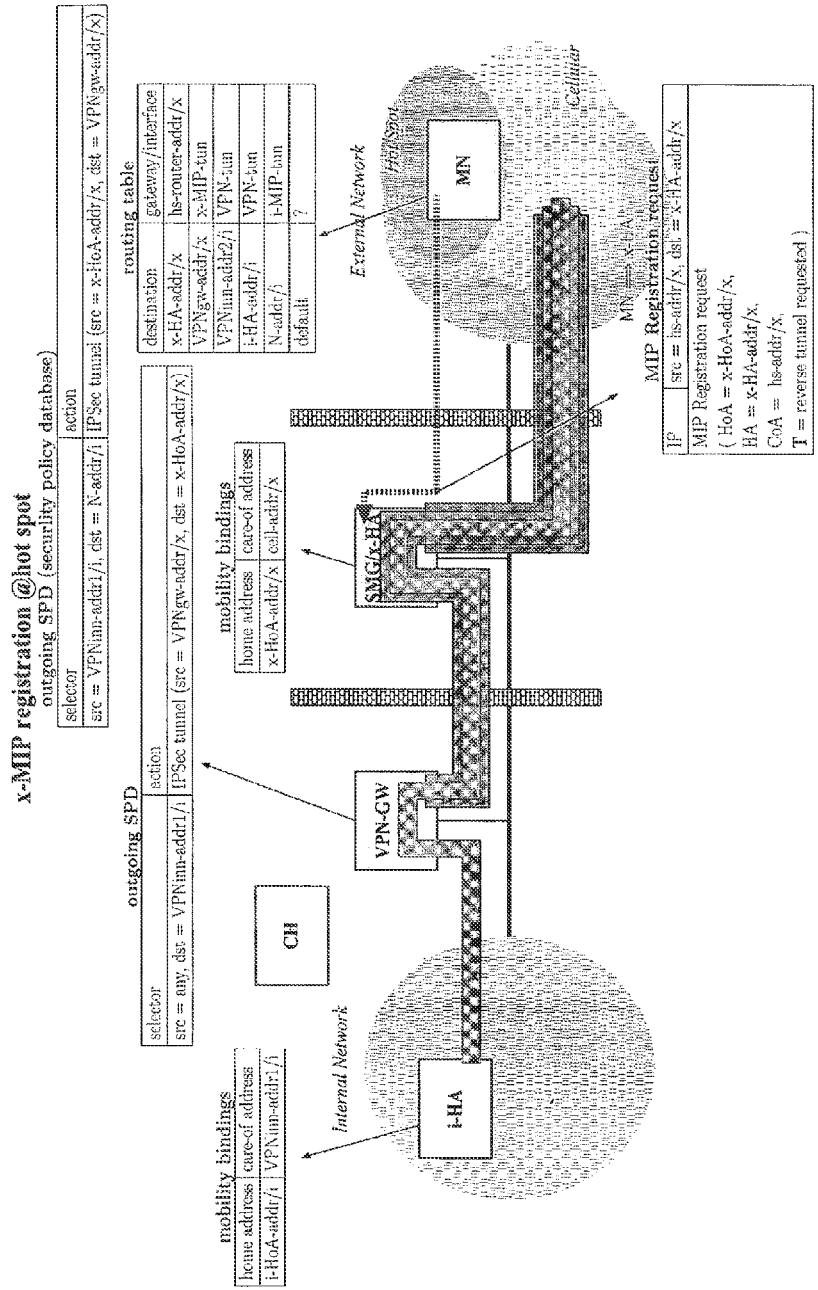
Figure 101:
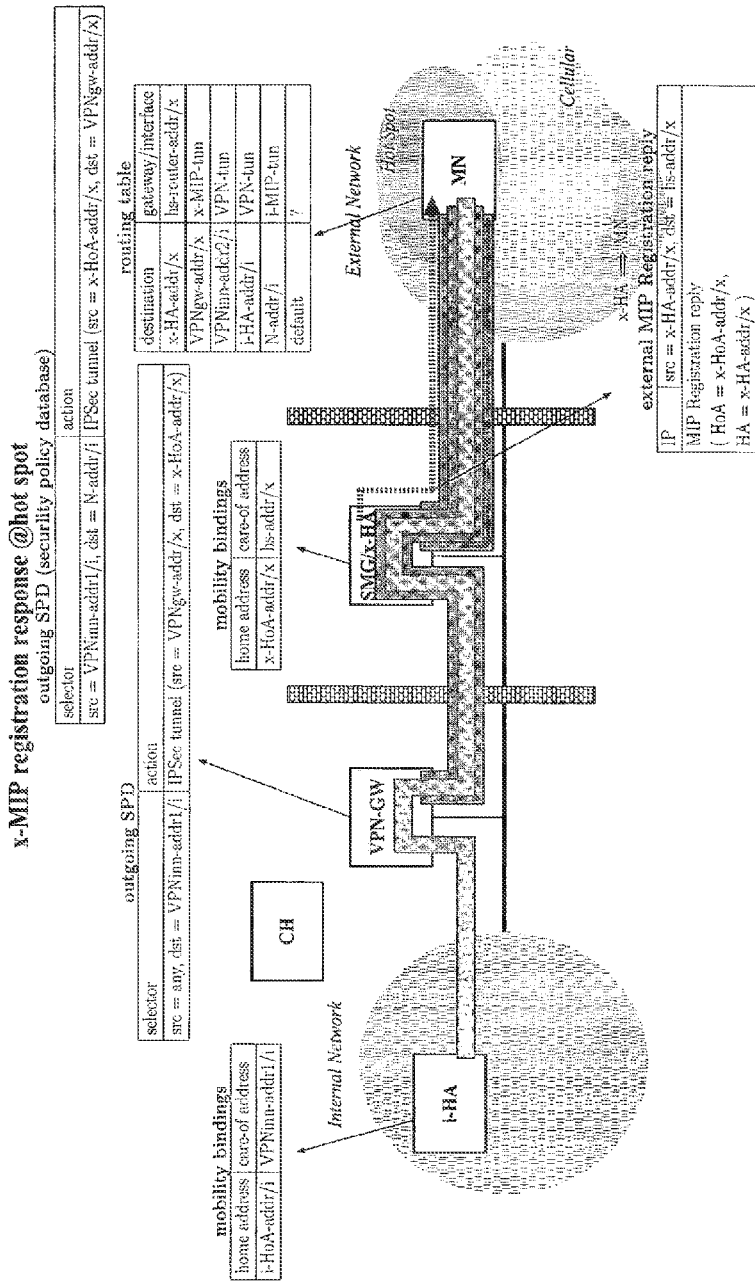

FIGS. 10K and 10L show the x-MIP update changes. Here, mobile node 607 sends x-MIP registration request message to x-HA 605, and receives the x-MIP registration response message from x-HA 605. When x-HA 605 sends a successful response to mobile node 607, x-HA 605 updates its mobility bindings. Notably, the mobile node 607 does not need to modify its connection with the VPN and i-MIP.

Scenario that MN Moves from an External Network to an Internal Network

FIGS. 11A-11F show the system where a mobile node 607 moves from an external network to an internal network. The following is described for a UNIX-based implementation for the mobile node 607.

Figure 11A:
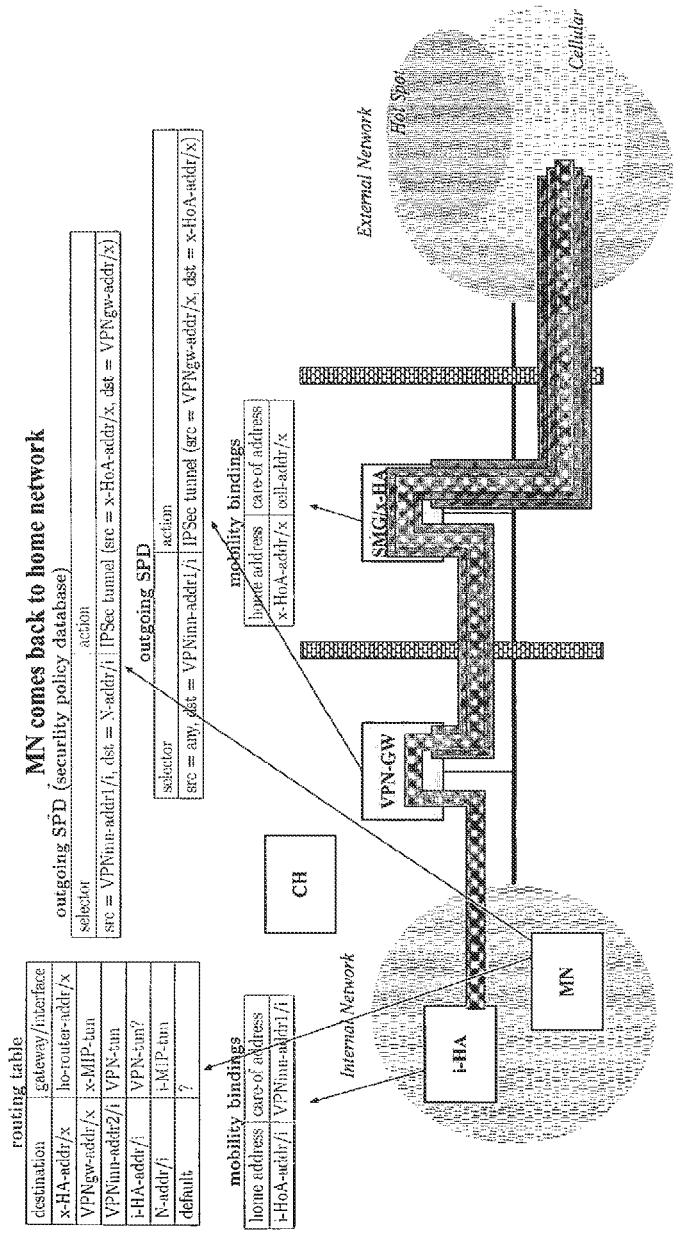
FIGS. 11A-11F show data signals where a mobile node is moving from an external network to an internal network in accordance with aspects of the present invention

In FIG. 11A, the mobile node 607 moves back to a home network. Here, this example is premised on the mobile node 607 having moved to an internal network. Mobile node 607 detects its movement according to WLAN signal strength or the like. The WLAN network interface of MN, when using the WLAN signal strength to determine its location, gets an IP address and routing information. Mobile node 607 updates its routing table according to the information.

At this point in time, mobile node 607 communicates with correspondent node 601 without any tunnels. Mobile node 607 can simply destroy and flush tunnel information when desired, if one does not care about the VPN-gw 1001 and x-HA 605. Alternatively, one may leave the tunnels open.

The following shows how the tunnels may be destroyed. Here, this allows x-HA 605 and VPN-gw 1001 to free their resources immediately.

Mobile node 607 can send an i-MIP deregistration request to i-HA 602 first. It eliminates the delay caused by disconnections of tunnels and enables one to communicate with CNs continuously. When i-HA 602 receives a deregistration request, it removes the entry of mobility bindings and replies to mobile node 607. After mobile node 607 receives a successful deregistration response, mobile node 607 updates the entry for N-addr/i of the table so to use the network interface directly to communicate with nodes in the internal network. FIGS. 12J and 12K show this process.

Figure 11B:
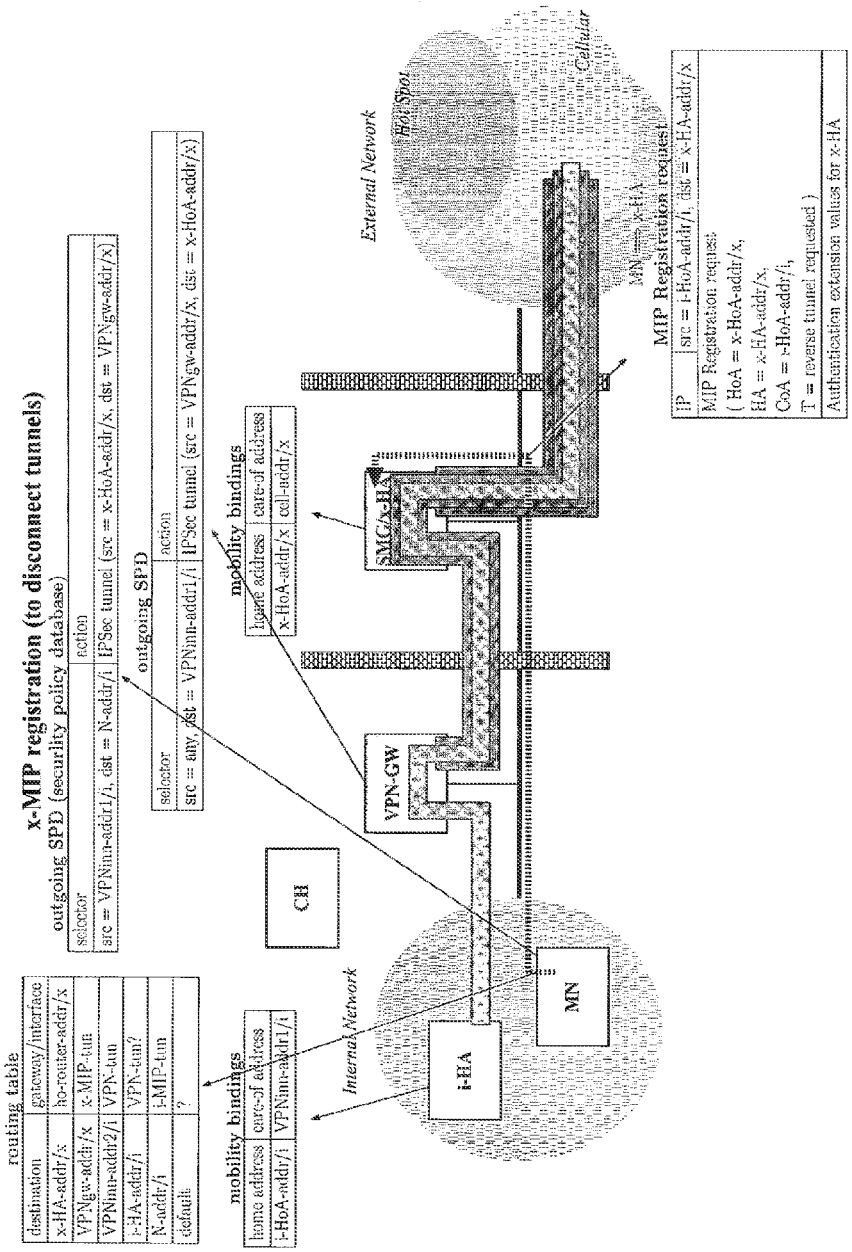

FIG. 11B shows the updating of the x-MIP update, if necessary. Two cases may apply:

a. Case 1: Mobile node 607 cannot use the network interface which was used in the external network. For example, mobile node 607 is reusing the same network interface which was used in an external network until mobile node 607 moved to the internal network, so the interface has another IP address than one set in the external network.

b. Case 2: Mobile node 607 can use the network interface which was used in the external network. In other words, mobile node 607 has at least two network interfaces (physically or virtually), and they can be used simultaneously.

For example, mobile node 607 used to use a cellular interface in the external network, and is using WLAN interface in the internal network.

If the case is 1, mobile node 607 needs to update x-MIP (see FIGS. 11B and 12I). Mobile node 607 registers i-HoA-addr/i as x-MIP CoA. x-HA 605 updates its mobility bindings, so that tunnels are set up again.

If the case is 2, mobile node 607 can use the network interface without updating x-MIP as shown in the following Figures.

Figure 11C:
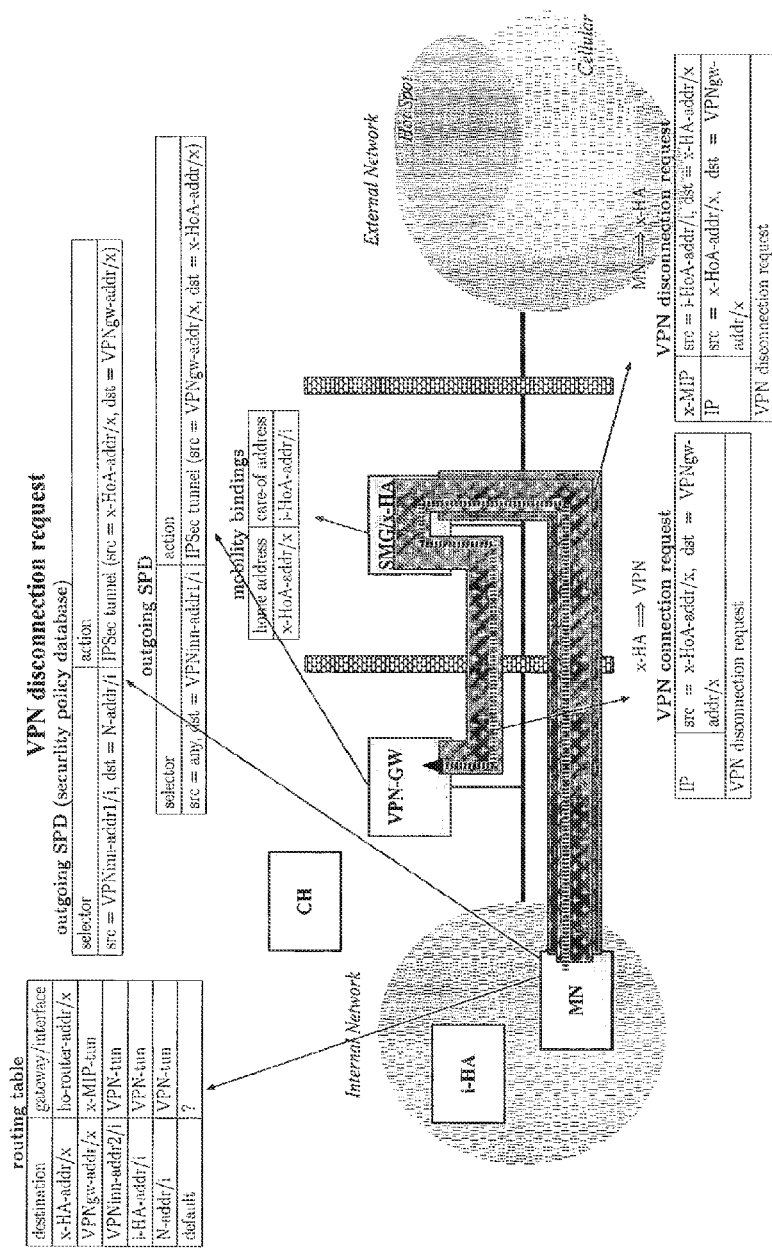
Figure 11D:
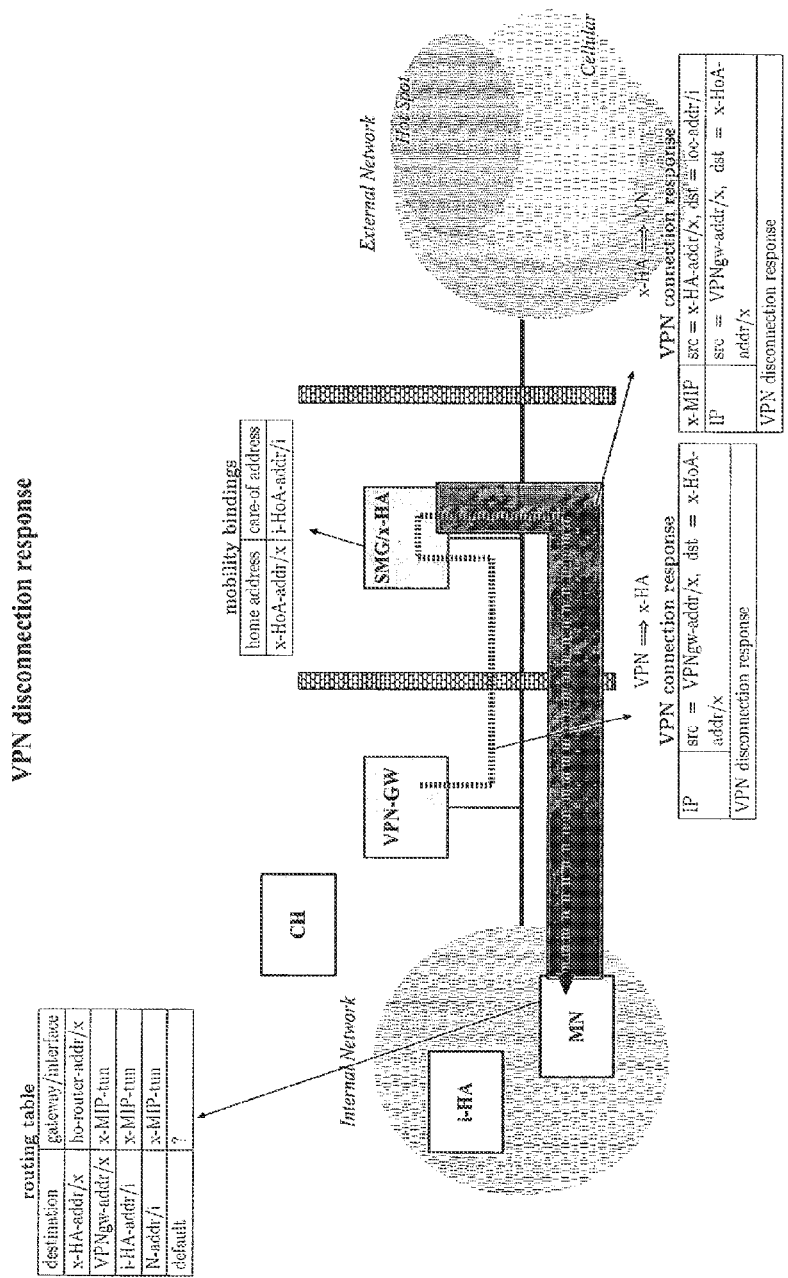

FIGS. 11C and 11D show VPN tunnel disconnection. Mobile node 607 sends a VPN disconnection request through x-MIP tunnel. VPN-gw 1001 removes the mobile node 607 entry from its SPD. Mobile node 607 also removes VPN-gw 1001's entry from its SPD and updates the routing table. This permits the resources used in the VPN to be freed and mobile node 607 stops using VPN.

Figure 11E:
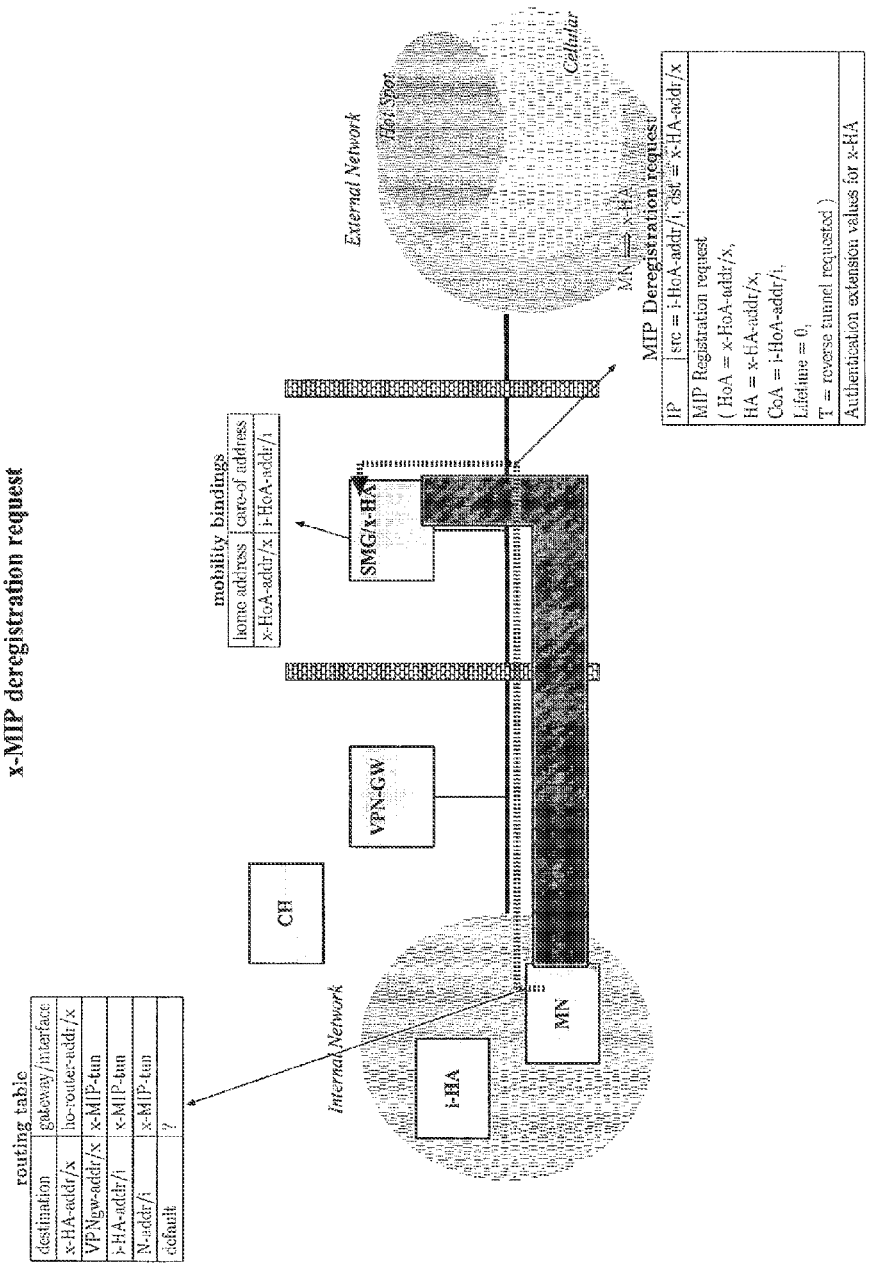
Figure 11F:
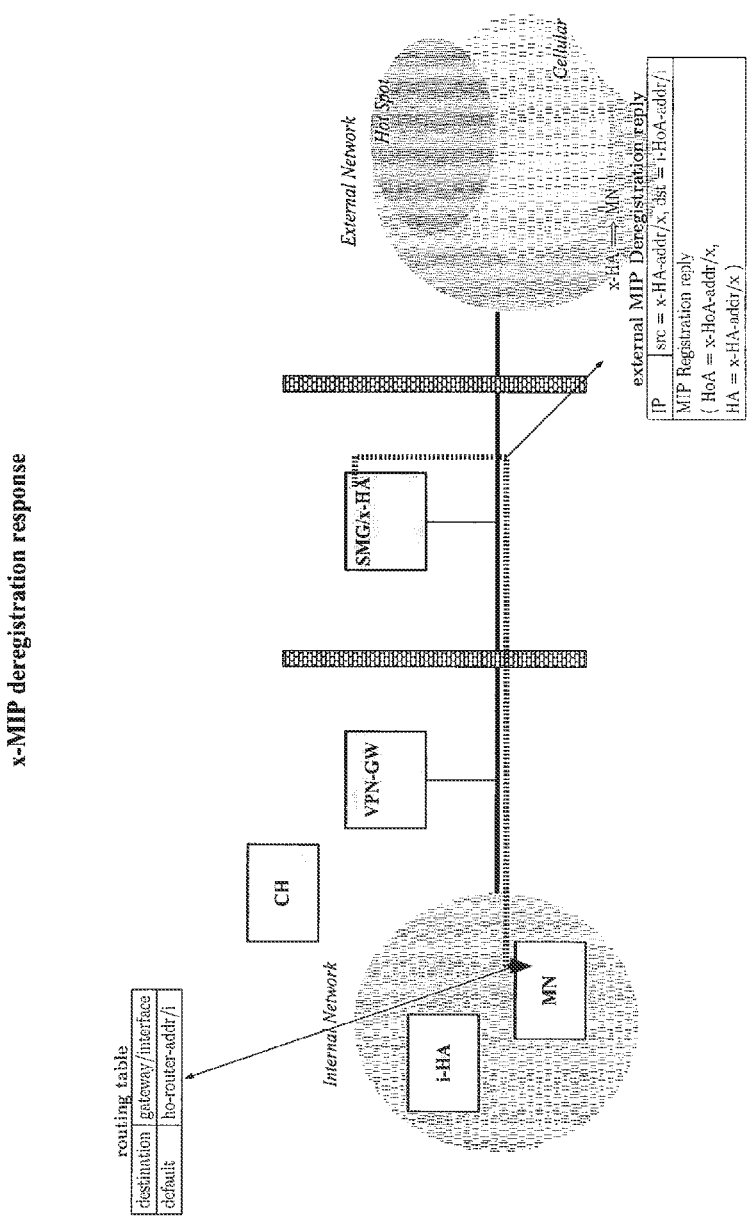

FIGS. 11E and 11F show x-MIP deregistration. Mobile node 607 sends an x-MIP deregistration request message to x-HA 605, and receives a x-MIP deregistration response message from x-HA 605. When x-HA 605 sends a successful response to mobile node 607, x-HA 605 removes the entry of mobility bindings for mobile node 607.

After mobile node 607 receives a successful response from x-HA 605, mobile node 607 removes the entry from its routing table. This permits all tunnels to disappear. Finally, the mobile node 607 returns to the state same with the initial one.

Scenario that MN Moves from an Internal Network to an External Network (Windows-Based Node)

FIGS. 12A-12K describe a scenario where the mobile node 607 moves from an internal network to an external network (using a Windows-based mobile node). In some instances, other figures are referenced that are relevant to the scenario where the mobile node moves from the internal network to the external network.

Figure 13A:
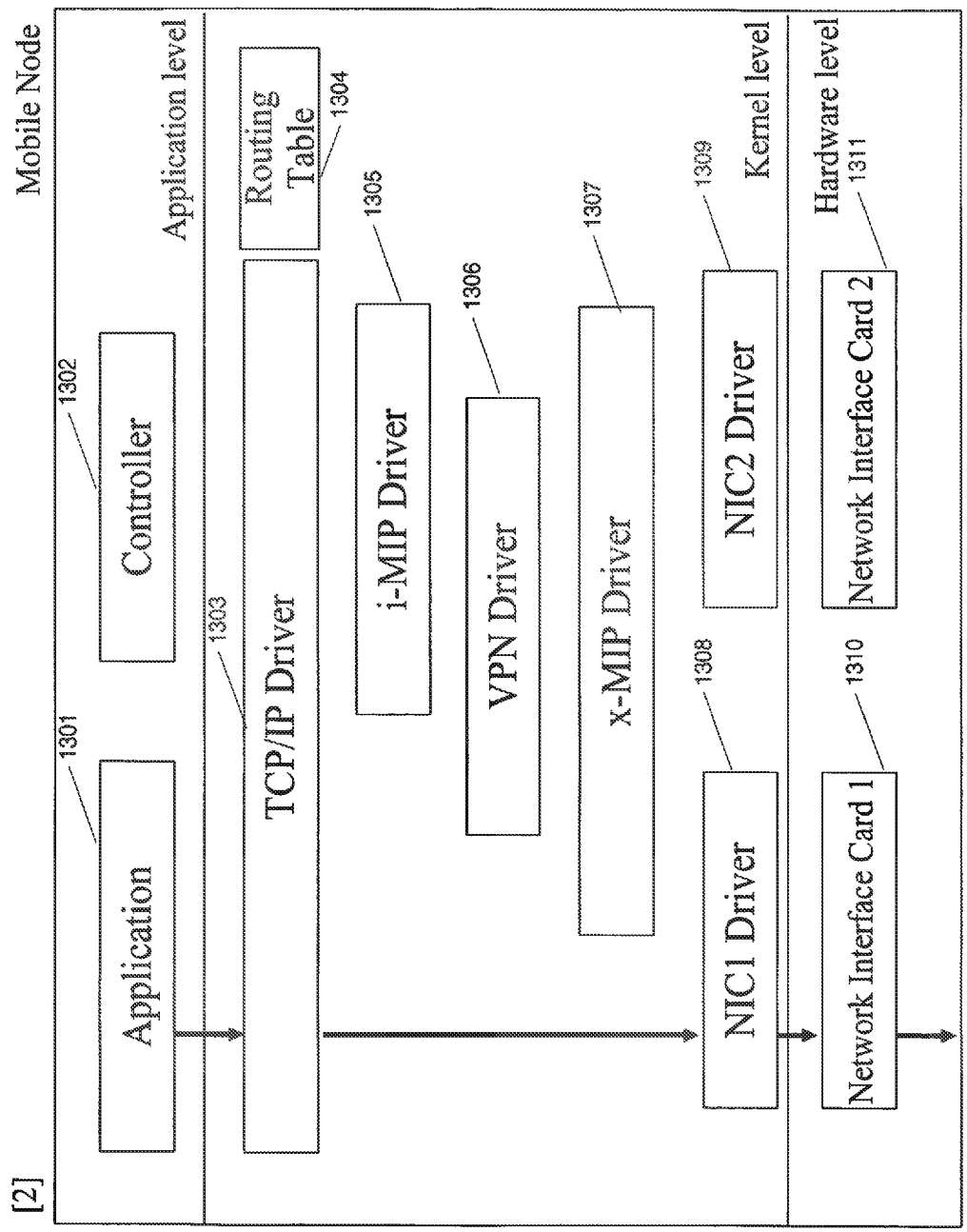
FIGS. 13A-13T shows one example of data signals when a mobile node switches between a double MIP tunnel and a triple tunnel in accordance with aspects of the present invention.
Figure 13B:
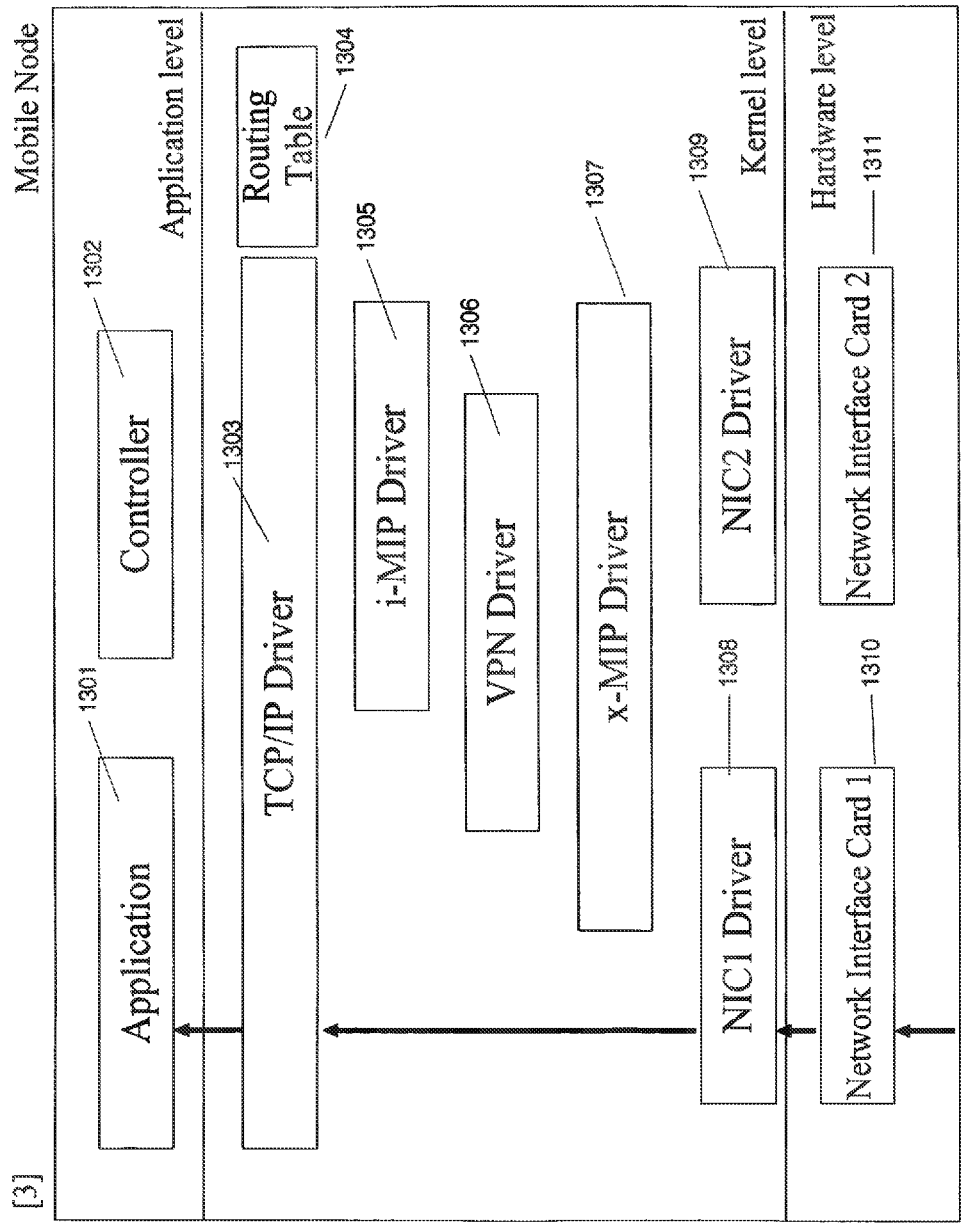
Figure 13C:
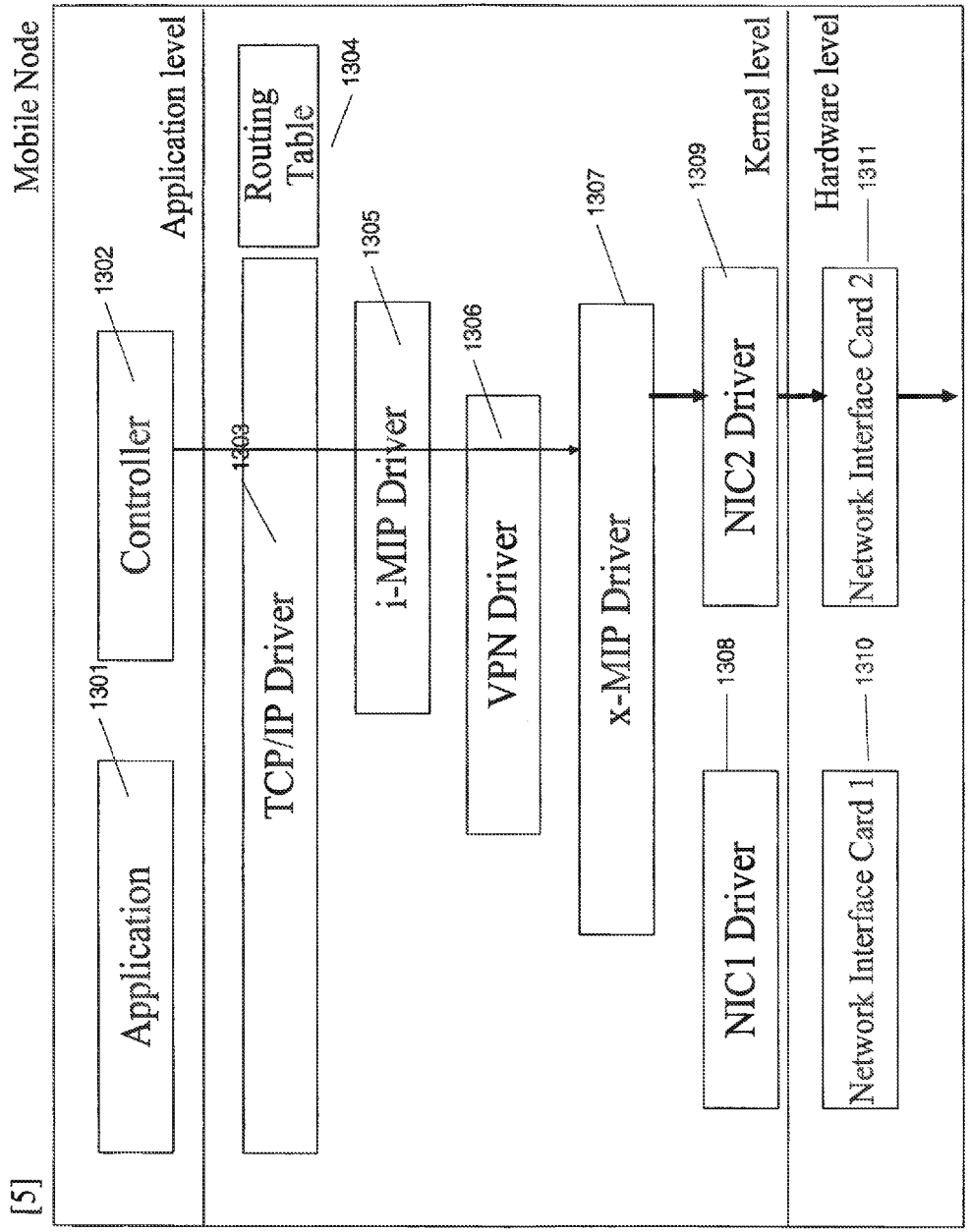
Figure 13D:
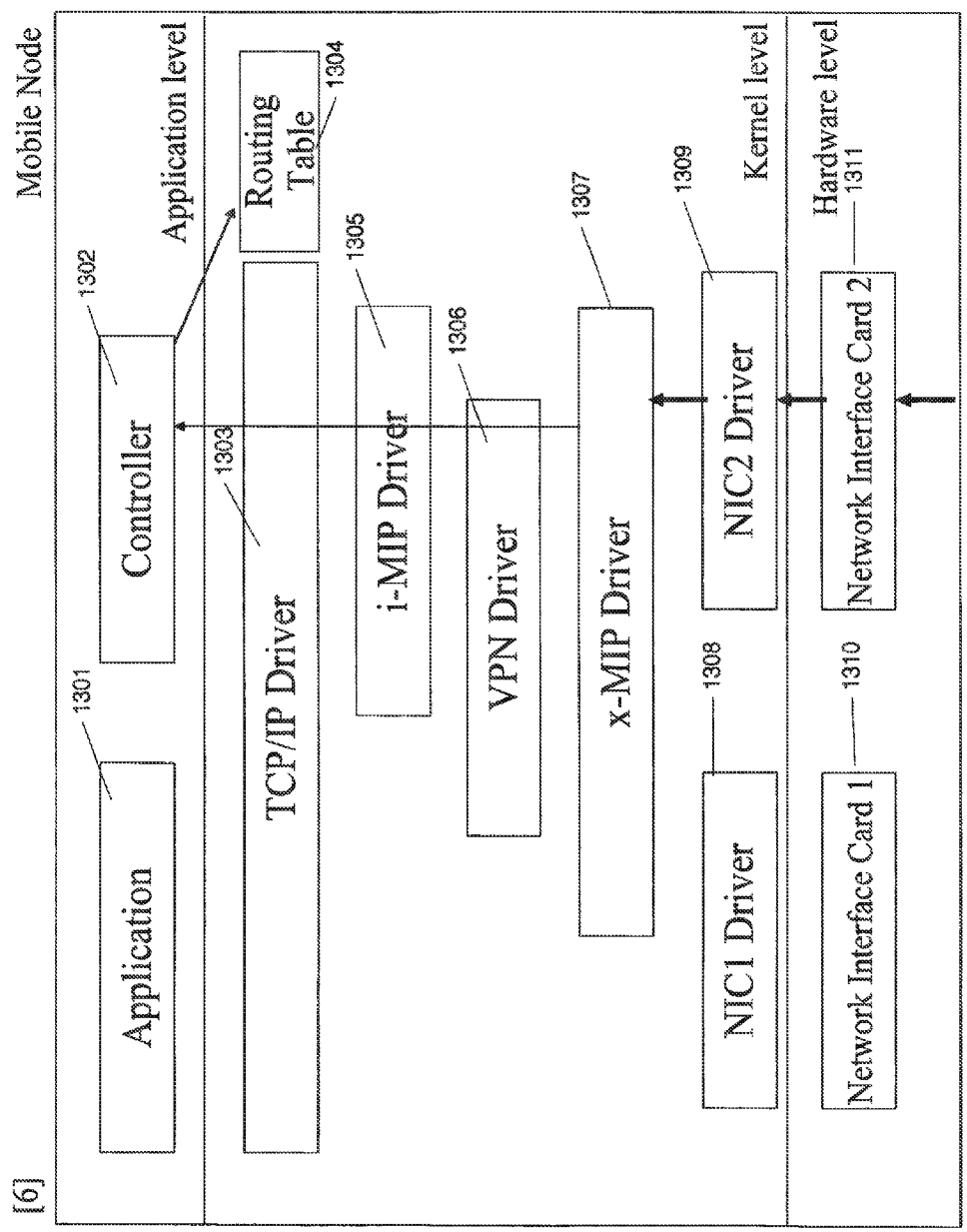
Figure 13E:
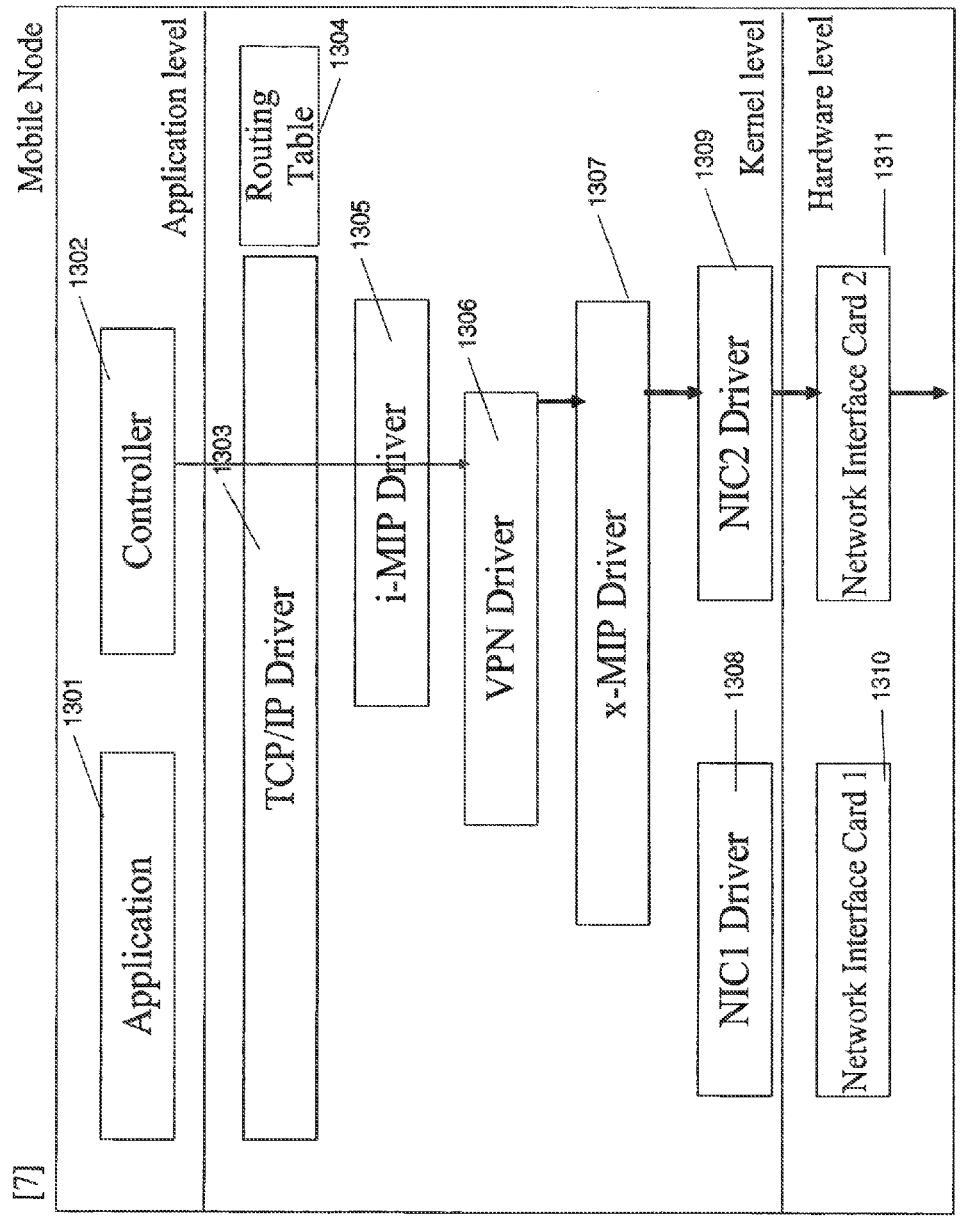
Figure 13F:
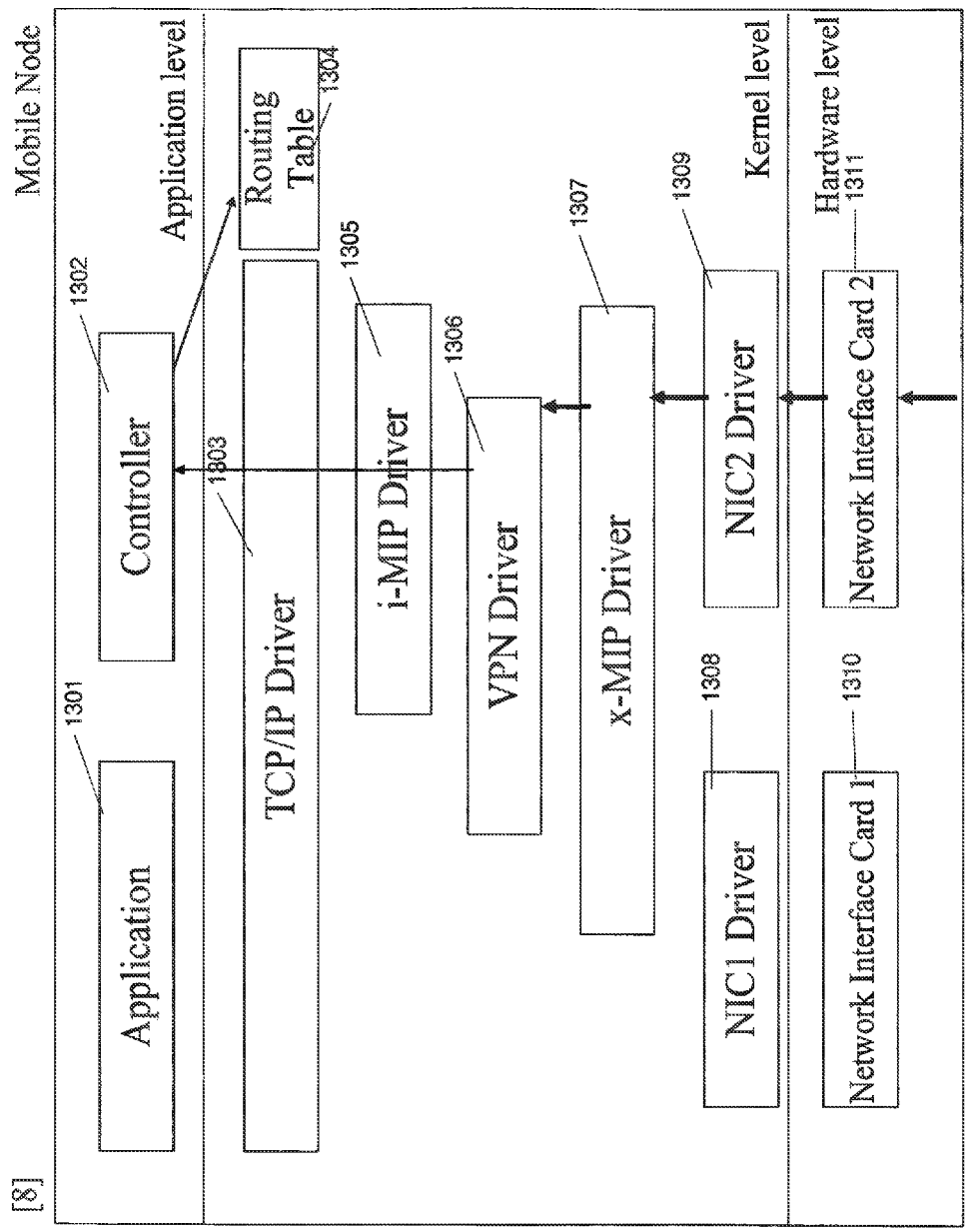
Figure 13G:
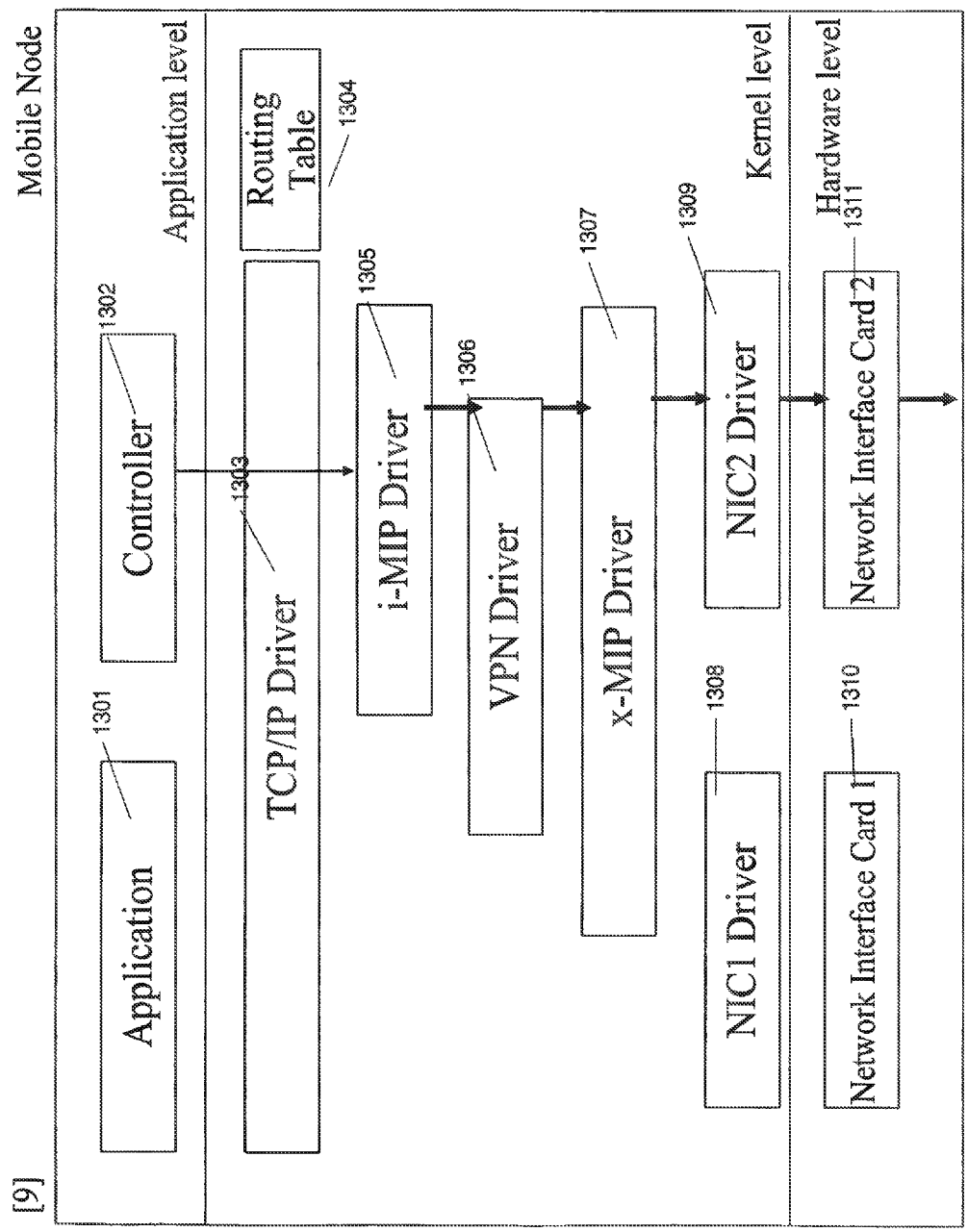
Figure 13H:
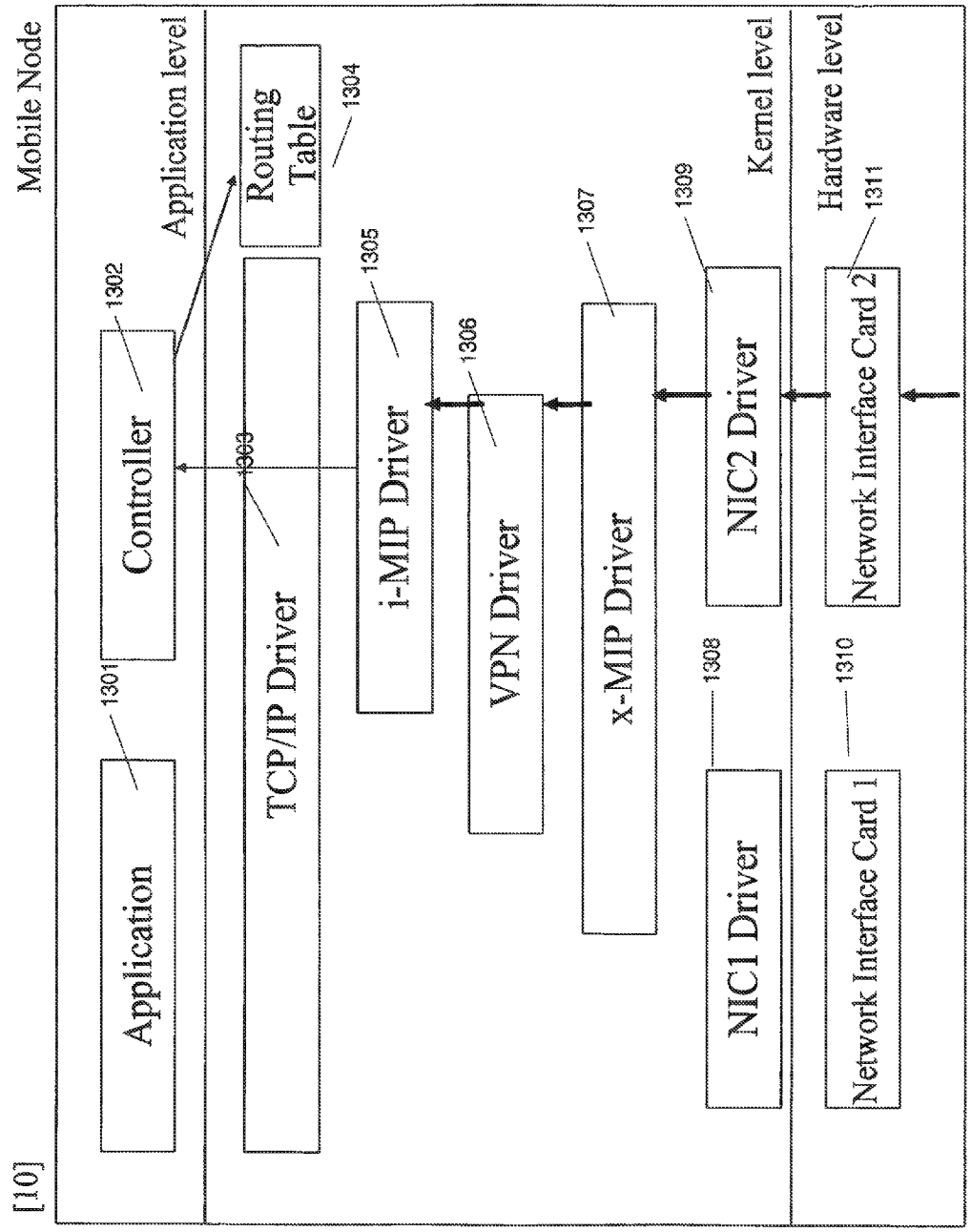
Figure 13I:
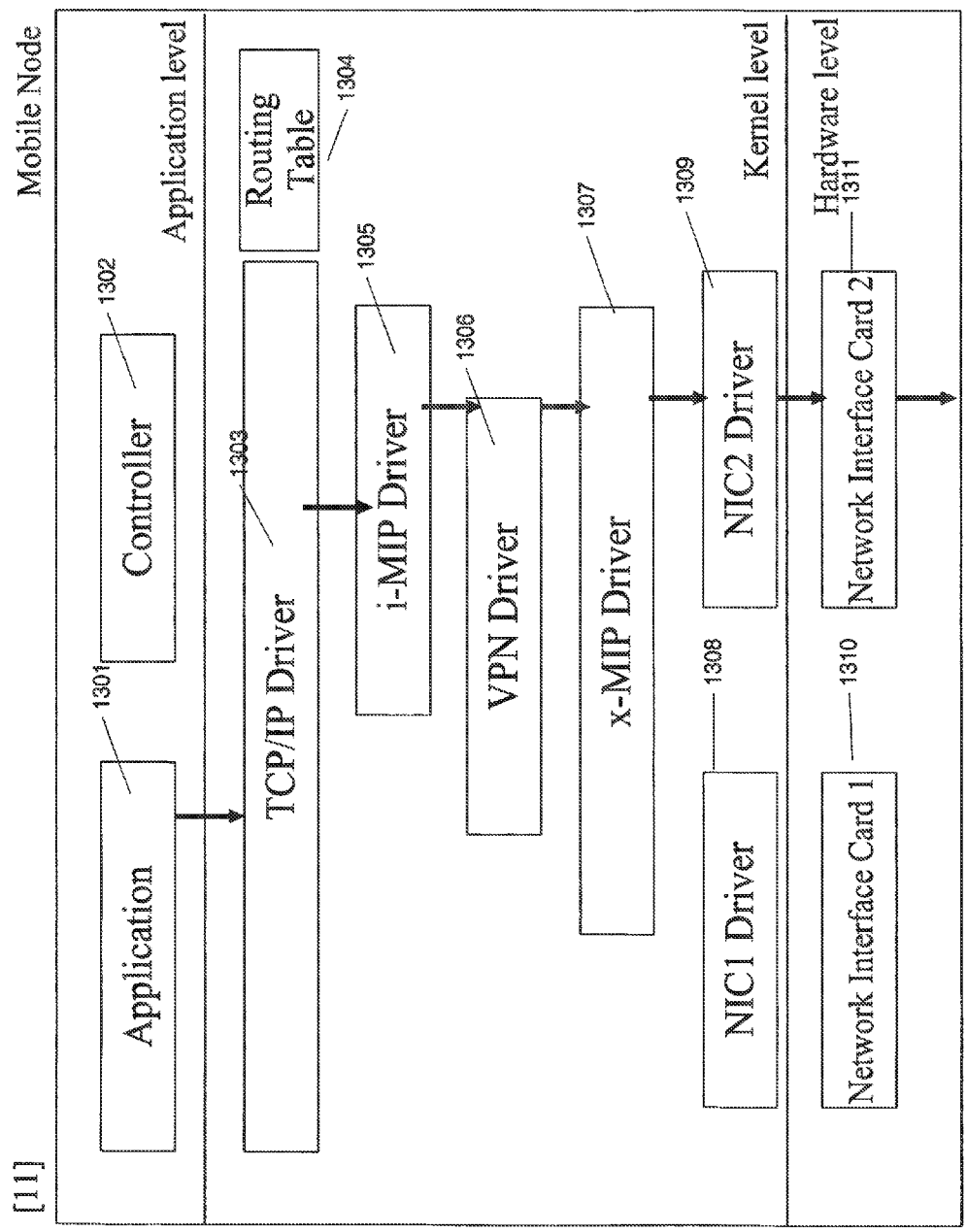
Figure 13J:
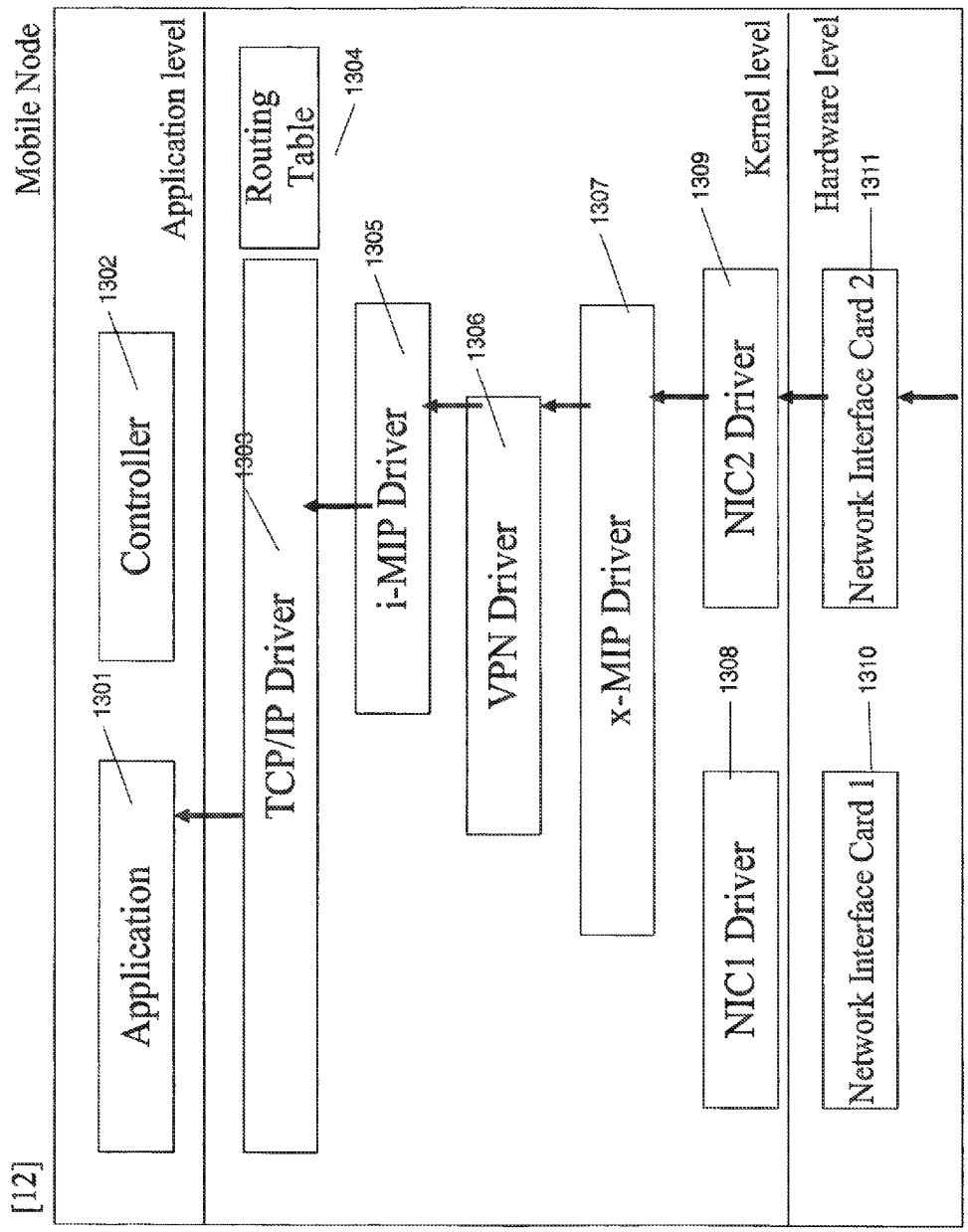
Figure 13K:
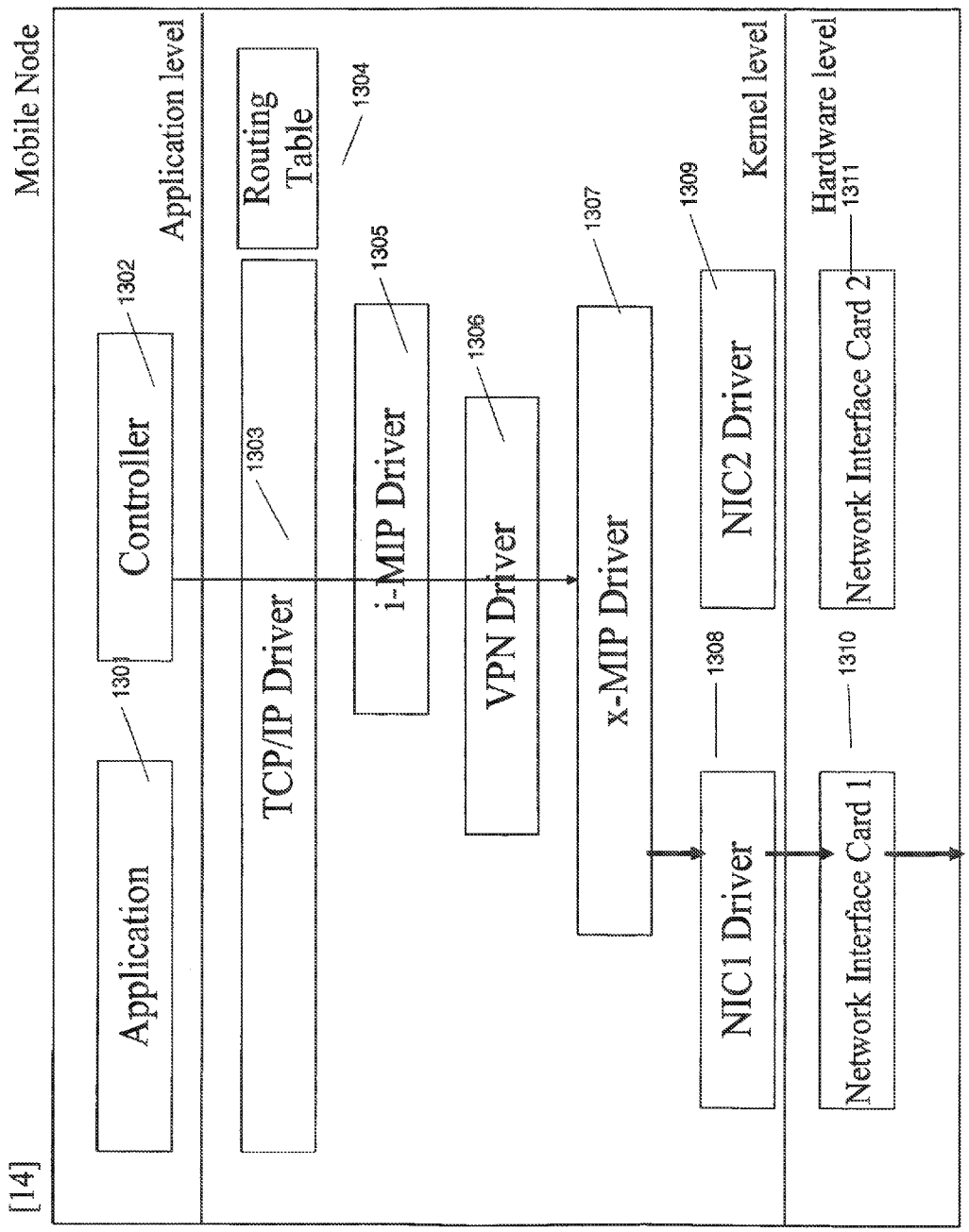
Figure 13L:
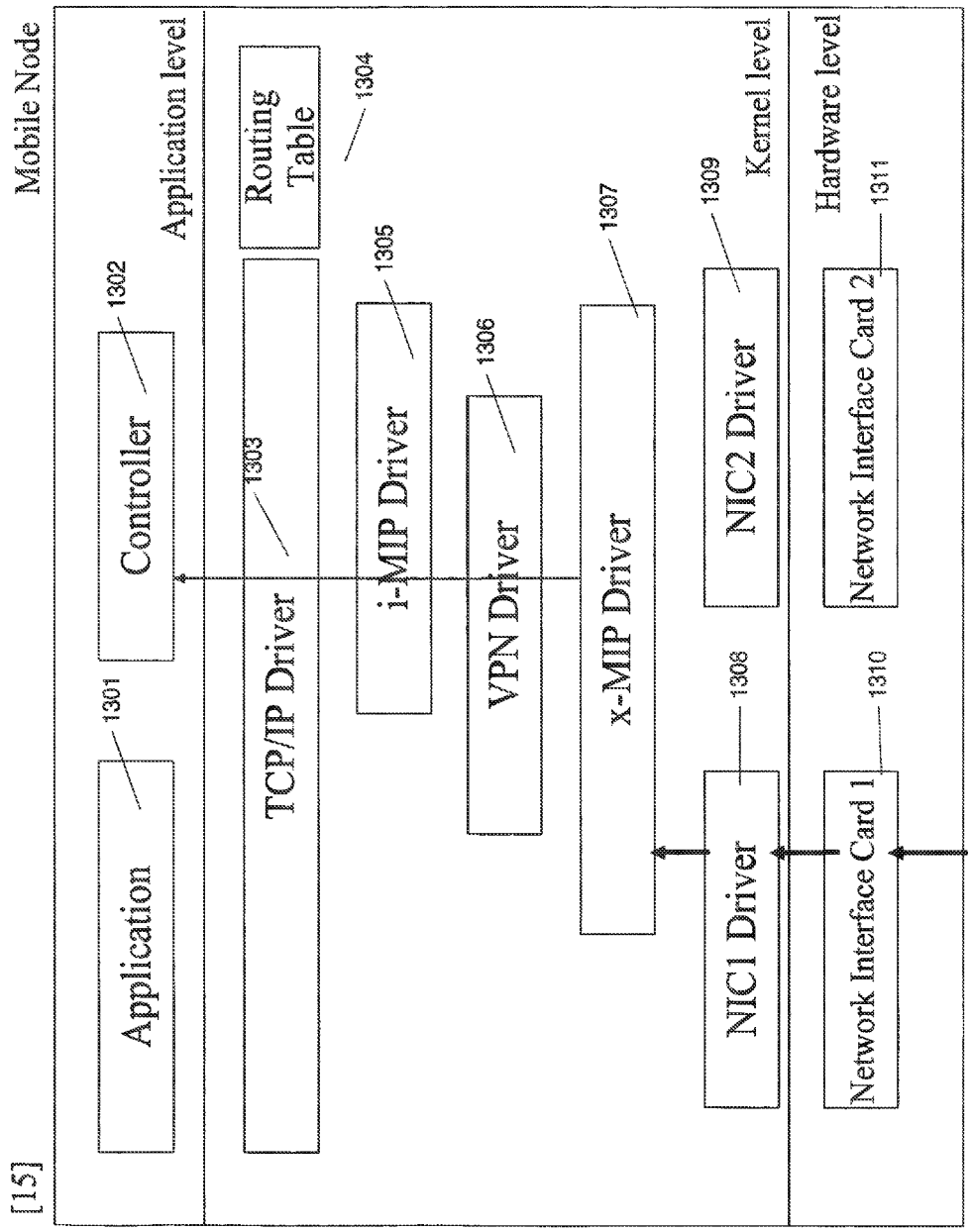
Figure 13M:
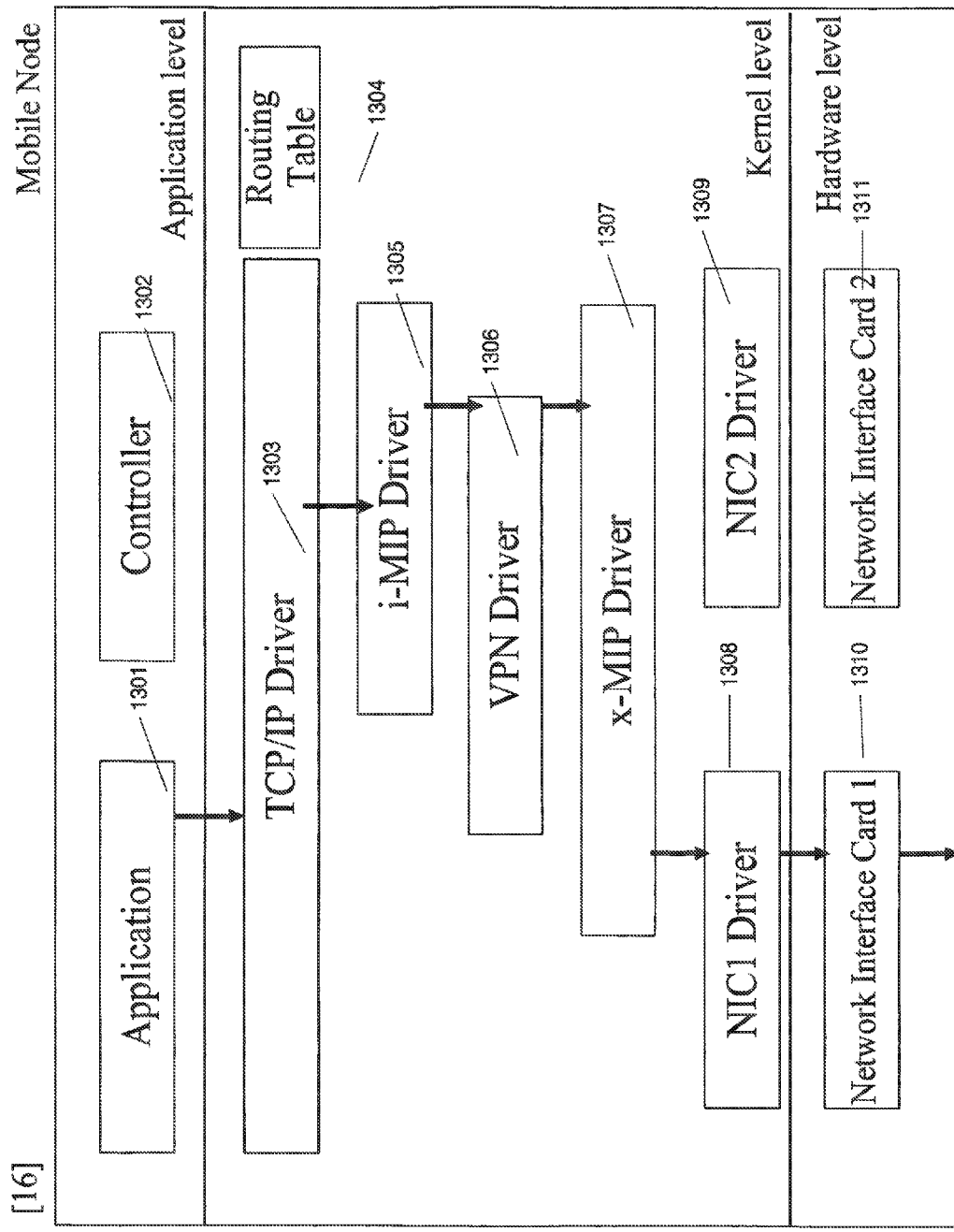
Figure 13N:
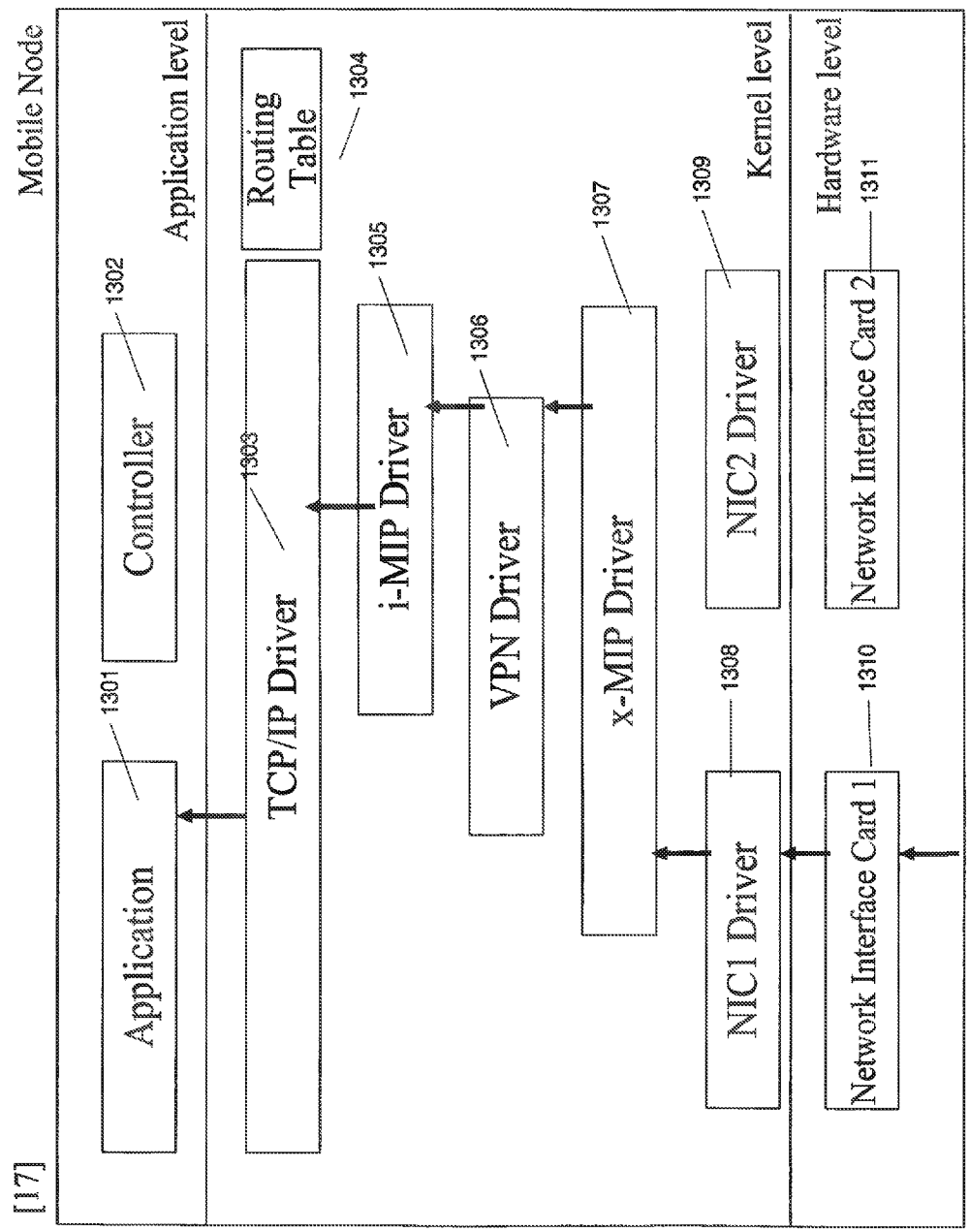
Figure 130:
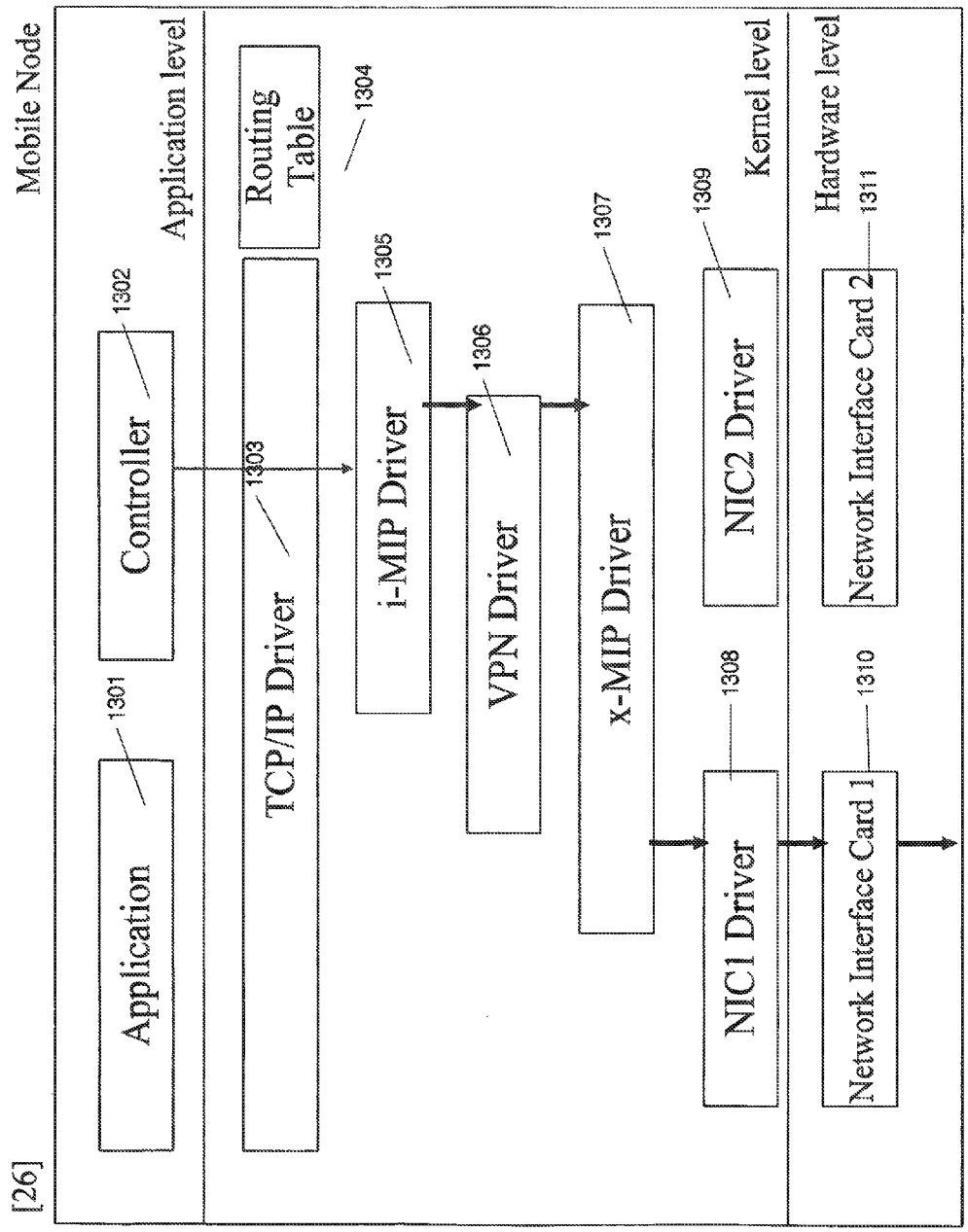
Figure 13P:
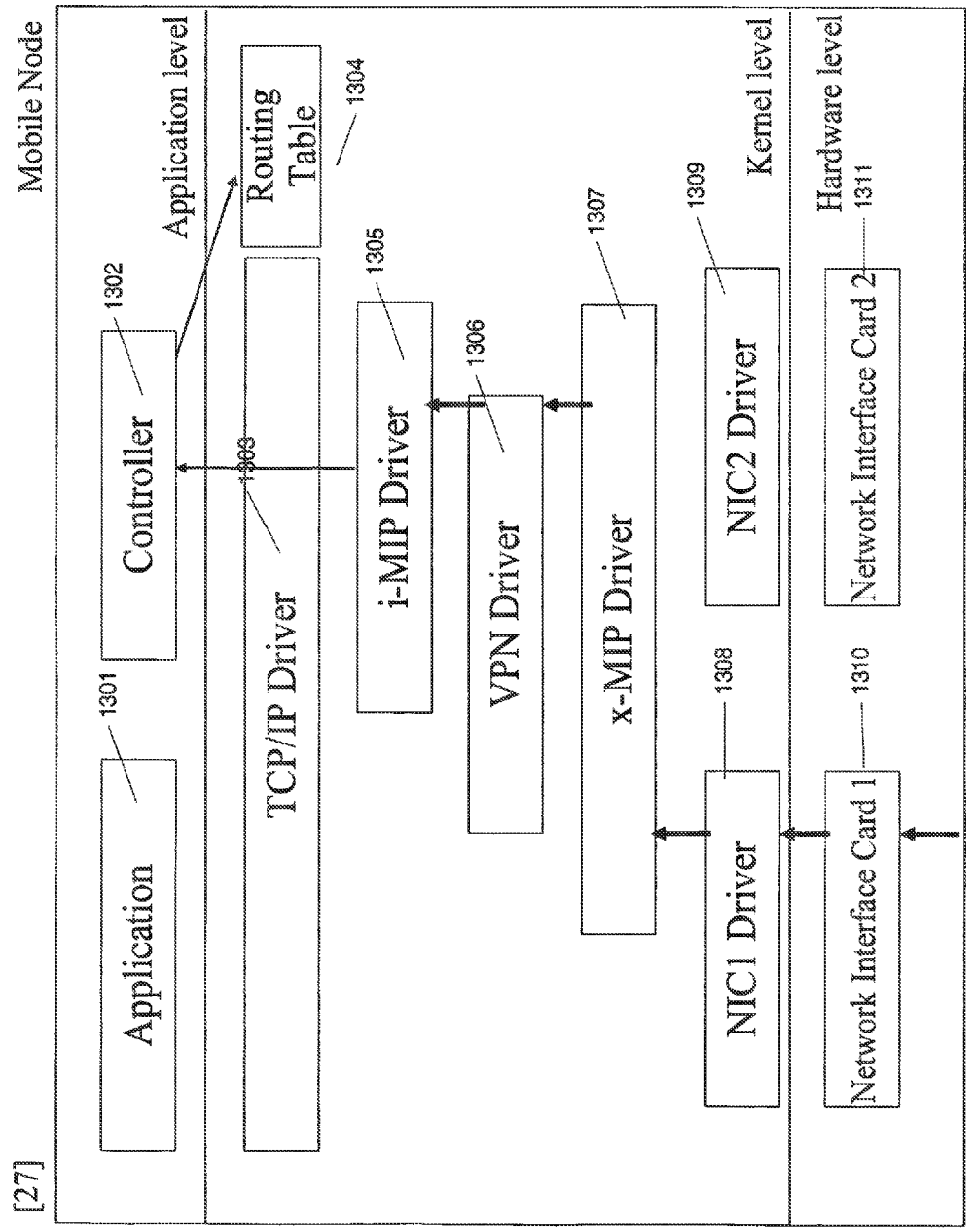
Figure 13Q:
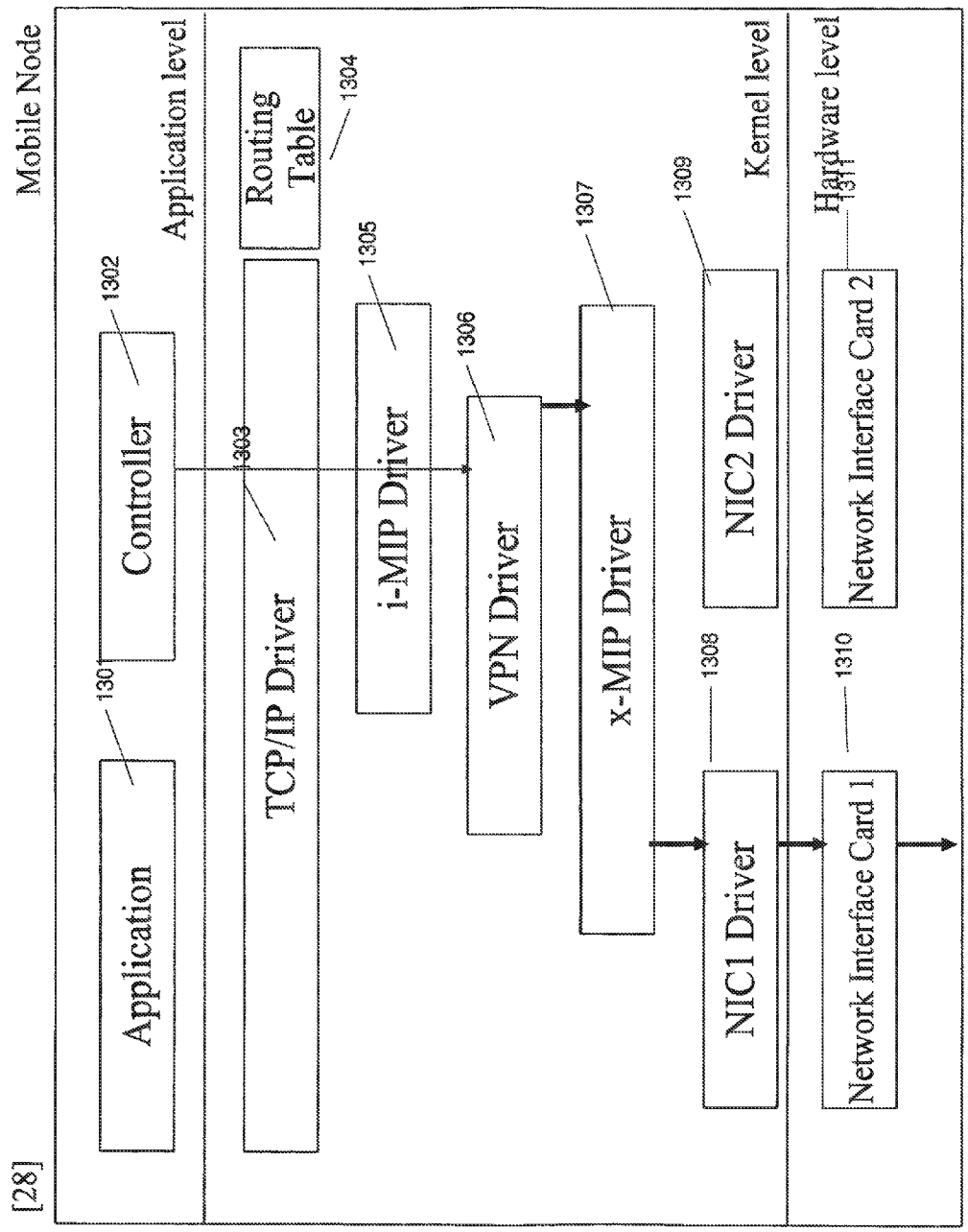
Figure 13R:
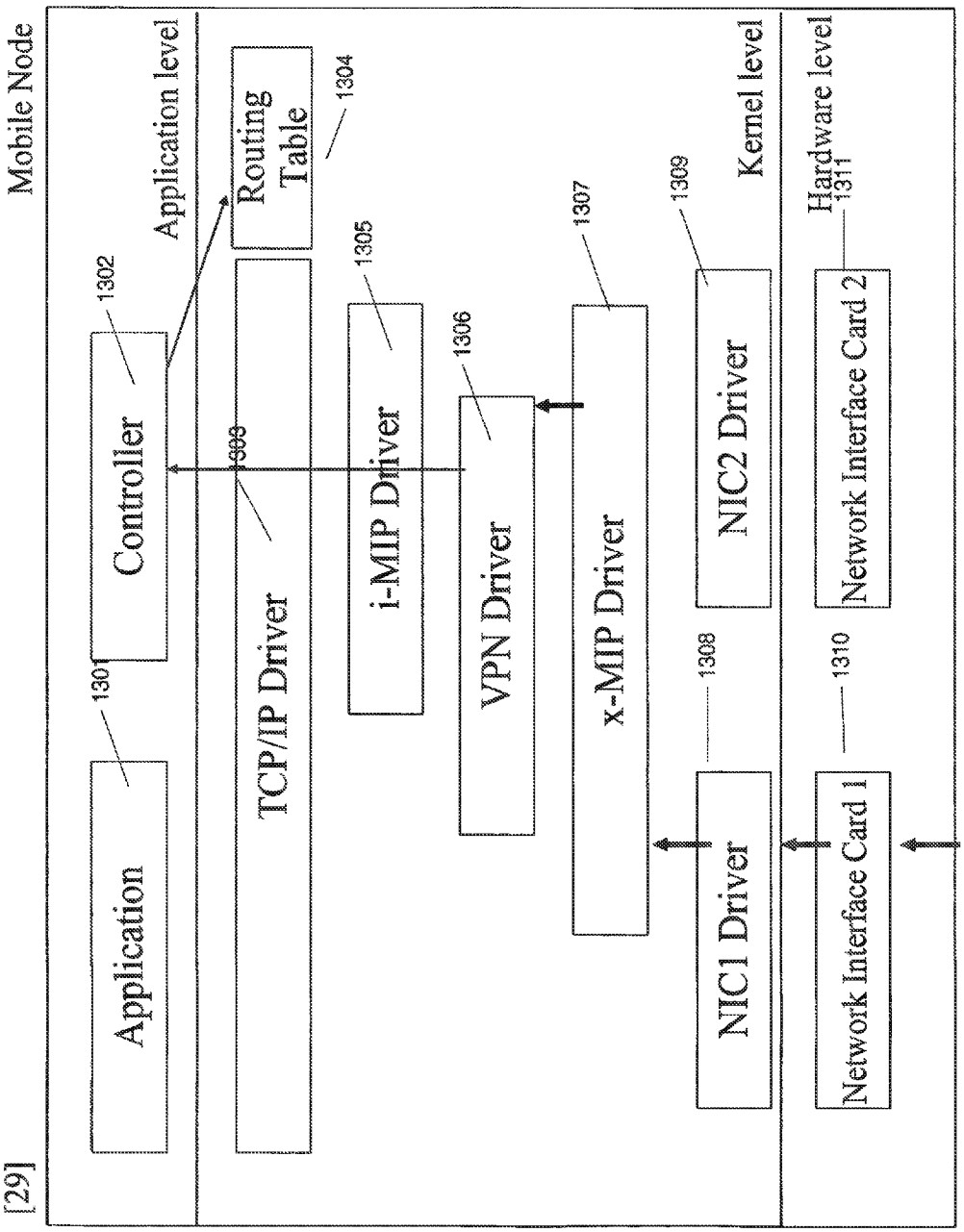
Figure 13S:
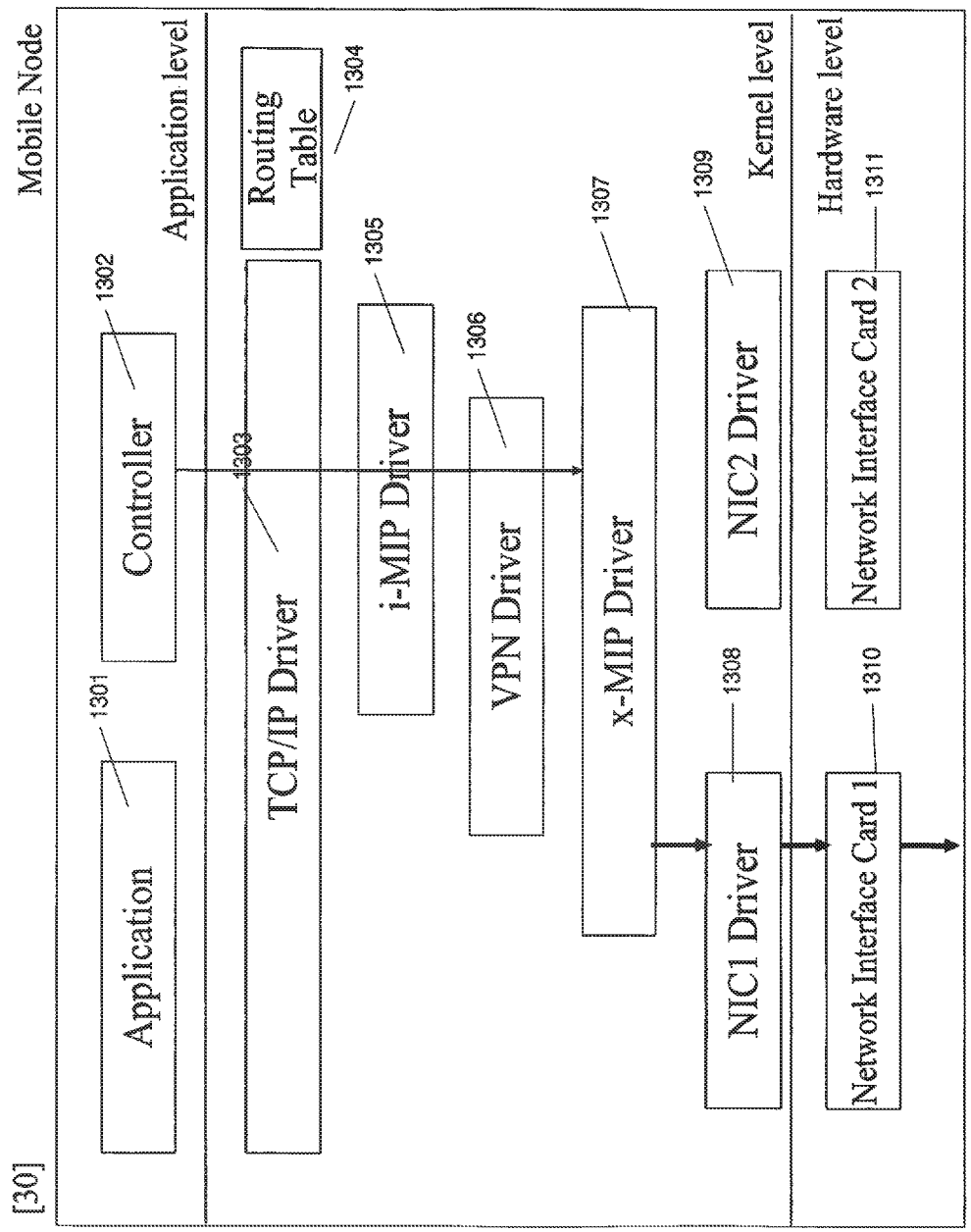
Figure 13T:
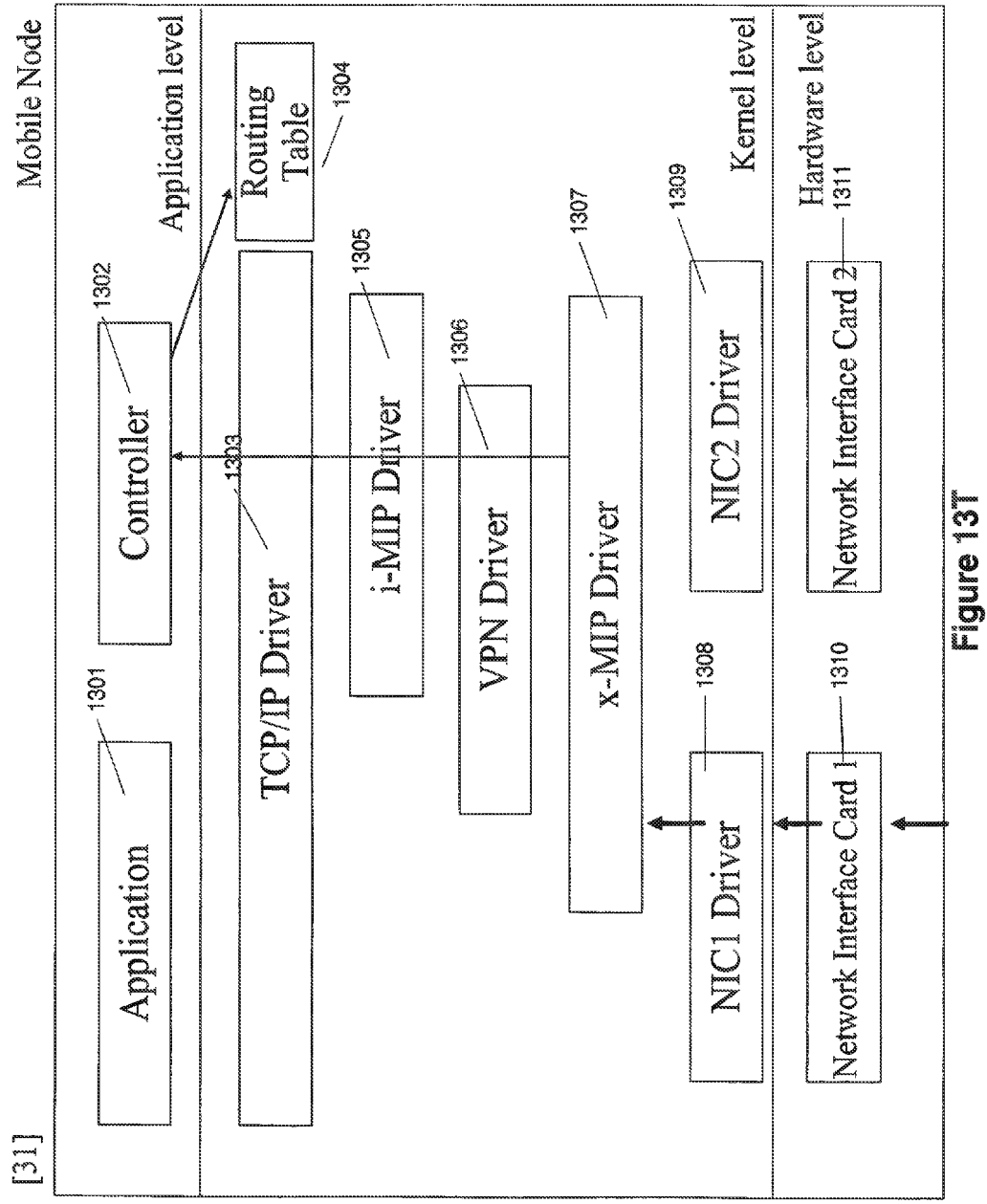

FIGS. 13A-13T shows the signal exchanges in the components of the mobile node.

In this scenario, NIC1 1310 is assumed to be an interface like wireless LAN or wired LAN. NIC2 1311 is assumed to be an interface like Cellular or some other protocol.

FIG. 12A shows the mobile node 607 beginning to transfer data. The follow process may be used referencing FIG. 13A:
- a. Application 1301 sends the data to TCP/IP driver 1303. TCP/IP driver 1303 adds a TCP/IP header with data from routing table 1304.
- b. Next the packet is sent to the NIC1 Driver 1308. NIC1 Driver 1308 creates a specific packet for NIC1 1310 from the data.
- c. Next the data are sent to NIC1 1310.

Figure 12B:
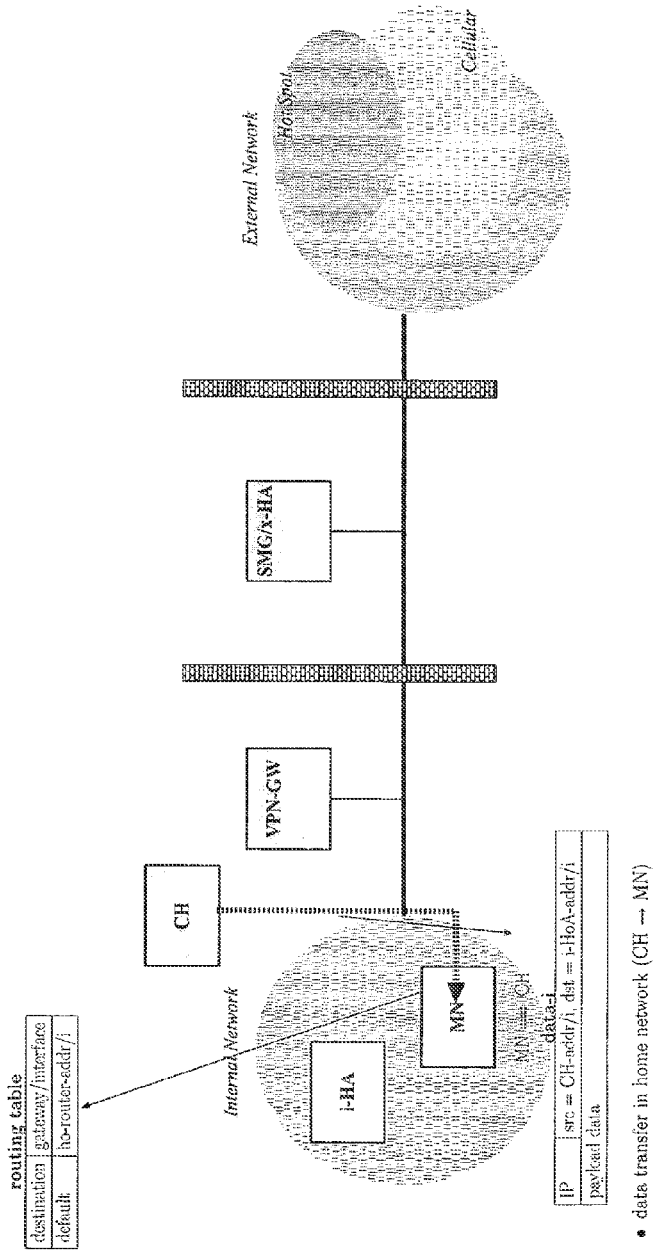
FIGS. 12A-12L show data signals where a mobile load is moving from an internal network to an extra network in accordance with aspects of the present invention.

FIGS. 12B and 13B show examples where mobile node 607 receives data. The behavior inside the mobile node 607 is as follows:
- a. NIC1 1310 receives data and sends it to NIC1 Driver 1308.
- b. NIC1 Driver 1308 creates its specific packet for TCP/IP 1303.
- c. NIC1 driver 1308 then sends the data to TCP/IP driver 1303.
- d. TCP/IP driver 1303 the deletes the TCP/IP header.
- e. TCP/IO driver 1303 then forwards the data to application 1301.

FIGS. 10B and 13C describe when the mobile node 607 creates an x-MIP Registration request. The internal behavior of mobile node 607 may include:
- a. Controller 1302 sends a signal to x-MIP Driver 1307.
- b. x-MIP Driver 1307 creates an x-MIP Registration request and sends it to NIC2 Driver 1312.
- c. NIC2 Driver 1312 creates its specific packet for NIC2 1311 and forwards it to NIC2 1311.

FIGS. 10C and 13D show where the mobile node 607 receives x-MIP Registration replies. The internal behavior may include the following:
- a. NIC2 1311 receives x-MIP Registration reply and sends it to NIC2 Driver 1309.
- b. NIC2 Driver 1309 creates its specific packet for x-MIP Driver 1307 and sends it to the x-MIP Driver 1307.
- c. The x-MIP Driver 1307 receives the data and forwards it to controller 1302.
- d. The controller 1302 then updates the routing table 1304.

FIGS. 10D and 13E show where mobile node 607 creates a VPN connection request. Referring to FIG. 13E:
- a. Controller 1302 sends a signal to VPN Driver 1306 a signal.
- b. VPN Driver 1306 creates packets includes IKE or other protocols and forwards them to the x-MIP Driver 1307.
- c. The x-MIP Driver 1307 adds an x-MIP header to it then forwards it to the NIC2 Driver 1308.
- d. The NIC2 Driver 1309 creates its specific packet for its specific packet for NIC2 1311 from it and sends it to NIC2 1311.

In FIGS. 10E and 13F, mobile node 607 receives a VPN connection response. The internal behavior is as follows:
- a. NIC2 1311 receives VPN connection response and sends it to NIC2 Driver 1309. NIC2 Driver 1309 creates its specific packet for x-MIP Driver 1307 and sends the data to x-MIP Driver 1307. The x-MIP Driver 1307 receives and removes the x-MIP header and sends it to the VPN Driver 1306.
- b. VPN Driver 1306 receives and forwards the data to the controller 1302.
- c. Controller 1302 then updates routing table 1304.

FIGS. 10F and 13G describe where mobile node 607 creates an i-MIP Registration request. The following references FIG. 13G:
- a. Controller 1302 sends a signal to i-MIP Driver 1305. i-MIP Driver 1305 creates an i-MIP Registration request and sends it to the VPN Driver 1306.
- b. VPN Driver 1306 encrypts the request and adds header information and sends it to x-MIP Driver 1307. x-MIP Driver 1307 adds x-MIP header information and sends it to NIC2 Driver 1309.
- c. NIC2 Driver 1309 creates its specific packet for NIC2 1311 from it and sends it to NIC2 1311.

FIGS. 10G and 13H relate to where mobile node 607 receives an i-MIP Registration reply. The behavior of FIG. 13H is as follows:
- a. NIC2 1311 receives an i-MIP Registration reply and sends it to NIC2 Driver 1309. NIC2 Driver 1309 creates its specific packet for x-MIP Driver 1307 and forwards it.
- b. The x-MIP Driver 1307 receives and removes the x-MIP header and sends it to VPN Driver 1306.
- c. The VPN Driver 1306 decrypts and sends it to i-MIP Driver 1305.
- d. i-MIP Driver 1305 receives and processes the data.
- e. Finally, the information is forwarded to control 1302 where routing table 1303 is updated.

FIGS. 10H and 13I relate to when the mobile node sends application data to the correspondent host. The behavior of the mobile node is shown with respect to FIG. 13I:
- a. Application creates data and sends it to the TCP/IP Driver.
- b. TCP/IP Driver adds header and sends it to the i-MIP Driver after referencing the routing table.
- c. The i-MIP Driver adds the i-MIP header and sends the data to the VPN driver.
- d. The VPN driver encrypts it, adds a header and sends it to the x-MIP Driver.
- e. The x-MIP Driver adds the x-MIP header and sends the data to the NIC2 Driver. NIC2 Driver creates its specific packet for NIC2 from it and sends it to NIC2.
- f. NIC2 transfers the packet to its next hop.

FIGS. 10I and 13J show the process where the mobile node 607 receives application data from correspondent host 601. The data flows inside the mobile node 607 are shown in FIG. 13J.
- a. NIC2 1311 receives data and sends it to NIC2 Driver 1309.
- b. NIC2 Driver 1309 creates its specific packet for x-MIP Driver 1307 from it and sends it to the x-MIP Driver 1307.
- c. x-MIP Driver 1307 receives and removes x-MIP header and sends it to the VPN Driver 1306.
- d. The VPN Driver 1306 decrypts and sends the decrypted packet to i-MIP Driver 1305.
- e. i-MIP Driver 1305 removes the i-MIP header and sends the packet to the TCP/IP Driver 1303.
- f. The TCP/IP Driver 1303 removes header and sends the packet to Application 1301.

FIGS. 10K and 13K show a process for changing between network interfaces when a mobile node 607 moves to a hotspot. FIG. 13K shows the process internal to the mobile node 607. Here, the mobile node sends an x-MIP registration request.
- a. Controller 1302 sends a signal to x-MIP Driver 1307.
- b. x-MIP Driver 1307 creates an x-MIP Registration request and sends it to NIC1 Driver 1308.
- c. NIC1 Driver 1308 creates a specific packet for NIC 1 1310 from the packet and sends it to NIC 1 1310.
- d. NIC 1 1310 then transfers the packet to the network.

FIGS. 10L and 13L describe a mobile node 607 when it receives an x-MIP Registration response. The process inside mobile node 607 is shown in FIG. 13L.
- a. NIC 1 1310 receives a x-MIP Registration response and sends it to NIC1 Driver 1308.
- b. NIC1 Driver 1308 creates a specific packet for x-MIP Driver 1307 from the packet and sends it to x-MIP Driver 1307.
- c. x-MIP Driver 1307 receives the packet and forwards it to controller 1302.

Figure 12C:
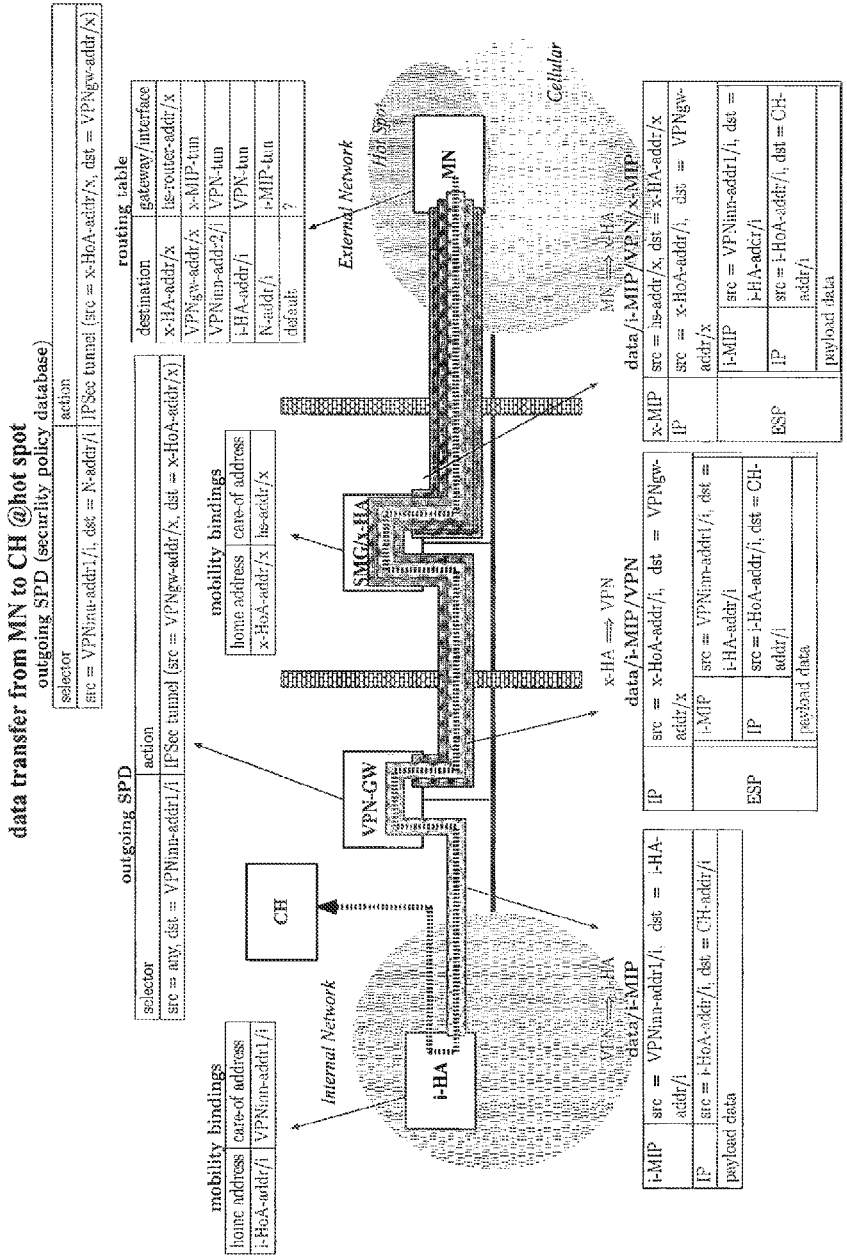

FIGS. 12C and 13M show a process when mobile node 607 sends application data to the correspondent host 1301. FIG. 13M shows a process internal to the mobile node 607.
- a. Application 1301 creates data and sends it to TCP/IP Driver 1303. TCP/IP Driver 1303 adds a header and sends it to i-MIP Driver 1305 after checking with routing table 1304.
- b. i-MIP Driver 1305 adds an i-MIP header and sends the packet to VPN Driver 1306.
- c. VPN Driver 1306 encrypts it, adds a header, and sends it to x-MIP Driver 1307.
- d. x-MIP Driver 1307 adds an x-MIP header and sends the packet to NIC1 Driver 1308.
- e. NIC1 Driver 1308 creates a specific packet for NIC 1 1310 from it and sends it to NIC 1 1310.
- f. NIC 1 1310 then forwards the packet to the network.

Figure 12D:
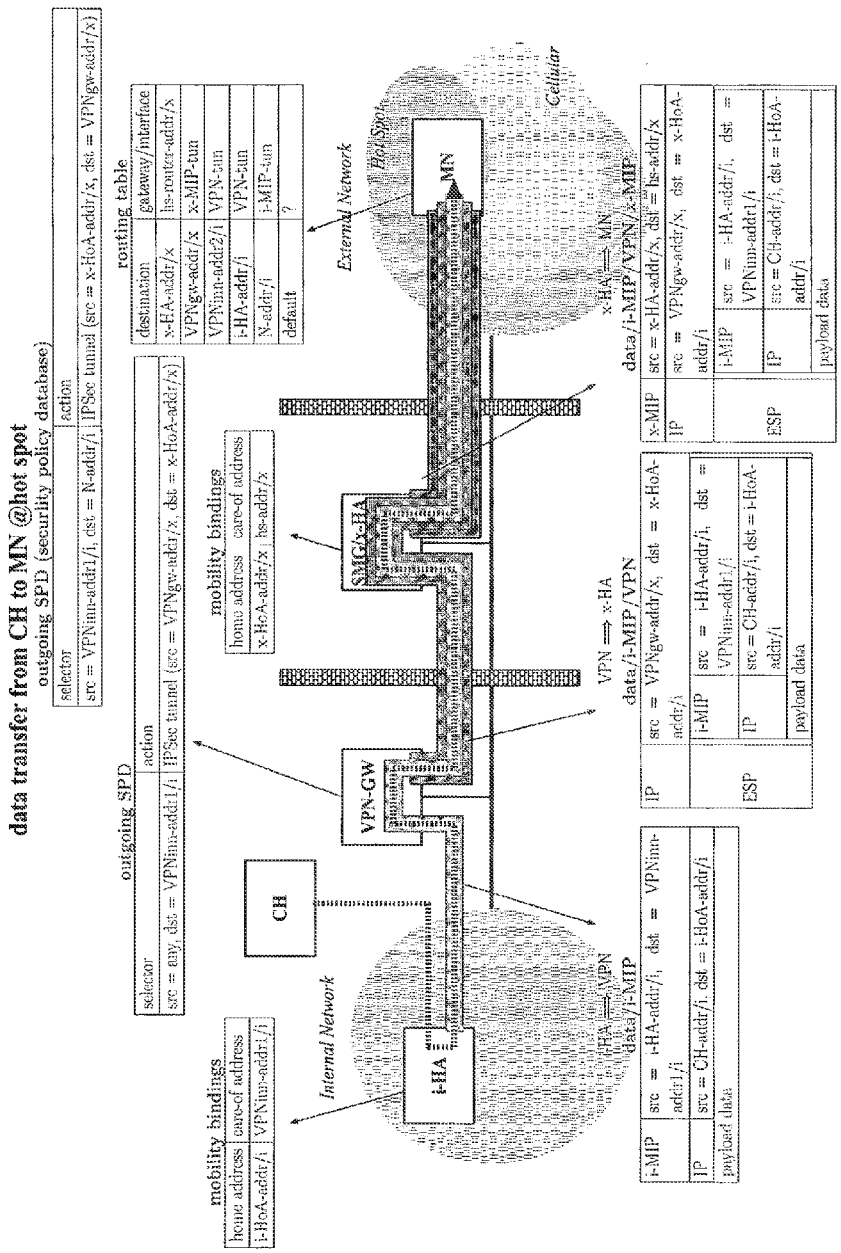

FIGS. 12D and 13N show a mobile node 607 receiving application data from a correspondent host 601. FIG. 13N shows the internal processes of the mobile node 607.
- a. NIC 1 1310 receives data and sends it to NIC1 Driver 1308.
- b. NIC1 Driver 1308 creates a specific packet for the x-MIP Driver 1307 from it and sends the packet to the x-MIP Driver 1307.
- c. x-MIP Driver 1307 receives the packet, removes the x-MIP header, and sends the packet to the VPN Driver 1306.
- d. VPN Driver 1306 decrypts and sends the decrypted packet to the i-MIP Driver 1305.
- e. i-MIP Driver 1305 removes the i-MIP header and sends the packet to the TCP/IP Driver 1303.
- f. The TCP/IP Driver 1303 removes header and sends the packet to the application 1301.

Figure 12E:
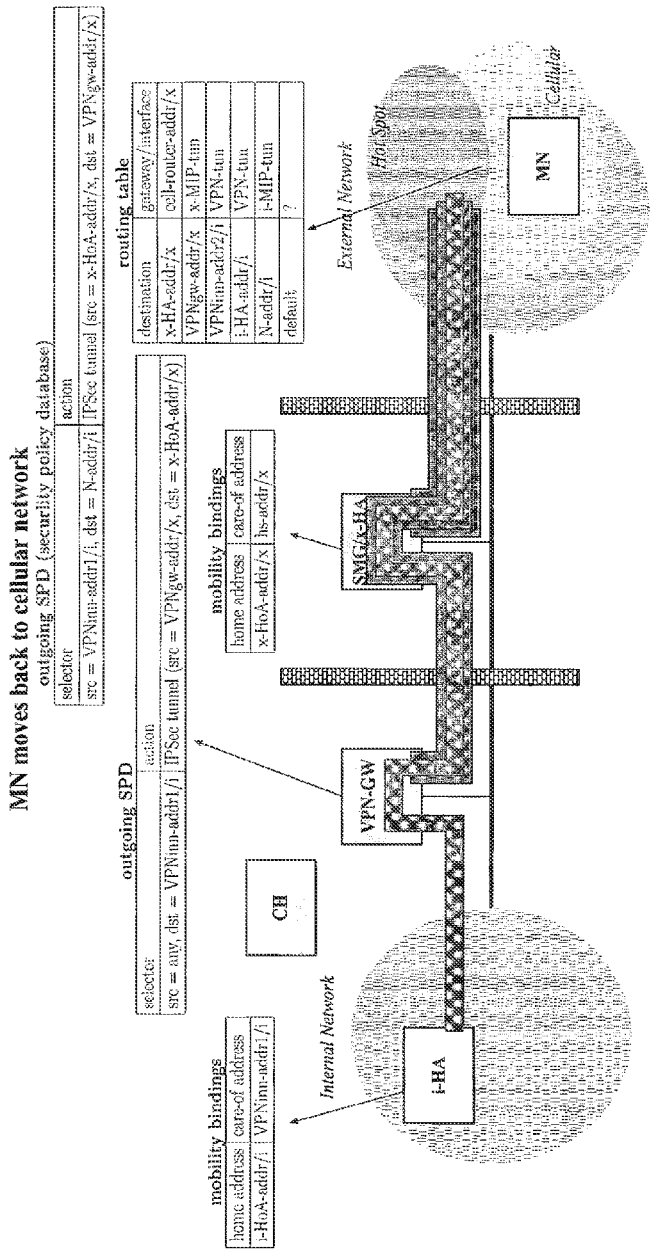

FIG. 12E shows a process where a mobile node 607 moves back to a cellular network.

Figure 12F:
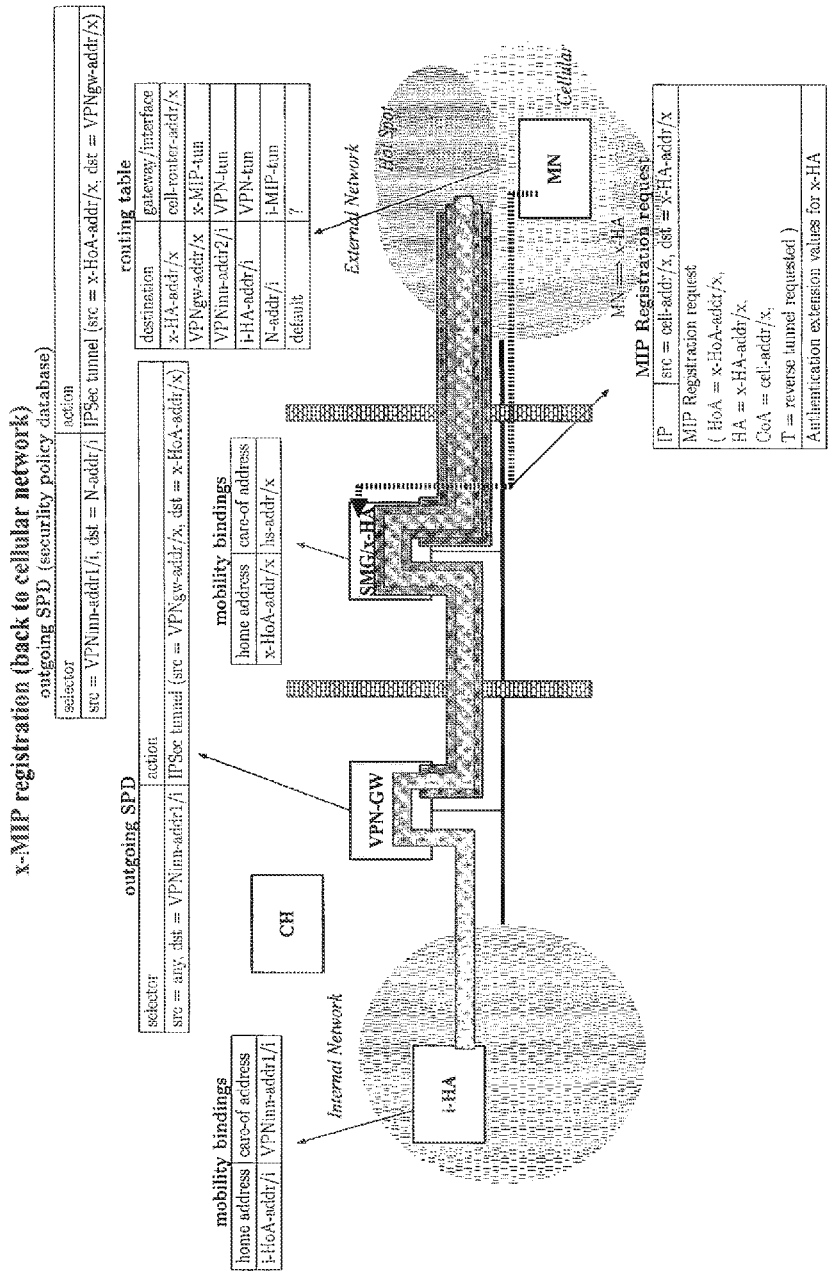
Figure 12G:
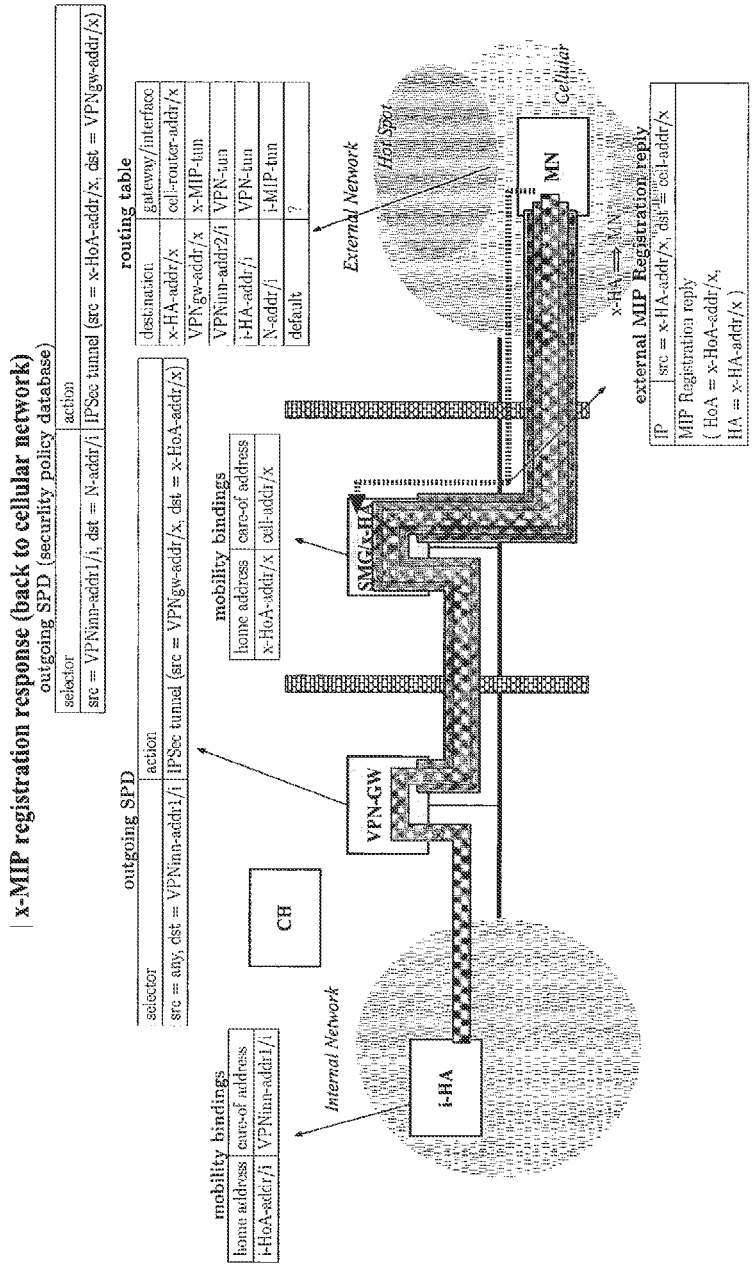

FIGS. 12F and 12G show a process relating to x-MIP registration. In FIG. 12F, the mobile node 607 cents and x-MIP registration request message to x-HA 605 and receives an x-MIP registration response message from x-HA 605. After x-HA 605 sends a successful response to mobile node 607, x-HA 605 updates its mobility bindings. After mobile node 607 receives a successful response from x-HA 605, mobile node 607 adds new entries to its routing table, if a reverse tunnel is required for x-MIP. The configuration of the external firewall may require a reverse tunnel for x-MIP. Further IP packets sent from MN to any address in the internal network is considered to be transmitted through x-MIP tunnel.

Figure 12H:
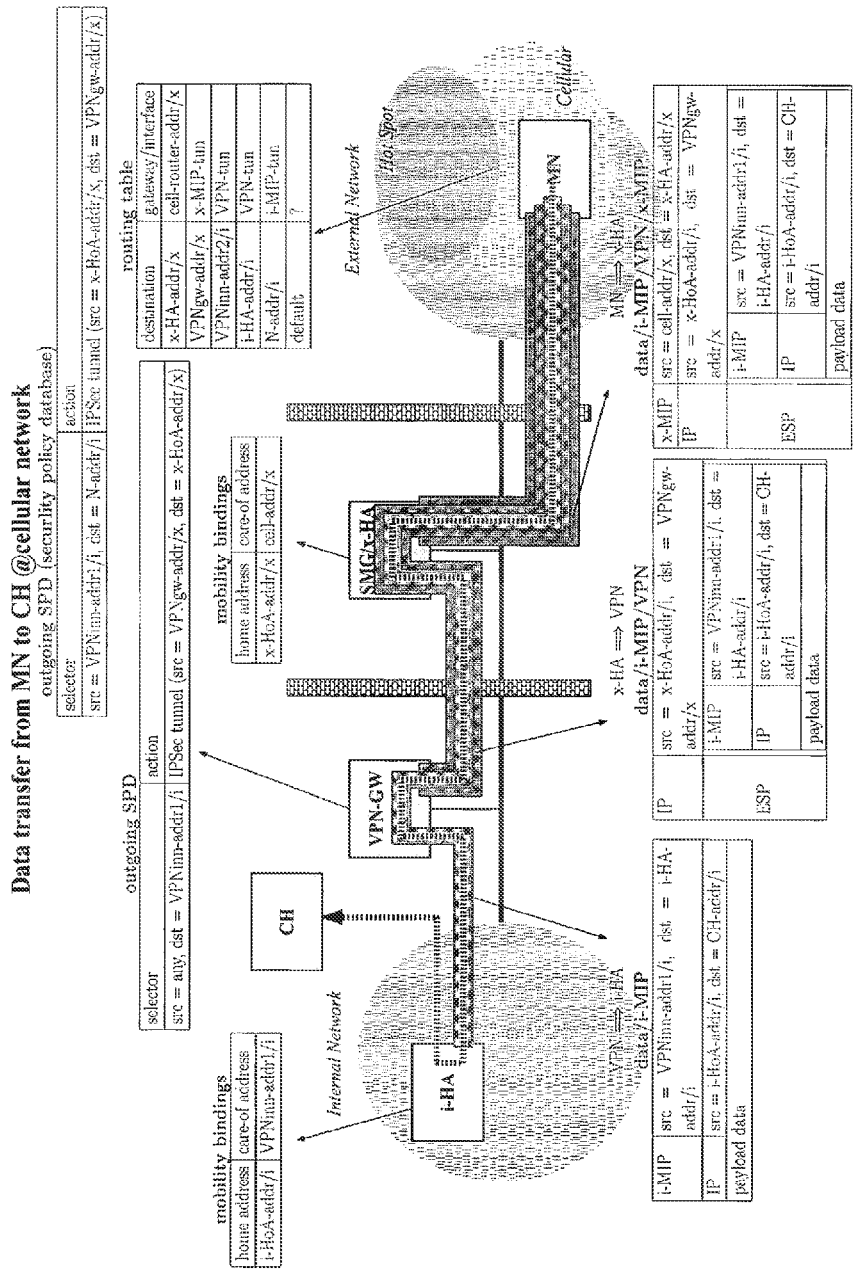
Figure 12:
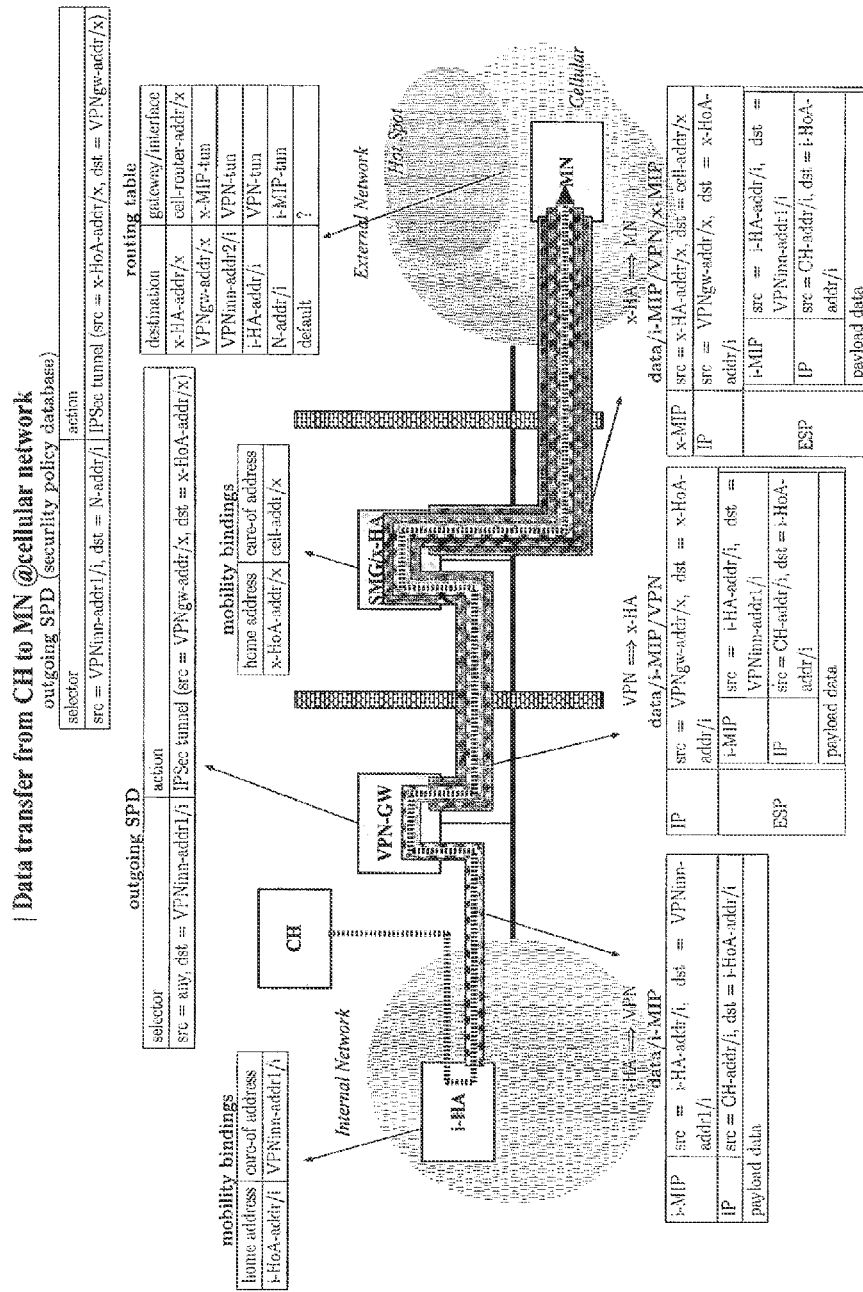
Figure 12J:
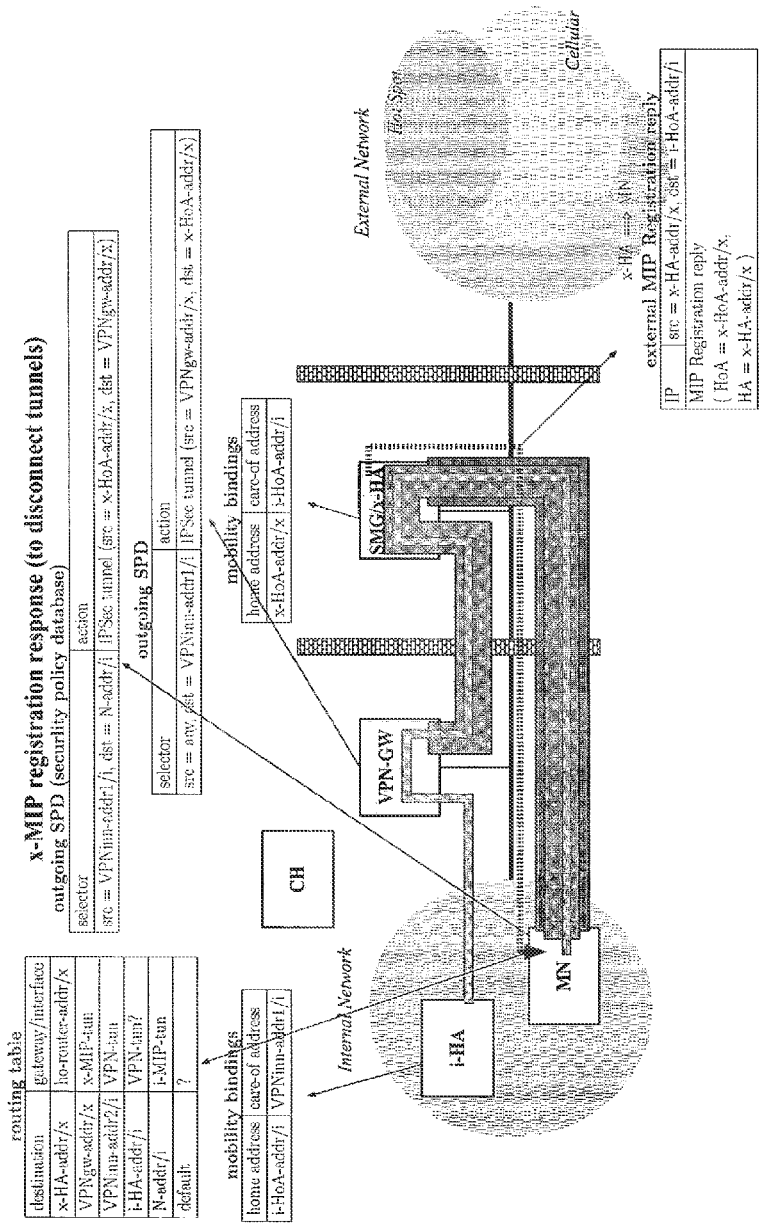
Figure 12K:
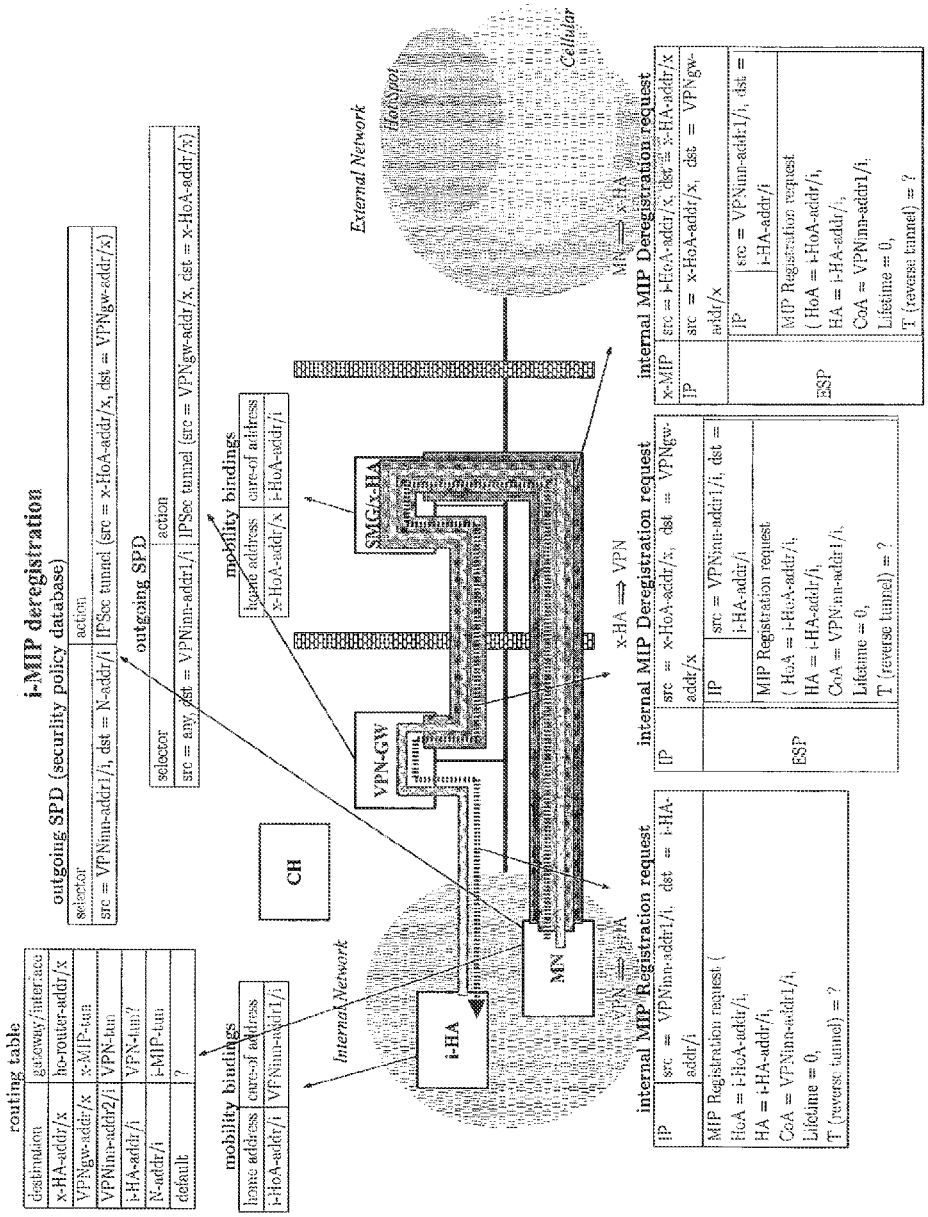
Figure 121:
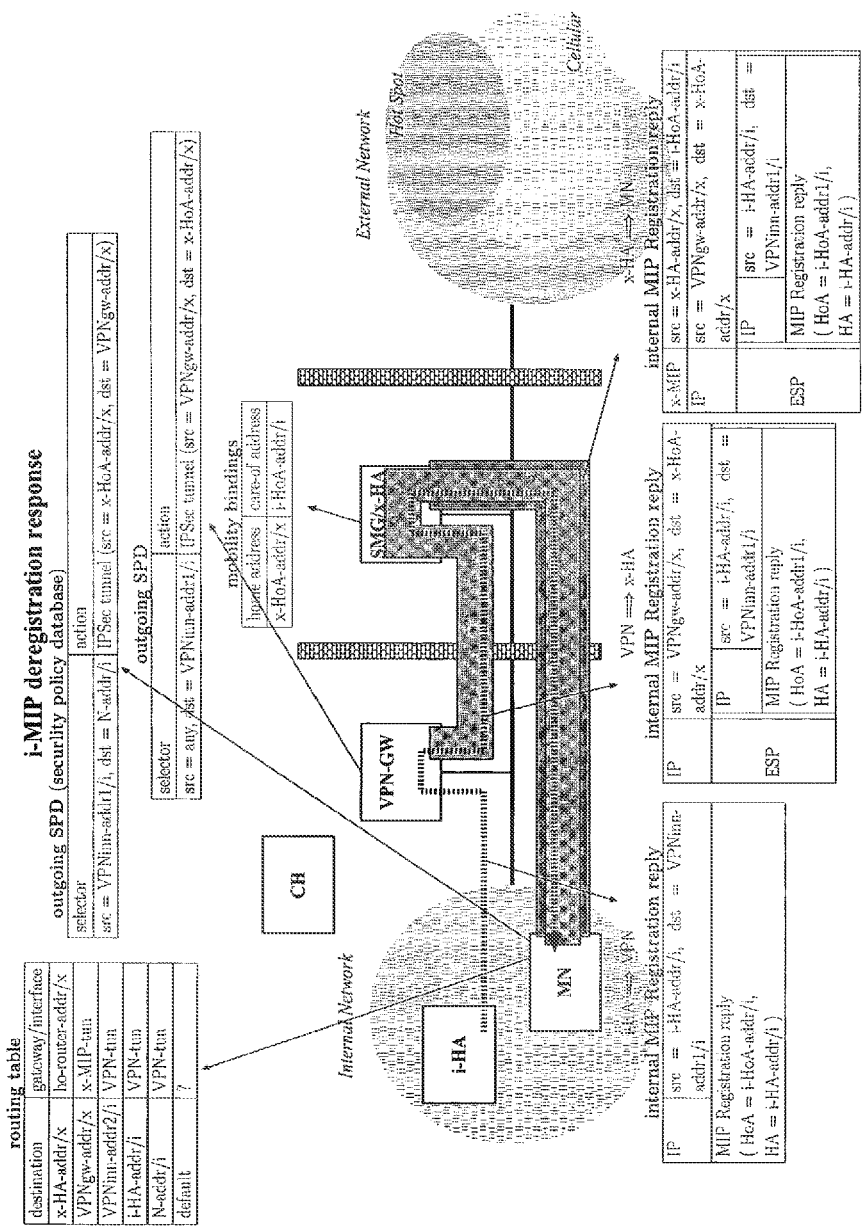

FIGS. 12H and 12I show sending data through the triple tunnel. When mobile node 607 sends an IP packet to correspondent node 601 (CH-addr/i), the IP layer of mobile node 607 refers the routing table, and finds an entry for N-addr/i. Here, mobile node 607 notices packets should be sent via the i-HA-tun interface. The i-HA-tun interface encapsulates the packet with the i-MIP header, if a reverse tunnel is required. Next, mobile node 607 refers to the routing table again. However the destination address of the packet is now i-HA-addr/i. Mobile node 607 finds an entry for i-HA-addr/i and it indicates the packet should be sent via the VPN-tun interface. The outgoing SPD may indicate that the packet sent to the internal network should be encrypted. Accordingly, the VPN-tun interface encrypts the packet, encapsulates it with IPsec ESP, and labels it to be sent for VPNgw-addr/x according to the SPD.

Now the mobile node 607 refers the routing table when new packets arrive and finds the entry for VPNgw-addr/x showing the packet should be sent via the x-MIP-tun interface. The x-MIP-tun interface encapsulates the packet with the x-MIP header, if a reverse tunnel is required. x-MIP-tun labels the packet to be sent to the x-HA-addr/x. Mobile node 607 refers the routing table and finds the entry for x-HAaddr/x. The entry indicates the packet should be sent via the cellular interface. The packet is finally sent to the cellrouter-addr/x as the first hop via the cellular interface.

FIG. 12H shows the relevant tables.

FIG. 12I is used to describe the receiving of data through the triple tunnel. When the cellular interface of mobile node 607 receives a packet through the triple tunnel, IP layer of mobile node 607 checks the outer most IP header of the packet. The protocol field of the header shows it is IP-in-IP (x-MIP) packet. Accordingly, the MIP layer decapsulates the outer most IP-in-IP header. The next IP header shows it includes IPsec ESP so the VPN interface decrypts the packet. The next IP header shows it is IP-in-IP (i-MIP) packet, so MIP layer decapsulates the packet. At last, the inner most IP header appears and the packet is received and processed by an application program.

FIGS. 11B and 12J show the x-MIP update changes. Here, mobile node 607 sends x-MIP registration request message to x-HA 605, and receives the x-MIP registration response message from x-HA 605. When x-HA 605 sends a successful response to mobile node 607, x-HA 605 updates its mobility bindings. Notably, the mobile node 607 does not need to modify its connection with the VPN and i-MIP.

FIGS. 12K and 13O describe when a mobile node creates an i-MIP Deregistration request. The internal behavior of mobile node 607 is described as follows:
- a. Controller 1302 sends a signal to i-MIP Driver 1305.
- b. i-MIP Driver 1305 creates an i-MIP Deregistration request and sends it to VPN Driver 1306.
- c. VPN Driver encrypts it, adds a header and sends the packet to x-MIP Driver 1307.
- d. x-MIP Driver 1307 adds x-MIP header and sends the packet to NIC1 Driver 1308.
- e. NIC1 Driver 1308 creates its specific packet for NIC1 1310 from it and sends it to NIC1 1310.
- f. NIC1 1310 then transfers it to the network.

FIGS. 12L and 13P describe when mobile node 607 receives an i-MIP Deregistration reply.
- a. NIC1 1310 receives an i-MIP Deregistration reply and sends it to NIC1 Driver 1308.
- b. NIC1 Driver 1308 creates a specific packet for x-MIP Driver 1307 and sends it to x-MIP Driver 1307.
- c. x-MIP Driver 1307 receives the packet, removes the x-MIP header, and sends the packet to VPN Driver 1306.
- d. VPN Driver 1306 decrypts and sends the packet to i-MIP Driver 1305.
- e. i-MIP Driver 1305 receives, processes, and alerts controller 1302.
- f. Controller updates routing table 1304 to any changes.

FIGS. 11C and 13Q describe mobile node 607 creating a VPN disconnection request. FIG. 11C is described above. FIG. 13Q shows an internal signal flow for mobile node 607.

a. Controller 1302 sends a signal to VPN Driver 1306.
b. VPN Driver 1306 creates a VPN disconnection request and sends the request to x-MIP Driver 1307.
c. x-MIP Driver 1307 adds an x-MIP header to the request then forwards it to NIC1 Driver 1308.
d. NIC1 Driver 1308 creates a packet for NIC1 1310 and sends the packet to NIC1 1310.
e. NIC1 1310 then forwards the packet to the network.

FIGS. 11D and 13R describe mobile node 607 receiving a VPN disconnection response. FIG. 11D is treated above. FIG. 13R shows the internal signaling of mobile node 607.

a. NIC1 1310 receives a VPN disconnection response and sends it to NIC1 Driver 1308.
b. NIC1 Driver 1308 creates a packet for x-MIP Driver 1307 and forwards the packet to the x-MIP Driver 1307.
c. x-MIP Driver 1307 receives and remove the x-MIP header. It then sends the packet to VPN Driver 1306.
d. VPN Driver 1306 receives the packet, processes it, and forwards information to Controller 1302.
e. Controller 1302 then updates routing table routing table 1304 with any updates.

FIGS. 11E and 13S describe mobile node 607 creating an x-MIP Deregistration request. FIG. 11E is described above. The internal signaling of mobile node 607 is described in FIG. 13S.

a. Controller 1302 sends a signal to x-MIP Driver 1307.
b. x-MIP Driver 1307 creates an x-MIP Deregistration request and sends the request to the NIC1 Driver 1308.
c. NIC1 Driver 1308 creates its specific packet for NIC1 131 and forwards the packet to NIC1 1310.
d. NIC1 1310 then transfers the request to the network.

FIGS. 11F and 13T describe mobile node 607 receiving an x-MIP Deregistration reply. FIG. 11F is described above. FIG. 13T describes the internal signals of mobile node 607.

a. NIC1 1310 receives an x-MIP Registration response and sends it to NIC1 Driver 1308.
b. NIC1 Driver 1308 creates a packet for x-MIP Driver 1307 and forwards it to x-MIP Driver 1307.
c. x-MIP Driver 1307 receives the packet, processes it, and sends information to Controller 1302.
d. Controller 1302 then processes the information and sends any updates to routing table 1304.

Initial State of the Mobile Node

The following describes the initial state of mobile node 607. The initial state may include the mobile node 607 determining where it is located. It can do this through a number of processes including, but not limited to, determining its network connectivity and related address (Ethernet Interface, WLAN Interface, Dial-up ppp etc.), network configurations (given by DHCP, router advertisement or mobility agents) and WLAN/Cellular signal strength.

Validate Initial Network Settings in MN

Next, the mobile node 607 attempts to validate its initial network settings. This may include validating some or all of its network settings. The settings may or may not include the network interface configurations, the routing table and SPD. Further, the mobile node 607 may use DHCP, router advertisement and mobility agent advertisement to validate network interface configurations and the routing table. If necessary, mobile node 607 can update them if needed.

Determine the Mobility State of the Mobile Node

Next, the mobile node 607 determines its mobility state. The mobile node 607 checks the pattern of the network configuration validated in the previous step, and finds a suitable configuration in any one of the possible states of mobility.

For example, mobile node 607 may not have any specific mobility bindings and SPD entries. The active network interface has internal home address 602. The simplest network configuration is one in which the mobile node 607 is in the internal home network. This also provides the benefit of the mobile node 607 easily determining its internal home network.

Check a Trigger to Change the State

Mobile node 607 may periodically or occasionally check whether any triggers have occurred that indicate the mobile node 607 should attempt to change its mobility state. For instance, the fact that an internal WLAN signal strength is lower than a threshold may suggest that the mobile node 607 should switch from the internal mode of operating inside firewall 603 to operating outside of firewall 603. If the mobile node 607 detects such triggers, the mobile node 607 may respond to the trigger or triggers immediately or may respond to them after a short interval (for instance, to see if the signal strength increases after a few seconds, a few minutes, etc.).

Make-Before-Break

One aspect of the mobile node 607 in accordance with aspects of the present invention is its ability to make a connection before breaking a previous connection. So, if one is moving to a new network, for instance, a new connection may be made prior to terminating the old connection. This allows a mobile node to transition without losing connectivity to a home network.

For example, the mobile node 607 may move from the internal mobile node 607 internal WLAN network to external cellular network. To achieve Make-before-Break, MN watches signal strength level of WLAN at all times. Before internal WLAN signal strength becomes lower than a threshold A, MN starts using cellular network and establishes x-MIP tunnel and VPN tunnel as a stand-by path. When the signal level drops below another threshold ("B" which is lower than the threshold A), MN sends an i-MIP registration request over the stand-by path and establishes the i-MIP tunnel. Then, the mobile node 607 stops using the WLAN interface and starts to use the i-MIP/VPN/x-MIP tunnel over the cellular.

This approach may remove a major factor of hand-off delay, since the PPP session establishment and VPN tunnel establishment are done before switch-over.

Double MIP Tunnel Scenario

The following describes a double MIP tunnel scenario. If a mobile node has no communications with an internal network, mobile node 607 may establish a i-MIP/x-MIP double tunnel, when it moves to an external network. But once mobile node 607 detects the necessity of VPN, it may or may not automatically switch to i-MIP/VPN/x-MIP triple tunnel mode.

Switching Between Double and Triple Tunnel Mode

Switching between double and triple tunnel modes are described below.

About Double Tunnel->Triple Tunnel

A trigger packet may be queued until a triple tunnel is established in order not to start application traffic.

About Triple Tunnel->Double Tunnel

When mobile node 607 and correspondent node 601 finished application traffic, a VPN tunnel may be removed.

Scenarios

The following describes various network messages and processes in network nodes including in the mobile node. There may be various implementations for the mobile node. For instance, it may include a UNIX-based architecture or a Windows-based architecture.

Figure 14B:
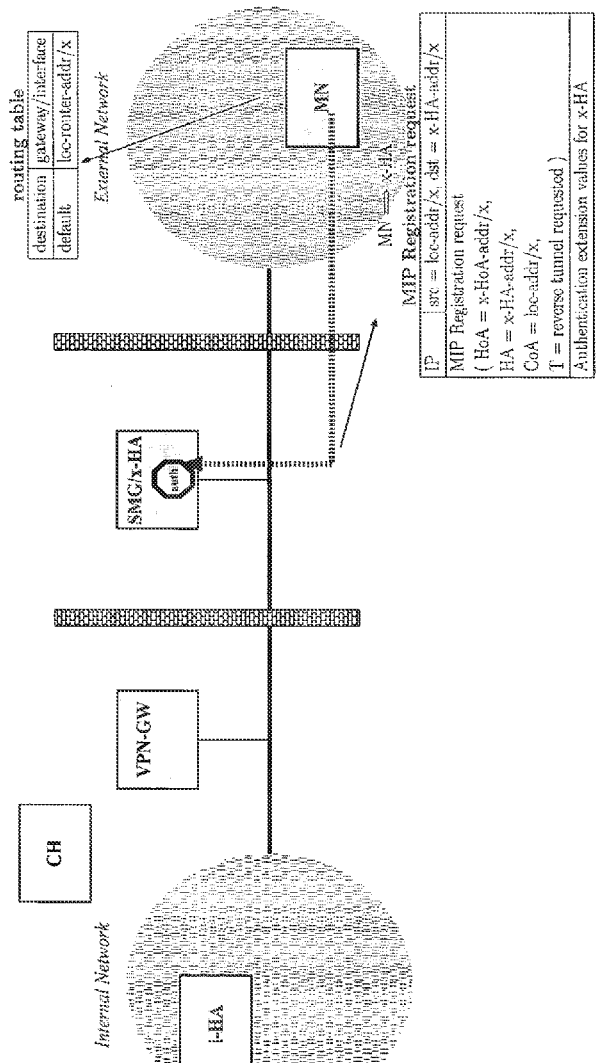
FIGS. 14A-14NN shows another example of data signals when a mobile node switches between a double MIP tunnel and a triple tunnel in accordance with aspects of the present invention.
Figure 14C:
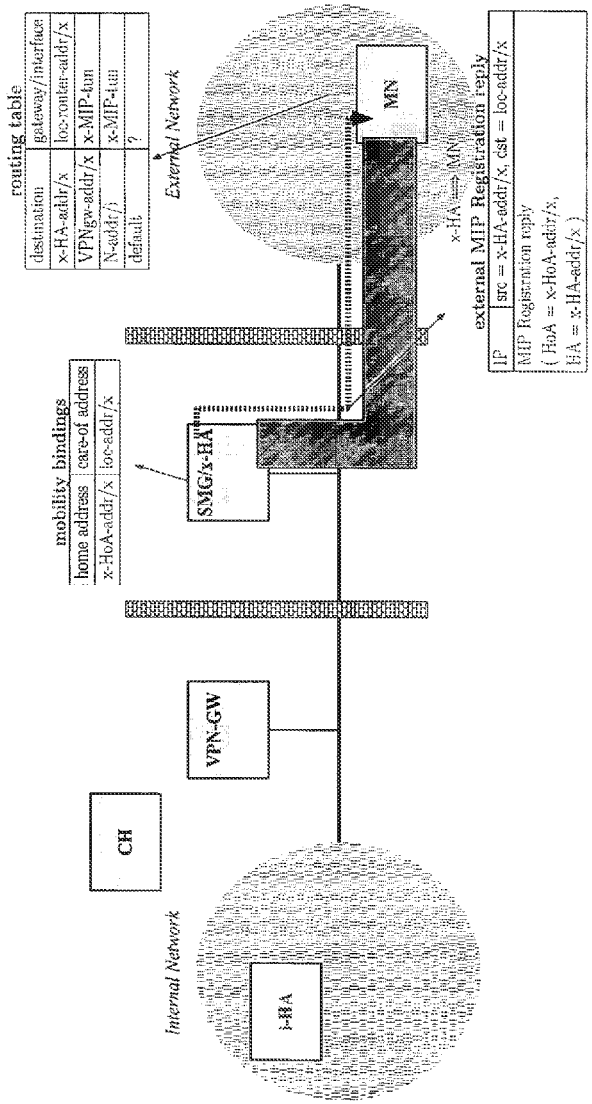
Figure 14D:
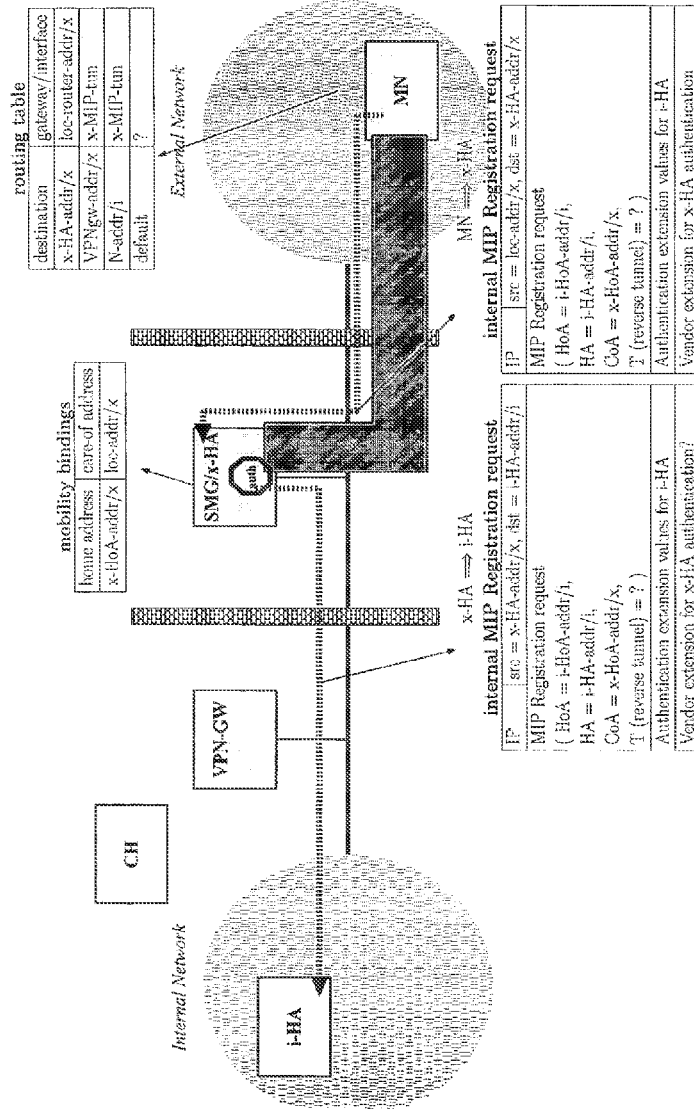
Figure 14E:
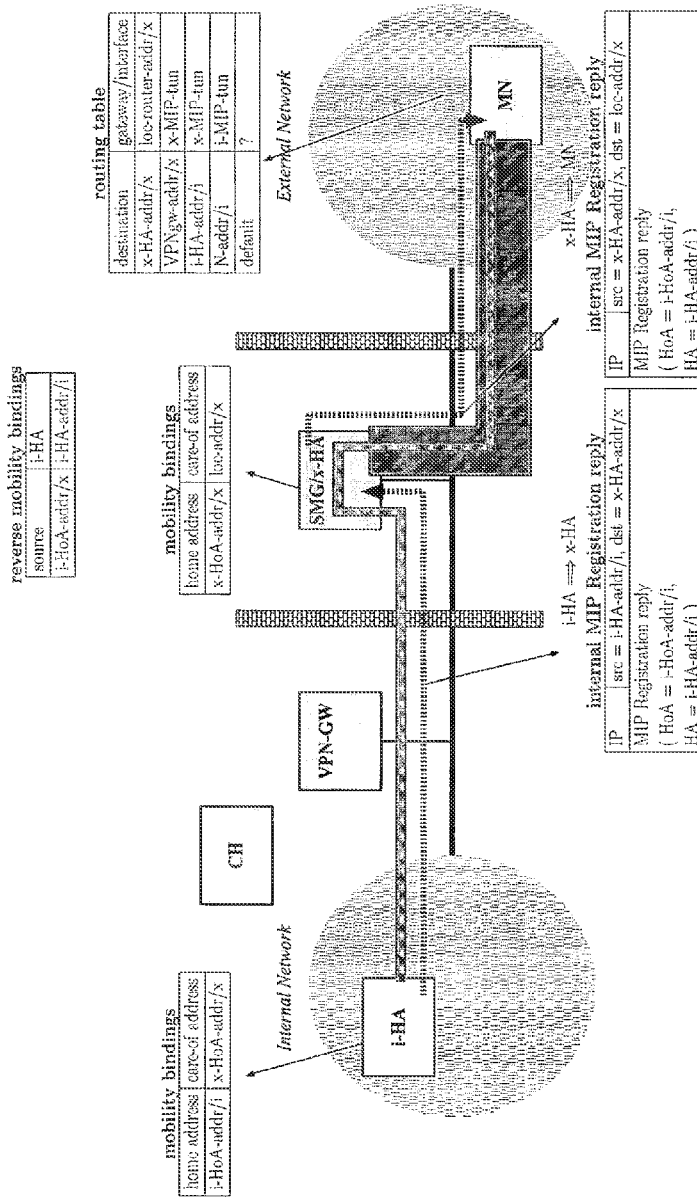
Figure 14F:
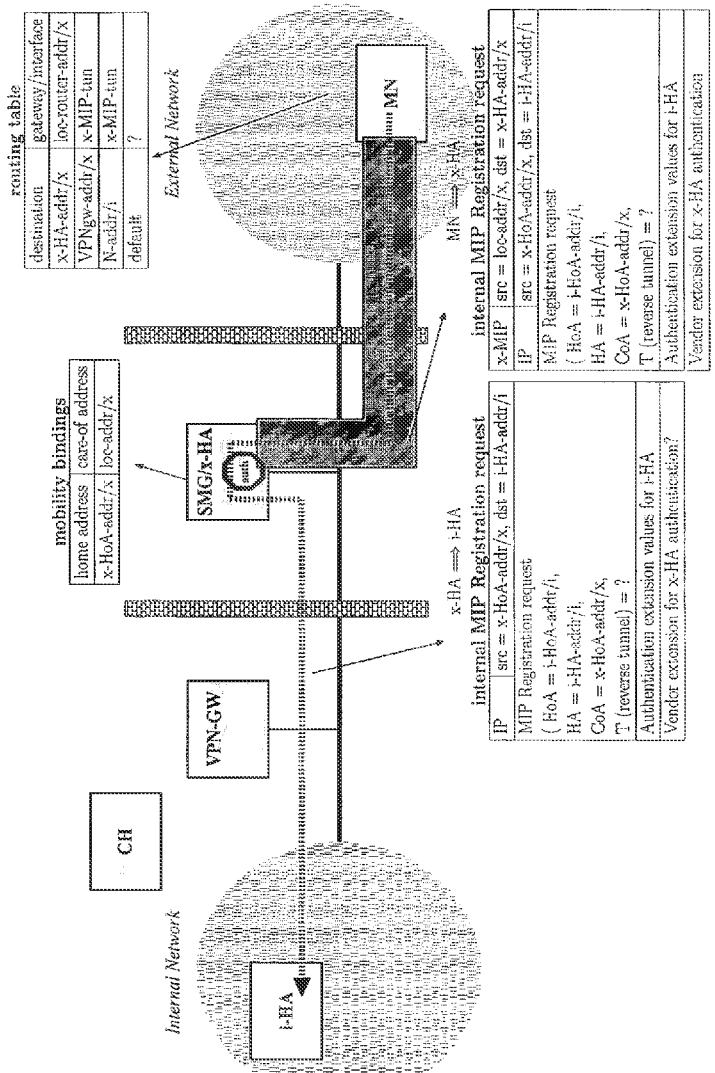
Figure 14G:
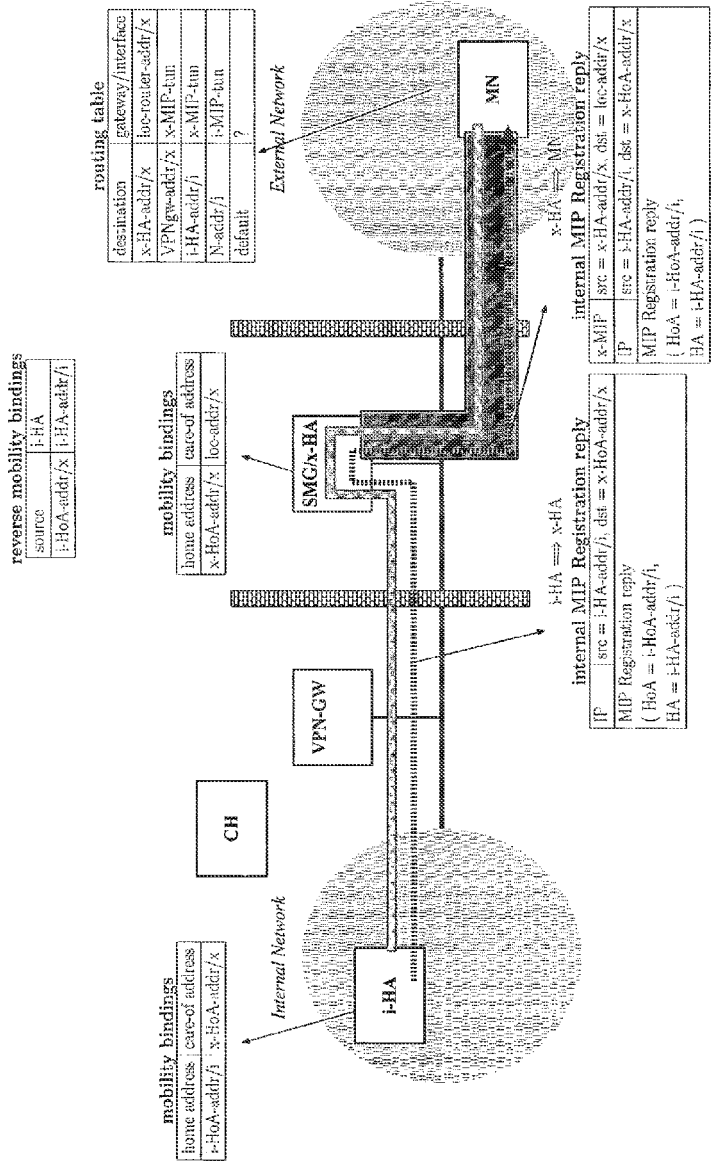
Figure 141:
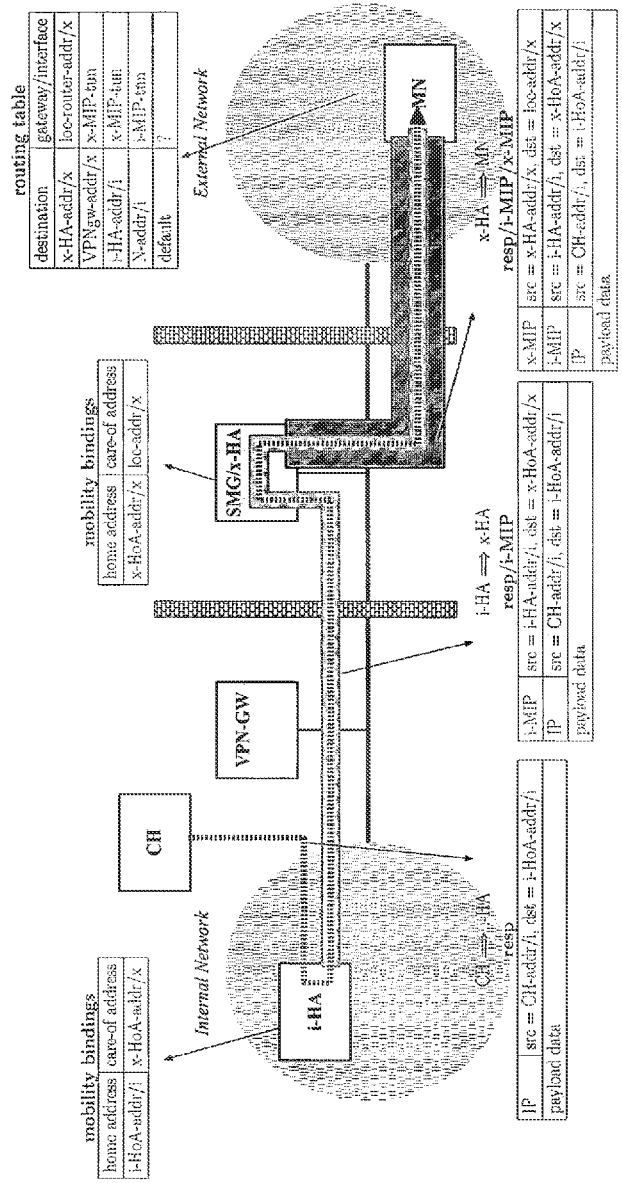
Figure 14J:
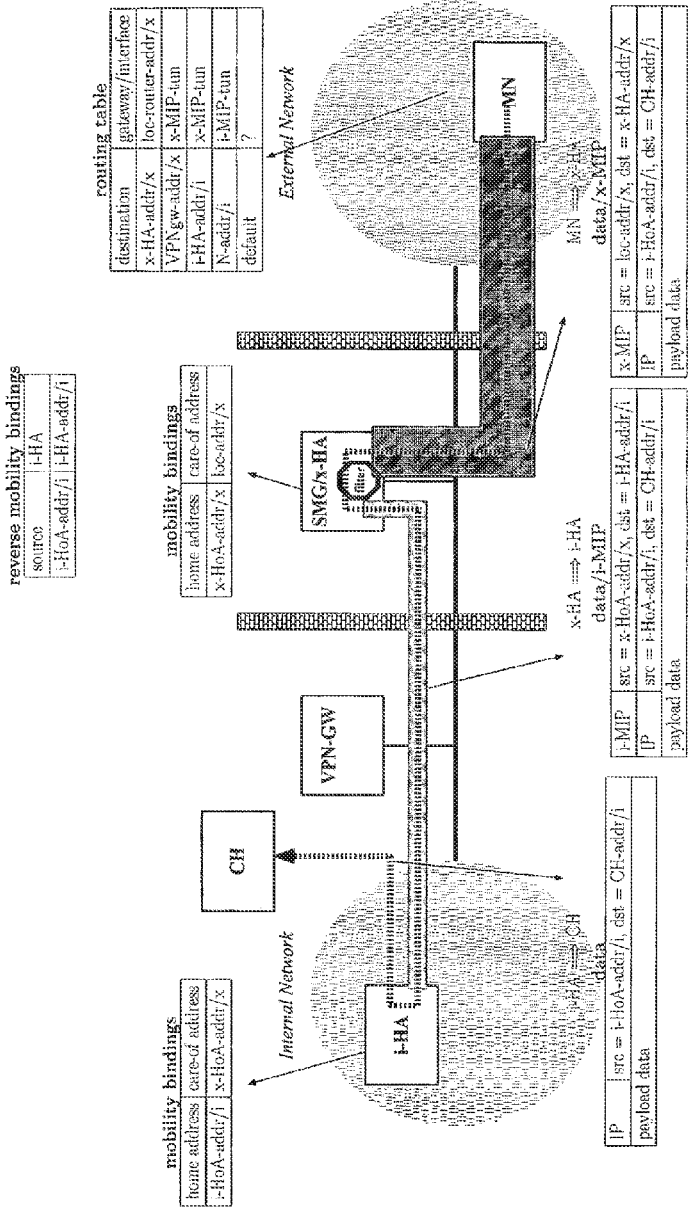
Figure 14K:
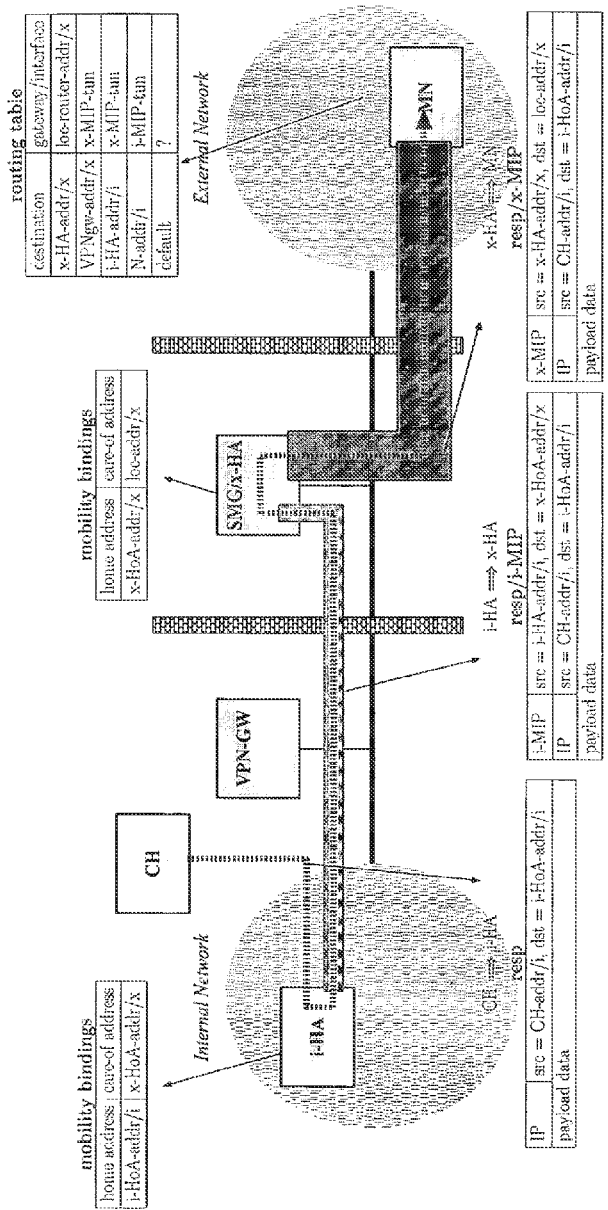
Figure 141:
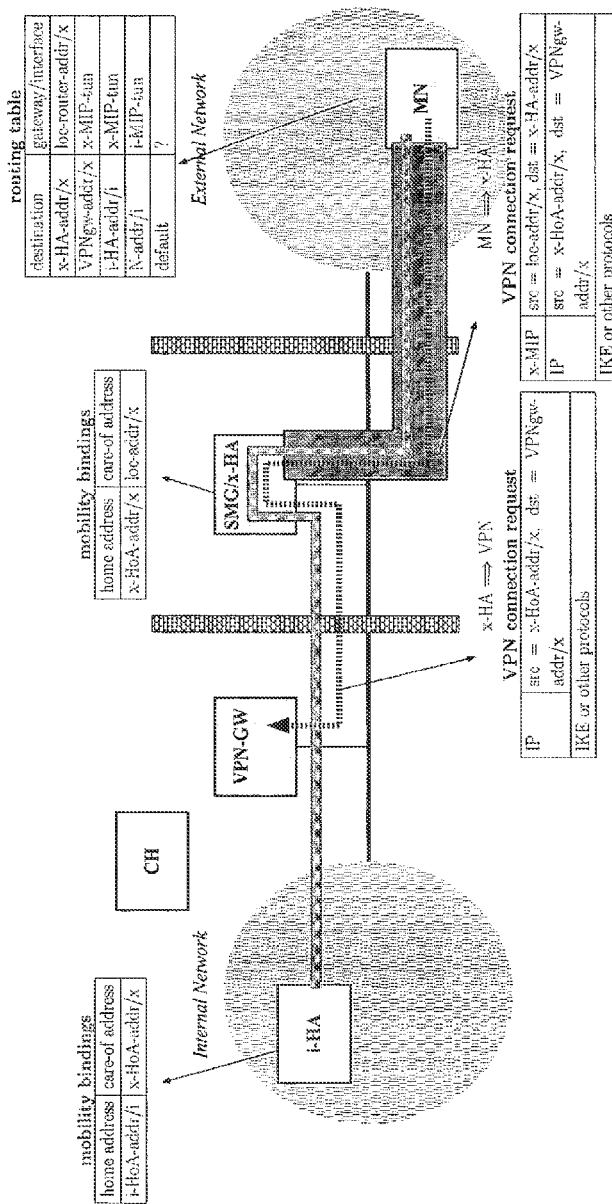
Figure 14M:
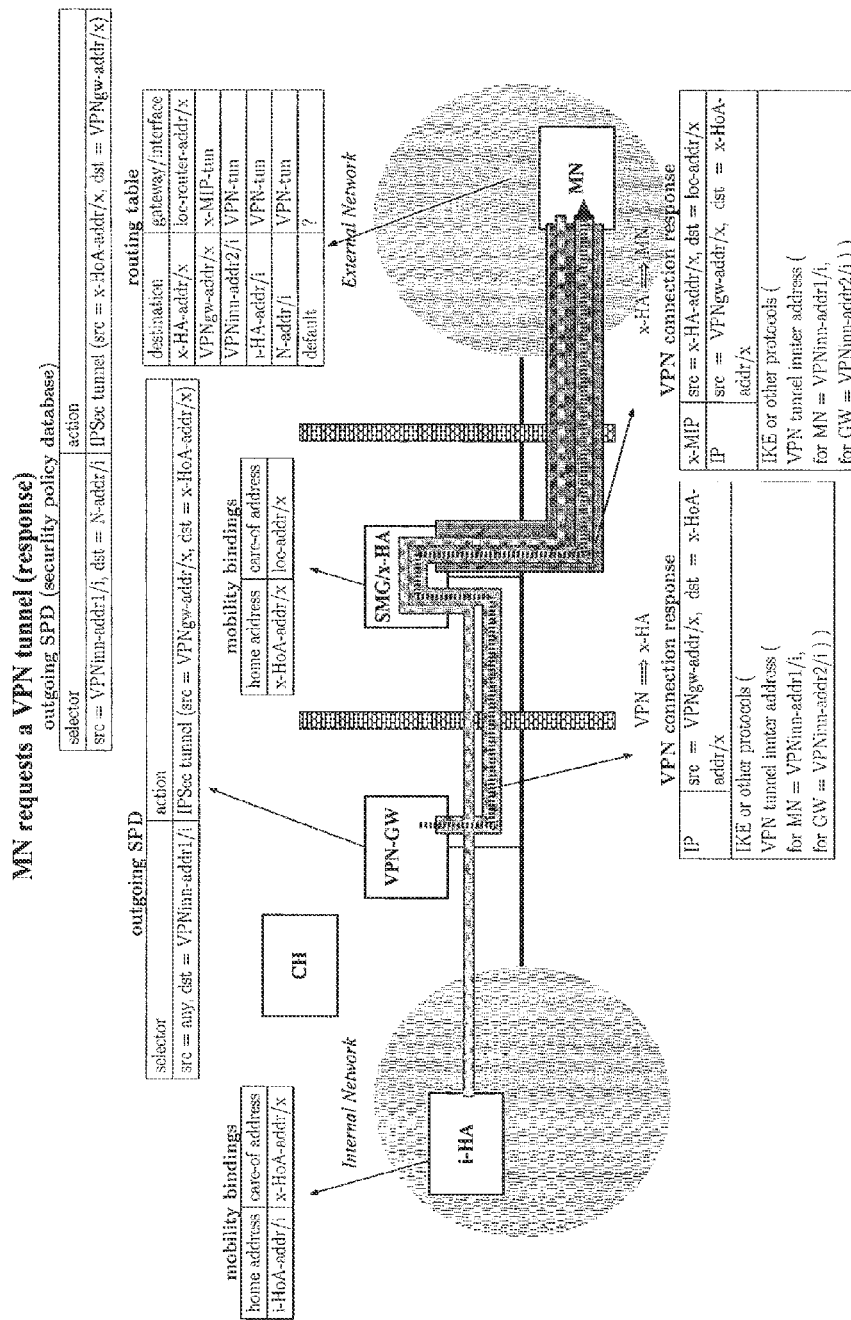
Figure 14N:
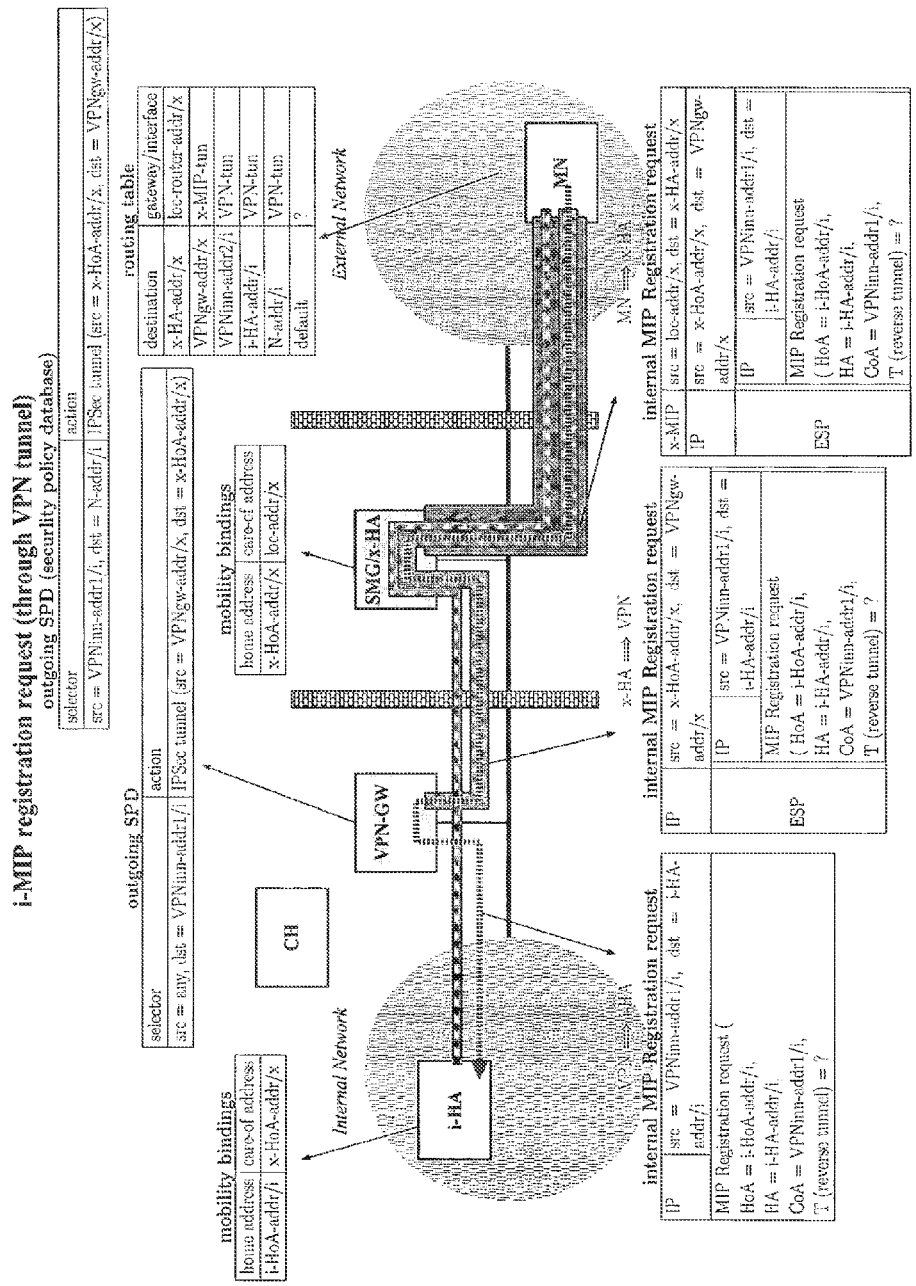
Figure 140:
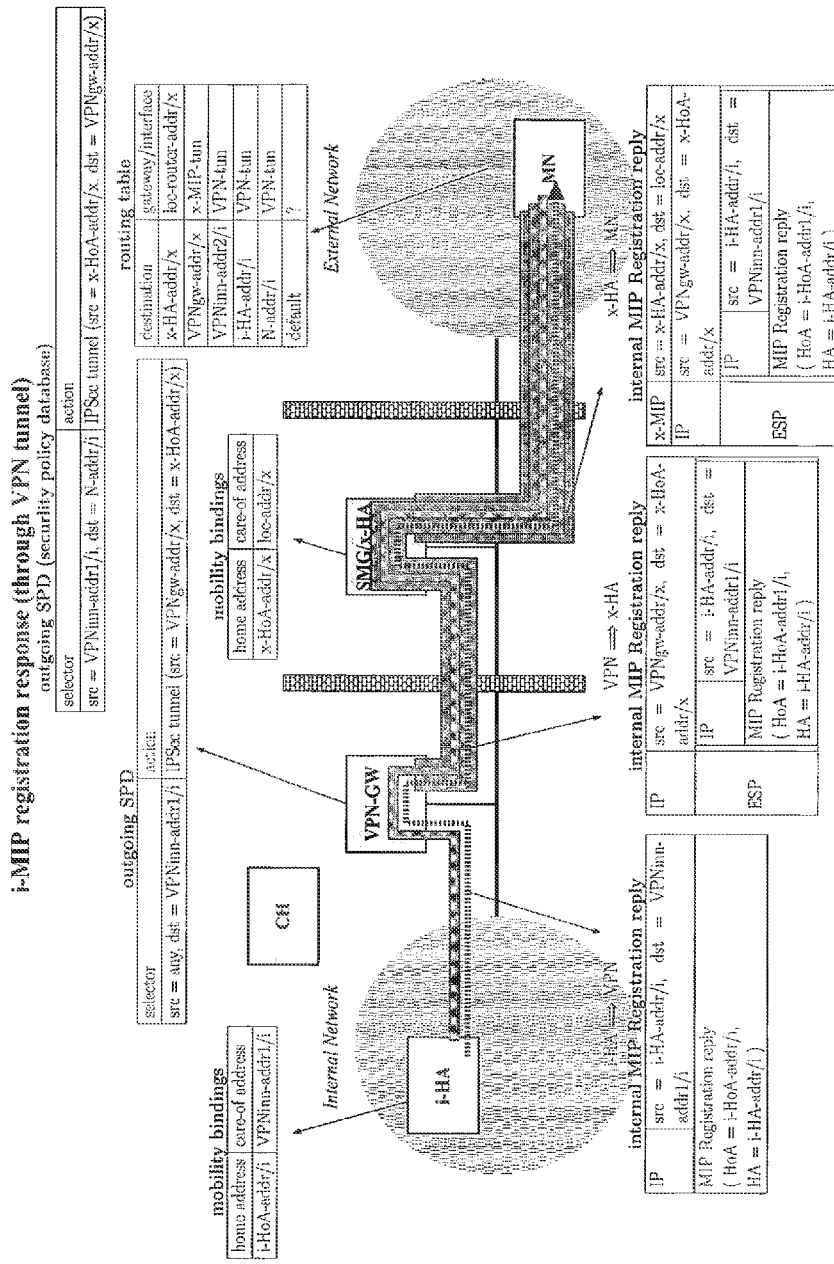
Figure 14P:
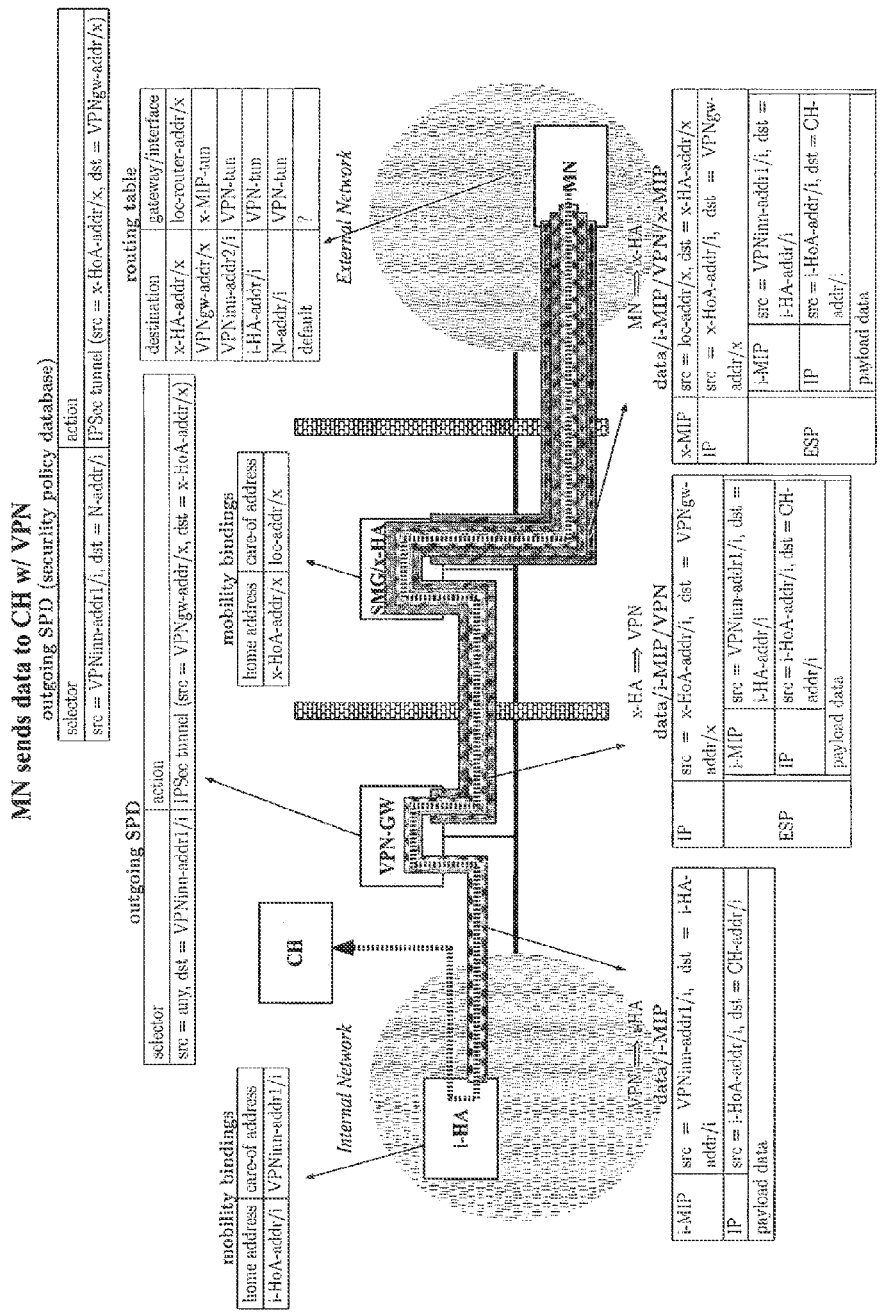
Figure 14Q:
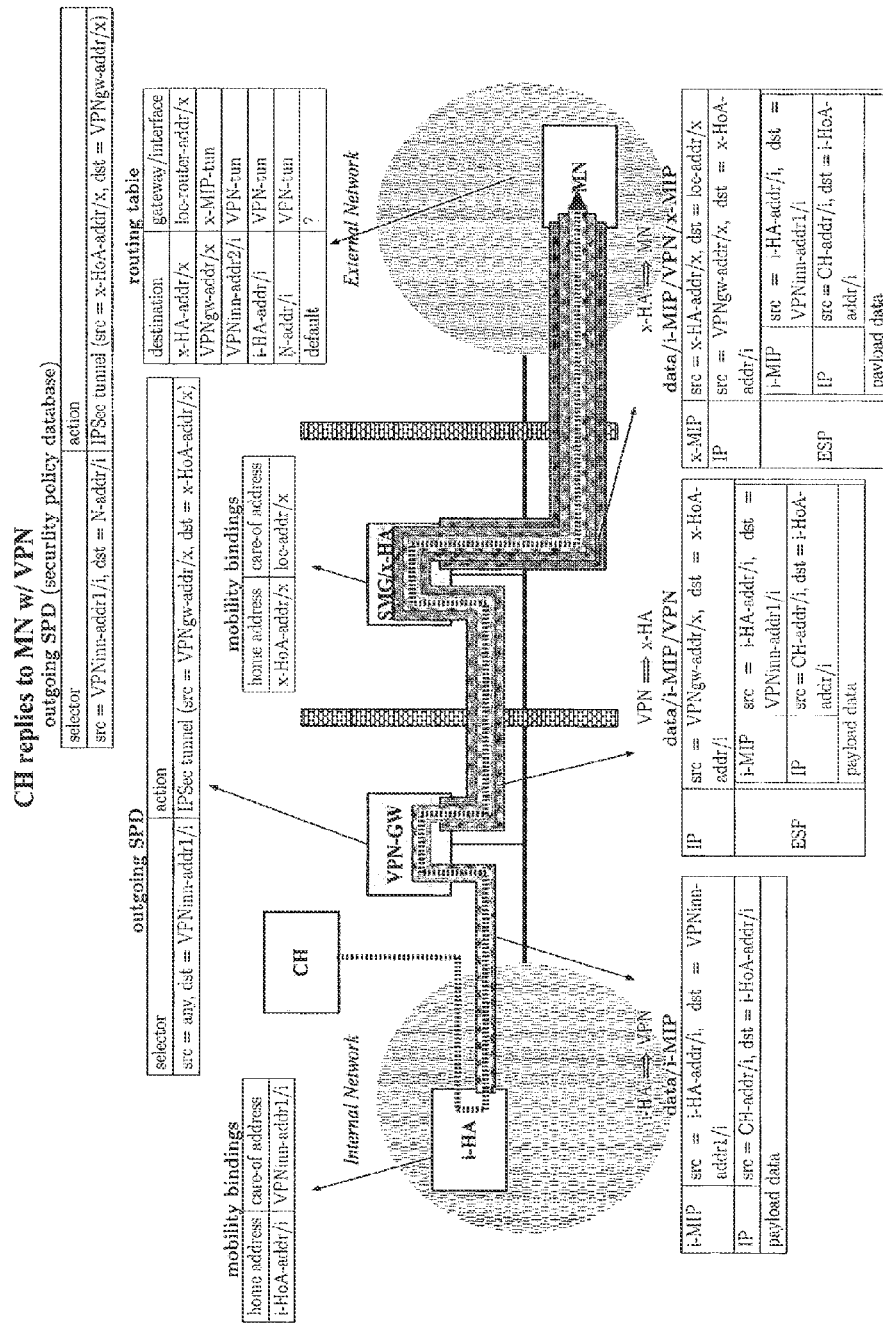
Figure 14R:
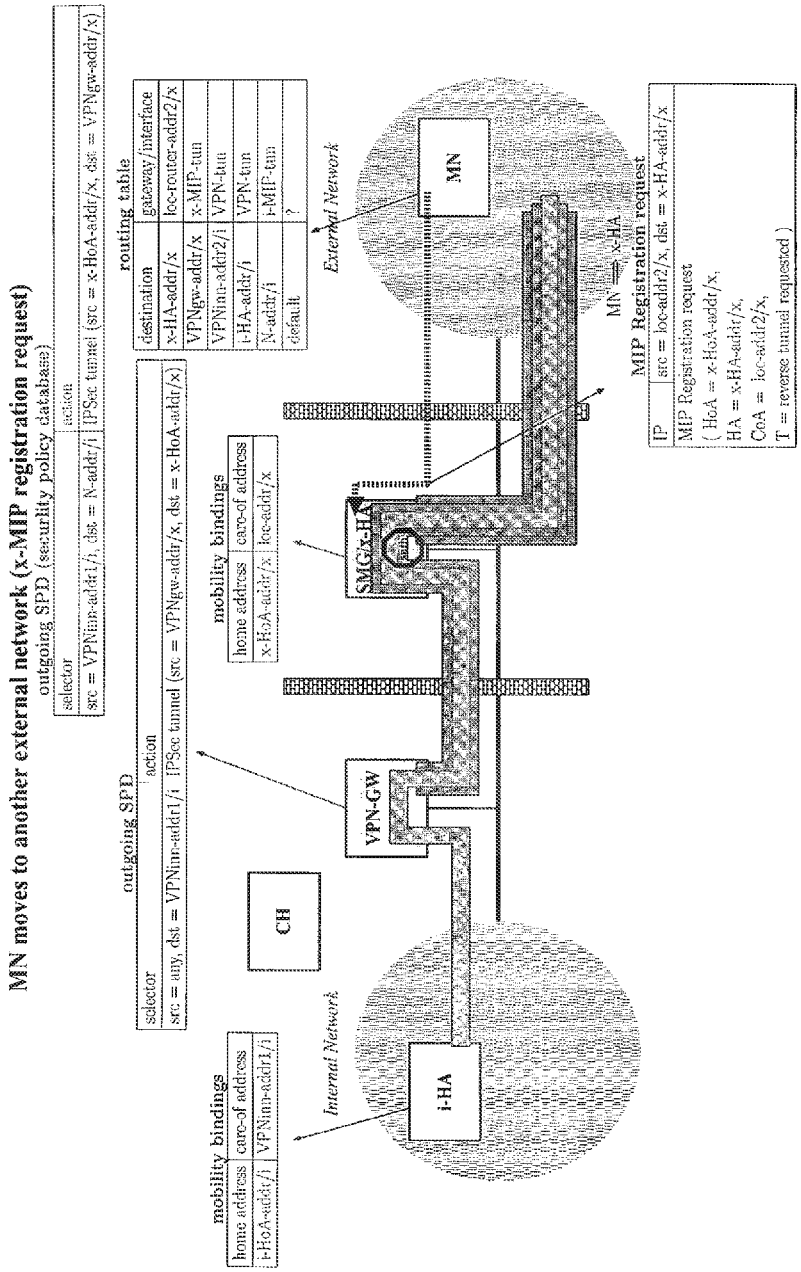
Figure 14T:
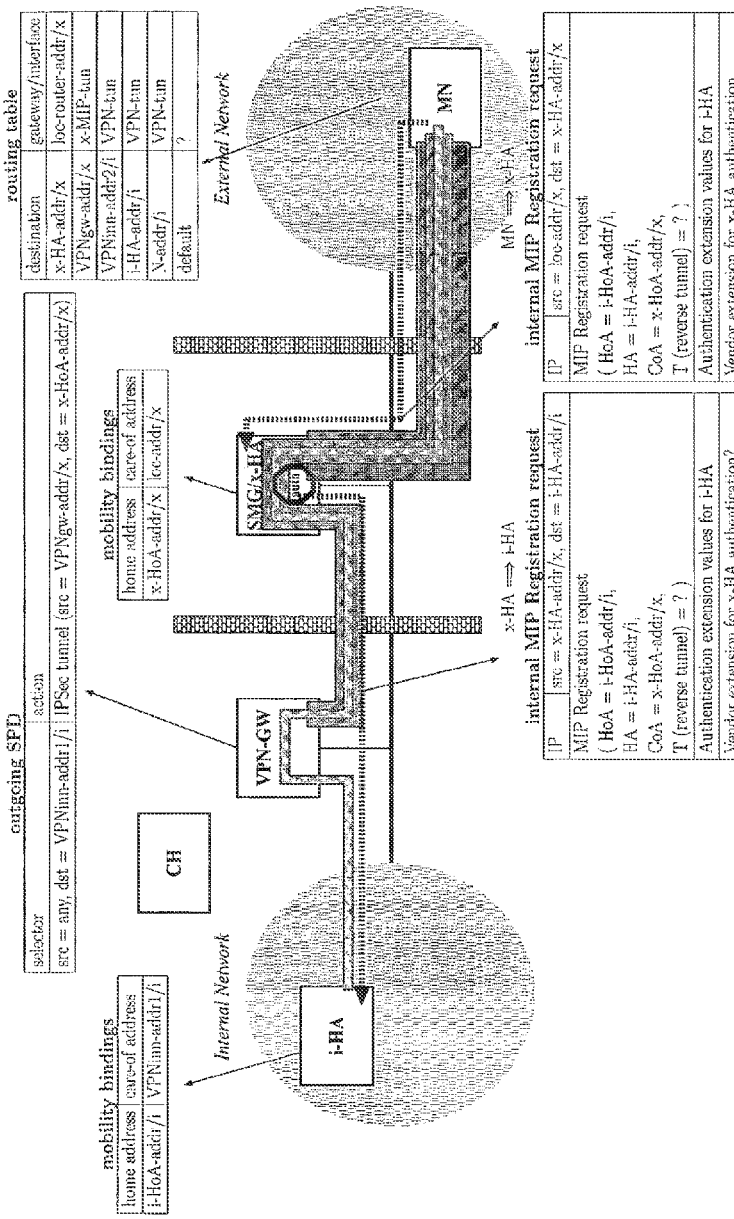
Figure 14U:
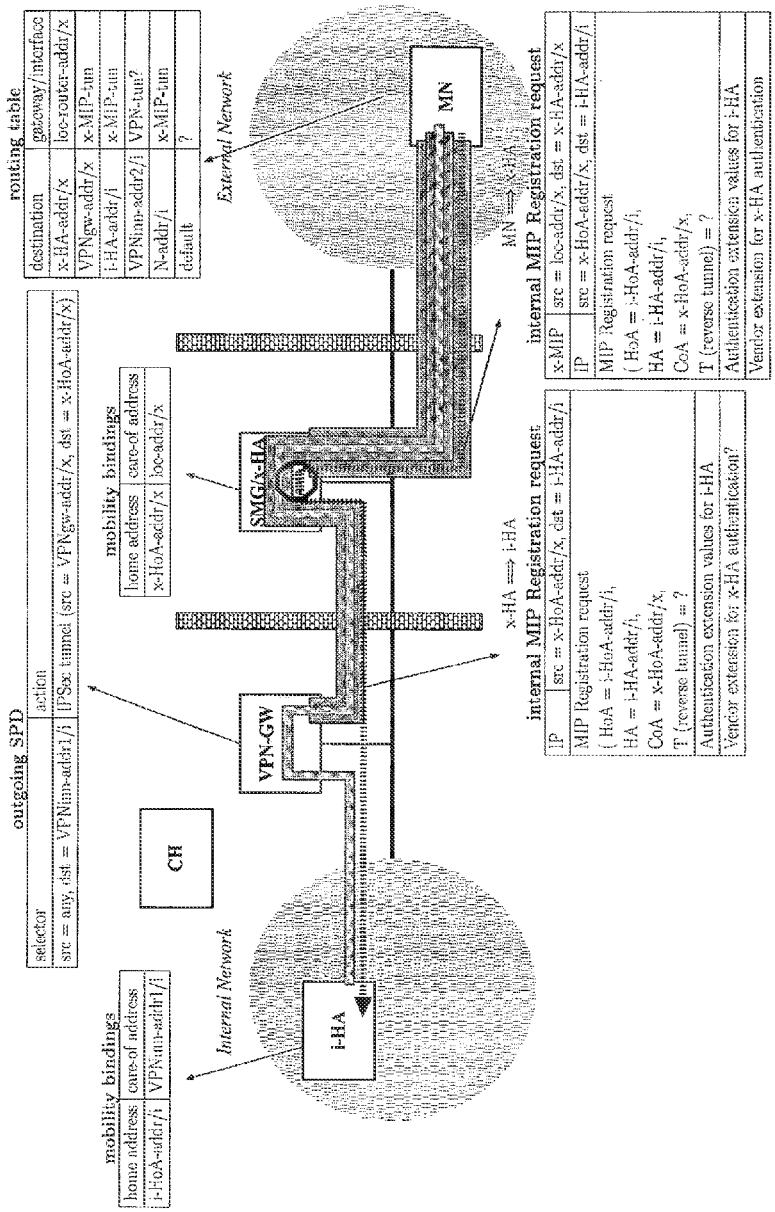
Figure 14V:
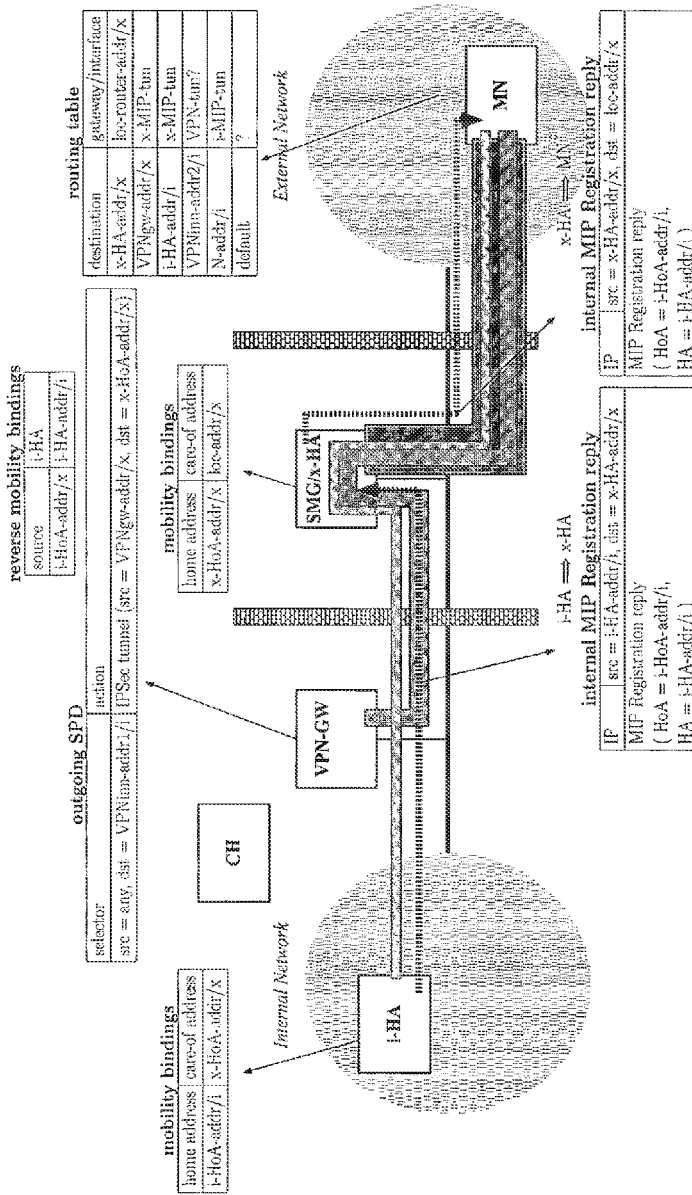
Figure 14W:
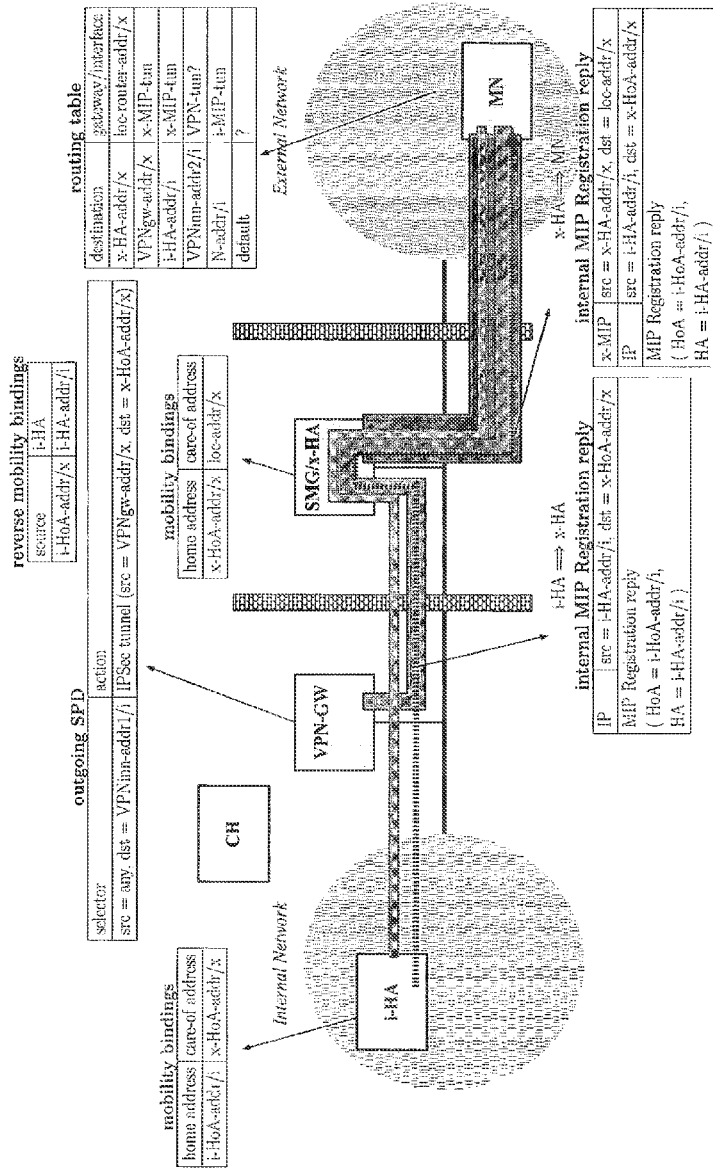
Figure 14X:
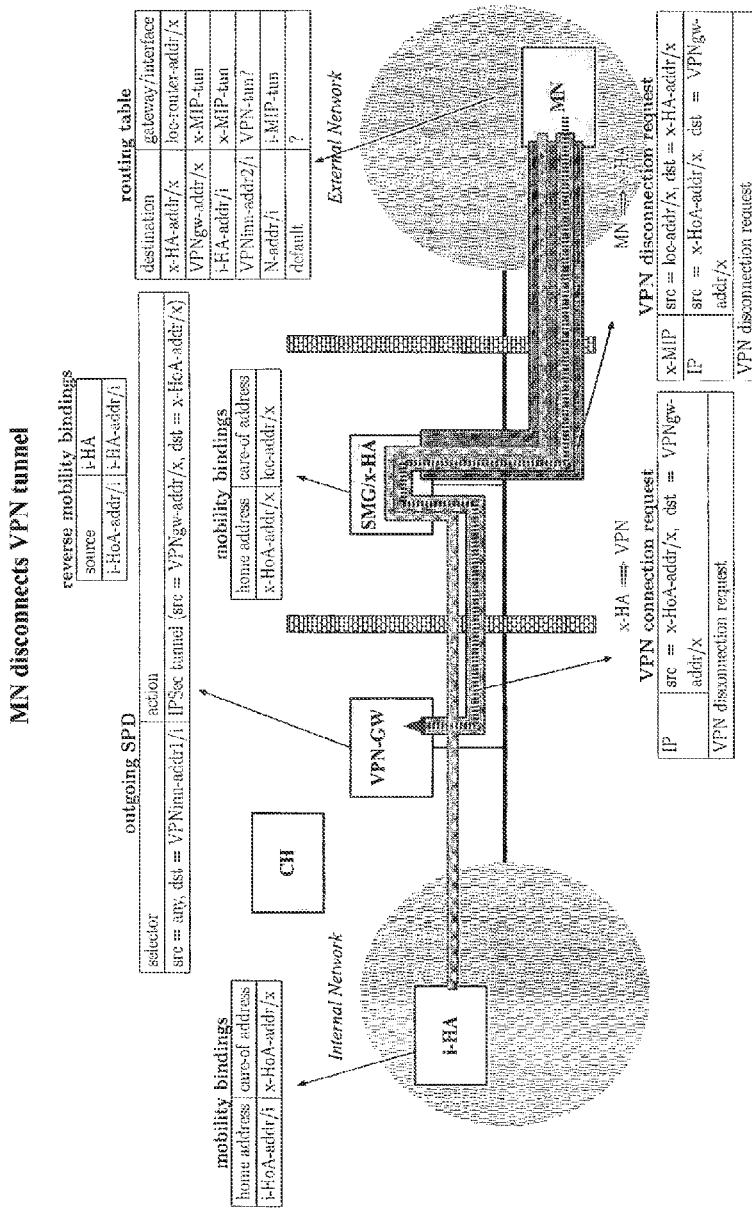
Figure 14V:
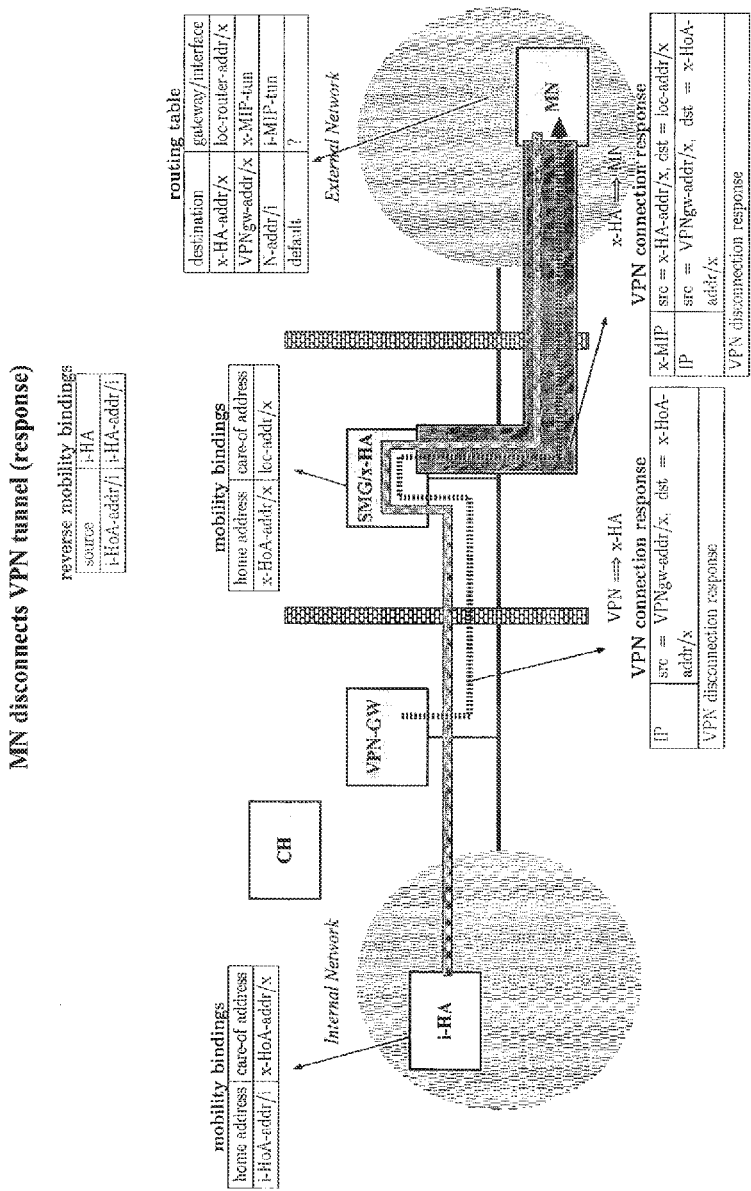
Figure 14Z:
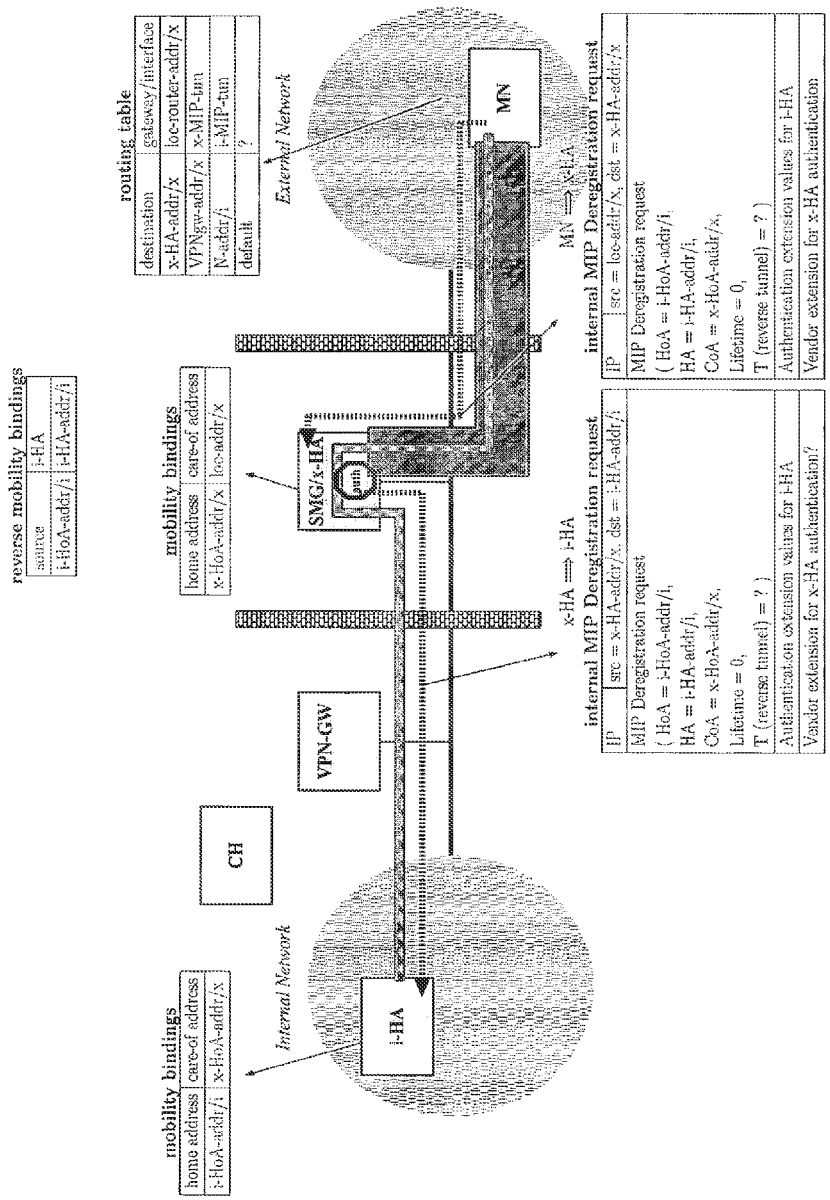
Figure 14A:
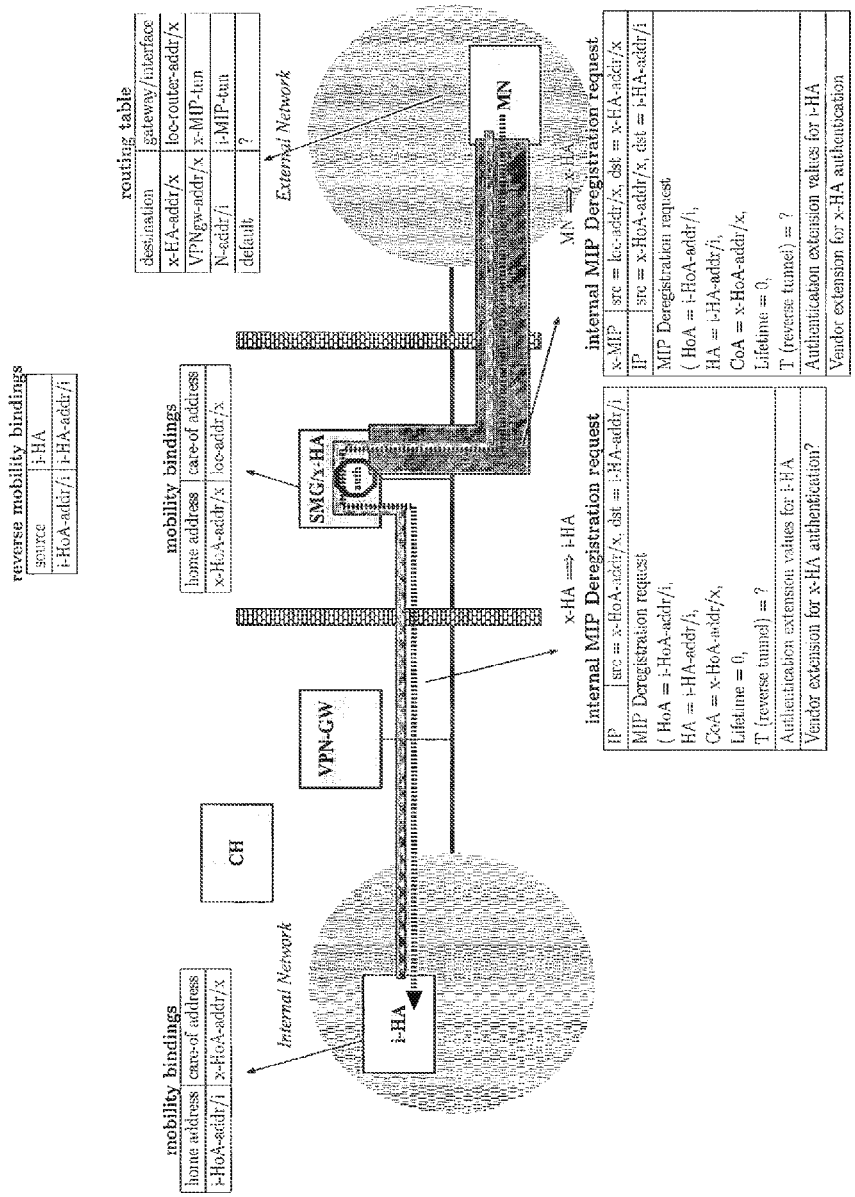
Figure 14B:
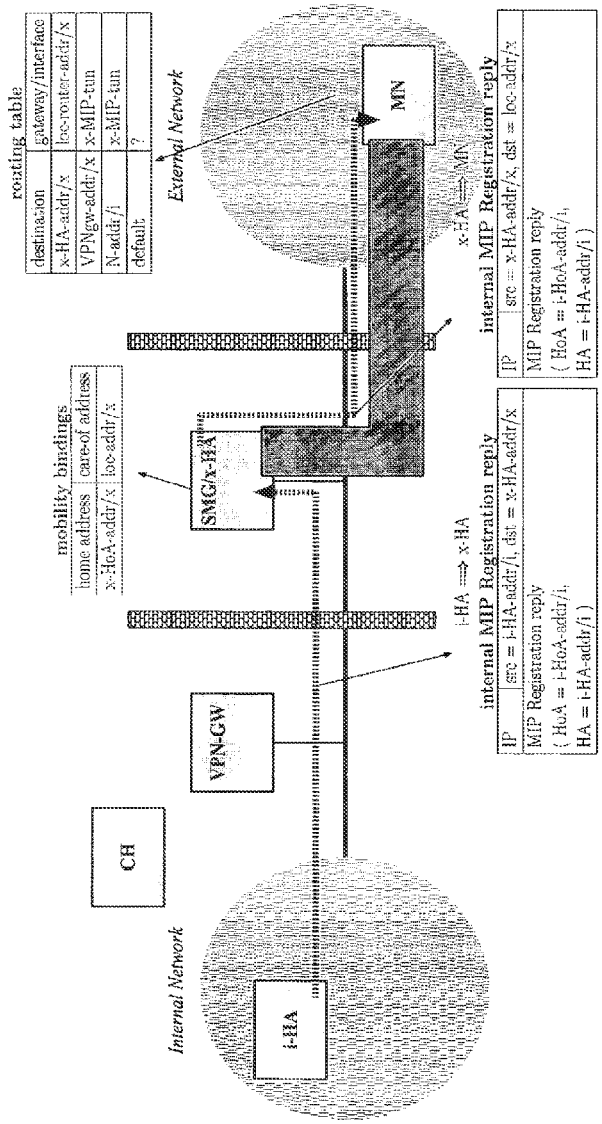
Figure 14C:
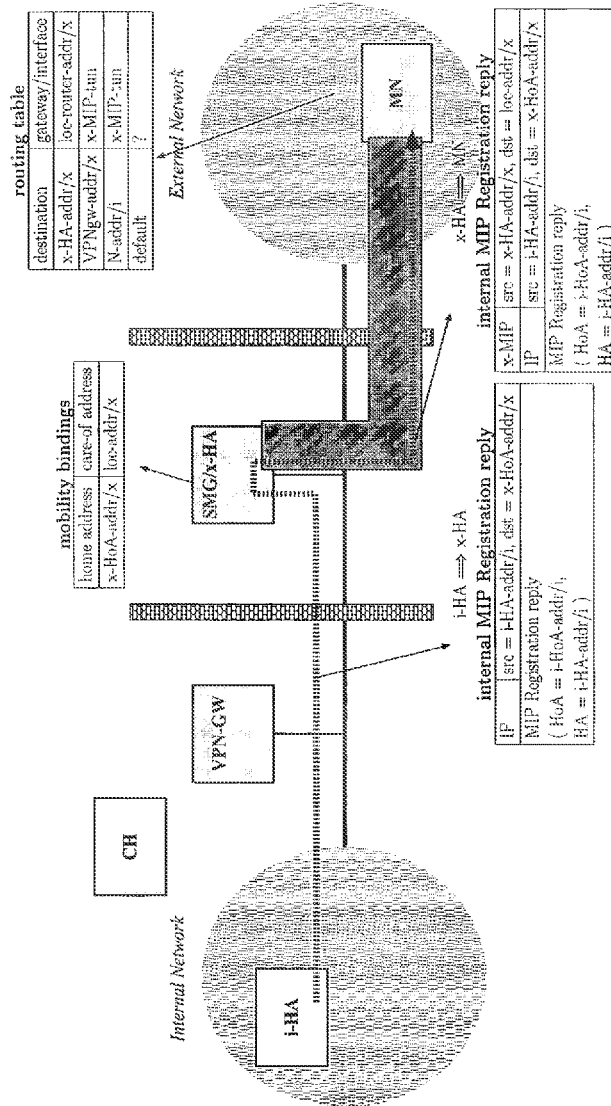
Figure 14D:
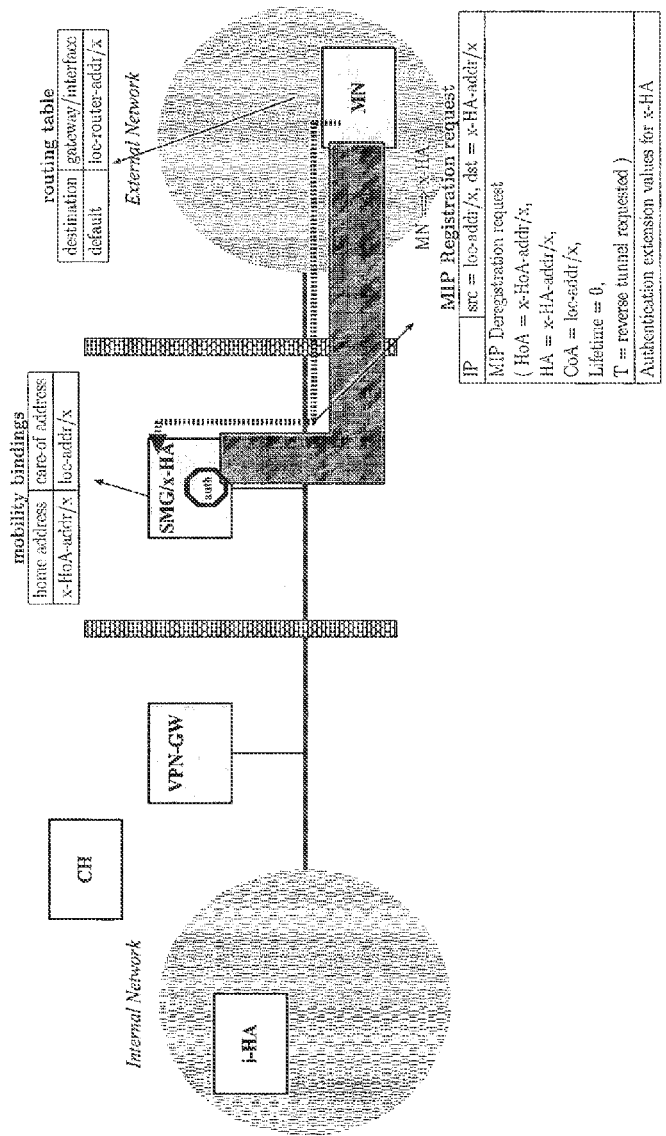
Figure 14E:
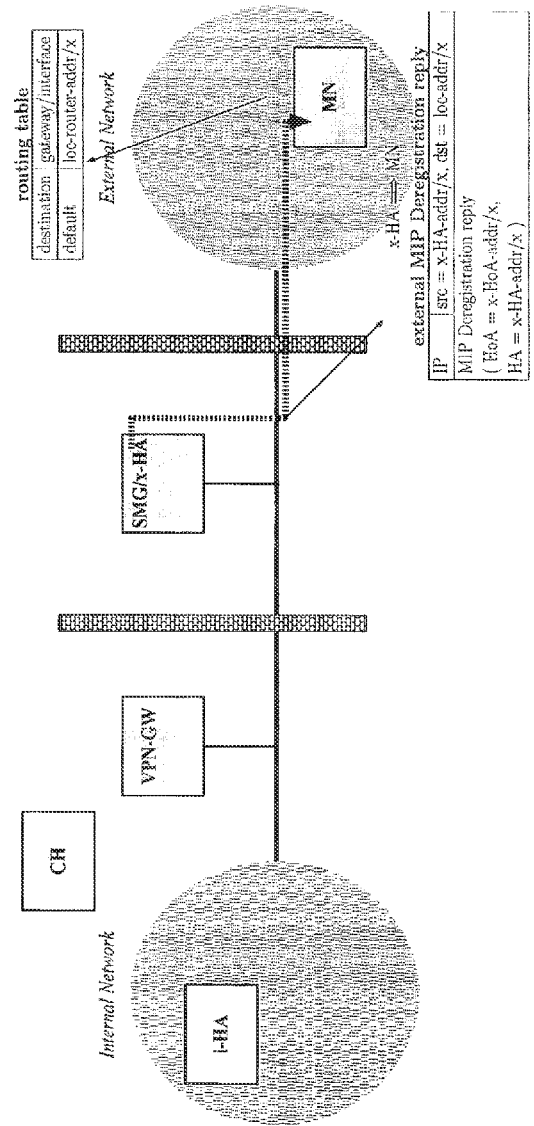
Figure 14F:
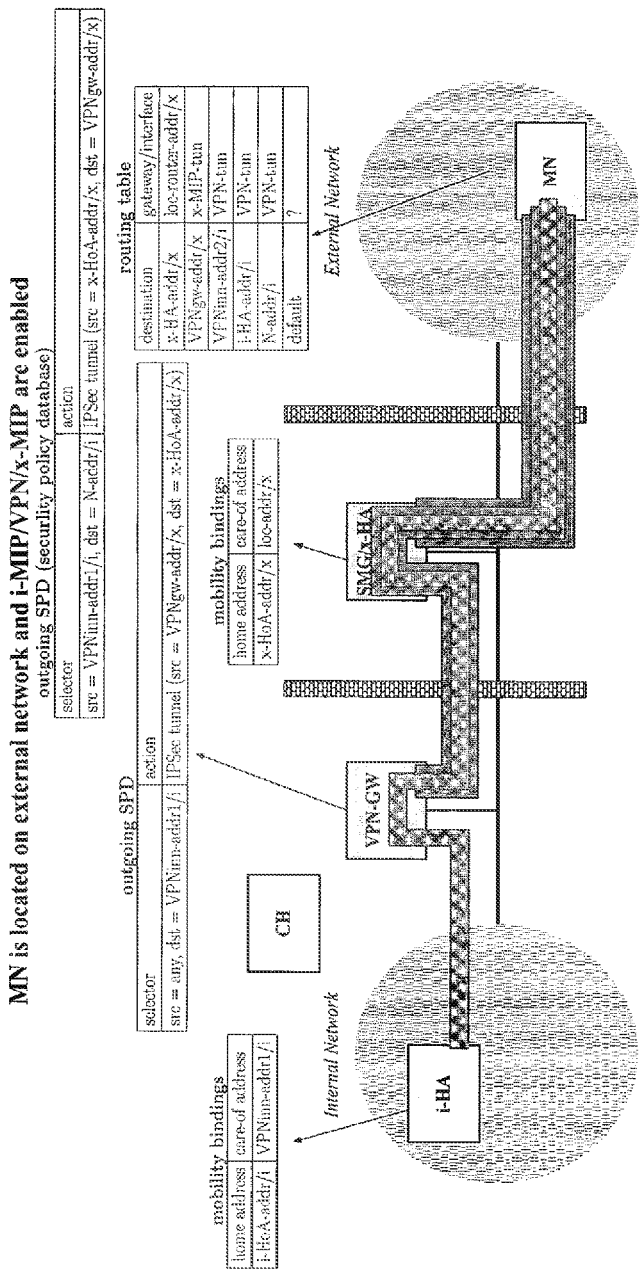
Figure 14G:
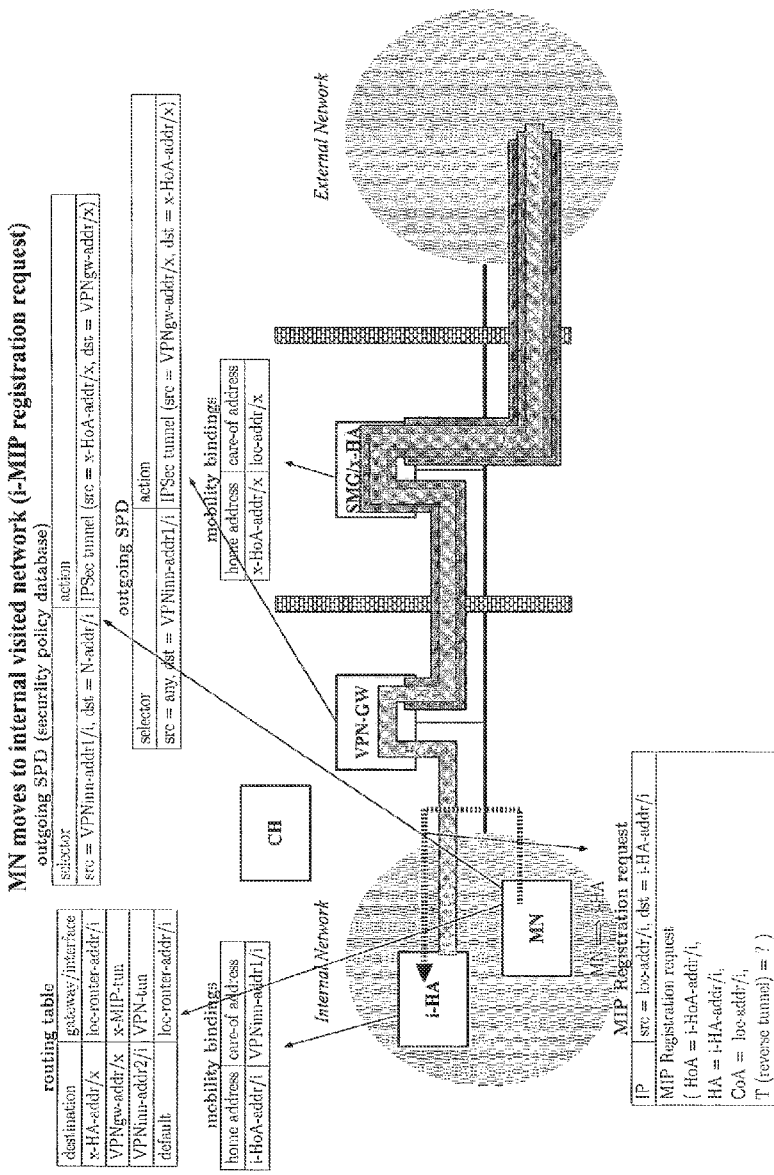

Scenario which Mobile Node Switches from Double to Triple and Vice Versa for Unix-Based Mobile Node The following scenario referencing FIGS. 14A-14NN describes where a mobile node switches from a double tunnel to a triple tunnel and back again in a UNIX-based mobile mode.

FIG. 14A shows a correspondent host 1401, an i-HA 1402, and a VPN-gw 1403 inside firewall 1404. FIG. 14A also includes an SMG/x-HA 1405 outside firewall 1404 yet inside firewall 1406. Finally, a mobile node 1407 is outside firewall 1406. Mobile node 1407 is supported by an external network. Mobile node 1407 may have a routing table with the following information:
- a. Destination:default(all destination),Gateway/Interface: local-router/x FIG. 14B shows mobile node 1407 when it has detected that it is located on an external network. Here, mobile node 1407 creates an x-MIP Registration Request and sends it to SMG/x-HA 1405. The x-MIP Registration Request's format is with the following information:
- a. Source IP address: local-addr/x
- b. Destination IP address: x-HA-addr/x(x-Home Agent address)
- c. Home Address: x-HoA-addr/x
- d. Home Agent: x-HA-addr/x
- e. Care of Addrss=local-addr/x
- f. Reverse tunnel request flag=true
- g. Authentication extension values for x-HA FIG. 14C shows SMG/x-HA 1405 making a mobility binding. Here, when SMG/x-HA 1405 receives the x-MIP Registration Request, SMG/x-HA 1405 authenticates it with authentication extension values. If the authentication is successful, then the SMG/x-HA 1405 makes a mobility binding with the following information:
- a. Home address: x-HoA-addr/x, Care of Address: local-addr/x SMG/x-HA 1405 may then send an x-MIP Registration reply to mobile node 1407 with the following information:
- a. Source IP address: x-HA-addr/x
- b. Destination IP address: local-addr/x
- c. Home Address: x-HoA-addr/x
- d. Home Agent: x-HA-addr/x When mobile node 1407 receives the x-MIP Registration reply, mobile node 1407 may add entries to its routing table with the following information:
- a. Destination: x-HA-addr/x, Gateway/interface: local-router-addr/x
- b. Destination: VPN-gateway-addr/x, Gateway/interface: x-MIP-tunnel
- c. Destination: internal-network-addr/i, Gateway/interface: x-MIP-tunnel The following shows two methods for i-MIP registration. Other approaches may also be used. The two approaches are described below using "SMG" and "MIP".

FIG. 14D shows SMG registration. Here, mobile node 1407 creates and sends SMG/x-HA 1405 a i-MIP Registration Request with the following information:
- a. Source IP address: local-addr/x
- b. Destination IP address: x-HA-addr/x
- c. Home Address: i-HoA-addr/i
- d. Home Agent: i-HA-addr/i
- e. Care of Address: x-HoA-addr/x
- f. Authentication extension values for i-HA
- g. Vendor extension for x-HA authentication When SMG/x-HA 1405 receives the i-MIP Registration Request, authenticates it and, if authentication succeeds, changes Source and Destination IP address information and send them to i-HA 1402 with the following information:
- a. Source IP address: x-HA-addr/x
- b. Destination IP address: i-HA-addr/i FIG. 14E shows SMG registration. When i-HA 1402 receives the i-MIP Registration Request, it authenticates it and, if authentication is successful, i-HA 1402 creates mobility bindings with the following information:
- a. home address:i-HoA-addr/i, care-of address:x-HoA-addr/x i-HA 1402 creates an i-MIP Registration Reply and send to SMG/x-HA 1405 with the following information:
- a. Source IP address: i-HA-addr/i
- b. Destination IP address: x-HA-addr/x
- c. Home Address: i-HoA-addr/i
- d. Home Agent: i-HA-addr/i When SMG/x-HA 1405 receives the i-MIP Registration Reply, SMG/x-HA 1405 records reverse mobility bindings with the following information:
- a. Source Address: i-HoA-addr/x, i-HA address: i-HA-addr/i Reverse mobility bindings may be used in the split tunnel mode.

SMG/x-HA 1405 changes the Source IP address and the Destination IP address and sends a signal to mobile node 1407 with the following information:
- a. Source IP address: x-HA-addr/x
- b. Destination IP address: local-addr/x When mobile node 1407 receives the i-MIP Registration Reply, it adds an entry in its routing table with the following information:
- a. Destination: i-HA-addr/i, Gateway/interface: x-MIP-tunnel
- b. Destination: internal network address/i, Gateway/interface: i-MIP-tunnel FIG. 14F shows mobile node 1407 creating and sending an i-MIP registration request to SMG/x-HA 1405 with the following information:
- a. x-MIP Source IP address: local-addr/x
- b. x-MIP Destination IP address: x-HA-addr/x
- c. Source IP address: x-HoA-addr/x
- d. Destination IP address: i-HA-addr/x
- e. Home Address: i-HoA-addr/i
- f. Home Agent: i-HA-addr/i
- g. Care of Address: x-HoA-addr/x
- h. Authentication extension values for i-HA
- i. Vendor extension for x-HA authentication When SMG/x-HA 1405 receives the i-MIP Registration Request, it authenticates it and, if authentication is successful, it removes the x-MIP Source and x-MIP Destination IP address and send to i-HA.

FIG. 14G shows the registration response. When i-HA 1402 receives the i-MIP Registration Request, it authenticates it and, if authentication succeeds, i-HA 1402 creates mobility bindings with the following information:
- a. home address: i-HoA-addr/i, care-of address: x-HoA-addr/x i-HA 1402 creates an i-MIP Registration Reply and send it to SMG/x-HA 1405 with the following information:
- a. Source IP address: i-HA-addr/i
- b. Destination IP address: x-HoA-addr/x
- c. Home Address: i-HoA-addr/i
- d. Home Agent: i-HA-addr/i When SMG/x-HA 1405 receives the i-MIP Registration Reply, SMG/x-HA 1405 records reverse mobility bindings with the following information:

a. Source Address: i-HoA-addr/x, i-HA address: i-HA-addr/i

Reverse mobility bindings may be used by split the tunnel mode.

SMG/x-HA 1405 adds the x-MIP Source IP address and x-MIP Destination IP address and sends it to mobile node 1407 with the following information:
 a. x-MIP Source IP address: x-HA-addr/x
 b. x-MIP Destination IP address: local-addr/x When mobile node 1407 receives the i-MIP Registration Reply, it adds an entry in the routing table with the following information:
 a. Destination: i-HA-addr/i, Gateway/interface: x-MIP-tunnel
 b. Destination: internal network address/i, Gateway/interface: i-MIP-tunnel There are at least two types of double MIP tunnels. First, there is a two mode for double MIP tunnel (x-MIP and i-MIP), one is Overlaid MIP the other is Split MIP. The following describe how the data flows between the mobile node 1407 and the correspondent host 1401 in the following figures.

Figure 14H:
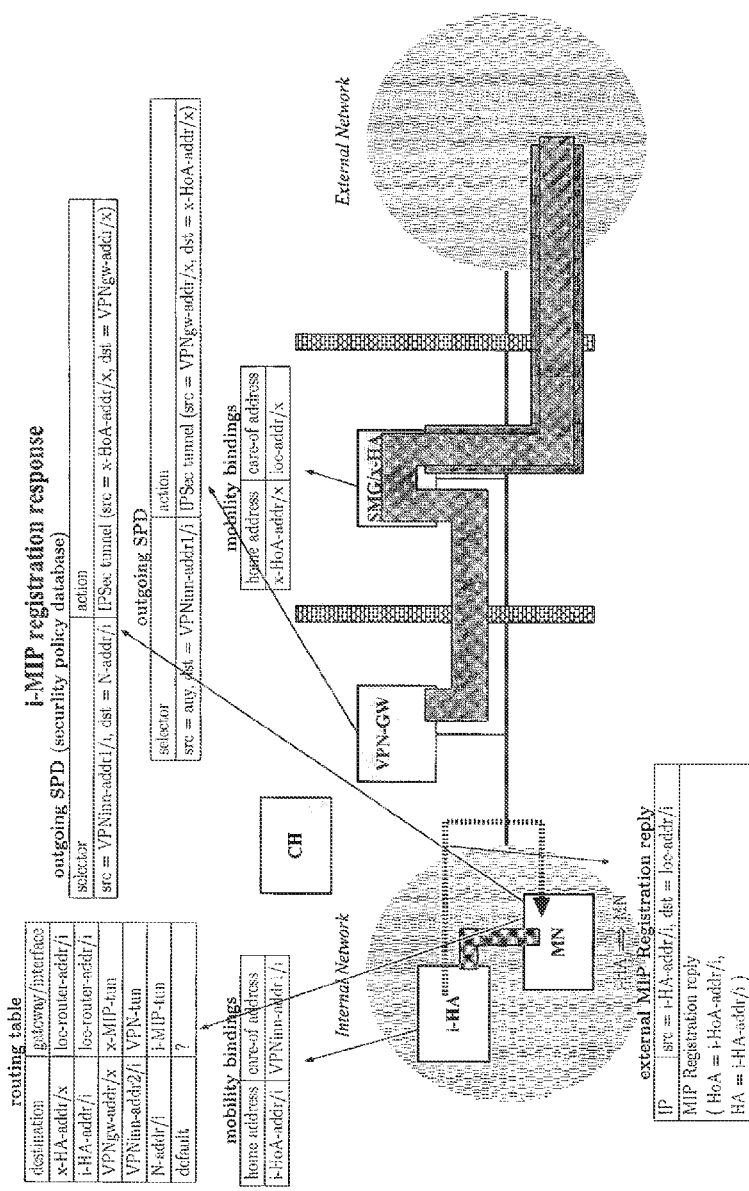

FIG. 14H shows the mobile node 1407 sending data to correspondent host 1401 without a VPN (overlaid MIP). When mobile node 1407 sends a data packet, it creates an encapsulated packet and sends it to SMG/x-HA 1405 with the following information:
 a. x-MIP Source IP address: local-addr/x
 b. X-MIP Destination IP address: x-HA-addr/x
 c. i-MIP Source IP address: x-HoA-addr/x
 d. i-MIP Destination IP address: i-HA-addr/i
 e. Source IP address: i-HoA-addr/i
 f. Destination IP address: CH-addr/i
 g. Payload data When SMG/x-HA 1405 receives the data packet, it removes x-MIP IP header and then send it to i-HA 1402.

When i-HA 1402 receives the data packet, it removes i-MIP IP header, then send the package to correspondent host 1401.

Correspondent host 1401 receives normal IP data packet which is not encapsulated.

Figure 14I:
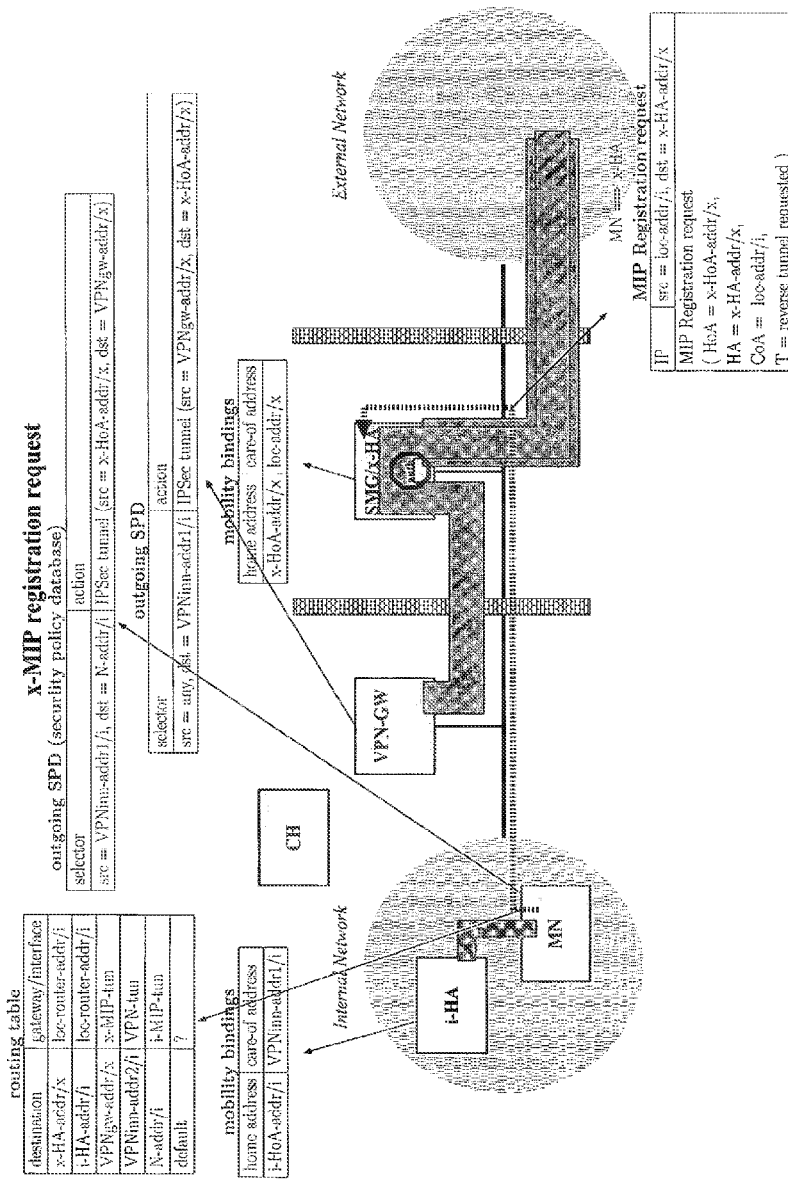
Figure 14J:
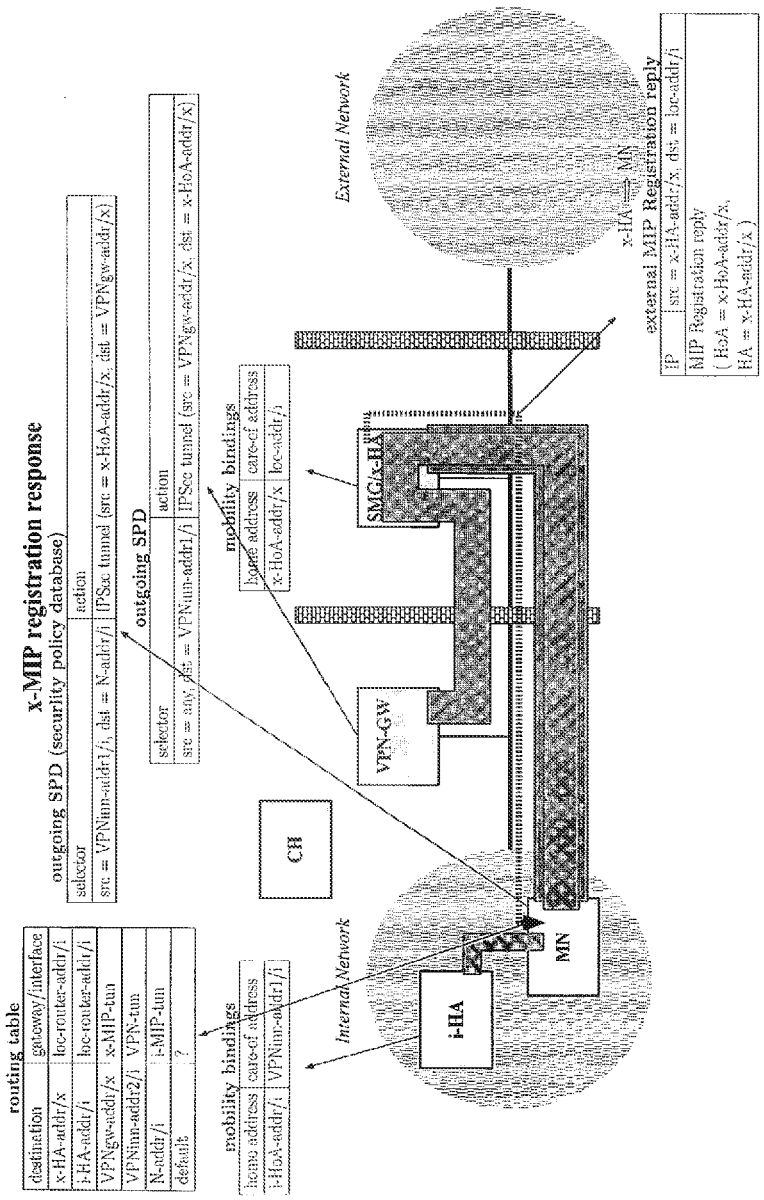
Figure 14K:
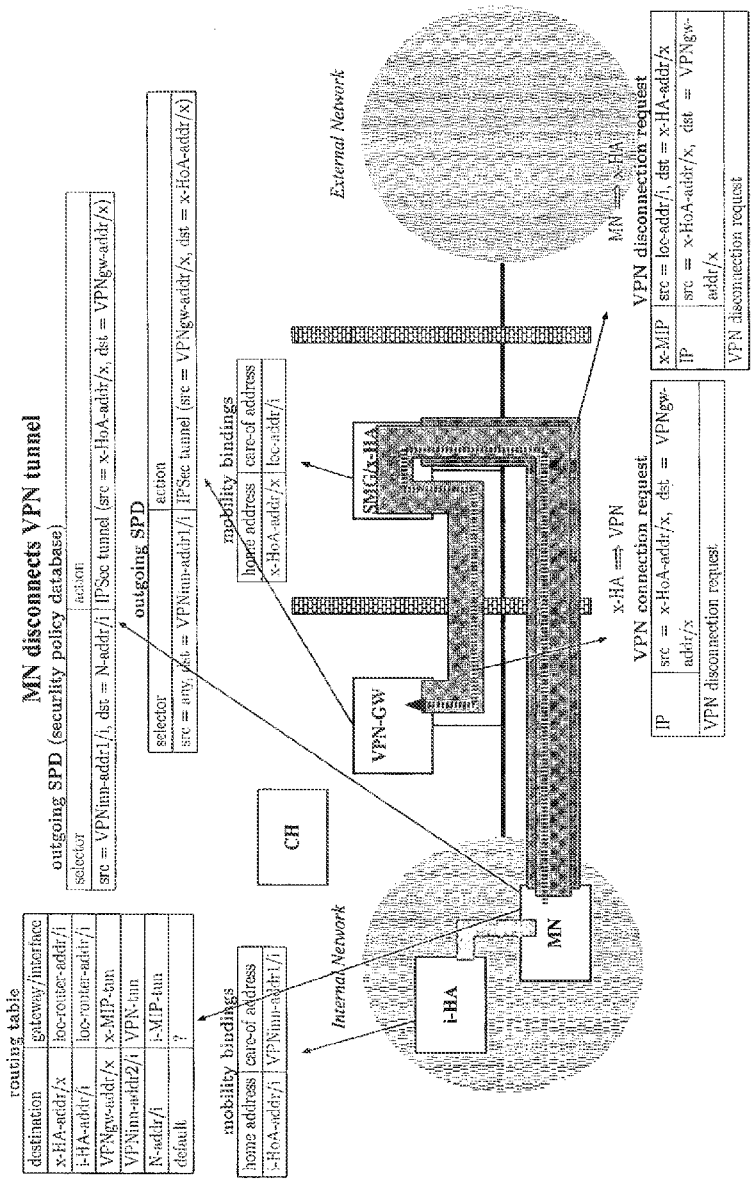
Figure 14M:
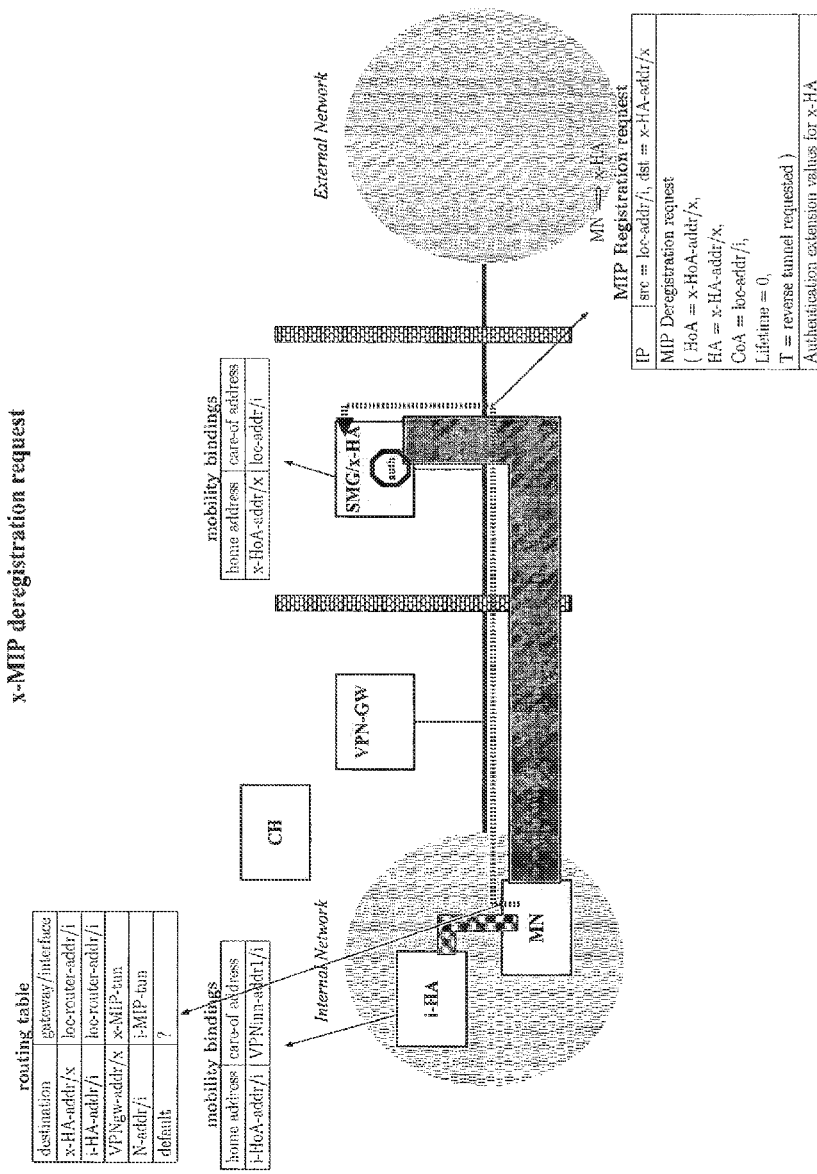
Figure 14N:
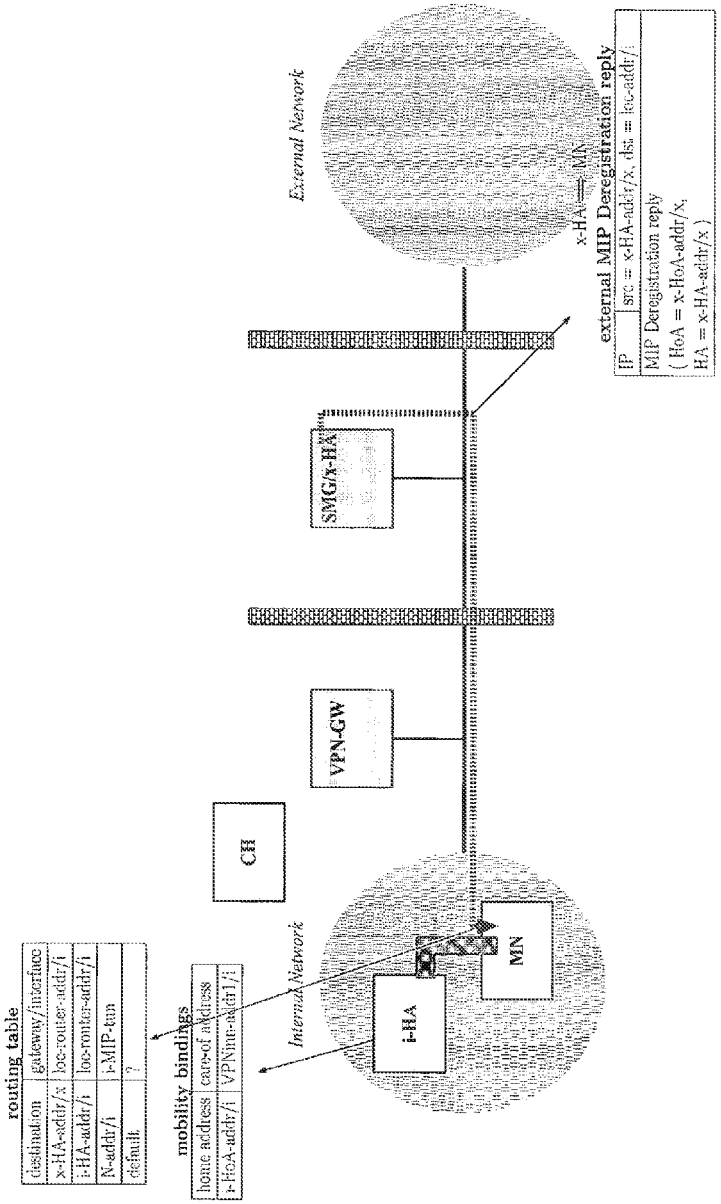

FIG. 14I shows where a correspondent host replies to the mobile node without a VPN (referred to as overlay API). When correspondent host 1401 sends a data packet, it creates the packet and sends it to i-HA 1402 with the following information:
 a. Source IP address: CH-addr/i
 b. Destination IP address: i-HoA-addr/i
 c. Payload data When i-HA 1402 receives the data packet, it adds an i-MIP IP header and sends the packet to the SMG/x-HA 1405 with the following information:
 a. i-MIP Source IP Address: i-HA-addr/i
 b. i-MIP destination IP address: x-HoA-addr/x When SMG/x-HA 1404 receives a data packet, it adds an x-MIP header and sends it to mobile node 1405 with the following information:
 a. x-MIP Source IP address: x-HA-addr/i
 b. x-MIP Destination IP address: local-addr/i FIG. 14J shows an example where the mobile node 1405 sends data to the correspondent host 1401 without using a VPN. This may also be referred to as a split MIP.

When mobile node 1405 sends a data packet, it creates an encapsulated packet and sends it to SMG/x-HA 1404 with the following information:
 a. x-MIP Source IP address: local-addr/x
 b. X-MIP Destination IP address: x-HA-addr/x
 c. Source IP address: i-HoA-addr/i
 d. Destination IP address: CH-addr/i
 e. Payload data When SMG/x-HA 1404 receives the data packet, it removes the x-MIP IP header and adds an i-MIP IP header with reverse mobility bindings, then sends the packet to i-HA 1402 with the following information:
 a. i-MIP Source IP address: x-HoA-addr/x
 b. i-MIP Destination IP address: i-HA-addr/i When i-HA 1402 receives the data packet, it removes i-MIP IP header, then sends it to the correspondent host 1401.

Correspondent host 1401 receives the normal IP data packet (which is not encapsulated).

FIG. 14K shows correspondent host 1401 replying to mobile node 1405 without a VPN. When correspondent host 1401 sends a data packet, it creates the packet and sends it i-HA 1402 with the following information:
 a. Source IP address: CH-addr/i
 b. Destination IP address: i-HoA-addr/i
 c. Payload data When i-HA 1402 receives the data packet, it adds an i-MIP IP header and sends the packet to SMG/x-HA 1404 with the following information:
 a. i-MIP Source IP Address: i-HA-addr/i
 b. i-MIP destination IP address: x-HoA-addr/x When SMG/x-HA 1404 receives the data packet, it removes i-MIP header, adds an x-MIP header, and sends it to it to mobile node 1405 with the following information:
 a. x-MIP Source IP address: x-HA-addr/i
 b. x-MIP Destination IP address: local-addr/i FIG. 14L shows mobile node 1405 requesting a VPN tunnel. When mobile node 1405 wants to create a VPN tunnel, mobile node 1405 initiates a VPN connection request and send it to SMG/x-HA 1404 with the following information:
 a. x-MIP Source IP address: local-addr/x
 b. x-MIP Destination IP address: x-HA-addr/x
 c. Source IP address: x-HoA-addr/x
 d. Destination IP address: VPNgw-addr/x
 e. IKE or other protocols When SMG/x-HA 1404 receives the VPN connection request, it removes the x-MIP IP header and sends the packet to VPN-gw 1403 for processing.

FIG. 14M shows a response to the mobile node 1405's request for a VPN tunnel. When VPN-gw 1403 receives the VPN connection request, VPN-gw 1403 creates an outgoing SPD with the following information:
 a. selector:Source address=any, Destination address=VPNinn-addr1/i
 b. action:IPSec tunnel(Source address=VPNgw-addr/x, Destination address=x-HoA-addr/x)

VPN-gw 1403 creates a VPN connection response and sends it to SMG/x-HA 1404 with the following information:
 a. Source IP address: VPNgw-addr/x
 b. Destination IP address: x-HoA-addr/x
 c. IKE or other protocols
 d. VPN tunnel inner address for MN=VPNinn-addr1/i
 e. VPN tunnel inner address for GW=VPNinn-addr2/i When SMG/x-HA 1404 receives the VPN connection response, it adds an x-MIP header and sends the packet to mobile node 1405 with the following information:
 a. x-MIP Source IP address: x-HA-addr/x
 b. x-MIP Destination IP address: local-addr/x When Mobile node receives VPN connection response adds or change entries to routing table with the following information:
 a. Destination:VPNinn-addr2/i, Gateway/interface:VPN-tun
 b. Destination:i-HA-addr/i, Gateway/interface:VPN-tun c. Destination:internal network, Gateway/interface:VPN-tun Mobile node 1405 creates an outgoing SPD with the following information:
  a. selector:Source address=VPNinn-addr1/i, Destination address=internal-network-addr/i
  b. action:IPSec tunnel(Source address=x-HoA-addr/x, Destination address=VPNgw-addr/x)

FIG. 14N shows an i-MIP registration request as passing through the VPN tunnel.

After creating the VPN connection, the mobile node 1405 may have to reregister i-MIP via the VPN tunnel. To do this, mobile node 1405 creates an i-MIP registration request and sends it to SMG/x-HA 1404 with the following information:
  a. x-MIP source IP address=local-addr/x
  b. x-MIP destination IP address=x-HA-addr/x
  c. Source IP address=x-HoA-addr/x
  d. Destination IP address=VPNgw-addr/x
  e. ESP encrypted packet
  f. Source IP address=VPNinn-addr1/i
  g. Destination IP address=i-HA-addr/i
  h. i-MIP Home address=i-HoA-addr/i
  i. i-MIP Home agent=i-HA-addr/i
  j. Care of address=VPNinn-addr1/i When SMG/x-HA 1404 receives an i-MIP registration request, it removes the x-MIP header and sends it to VPN-GW.

When VPN-gw 1403 receives an i-MIP registration request, it removes the IP header, decrypts ESP and sends it to i-HA 1402.

FIG. 14O shows a response to the i-MIP registration request through the VPN tunnel. When i-HA 1402 receives the i-MIP registration request, it modifies its mobility bindings with the following information:
  a. home address:i-HoA-addr/i, care of address:VPNinn-addr1/i i-HA 1402 creates an i-MIP Registration Reply and sends it to VPN-gw 1403 with the following information:
  a. Source IP address=i-HA-addr/i
  b. Destination IP address=VPNinn-addr1/i
  c. i-MIP Home Address=i-HoA-addr/i
  d. i-MIP Home Agent=i-HA-addr/i When VPN-gw 1403 receives the i-MIP Registration reply, it encrypts the IP packet, adds IP header and sends it to SMG/x-HA 1404 with the following information:
  a. Source IP address=VPNgw-addr/x
  b. Destination IP address=x-HoA-addr/x When SMG/x-HA 1404 receives the i-MIP Registration reply, it adds x-MIP header and sends it to mobile node 1405 with the following information:
  a. x-MIP Source IP address=x-HA-addr/x
  b. x-MIP Destination IP address=local-addr/x FIG. 14P shows mobile node 1405 sending data to the correspondent host 1401 using the VPN. Mobile node 1405 creates data and sends it to SMG/x-HA 1404 with the following information:
  a. x-MIP Source IP address=local-addr/x
  b. x-MIP Destination IP address=x-HA-addr/x
  c. Source IP address=x-HoA-addr/i
  d. Destination IP address=VPNgw-addr/x
  e. ESP encrypted packet
  f. i-MIP Source IP address=VPNinn-addr1/i
  g. i-MIP Destination IP address=i-HA-addr/i
  h. Source IP address=i-HoA-addr/i
  i. Destination IP address=CH-addr/i
  j. Payload data When SMG/x-HA 1404 receives the data, it removes x-MIP IP header and sends it to VPN-gw 1403. When VPN-gw 1403 receives the data, it removes the IP header, decrypts ESP and sends the packet to i-HA 1402. When i-HA 1402 receives the data, it remove the i-MIP IP header and send it to correspondent host 1401.

FIG. 14Q shows correspondent host 1401 sending data to mobile node 1405 using the VPN. When correspondent host 1401 sends data, the correspondent host 1401 creates a data packet and sends it to i-HA 1402 with the following information:
  a. Source IP address=CH-addr/i
  b. Destination IP address=i-HoA-addr/i
  c. payload data When i-HA 1402 receives the data, i-HA 1402 adds an i-MIP IP header and sends it to VPN-gw 1403 with the following information:
  a. i-MIP Source address=i-HA-addr/i
  b. i-MIP Destination address=VPNinn-addr1/i When VPN-gw 1403 receives the data, it encrypts the data, adds an IP header and sends it to SMG/x-HA 1404 with the following information:
  a. Source IP address=VPNgw-addr/x
  b. Destination IP address=VPNinn-addr1/i When SMG/x-HA 1404 receives the data, it adds an x-MIP header and sends the packet to mobile node 1405 with the following information:
  a. x-MIP Source IP address=x-HA-addr/x
  b. x-MIP Destination IP address=local-addr/x FIG. 14R shows mobile node 1405 moving to another external network. When mobile node 1405, which used a triple tunnel, has moved to another external network, a routing table entry for x-HA-addr/x is changed with the following information:
  a. Destination:x-HA-addr/x, Gateway/interface: local-router-addr2/x Mobile node 1405 creates x-MIP Registration request for re-registration and sends it to SMG/x-HA 1404 with the following information:
  a. Source IP address=local-addr2/x
  b. Destination IP address=x-HA-addr/x
  c. x-MIP Home address=x-HoA-addr/x
  d. x-MIP Home agent=x-HA-addr/x
  e. care of address=local-addr2/x FIG. 14S shows mobile node 1405 moving to another external network (x-MIP registration response). When SMG/x-HA 1404 receives an x-MIP Registration Request, changes its mobility bindings with the following information:
  a. home address:x-HoA-addr/x,care-of address:local-addr2/x SMG/x-HA 1404 creates x-MIP Registration Reply and sends it to mobile node 1405 with the following information:
  a. Source IP address=x-HA-addr/x
  b. Destination IP address=local-addr2/x
  c. x-MIP Home Address=x-HoA-addr/x
  d. x-MIP Home Agent=x-HA-addr/x FIGS. 14T, 14U, 14V, and 14W relate to i-MIP registrations. Here, once mobile node 1405 removes the VPN tunnel, mobile node 1405 may need to reregister the i-MIP tunnel via x-MIP. There are 2 scenarios shown, for example: one is i-MIP registration via the SMG, the other is i-MIP registration through the x-MIP tunnel.

For the following, mobile node 1405 is in the original external network the local address is local-addr/x.

In FIG. 14T, mobile node 1405 creates and sends an i-MIP Registration Request to SMG/x-HA 1404 with the following information:
 a. Source IP address: local-addr/x
 b. Destination IP address: x-HA-addr/x
 c. Home Address: i-HoA-addr/i
 d. Home Agent: i-HA-addr/i
 e. Care of Address: x-HoA-addr/x
 f. Authentication extension values for i-HA
 g. Vendor extension for x-HA authentication When SMG/x-HA 1404 receives the i-MIP Registration Request, it authenticates the request and, if authentication is successful, changes the Source and Destination IP addresses and sends it to i-HA 1402 with the following information:
 a. Source IP address: x-HA-addr/x
 b. Destination IP address: i-HA-addr/i In FIG. 14V, i-HA 1402 receives the i-MIP Registration Request, authenticates it and, if authentication is successful, i-HA 1402 changes mobility bindings with the following information:
 a. home address:i-HoA-addr/i, care-of address:x-HoA-addr/x i-HA 1402 creates an i-MIP Registration Reply and sends it to SMG/x-HA 1404 with the following information:
 a. Source IP address: i-HA-addr/i
 b. Destination IP address: x-HA-addr/x
 c. Home Address: i-HoA-addr/i
 d. Home Agent: i-HA-addr/i When SMG/x-HA 1404 receives the i-MIP Registration Reply, SMG/x-HA 1404 records reverse mobility bindings with the following information:
 a. Source Address: i-HoA-addr/x, i-HA address: i-HA-addr/i Reverse mobility bindings may be used by the split tunnel mode.

SMG/x-HA 1404 changes the Source IP address and the Destination IP address and sends the request it to mobile node 1405 with the following information:
 a. Source IP address: x-HA-addr/x
 b. Destination IP address: local-addr/x When mobile node 1405 receives the i-MIP Registration Reply, the changes are entered in to the routing table as follows:
 a. Destination: i-HA-addr/i, Gateway/interface: x-MIP-tunnel
 b. Destination: internal network address/i, Gateway/interface: i-MIP-tunnel In FIG. 14U, mobile node 1405 creates an i-MIP Registration Request and sends it to SMG/x-HA 1404 with the following information:
 a. x-MIP Source IP address: local-addr/x
 b. x-MIP Destination IP address: x-HA-addr/x
 c. Source IP address: x-HoA-addr/x
 d. Destination IP address: i-HA-addr/x
 e. Home Address: i-HoA-addr/i
 f. Home Agent: i-HA-addr/i
 g. Care of Address: x-HoA-addr/x
 h. Authentication extension values for i-HA
 i. Vendor extension for x-HA authentication When SMG/x-HA 1404 receives the i-MIP Registration Request, the SMG/x-HA 1404 authenticates it and, if authentication is successful, removes x-MIP Source and x-MIP Destination IP addresses and sends it to i-HA 1402.

In FIG. 14W, when i-HA 1402 receives the i-MIP Registration Request, i-HA 1402 authenticates it and, if authentication is successful, i-HA 1402 changes mobility bindings with the following information:
 a. home address: i-HoA-addr/i, care-of address: x-HoA-addr/x i-HA 1402 creates an i-MIP Registration Reply and sends it to SMG/x-HA 1404 with the following information:
 a. Source IP address: i-HA-addr/i
 b. Destination IP address: x-HoA-addr/x
 c. Home Address: i-HoA-addr/i
 d. Home Agent: i-HA-addr/i When SMG/x-HA 1404 receives the i-MIP Registration Reply, SMG/x-HA 1404 records the reverse mobility bindings with the following information:
 a. Source Address: i-HoA-addr/x, i-HA address: i-HA-addr/i Reverse mobility bindings may be used by the split tunnel mode.

SMG/x-HA adds the x-MIP Source IP address and x-MIP Destination IP address and sends it to mobile node 1405 with the following information:
 a. x-MIP Source IP address: x-HA-addr/x
 b. x-MIP Destination IP address: local-addr/x When mobile node 1405 receives i-MIP Registration Reply, it adds an entry to the routing table with the following information:
 a. Destination: i-HA-addr/i, Gateway/interface: x-MIP-tunnel
 b. Destination: internal network address/i, Gateway/interface: i-MIP-tunnel FIG. 14X shows the mobile node 1405 disconnecting from the VPN tunnel. After deregistration of i-MIP, mobile node 1405 creates a VPN disconnection request and sends it to SMG/x-HA 1404 with the following information:
 a. x-MIP Source IP address=local-addr/x
 b. x-MIP Destination IP address=x-HA-addr/x
 c. Source IP address=x-HoA-addr/x
 d. Destination IP address=VPNgw-addr/x
 e. VPN disconnection request When SMG/x-HA 1404 receives the VPN disconnection request, it removes the x-MIP IP header and sends the request to VPN-gw 1403.

FIG. 14Y shows a response to the mobile node 1405's request to disconnect the VPN tunnel. When VPN-gw 1403 receives the VPN disconnection request, it deletes the outgoing SPD, creates a VPN disconnection response and sends it to SMG/x-HA 1404 with the following information:
 a. Source IP address=VPNgw-addr/x
 b. Destination IP address=x-HoA-addr/x
 c. VPN disconnection response When SMG/x-HA 1404 receives the VPN disconnection request, it adds an x-MIP IP header and sends the request to mobile node 1405 with the following information:
 a. x-MIP Source IP address=x-HA-addr/x
 b. x-MIP Destination IP address=local-addr/x When mobile node 1405 receives the VPN disconnection request, the mobile node 1405 deletes the entry of routing table for VPNinnaddr2/i and i-HA-addr/i The following describes i-MIP deregistrations. There are at least two methods for sending a deregistration request: one is via SMG and the other is through an x-MIP tunnel.

FIG. 14Z shows sending the deregistration request through the SMG. Here, mobile node 1405 creates and sends to SMG/x-HA an i-MIP Deregistration Request with the following information:
 a. Source IP address: local-addr/x
 b. Destination IP address: x-HA-addr/x
 c. Home Address: i-HoA-addr/i d. Home Agent: i-HA-addr/i
e. Care of Address: x-HoA-addr/x
f. Lifetime=0
g. Authentication extension values for i-HA
h. Vendor extension for x-HA authentication When SMG/x-HA 1404 receives the i-MIP Deregistration Request, the SMG/x-HA 1404 authenticates it and, if authentication is successful, changes a Source and Destination IP address and send the request to i-HA 1402 with the following information:
  a. Source IP address: x-HA-addr/x
  b. Destination IP address: i-HA-addr/i FIG. 14BB shows further handling of the SMG deregistration request. When i-HA 1402 receives the i-MIP Deregistration Request, i-HA 1402 authenticates it and, if authentication is successful, i-HA 1402 deletes the mobility bindings.

i-HA 1402 creates an i-MIP Deregistration Reply and sends it to SMG/x-HA 1404 with the following information:
  a. Source IP address: i-HA-addr/i
  b. Destination IP address: x-HA-addr/x
  c. Home Address: i-HoA-addr/i
  d. Home Agent: i-HA-addr/i When SMG/x-HA 1404 receives the i-MIP Deregistration Reply, SMG/x-HA 1404 deletes the reverse mobility bindings. Also, SMG/x-HA 1404 changes the Source IP address and the Destination IP address and sends the rely mobile node 1405 with the following information:
  a. Source IP address: x-HA-addr/x
  b. Destination IP address: local-addr/x When mobile node 1405 receives the i-MIP Deregistration Reply, the mobile node 1405 changes the entry of the routing table with the following information:
  a. Destination: internal network address/i, Gateway/interface: x-MIP-tunnel shutting down FIGS. 14Z-14EE show the mobile node 1405 shutting down the tunnels.

FIG. 14AA shows the i-MIP deregistration request being sent through the x-MIP tunnel. Mobile node 1405 creates a i-MIP Deregistration Request and sends it to SMG/x-HA 1404 with the following information:
  a. x-MIP Source IP address: local-addr/x
  b. x-MIP Destination IP address: x-HA-addr/x
  c. Source IP address: x-HoA-addr/x
  d. Destination IP address: i-HA-addr/i
  e. Home Address: i-HoA-addr/i
  f. Home Agent: i-HA-addr/i
  g. Care of Address: x-HoA-addr/x
  h. Lifetime=0
  i. Authentication extension values for i-HA
  j. Vendor extension for x-HA authentication When SMG/x-HA 1404 receives the i-MIP Deregistration Request, the SMG/x-HA 1404 authenticates it and, if authentication is successful, removes the x-MIP Source and x-MIP Destination IP address and sends the request to i-HA 1402.

FIG. 14CC shows a continuing response of the system with the deregistration request. When i-HA 1402 receives the i-MIP Deregistration Request, i-HA 1402 authenticates it and, if authentication is successful, i-HA 1402 deletes mobility bindings.

i-HA 1402 creates an i-MIP Deregistration Reply and sends i to SMG/x-HA 1404 with the following information:
  a. Source IP address: i-HA-addr/i
  b. Destination IP address: x-HoA-addr/x
  c. Home Address: i-HoA-addr/i
  d. Home Agent: i-HA-addr/i When SMG/x-HA 1404 receives the i-MIP Registration Reply, SMG/x-HA 1404 deletes reverse mobility bindings. SMG/x-HA 1404 adds the x-MIP Source IP address and x-MIP Destination IP address and sends the reply to mobile node 1405 with the following information:
  a. x-MIP Source IP address: x-HA-addr/x
  b. x-MIP Destination IP address: local-addr/x When mobile node 1405 receives an i-MIP Deregistration Reply, it changes the entry of the routing table with the following information:
  a. Destination: internal network address/i, Gateway/interface: x-MIP-tunnel FIG. 14DD shows the handling of an x-MIP deregistration request. When mobile node 1405 deregisters i-MIP, mobile node 1405 creates an x-MIP Deregistration request and sends it to SMG/x-HA 1404 with the following information:
  a. Source IP address=local-addr/x
  b. Destination IP address=x-HA-addr/x
  c. x-MIP Home Address=x-HoA-addr/x
  d. x-MIP Home Agent=x-HA-addr/x
  e. Care of address=local-addr/x
  f. Lifetime=0
  g. Authentication extension values for x-HA FIG. 14EE shows the handling of the x-MIP deregistration response. When SMG/x-HA 1404 receives the x-MIP Deregistration request, after successful authentication, SMG/x-HA 1404 creates an x-MIP Deregistration reply and sends it to mobile node 1405 with the following information:
  a. Source IP address=x-HA-addr/x
  b. Destination IP address=local-addr/x
  c. Home Address=x-HoA-addr/x
  d. Home Agent=x-HA-addr/x When mobile node 1405 receives an x-MIP deregistration reply, mobile node 1405 deletes entries in the routing table for Internal-network-addr/i, VPNgw-addr/x. and changes the following information:
  a. Destination:dafault, Gateway/interface: local-router-addr/x The following shows mobile node 1405 returning to an internal network. In particular, FIGS. 14GG-14NN show mobile node 1405 moving to the internal visited network when mobile node 1405 is in a triple tunnel mode-like state as shown in FIG. 14FF.

In FIG. 14GG, mobile node 1405 moves to an internal visited network (using an i-MIP registration request). When mobile node 1405 moves to an internal visited network, the routing table is changed for x-HA-addr/x and default to local-router-addr/i.

Mobile node 1405 creates an i-MIP registration request and sends it to i-HA 1402 with the following information:
  a. Source IP address=local-addr/i
  b. Destination IP address=i-HA-addr/i
  c. i-MIP Home Address=i-HoA-addr/i
  d. i-MIP Home Agent=i-HA-addr/i
  e. Care of Address=local-addr/i FIG. 14HH shows the i-MIP registration response. When i-HA 1402 receives an i-MIP Registration Request, it changes the mobility bindings with the following information:
  a. home address:i-HoA-addr/i, care-of-address:local-addr/i i-HA 1402 creates an i-MIP Registration reply and sends it to mobile node 1405 with the following information:
  a. Source IP address=i-HA-addr/i
  b. Destination IP address=local-addr/i
  c. i-MIP Home address=i-HoA-addr/i
  d. i-MIP Home agent=i-HA-addr/i When mobile node 1405 receives an i-MIP Registration reply, it adds an entry in the routing table with the following information:
    a. Destination:i-HA-addr/i, Gateway/interface: local-router-addr/i
    b. Destination:internal-network-addr/i, Gateway/interface:i-MIP-tun FIG. 14II shows an x-MIP registration request. Here mobile node 1405 registers SMG/x-HA 1404 to disconnect VPN tunnel via x-MIP tunnel. Mobile node 1405 creates an x-MIP registration request and sends it to SMG/x-HA 1404 with the following information:
    a. Source IP address=local-addr/i
    b. Destination IP address=x-HA-addr/x
    c. x-MIP Home Address=x-HoA-addr/x
    d. x-MIP Home Agent=x-HA-addr/x
    e. Care of Address=local-addr/i In FIG. 14B, handling of an x-MIP registration response is shown. When SMG/x-HA 1404 receives an x-MIP registration request, it changes mobility bindings with the following information:
    a. home address:x-HoA-addr/x, care-of-adress:local-addr/i SMG/x-HA 1404 creates an x-MIP registration reply and sends it to mobile node 1405 with the following information:
    a. Source IP address=x-HA-addr/x
    b. Destination IP address=local-addr/i
    c. x-MIP Home Address=x-HoA-addr/x
    d. x-MIP Home Agent=x-HA-addr/x FIG. 14KK shows the mobile node 1405 disconnecting the VPN tunnel. Mobile node 1405 creates a VPN disconnection request and sends it to SMG/x-HA 1404 with the following information:
    a. x-MIP Source IP address=local-addr/i
    b. x-MIP Destination IP address=x-HA-addr/x
    c. Source IP address=x-HoA-addr/x
    d. Destination IP address=VPNgw-addr/x
    e. VPN disconnection request When SMG/x-HA 1404 receives the VPN disconnection request, it removes the x-MIP IP header and sends it to VPN-gw 1403.

FIG. 14LL shows a response to the mobile node 1405's VPN disconnection request. When VPN-gw 1403 VPN-GW receives the VPN disconnection request, it creates a VPN disconnection response and sends it to SMG/x-HA 1404 with the following information:
    a. Source IP address=VPNgw-addr/x
    b. Destination IP address=x-HoA-addr/x
    c. VPN disconnection response When SMG/x-HA 1404 receives the VPN disconnection response, it adds an x-MIP IP header and sends it to mobile node 1405 with the following information:
    a. x-MIP Source IP address=x-HA-addr/x
    b. x-MIP Destination IP address=local-addr/i When mobile node 1405 receives an VPN disconnection response, it deletes entry of routing table for VPNinnaddr2/i.

Figure 15A:
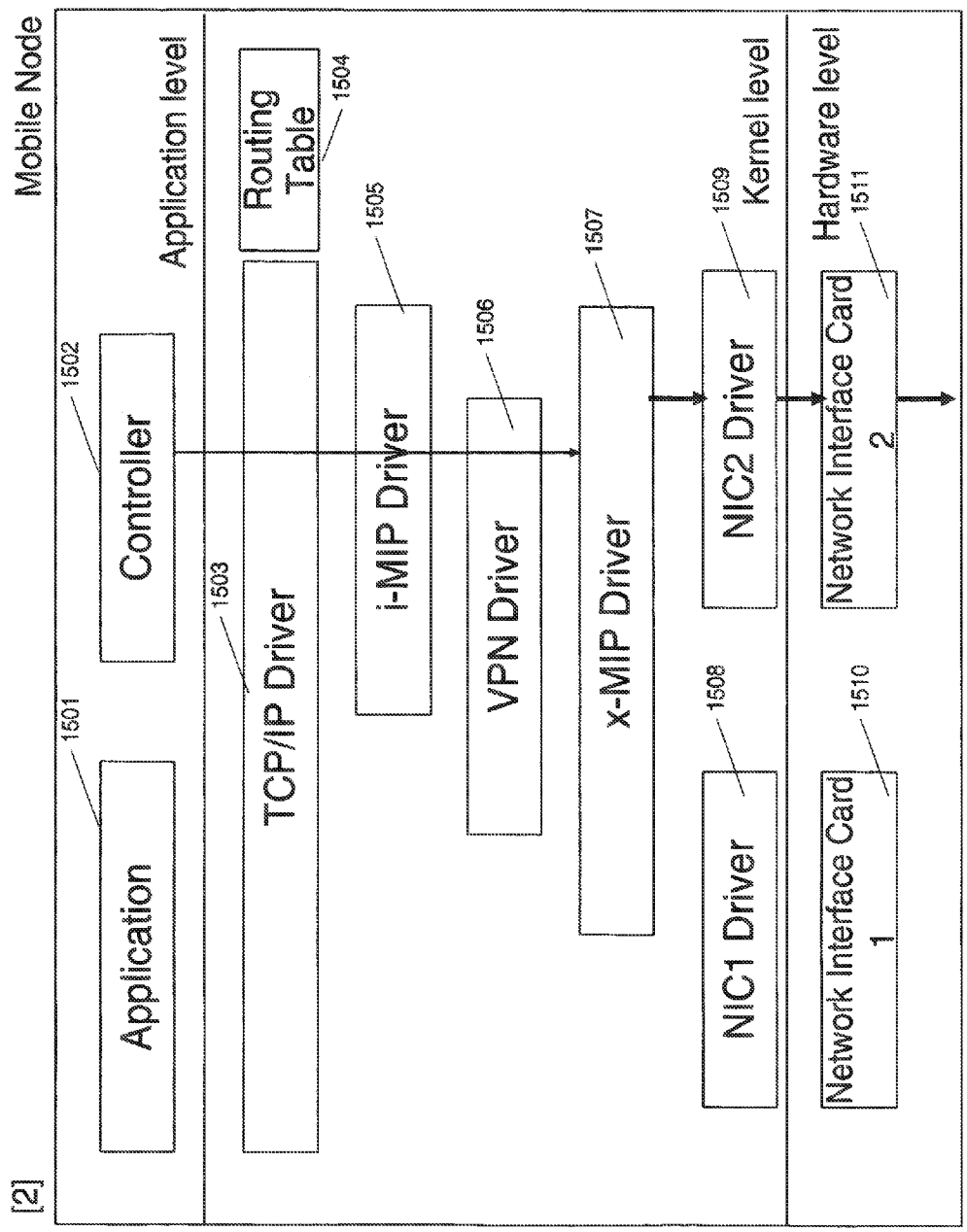
FIGS. 15A-15BB show data flows between architectural items related to FIGS. 14A-14NN in accordance with aspects of the present invention.
Figure 15B:
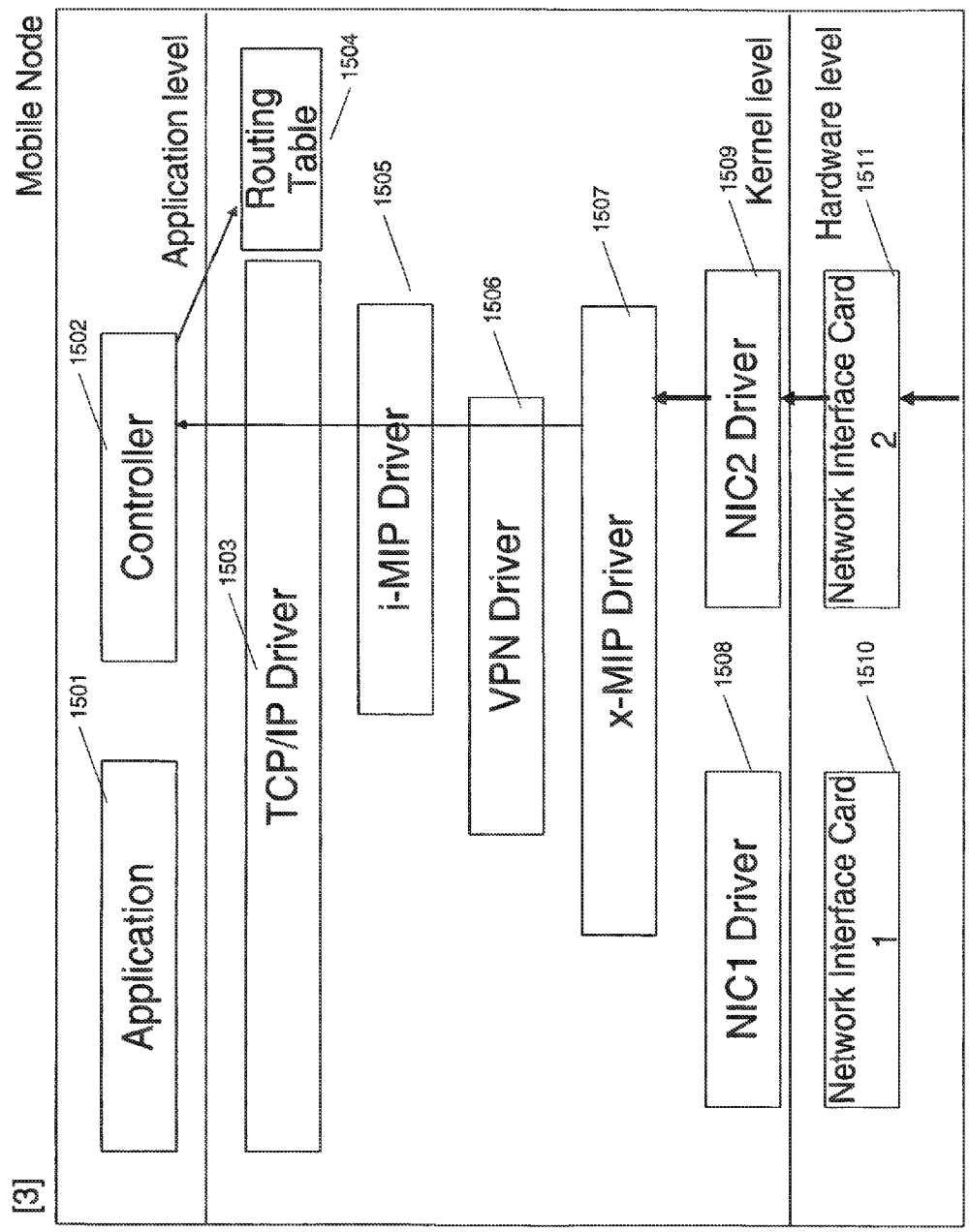

FIG. 14MM shows an x-MIP deregistration request. Mobile node 1405 creates an x-MIP deregistration request and sends it to SMG/x-HA 1404 with the following information:
    a. Source IP address=local-addr/i
    b. Destination IP address=x-HA-addr/x
    c. x-MIP Home Address=x-HoA-addr/x
    d. x-MIP Home agent=x-HA-addr/x
    e. Care of address=local-addr/i
    f. lifetime=0
    g. authentication extension values for x-HA FIG. 14NN shows the x-MIP deregistration response. When SMG/x-HA 1404 receives the x-MIP Deregistration request and, after successful authentication, the SMG/x-HA 1404 deletes the mobility bindings, creates an x-MIP Deregistration reply and sends it to mobile node 1405 with the following information:
    a. Source IP address=x-HA-addr/x
    b. Destination IP address=local-addr/i
    c. x-MIP Home Address=x-HoA-addr/x
    d. x-MIP Home Agent=x-HA-addr/x When mobile node 1405 receives the x-MIP Deregistration reply, it deletes the entry in the routing table for VPNgwaddr/x Scenario which Mobile Node is a Windows-Like Implementation The following describes the above scenario where the mobile node has a Windows-based implementation. Here, the following shows how mobile node 1405 switches from a double MIP tunnel to triple tunnel mode. FIGS. 15A-15BB are described in relation to FIGS. 14A-14NN. FIGS. 15A-15BB show mobile node 1405 with the following:
    a. Application 1501
    b. Controller 1502
    c. TCP/IP Driver 1503
    d. Routing Table 1504
    e. i-MIP Driver 1505
    f. VPN Driver 1506
    g. x-MIP Driver 1507
    h. NIC 1 Driver 1508
    i. NIC 2 Driver 1509
    j. Network Interface Card 1 1510
    k. Network Interface Card 2 1511

In FIG. 14A, mobile node 1405 is powered on in an external network. Mobile node 1405 has a routing table with the following information:
    a. Destination:default(all destination),Gateway/Interface: local-router/x In FIG. 14B and FIG. 15A, mobile node 1405 detects it is located in an external network. Next, mobile node 1405 creates an x-MIP Registration Request and sends it to SMG/x-HA 1404. x-MIP Registration Request includes the following information:
    a. Source IP address: local-addr/x
    b. Destination IP address: x-HA-addr/x(x-Home Agent address)
    c. Home Address: x-HoA-addr/x
    d. Home Agent: x-HA-addr/x
    e. Care of Address=local-addr/x
    f. Reverse tunnel request flag=true
    g. Authentication extension values for x-HA In FIGS. 14C and 15B, when SMG/x-HA 1404 receives an x-MIP Registration Request, SMG/x-HA 1404 authenticates it with authentication extension values. If the authentication is successful, then SMG/x-HA 1404 makes a mobility binding with the following information:
    a. Home address: x-HoA-addr/x, Care of Address: local-addr/x Next, SMG/x-HA 1404 sends an x-MIP Registration reply to mobile node 1405 with the following information:
    a. Source IP address: x-HA-addr/x
    b. Destination IP address: local-addr/x
    c. Home Address: x-HoA-addr/x
    d. Home Agent: x-HA-addr/x When mobile node 1405 receives the x-MIP Registration reply, mobile node 1405 adds an entry to routing table 1504 with the following information:
   a. Destination: x-HA-addr/x, Gateway/interface: local-router-addr/x
   b. Destination: VPN-gateway-addr/x, Gateway/interface: x-MIP-tunnel
   c. Destination: internal-network-addr/i, Gateway/interface: x-MIP-tunnel The following describes i-MIP registration. There are several methods available to make an i-MIP tunnel. The following shows two examples including using the SMG and the MIP.

Figure 15C:
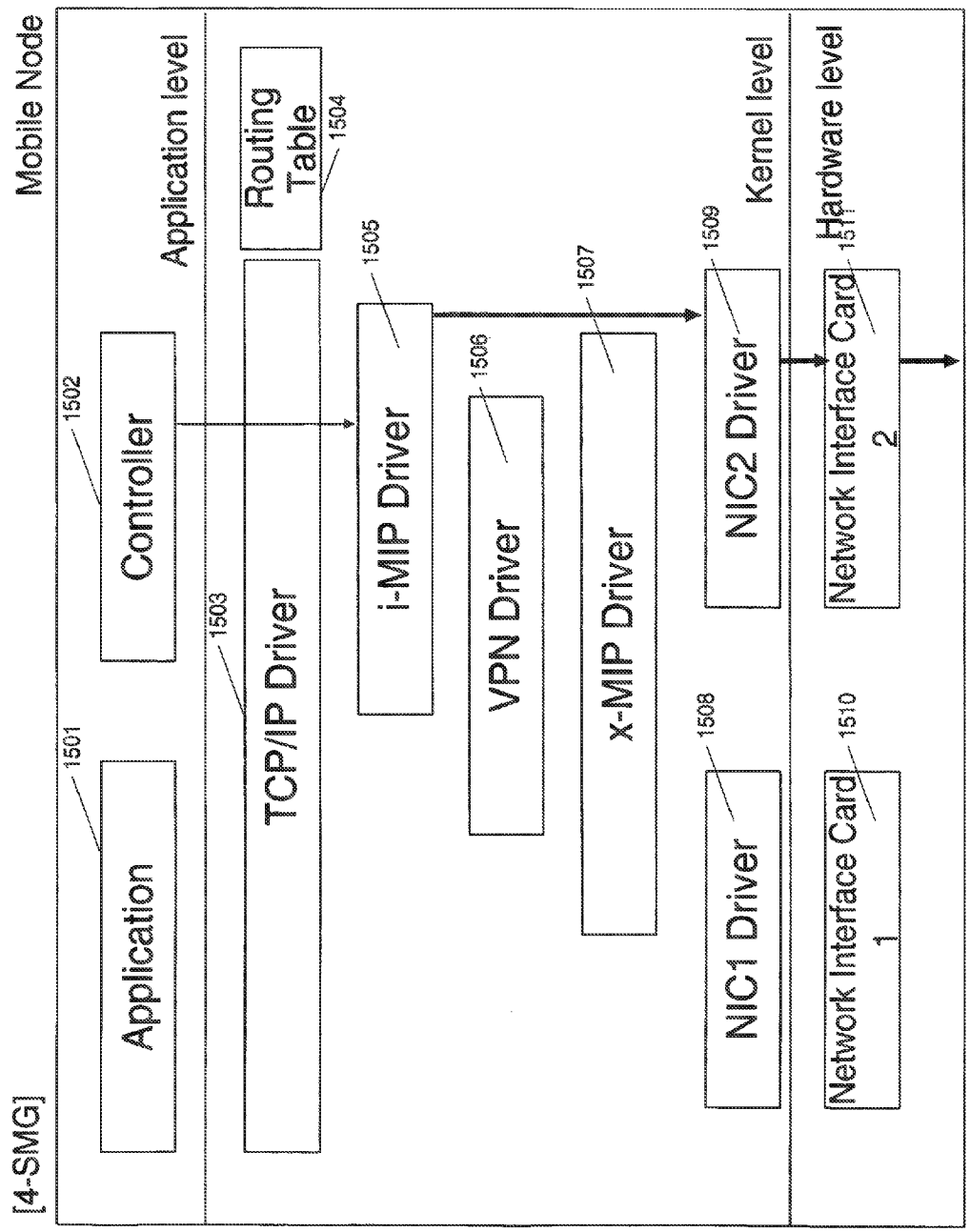
Figure 15D:
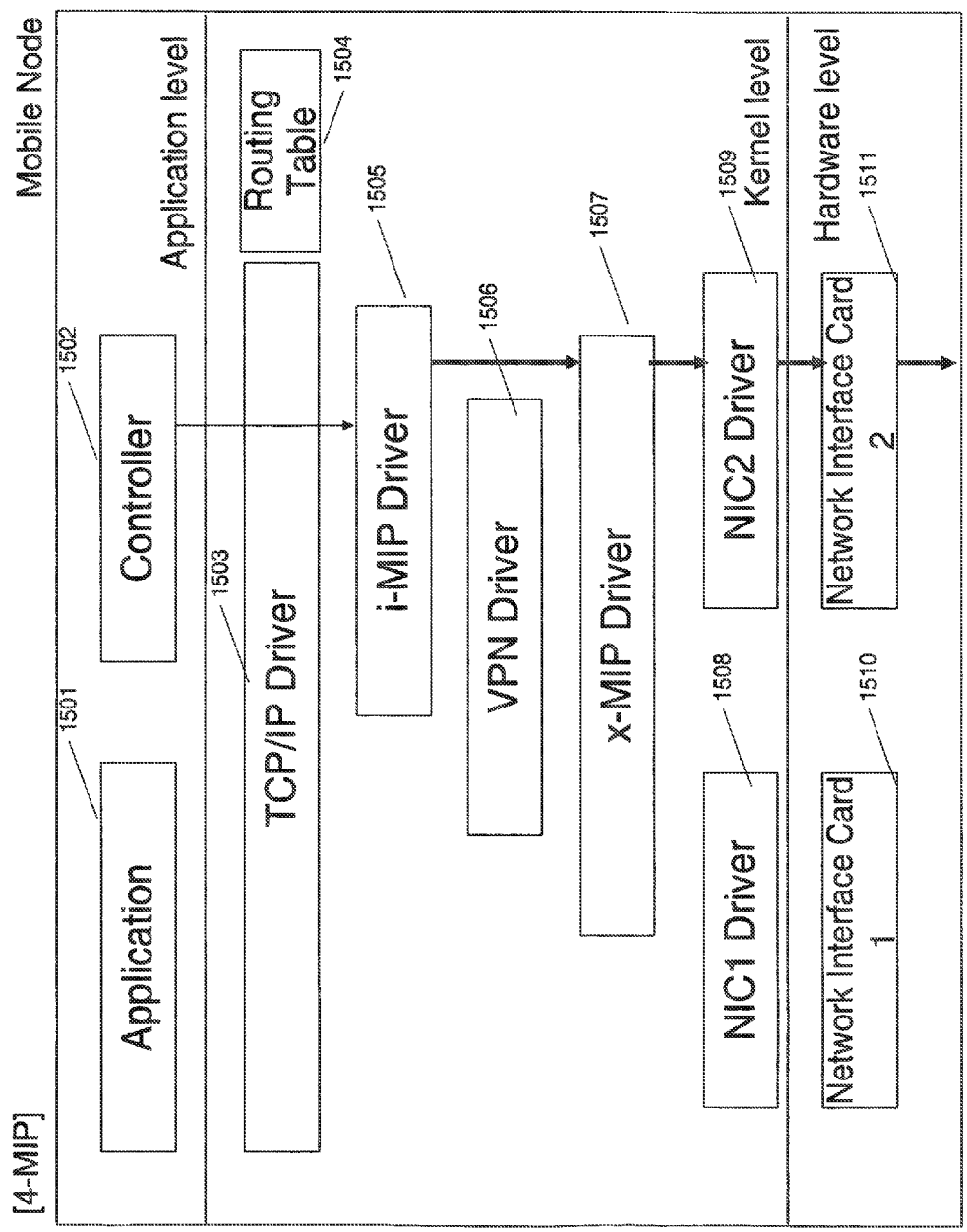
Figure 15E:
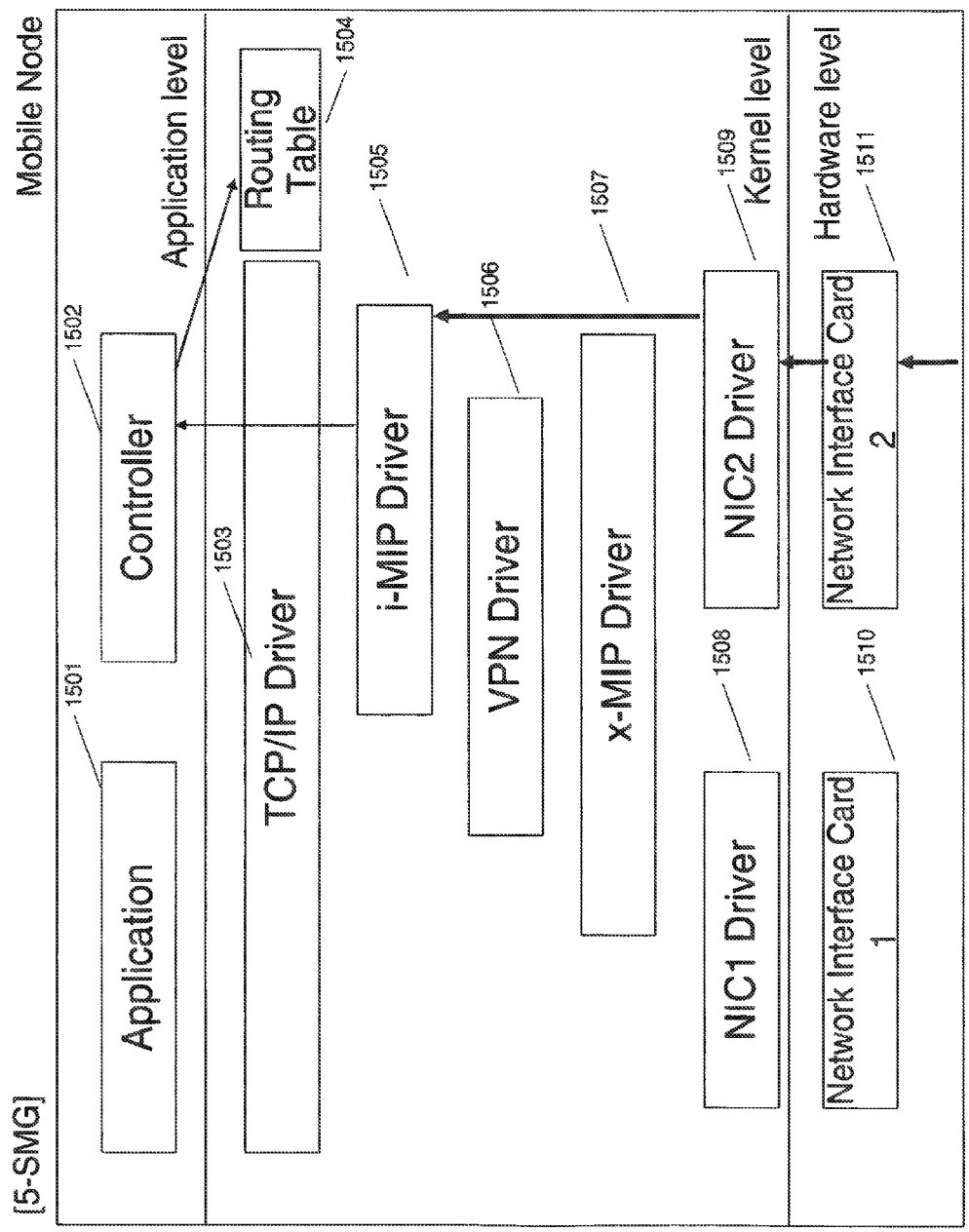

FIGS. 14D and 15C show the creation of the i-MIP tunnel using the SMG. Mobile node 1405 creates and send to SMG/x-HA 1404 an i-MIP Registration Request with the following information:
   a. Source IP address: local-addr/x
   b. Destination IP address: x-HA-addr/x
   c. Home Address: i-HoA-addr/i
   d. Home Agent: i-HA-addr/i
   e. Care of Address: x-HoA-addr/x
   f. Authentication extension values for i-HA
   g. Vendor extension for x-HA authentication When SMG/x-HA 1404 receives i-MIP Registration Request, it authenticates it and, if authentication is successful, it changes the Source and Destination IP addresses and send the request to i-HA 1402 with the following information:
   a. Source IP address: x-HA-addr/x
   b. Destination IP address: i-HA-addr/i FIGS. 14F and 15E show the next step using the SMG. When i-HA 1402 receives an i-MIP Registration Request, the i-HA 1402 authenticates it and, if authentication is successful, i-HA 1402 creates mobility bindings with the following information:
   a. home address:i-HoA-addr/i, care-of address:x-HoA-addr/x i-HA 1402 creates an i-MIP Registration Reply and sends it to SMG/x-HA 1404 with the following information:
   a. Source IP address: i-HA-addr/i
   b. Destination IP address: x-HA-addr/x
   c. Home Address: i-HoA-addr/i
   d. Home Agent: i-HA-addr/i When SMG/x-HA 1404 receives the i-MIP Registration Reply, SMG/x-HA 1404 records reverse mobility bindings with the following information:
   a. Source Address: i-HoA-addr/x, i-HA address: i-HA-addr/i Reverse mobility bindings may be used by the split tunnel mode.

SMG/x-HA 1404 changes the Source IP address and the Destination IP address and sends it to mobile node 1405 with the following information:
   a. Source IP address: x-HA-addr/x
   b. Destination IP address: local-addr/x When mobile node 1405 receives the i-MIP Registration Reply, it adds an entry in the routing table 1504 with the following information:
   a. Destination: i-HA-addr/i, Gateway/interface: x-MIP-tunnel
   b. Destination: internal network address/i, Gateway/interface: i-MIP-tunnel FIGS. 14E and 15D show creation of the i-MIP using an alternate approach. Mobile node 1405 creates and sends to SMG/x-HA 1404 the i-MIP Registration Request with the following information:
   a. x-MIP Source IP address: local-addr/x
   b. x-MIP Destination IP address: x-HA-addr/x
   c. Source IP address: x-HoA-addr/x
   d. Destination IP address: i-HA-addr/x
   e. Home Address: i-HoA-addr/i
   f. Home Agent: i-HA-addr/i
   g. Care of Address: x-HoA-addr/x
   h. Authentication extension values for i-HA
   i. Vendor extension for x-HA authentication When SMG/x-HA 1404 receives the i-MIP Registration Request, it authenticates it and, if authentication is successful, removes the x-MIP Source and x-MIP Destination IP addresses and sends the request to i-HA 1402.

Figure 15F:
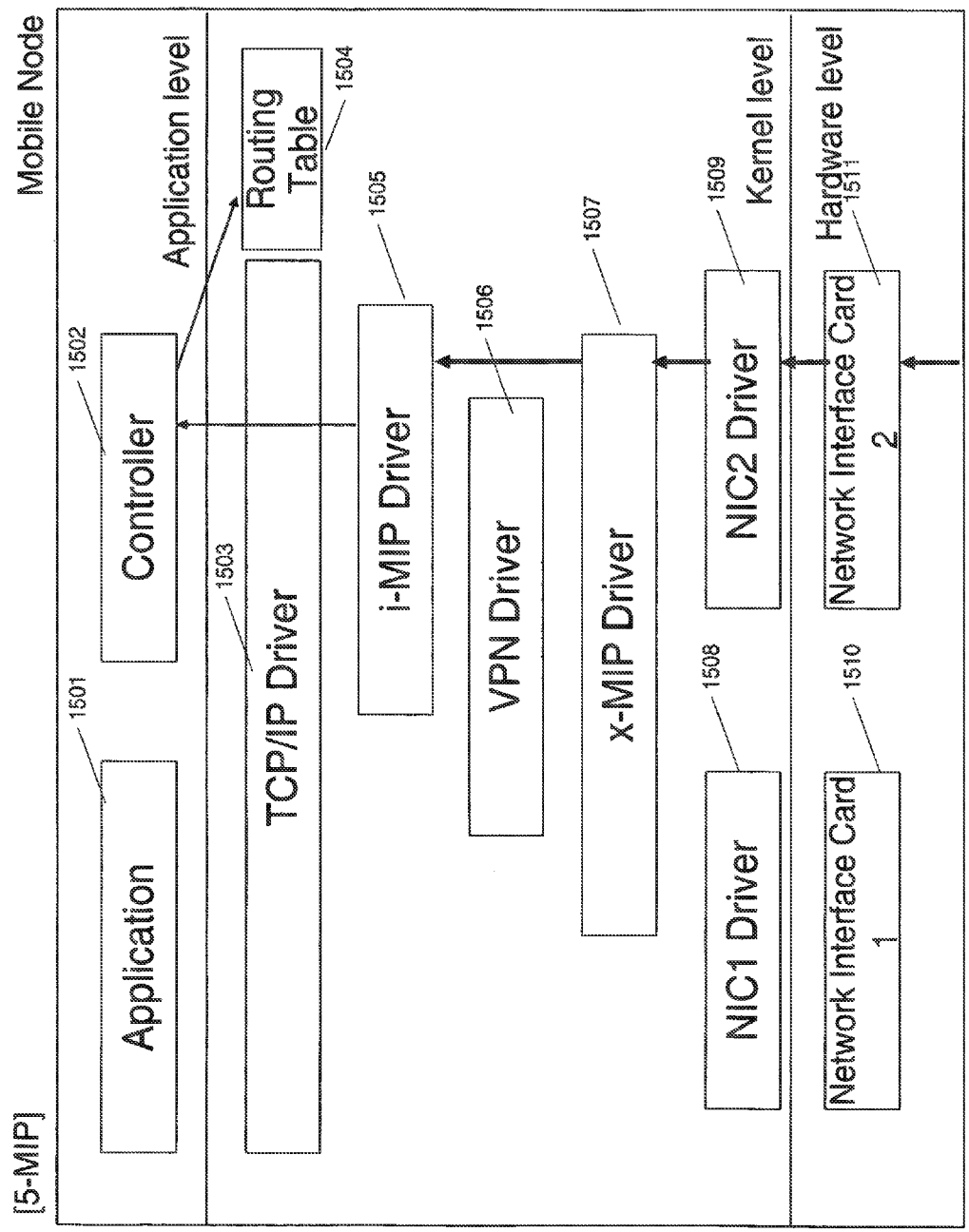

FIGS. 14G and 15F show further processing of the registration request. When i-HA 1402 receives the i-MIP Registration Request, it authenticates it and, if authentication is successful, i-HA 1402 creates mobility bindings with the following information:
   a. home address: i-HoA-addr/i, care-of address: x-HoA-addr/x i-HA 1402 creates an i-MIP Registration Reply and sends it to SMG/x-HA 1404 with the following information:
   a. Source IP address: i-HA-addr/i
   b. Destination IP address: x-HoA-addr/x
   c. Home Address: i-HoA-addr/i
   d. Home Agent: i-HA-addr/i When SMG/x-HA 1404 receives the i-MIP Registration Reply, SMG/x-HA 1404 records reverse mobility bindings with the following information:
   a. Source Address: i-HoA-addr/x, i-HA address: i-HA-addr/i Reverse mobility bindings may be used by the split tunnel mode.

Next, SMG/x-HA 1404 adds the x-MIP Source IP address and x-MIP Destination IP address and sends the reply to mobile node 1405 with the following information:
   a. x-MIP Source IP address: x-HA-addr/x
   b. x-MIP Destination IP address: local-addr/x When mobile node 1405 receives the i-MIP Registration Reply, it adds an entry to routing table 1504 with the following information:
   a. Destination: i-HA-addr/i, Gateway/interface: x-MIP-tunnel
   b. Destination: internal network address/i, Gateway/interface: i-MIP-tunnel The following describes two types of double MIP tunnels: overlaid and split. These are apparent where data are transmitted between mobile node 1405 and correspondent host 1401.

Figure 15G:
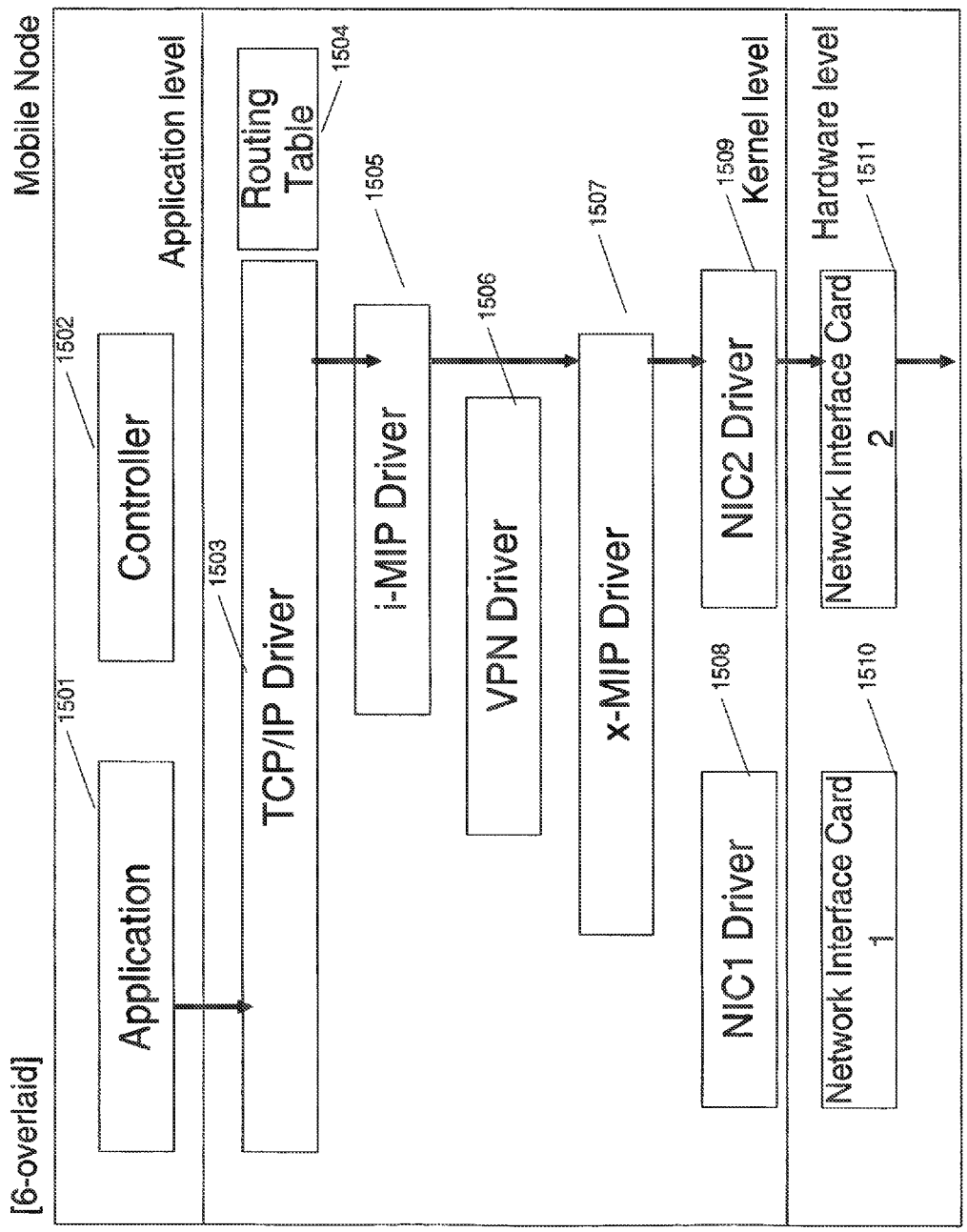

FIGS. 14H and 15G show an overlaid approach with data sent from mobile node 1405 to correspondent host 1401. When mobile node 1405 sends a data packet, the mobile node 1405 creates an encapsulated packet and sends it to SMG/x-HA 1404 with the following information:
   a. x-MIP Source IP address: local-addr/x
   b. X-MIP Destination IP address: x-HA-addr/x
   c. i-MIP Source IP address: x-HoA-addr/x
   d. i-MIP Destination IP address: i-HA-addr/i
   e. Source IP address: i-HoA-addr/i
   f. Destination IP address: CH-addr/i
   g. Payload data When SMG/x-HA 1404 receives the data packet, it remove the x-MIP IP header, then sends to i-HA 1402. When i-HA 1402 receives the data packet, it removes i-MIP IP header, and then sends the packet to correspondent host 1401. Correspondent host 1401 then receives the normal IP data packet without encapsulation.

Figure 15H:
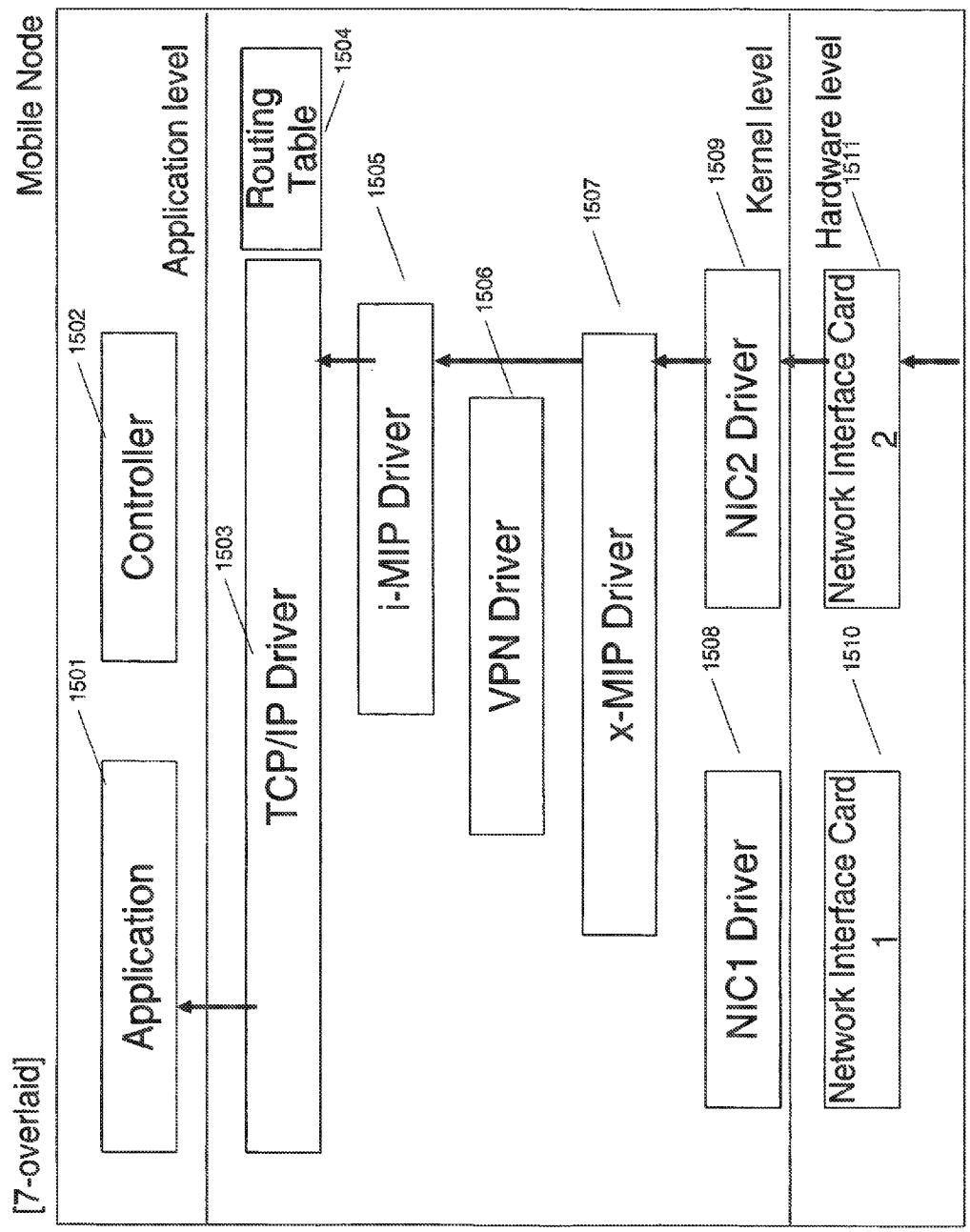
Figure 15I:
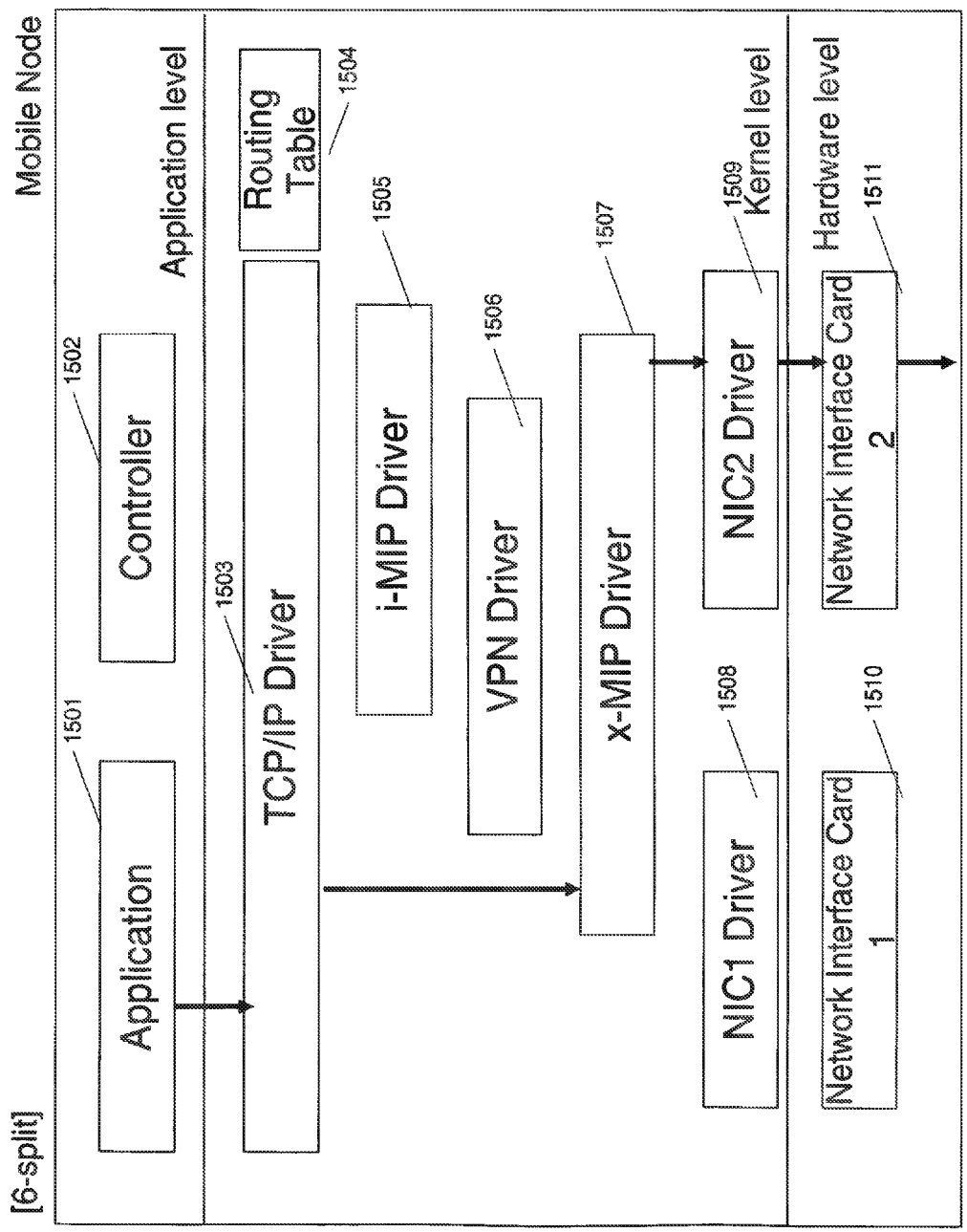

FIGS. 14I and 15H show the correspondent host 1401 sending a packet to mobile node 1405 using the overlaid tunnel. When correspondent host 1401 sends a data packet, it creates the packet and sends it to i-HA 1402 with the following information:
- a. Source IP address: CH-addr/i
- b. Destination IP address: i-HoA-addr/i
- c. Payload data When i-HA 1402 receives the data packet, it adds an i-MIP IP header and sends the packet to SMG/x-HA 1404 with the following information:
- a. i-MIP Source IP Address: i-HA-addr/i
- b. i-MIP destination IP address: x-HoA-addr/x When SMG/x-HA 1404 receives the data packet, it adds an x-MIP header and sends it to mobile node 1405 with the following information:
- a. x-MIP Source IP address: x-HA-addr/i
- b. x-MIP Destination IP address: local-addr/i FIGS. 14J and 15I show a split tunnel for data sent from mobile node 1405 to correspondent host 1401. When mobile node 1405 sends a data packet, mobile node 1405 creates an encapsulated packet and sends it to SMG/x-HA 1404 with the following information:
- a. x-MIP Source IP address: local-addr/x
- b. X-MIP Destination IP address: x-HA-addr/x
- c. Source IP address: i-HoA-addr/i
- d. Destination IP address: CH-addr/i
- e. Payload data When SMG/x-HA 1404 receives the data packet, it removes the x-MIP IP header and adds an i-MIP IP header with reverse mobility bindings, then sends it to i-HA 1402 with the following information:
- a. i-MIP Source IP address: x-HoA-addr/x
- b. i-MIP Destination IP address: i-HA-addr/i When i-HA 1402 receives the data packet, it removes the i-MIP IP header, then sends it to correspondent host 1401. Correspondent host 1401 receives the normal IP data packet having been decapsulated.

Figure 15J:
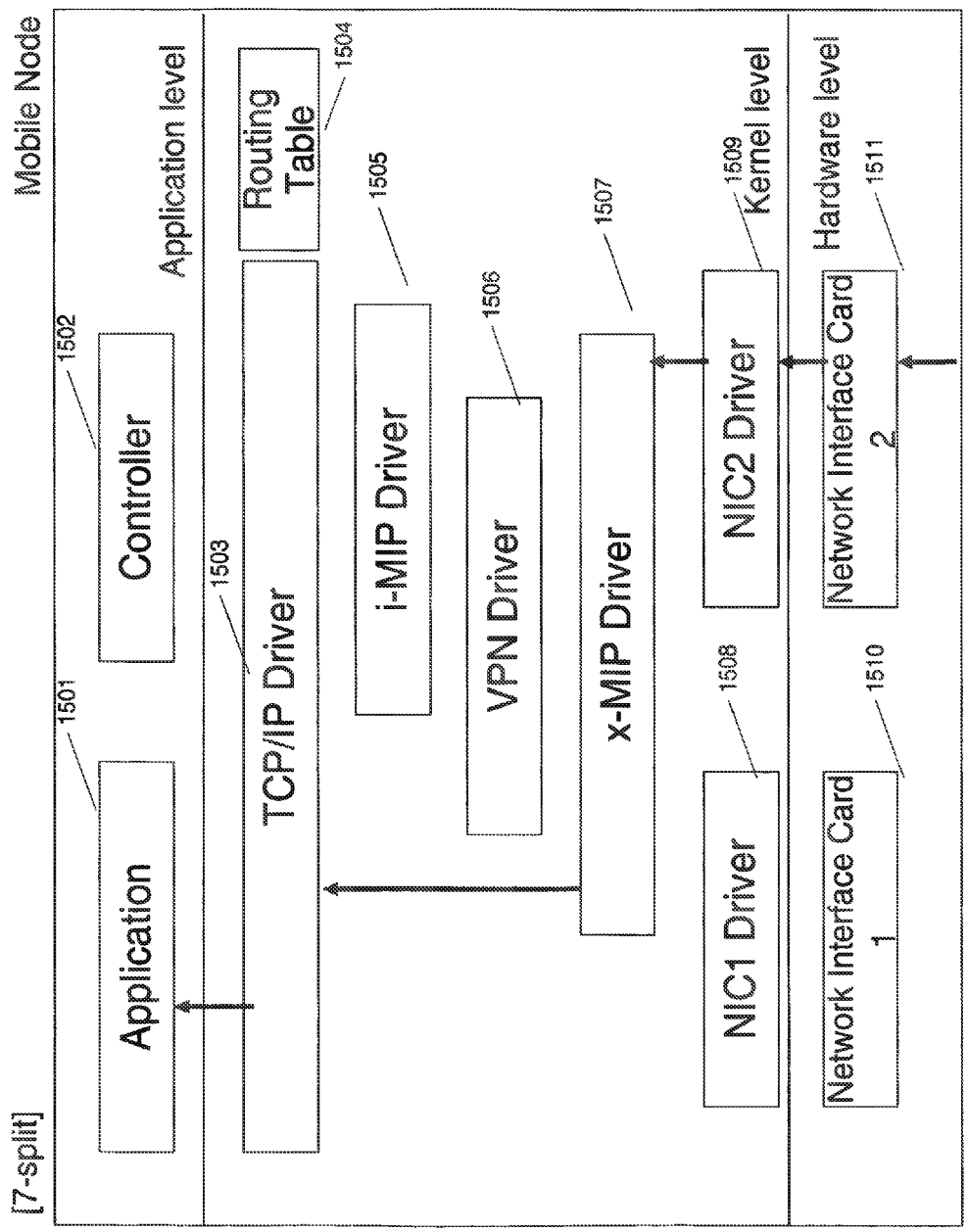
Figure 15K:
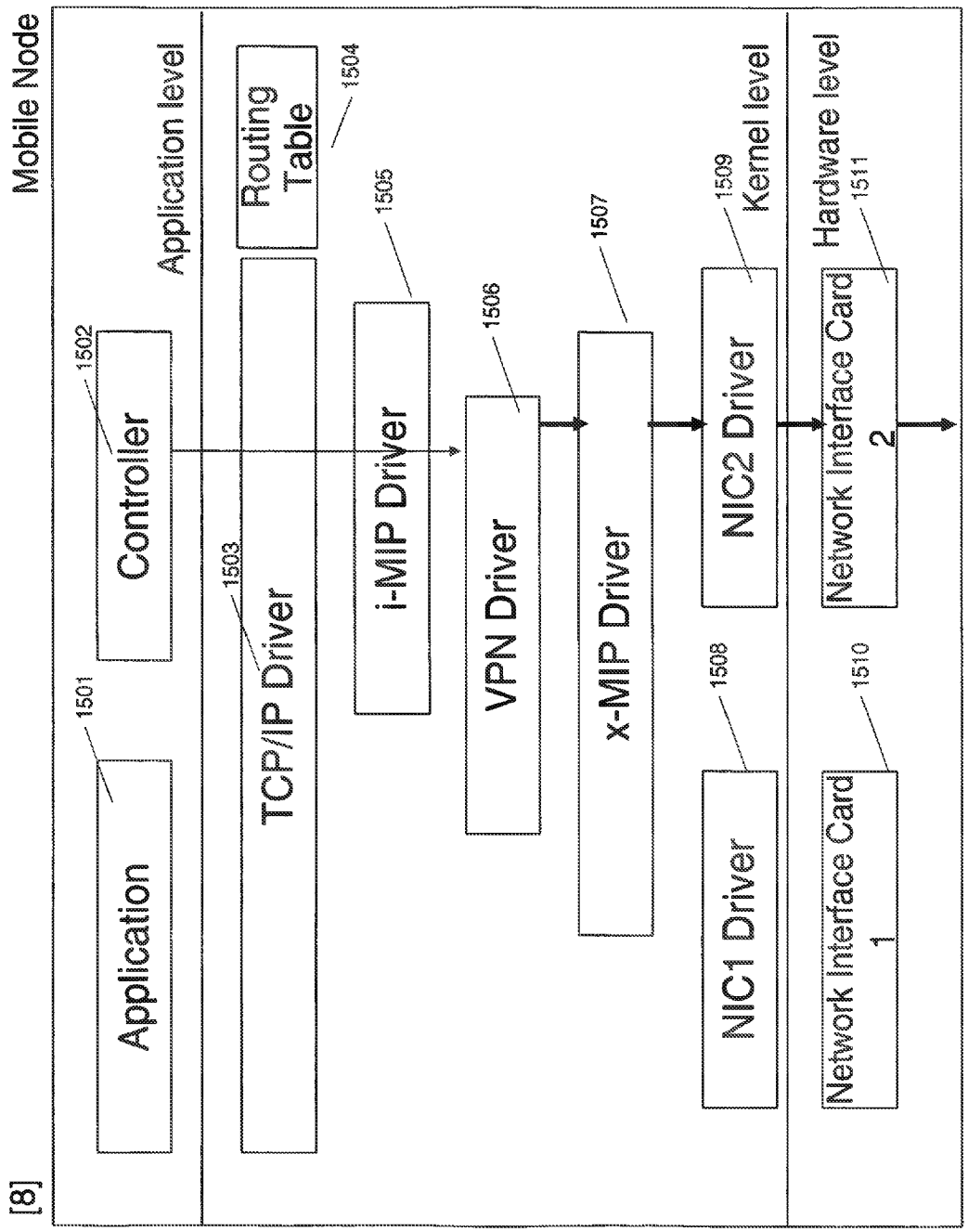

FIGS. 14K and 15J show correspondent host 1401 sending data to mobile node 1405. When correspondent host 1401 desires to send a data packet, it creates a packet and sends it to i-HA 1402 with the following information:
- a. Source IP address: CH-addr/i
- b. Destination IP address: i-HoA-addr/i
- c. Payload data When i-HA 1402 receives the data packet, it adds an i-MIP IP header and sends the packet to SMG/x-HA 1404 with the following information:
- a. i-MIP Source IP Address: i-HA-addr/i
- b. i-MIP destination IP address: x-HoA-addr/x When SMG/x-HA 1404 receives the data packet, it removes the i-MIP header and adds an x-MIP header and sends the packet to mobile node 1405 with the following information:
- a. x-MIP Source IP address: x-HA-addr/i
- b. x-MIP Destination IP address: local-addr/i FIGS. 14L and 15K show a mobile node 1405 requesting a setup of a VPN tunnel. When mobile desires to create an VPN tunnel, mobile node 1405 creates a VPN connection request and sends it to SMG/x-HA with the following information:
- a. x-MIP Source IP address: local-addr/x
- b. x-MIP Destination IP address: x-HA-addr/x
- c. Source IP address: x-HoA-addr/x
- d. Destination IP address: VPNgw-addr/x
- e. IKE or other protocols When SMG/x-HA 1404 receives the VPN connection request, it removes the x-MIP IP header and sends the request to VPN-gw 1403.

Figure 15L:
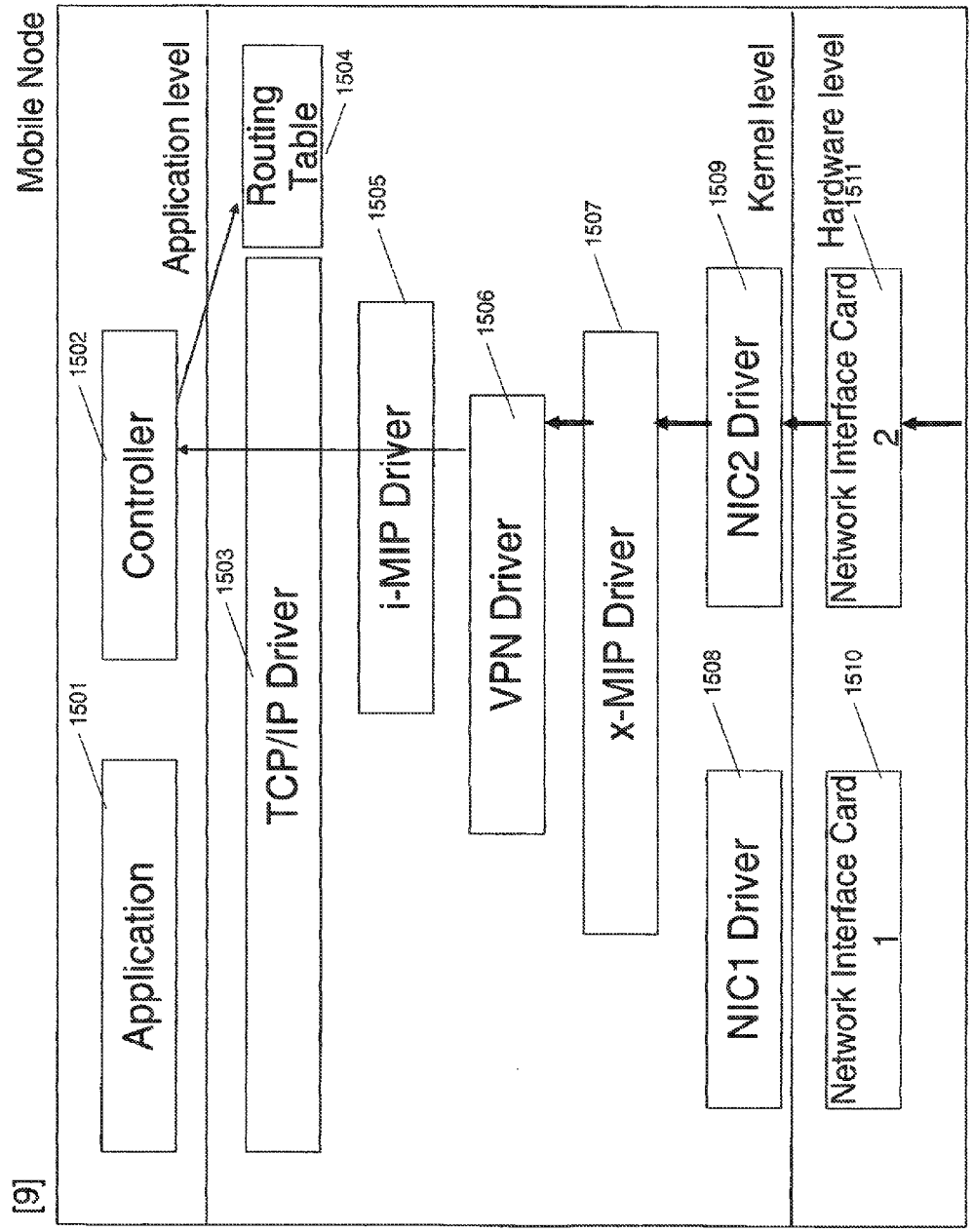

FIGS. 14M and 15L show a corresponding response. When VPN-gw 1403 receives the VPN connection request, VPN-gw 1403 creates an outgoing SPD with the following information:
- a. selector:Source address=any, Destination address=VPNinn-addr1/i
- b. action:IPSec tunnel(Source address=VPNgw-addr/x, Destination address=x-HoA-addr/x)

VPN-gw 1403 creates a VPN connection response and sends it to SMG/x-HA 1404 with the following information:
- a. Source IP address: VPNgw-addr/x
- b. Destination IP address: x-HoA-addr/x
- c. IKE or other protocols
- d. VPN tunnel inner address for MN=VPNinn-addr1/i
- e. VPN tunnel inner address for GW=VPNinn-addr2/i When SMG/x-HA 1404 receives the VPN connection response, it adds an x-MIP header and sends it to mobile node 1405 with the following information:
- a. x-MIP Source IP address: x-HA-addr/x
- b. x-MIP Destination IP address: local-addr/x When mobile node 1405 receives the VPN connection response, it adds or changes entries to routing table 1504 with the following information:
- a. Destination:VPNinn-addr2/i, Gateway/interface:VPN-tun
- b. Destination:i-HA-addr/i, Gateway/interface:VPN-tun
- c. Destination:internal network, Gateway/interface:VPN-tun Also, mobile node 1405 creates an outgoing SPD with the following information:
- a. selector:Source address=VPNinn-addr1/i, Destination address=internal-network-addr/i
- b. action:IPSec tunnel(Source address=x-HoA-addr/x, Destination address=VPNgw-addr/x)

Figure 15M:
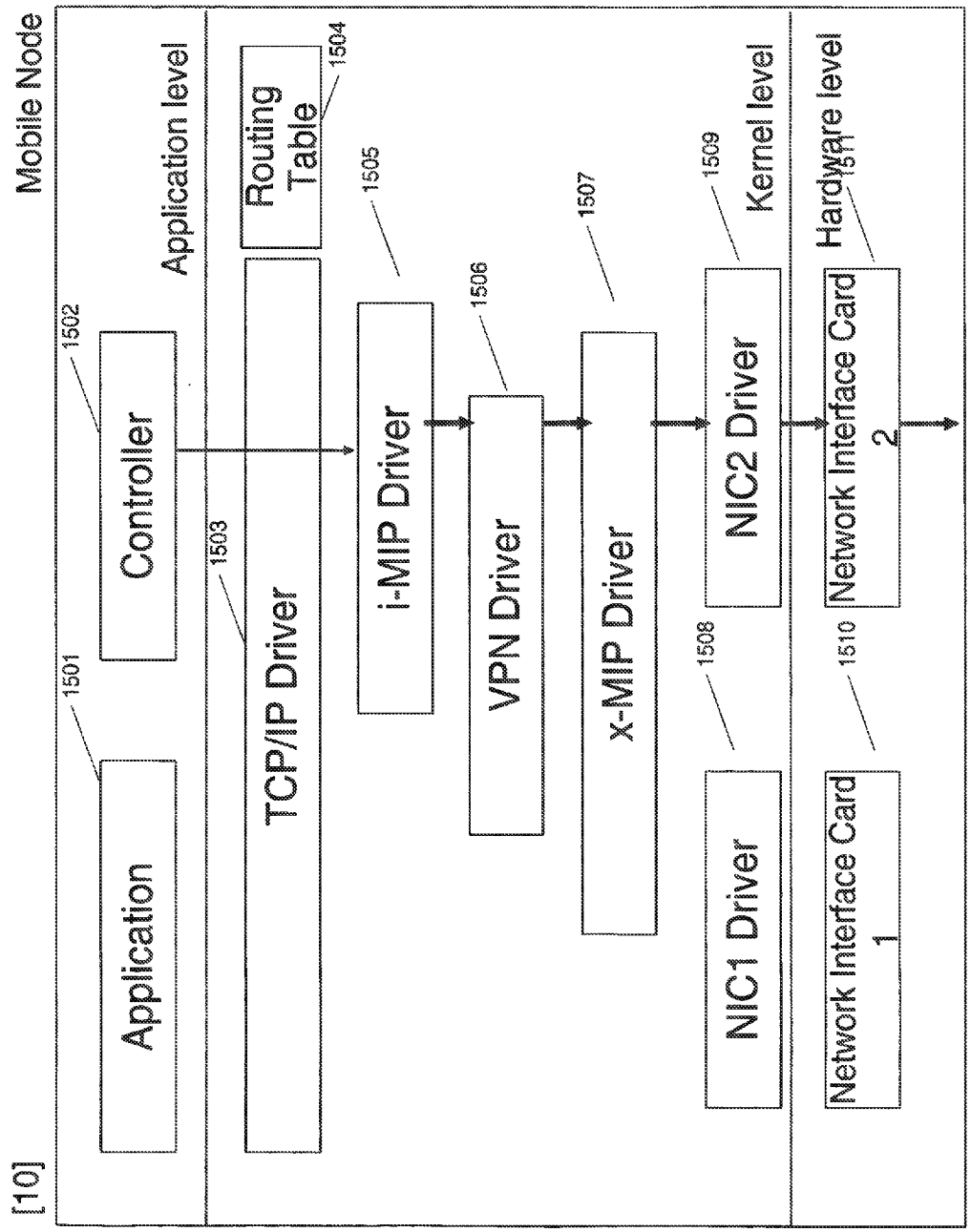

FIGS. 14N and 15M show an i-MIP registration request in the presence of a VPN tunnel. After a VPN connection is made, mobile node 1405 may need to reregister i-MIP via VPN tunnel. Mobile node 1405 creates an i-MIP registration request and sends it to SMG/x-HA 1404 with the following information:
- a. x-MIP source IP address=local-addr/x
- b. x-MIP destination IP address=x-HA-addr/x
- c. Source IP address=x-HoA-addr/x
- d. Destination IP address=VPNgw-addr/x
- e. ESP encrypted packet
- f. Source IP address=VPNinn-addr1/i
- g. Destination IP address=i-HA-addr/i
- h. i-MIP Home address=i-HoA-addr/i
- i. i-MIP Home agent=i-HA-addr/i
- j. Care of address=VPNinn-addr1/i When SMG/x-HA 1404 receives i-MIP registration request, it removes the x-MIP header and sends it to VPN-gw 1403.

When VPN-gw 1403 receives i-MIP registration request, it removes the IP header, decrypts ESP and sends it to i-HA 1402.

Figure 15N:
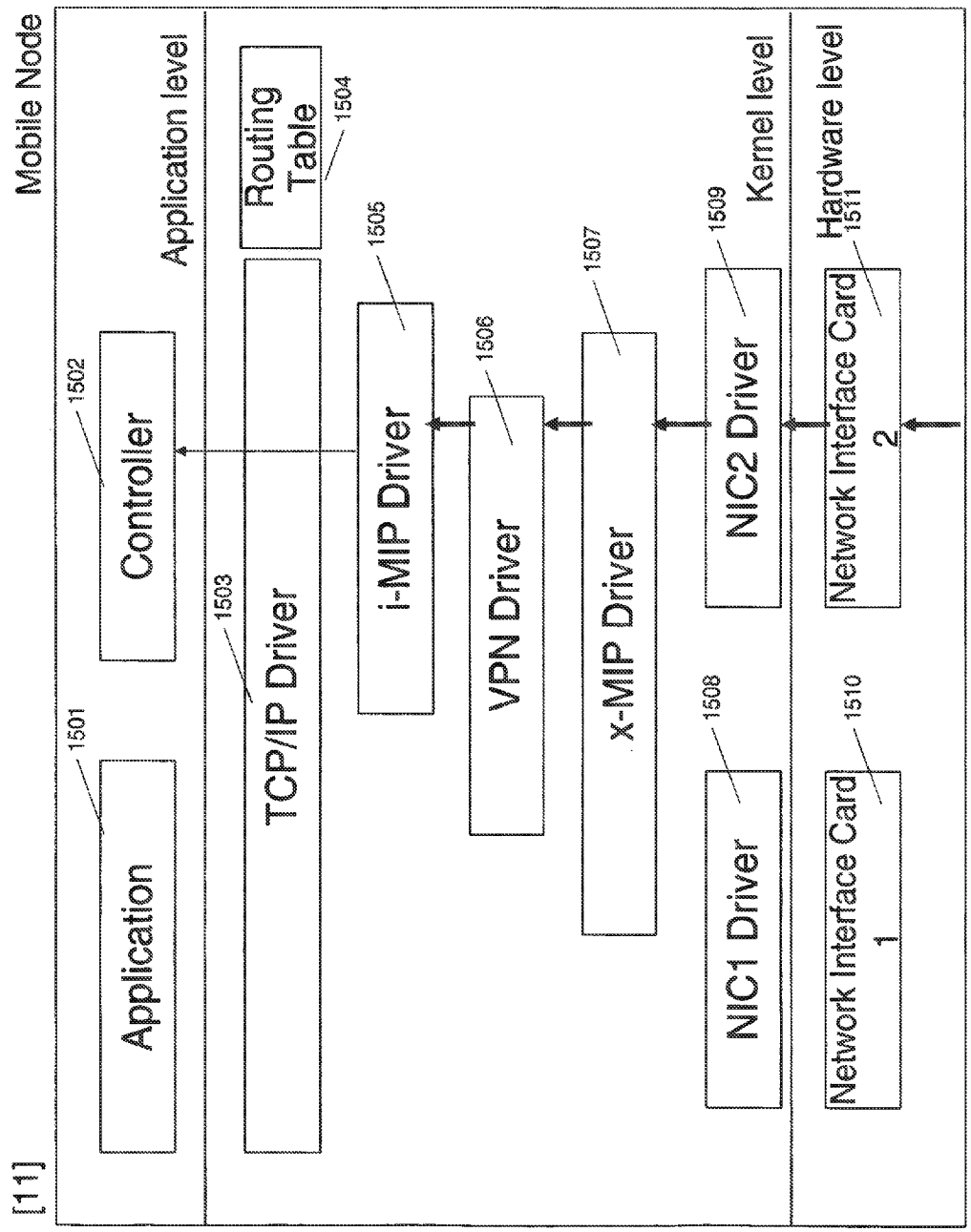
Figure 15O:
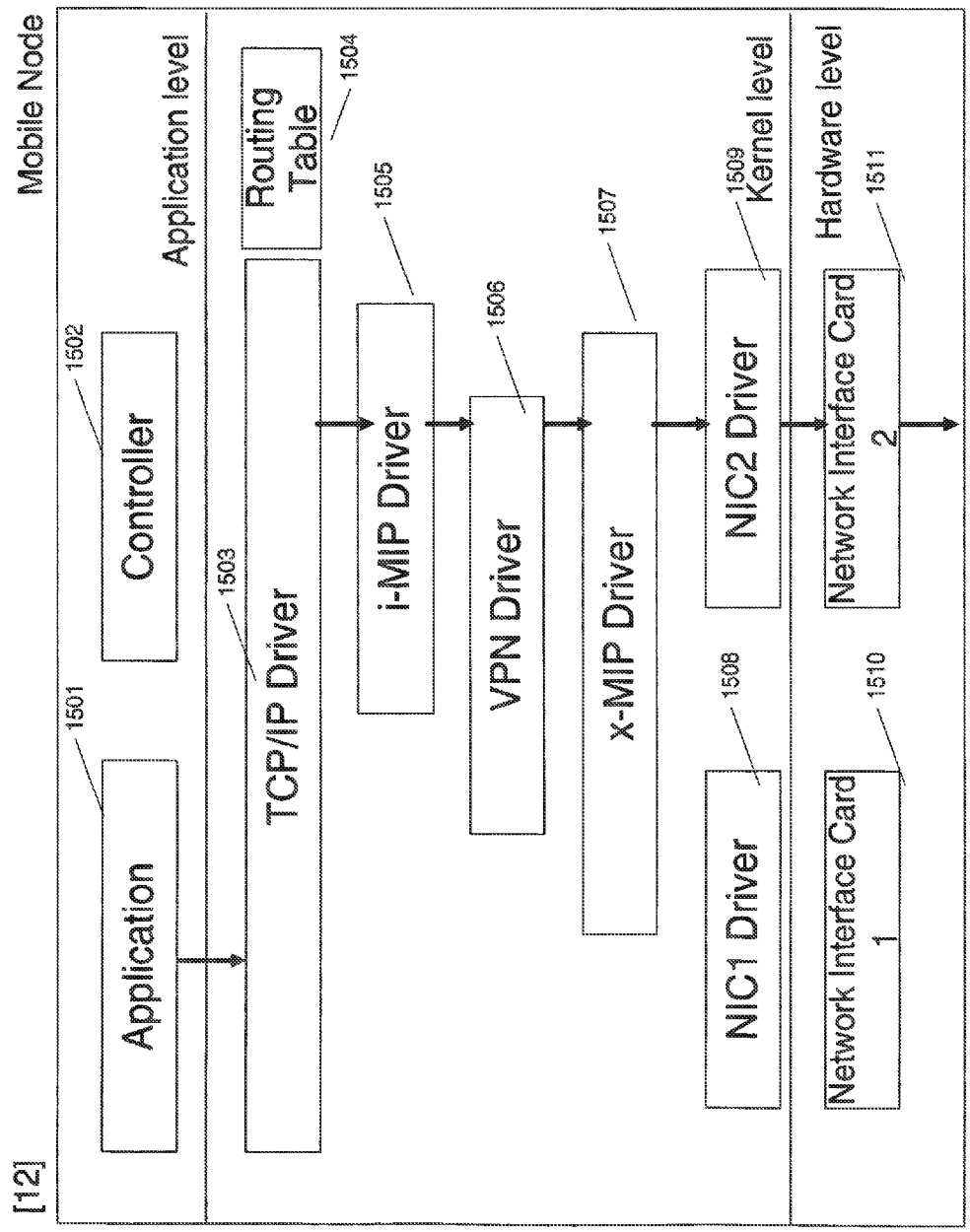

FIGS. 14O and 15N show an i-MIP registration response through the VPN tunnel. When i-HA 1402 receives the i-MIP registration request, the i-HA 1402 changes its mobility bindings with the following information:
  a. home address:i-HoA-addr/i, care of address:VPNinn-addr1/i i-HA 1402 creates an i-MIP Registration Reply and sends it to VPN-gw 1403 with the following information:
  a. Source IP address=i-HA-addr/i
  b. Destination IP address=VPNinn-addr1/i
  c. i-MIP Home Address=i-HoA-addr/i
  d. i-MIP Home Agent=i-HA-addr/i When VPN-gw 1403 receives the i-MIP registration reply, it encrypts the IP packet, adds an IP header and sends it to SMG/x-HA 1404 with the following information:
  a. Source IP address=VPNgw-addr/x
  b. Destination IP address=x-HoA-addr/x When SMG/x-HA 1404 receives the i-MIP Registration reply, it adds an x-MIP header and sends the packet to mobile node 1405 with the following information:
  a. x-MIP Source IP address=x-HA-addr/x
  b. x-MIP Destination IP address=local-addr/x FIGS. 14P and 15O show mobile node 1405 sending data to correspondent host 1401 using the VPN. Mobile node 1405 creates data and sends it to SMG/x-HA 1404 with the following information:
  a. x-MIP Source IP address=local-addr/x
  b. x-MIP Destination IP address=x-HA-addr/x
  c. Source IP address=x-HoA-addr/i
  d. Destination IP address=VPNgw-addr/x
  e. ESP encrypted packet
  f. i-MIP Source IP address=VPNinn-addr1/i
  g. i-MIP Destination IP address=i-HA-addr/i
  h. Source IP address=i-HoA-addr/i
  i. Destination IP address=CH-addr/i
  j. Payload data When SMG/x-HA 1404 receives the data, it removes the x-MIP IP header and sends it to VPN-gw 1403. When VPN-gw 1403 receives the data, it removes the IP header, decrypts ESP, and sends it to i-HA 1402. When i-HA 1402 receives the data, it removes the i-MIP IP header and sends it to correspondent host 1401.

Figure 15P:
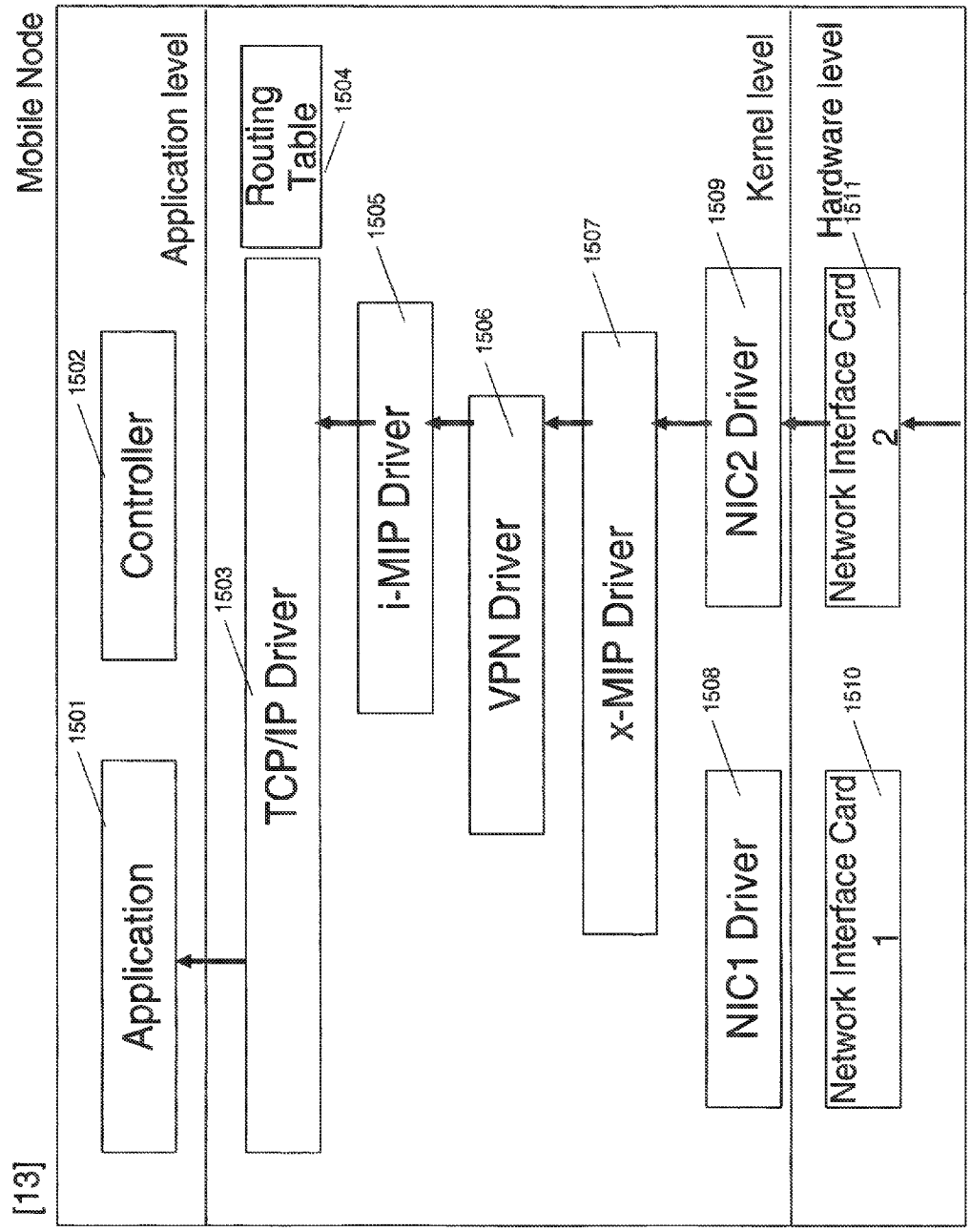
Figure 15Q:
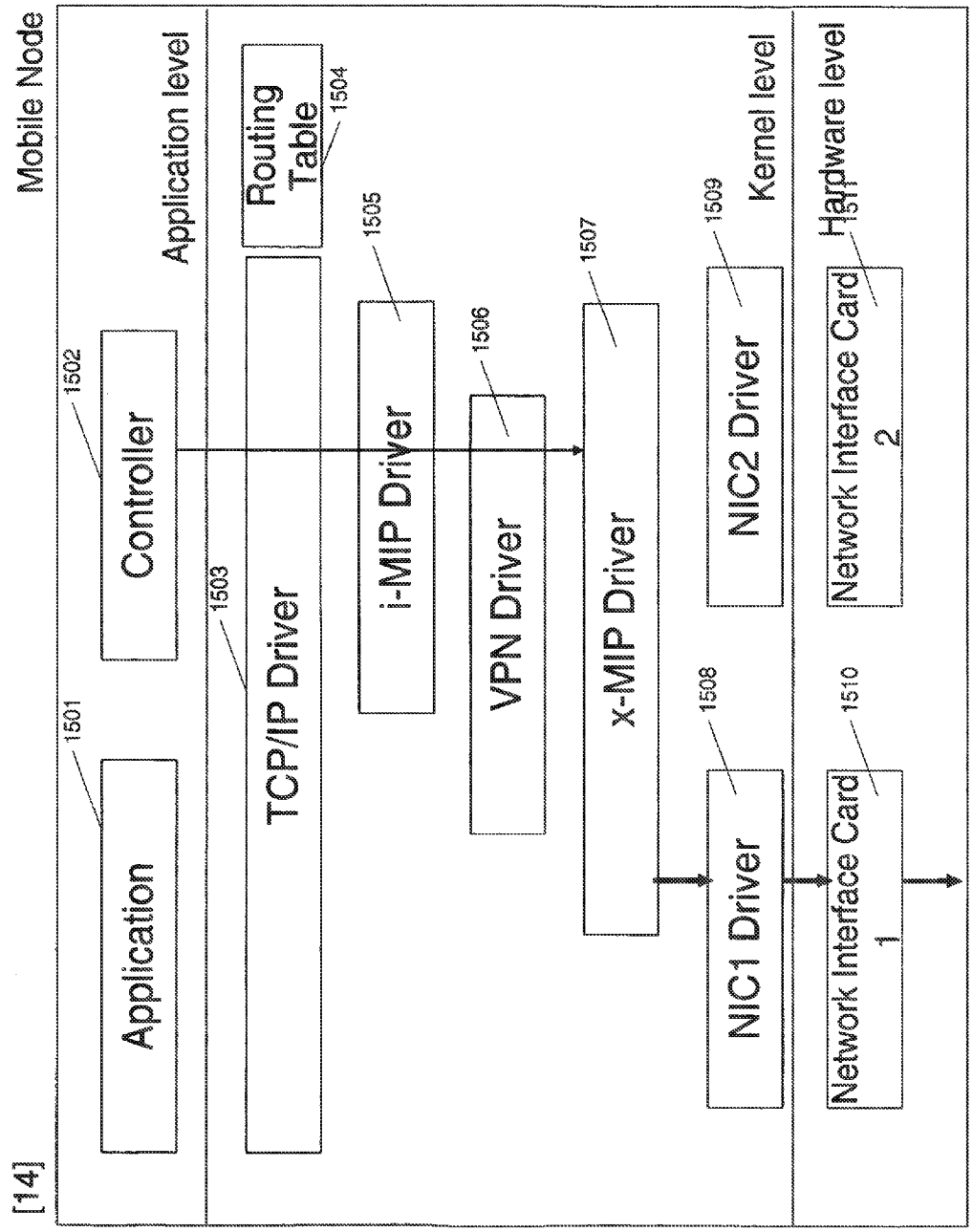
Figure 15R:
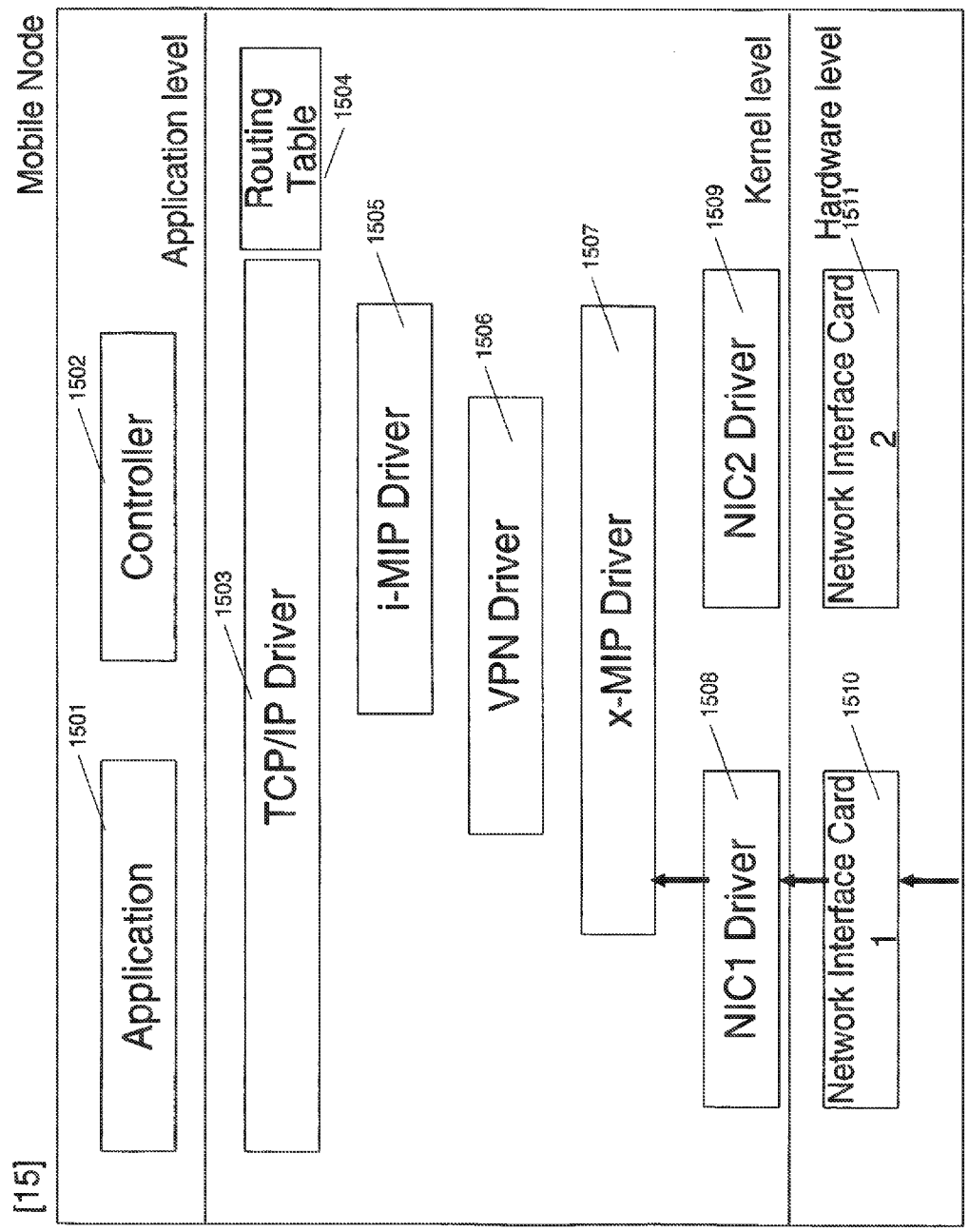

FIGS. 14Q and 15P show correspondent host 1401 sending data to the mobile node 1405 with the VPN. When the correspondent host 1401 desires to send data, the correspondent host 1401 creates the data and sends it to i-HA 1402 with the following information:
  a. Source IP address=CH-addr/i
  b. Destination IP address=i-HoA-addr/i
  c. payload data When i-HA 1402 receives the data, i-HA 1402 adds an i-MIP IP header and sends it to VPN-gw 1403 with the following information:
  a. i-MIP Source address=i-HA-addr/i
  b. i-MIP Destination address=VPNinn-addr1/i When VPN-gw 1403 receives the data, it encrypts the data and adds an IP header and sends it to SMG/x-HA 1404 with the following information:
  a. Source IP address=VPNgw-addr/x
  b. Destination IP address=VPNinn-addr1/i When SMG/x-HA 1404 receives the data, it adds the x-MIP header and sends it to mobile node 1405 with the following information:
  a. x-MIP Source IP address=x-HA-addr/x
  b. x-MIP Destination IP address=local-addr/x FIGS. 14R and 15Q show mobile node 1405 moving to another external network. When mobile node 1405 (using a triple tunnel) has moved to another external network, a routing table entry for x-HA-addr/x is modified with the following information:
  a. Destination:x-HA-addr/x, Gateway/interface: local-router-addr2/x Mobile node 1405 creates an x-MIP Registration request for re-registration and sends it to SMG/x-HA 1404 with the following information:
  a. Source IP address=local-addr2/x
  b. Destination IP address=x-HA-addr/x
  c. x-MIP Home address=x-HoA-addr/x
  d. x-MIP Home agent=x-HA-addr/x
  e. care of address=local-addr2/x FIGS. 14S and 15R show mobile node 1405 moving to another external network (with an x-MIP registration response). When SMG/x-HA 1404 receives an x-MIP Registration Request, it changes its mobility bindings with the following information:
  a. home address:x-HoA-addr/x,care-of address:local-addr2/x Next, SMG/x-HA 1404 creates an x-MIP Registration Reply and sends it to mobile node 1405 with the following information:
  a. Source IP address=x-HA-addr/x
  b. Destination IP address=local-addr2/x
  c. x-MIP Home Address=x-HoA-addr/x
  d. x-MIP Home Agent=x-HA-addr/x The following relates to i-MIP registration. FIGS. 14T-14W relate to the various approaches for registration as described above. Here, mobile node 1405 is in an original external network and the local address is local-addr/x.

In FIG. 14T, mobile node 1405 creates and sends to SMG/x-HA 1404 an i-MIP Registration Request with the following information:
  a. Source IP address: local-addr/x
  b. Destination IP address: x-HA-addr/x
  c. Home Address: i-HoA-addr/i
  d. Home Agent: i-HA-addr/i
  e. Care of Address: x-HoA-addr/x
  f. Authentication extension values for i-HA
  g. Vendor extension for x-HA authentication When SMG/x-HA 1404 receives the i-MIP Registration Request, it authenticates it and, if authentication is successful, changes the Source and Destination IP addresses and send the request to i-HA 1402 with the following information:
  a. Source IP address: x-HA-addr/x
  b. Destination IP address: i-HA-addr/i In FIG. 14V, when i-HA 1402 receives the i-MIP Registration Request, it authenticates it and, if authentication is succeed, i-HA 1402 changes its mobility bindings with the following information:
  a. home address:i-HoA-addr/i, care-of address:x-HoA-addr/x i-HA 1402 creates an i-MIP Registration Reply and sends it to SMG/x-HA 1404 with the following information:
  a. Source IP address: i-HA-addr/i
  b. Destination IP address: x-HA-addr/x
  c. Home Address: i-HoA-addr/i
  d. Home Agent: i-HA-addr/i When SMG/x-HA 1404 receives i-MIP Registration Reply, SMG/x-HA 1404 records reverse mobility bindings with the following information:
  a. Source Address: i-HoA-addr/x, i-HA address: i-HA-addr/i Reverse mobility bindings may be used by a split tunnel mode.

SMG/x-HA 1404 changes the Source IP address and the Destination IP addresses and sends the reply to mobile node 1405 with the following information:
 a. Source IP address: x-HA-addr/x
 b. Destination IP address: local-addr/x When mobile node 1405 receives the i-MIP Registration Reply, it changes an entry of routing table 1504 with the following information:
 a. Destination: i-HA-addr/i, Gateway/interface: x-MIP-tunnel
 b. Destination: internal network address/i, Gateway/interface: i-MIP-tunnel In FIG. 14U, mobile node 1405 creates and sends to SMG/x-HA 1404 an i-MIP Registration Request with the following information:
 a. x-MIP Source IP address: local-addr/x
 b. x-MIP Destination IP address: x-HA-addr/x
 c. Source IP address: x-HoA-addr/x
 d. Destination IP address: i-HA-addr/x
 e. Home Address: i-HoA-addr/i
 f. Home Agent: i-HA-addr/i
 g. Care of Address: x-HoA-addr/x
 h. Authentication extension values for i-HA
 i. Vendor extension for x-HA authentication When SMG/x-HA 1404 receives the i-MIP Registration Request, it authenticates the request and, if authentication is successful, removes x-MIP Source and x-MIP Destination IP address and send to i-HA 1402 with the following information:

In FIG. 14W, when i-HA 1402 receives the i-MIP Registration Request, it authenticates the request and, if authentication is succeed, i-HA 1402 changes mobility bindings with the following information:
 a. home address: i-HoA-addr/i, care-of address: x-HoA-addr/x i-HA 1402 creates an i-MIP Registration Reply and sends it to SMG/x-HA 1404 with the following information:
 a. Source IP address: i-HA-addr/i
 b. Destination IP address: x-HoA-addr/x
 c. Home Address: i-HoA-addr/i
 d. Home Agent: i-HA-addr/i When SMG/x-HA 1404 receives an i-MIP Registration Reply, SMG/x-HA 1404 records the reverse mobility bindings with the following information:
 a. Source Address: i-HoA-addr/x, i-HA address: i-HA-addr/i Reverse mobility bindings may be used by split tunnel mode.

Figure 15S:
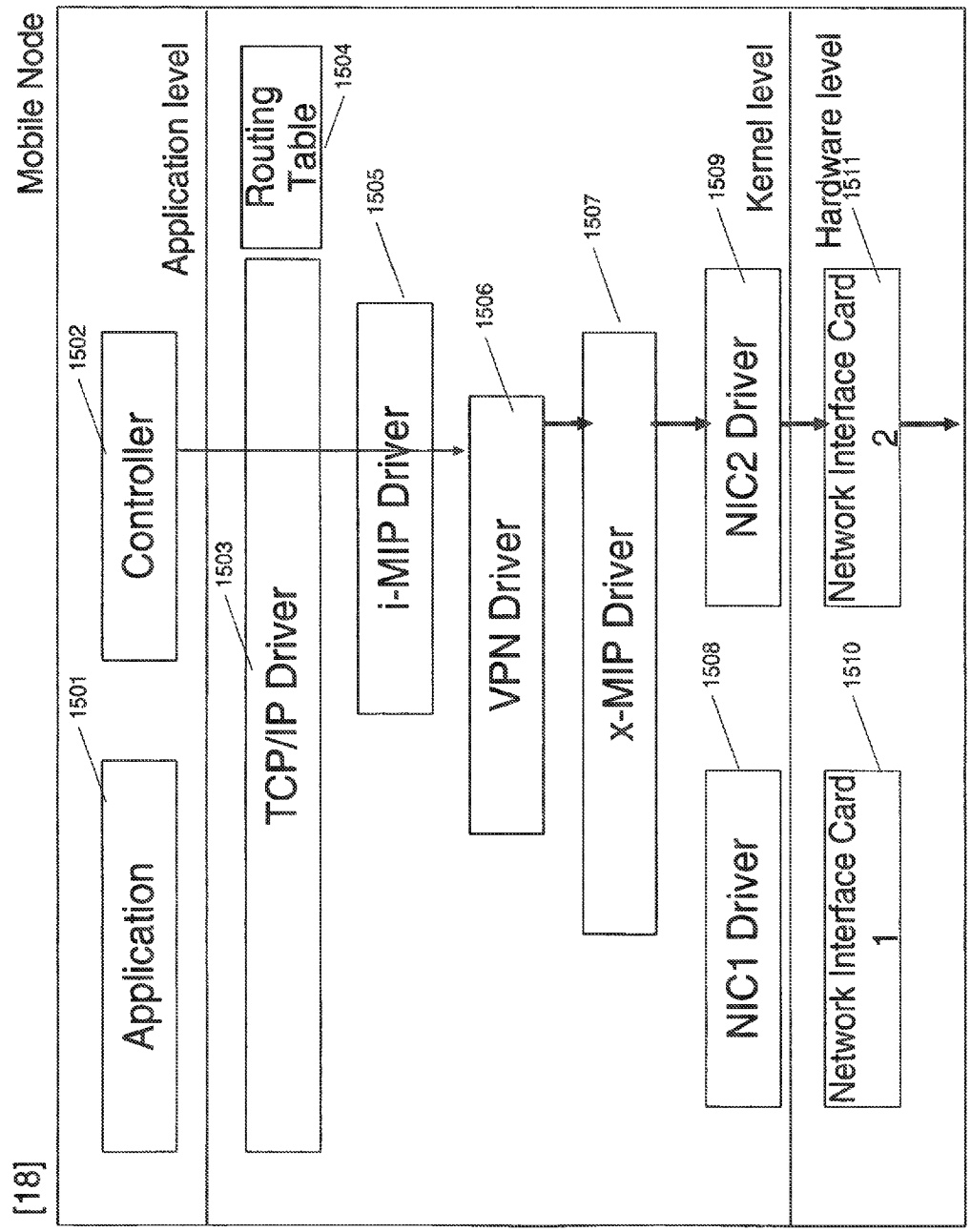

The SMG/x-HA 1404 adds the x-MIP Source IP address and x-MIP Destination IP address to the reply and sends it to mobile node 1405 with the following information:
 a. x-MIP Source IP address: x-HA-addr/x
 b. x-MIP Destination IP address: local-addr/x When mobile node 1405 receives i-MIP Registration Reply, adds entry of routing table with the following information:
 a. Destination: i-HA-addr/i, Gateway/interface: x-MIP-tunnel
 b. Destination: internal network address/i, Gateway/interface: i-MIP-tunnel FIGS. 14X and 15S show the mobile node 1405 disconnecting from the VPN tunnel. After deregistration of i-MIP, mobile node 1405 creates a VPN disconnection request and sends it to SMG/x-HA 1404 with the following information:
 a. x-MIP Source IP address=local-addr/x
 b. x-MIP Destination IP address=x-HA-addr/x
 c. Source IP address=x-HoA-addr/x
 d. Destination IP address=VPNgw-addr/x
 e. VPN disconnection request When SMG/x-HA 1404 receives the VPN disconnection request, it removes the x-MIP IP header and sends it to VPN-gw 1403.

Figure 15T:
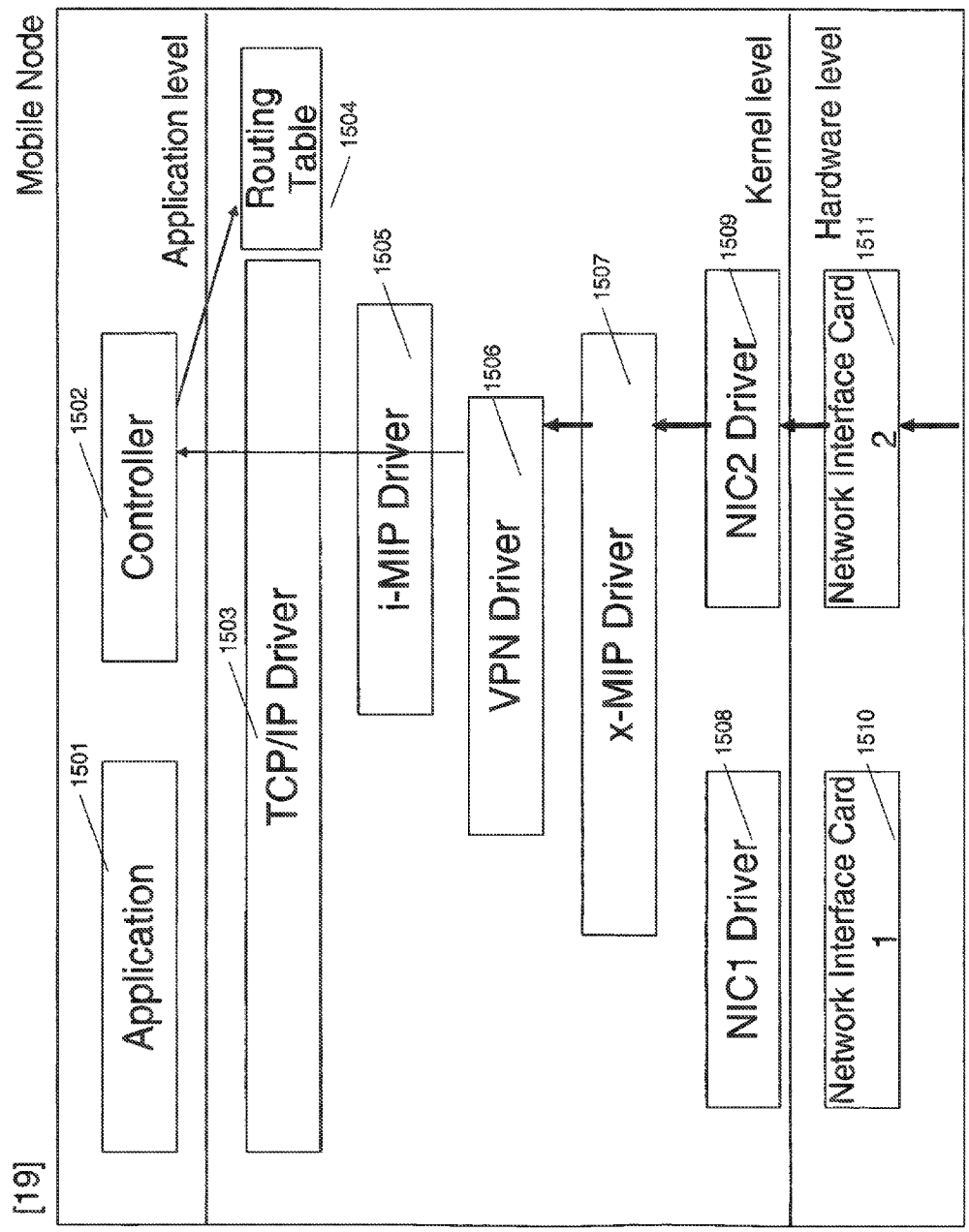

FIGS. 14Y and 15T show the response to the mobile node 1405 disconnect request. When VPN-gw 1403 receives the VPN disconnection request, it deletes the outgoing SPD, creates a VPN disconnection response, and sends it to SMG/x-HA 1404 with the following information:
 a. Source IP address=VPNgw-addr/x
 b. Destination IP address=x-HoA-addr/x
 c. VPN disconnection response When SMG/x-HA 1404 receives the VPN disconnection response, it adds an x-MIP IP header and sends the response to mobile node 1405 with the following information:
 a. x-MIP Source IP address=x-HA-addr/x
 b. x-MIP Destination IP address=local-addr/x When mobile node 1405 receives VPN disconnection response, it deletes entry of routing table for VPNinnaddr2/i and i-HA-addr/i The following relate to i-MIP deregistration. There are two methods for sending deregistration requests: one is via SMG, and the other is through x-MIP tunnel.

FIG. 14Z relates to sending the request by SMG. Here, mobile node 1405 creates and sends to SMG/x-HA 1404 the i-MIP Deregistration Request with the following information:
 a. Source IP address: local-addr/x
 b. Destination IP address: x-HA-addr/x
 c. Home Address: i-HoA-addr/i
 d. Home Agent: i-HA-addr/i
 e. Care of Address: x-HoA-addr/x
 f. Lifetime=0
 g. Authentication extension values for i-HA
 h. Vendor extension for x-HA authentication When SMG/x-HA 1404 receives the i-MIP Deregistration Request, it authenticates it and, if authentication is successful, changes eh Source and Destination IP addresses and sends the request to i-HA 1402 with the following information:
 a. Source IP address: x-HA-addr/x
 b. Destination IP address: i-HA-addr/i In FIG. 14BB, when i-HA 1402 receives the i-MIP Deregistration Request, it authenticates it and, if authentication is succeed, i-HA 1402 deletes mobility bindings. i-HA 1402 creates an i-MIP Deregistration Reply and sends it to SMG/x-HA 1404 with the following information:
 a. Source IP address: i-HA-addr/i
 b. Destination IP address: x-HA-addr/x
 c. Home Address: i-HoA-addr/i
 d. Home Agent: i-HA-addr/i When SMG/x-HA 1404 receives the i-MIP Deregistration Reply, SMG/x-HA 1404 deletes reverse mobility bindings. Next, SMG/x-HA 1404 changes the Source IP address and the Destination IP address and sends it to mobile node 1405 with the following information:
 a. Source IP address: x-HA-addr/x
 b. Destination IP address: local-addr/x When mobile node 1405 receives the i-MIP Deregistration Reply, the mobile node 1405 changes an entry in routing table 1504 with the following information:
 a. Destination: internal network address/i, Gateway/interface: x-MIP-tunnel deregistrating both of MIP tunnels FIGS. 14Z-14EE show how mobile node 1405 shuts down the tunnel in an external network.

FIG. 14AA shows the transmission of an i-MIP deregistration request (through an x-MIP tunnel). Mobile node 1405 creates and send to SMG/x-HA 1404 an i-MIP Deregistration Request with the following information:
 a. x-MIP Source IP address: local-addr/x
 b. x-MIP Destination IP address: x-HA-addr/x
 c. Source IP address: x-HoA-addr/x
 d. Destination IP address: i-HA-addr/x
 e. Home Address: i-HoA-addr/i
 f. Home Agent: i-HA-addr/i
 g. Care of Address: x-HoA-addr/x
 h. Lifetime=0
 i. Authentication extension values for i-HA
 j. Vendor extension for x-HA authentication When SMG/x-HA 1404 receives i-MIP Deregistration Request, it authenticates it and, if authentication is successful, removes the x-MIP Source and x-MIP Destination IP addresses and sends the request to i-HA 1402.

In FIG. 14BB, when i-HA 1402 receives an i-MIP Deregistration Request, it authenticates it and, if authentication is successful, i-HA 1402 deletes the mobility bindings.

i-HA 1402 creates an i-MIP Deregistration Reply and sends it to SMG/x-HA 1404 with the following information:
 a. Source IP address: i-HA-addr/i
 b. Destination IP address: x-HoA-addr/x
 c. Home Address: i-HoA-addr/i
 d. Home Agent: i-HA-addr/i When SMG/x-HA 1404 receives an i-MIP Registration Reply, SMG/x-HA 1404 deletes the reverse mobility bindings.

SMG/x-HA 1404 adds the x-MIP Source IP address and x-MIP Destination IP address. It then sends the reply to mobile node 1405 with the following information:
 a. x-MIP Source IP address: x-HA-addr/x
 b. x-MIP Destination IP address: local-addr/x When mobile node 1405 receives the i-MIP Deregistration Reply, it changes an entry in routing table 1504 with the following information:
 a. Destination: internal network address/i, Gateway/interface: x-MIP-tunnel FIG. 14DD shows transmission of an x-MIP deregistration request. When mobile node 1405 deregisters i-MIP, mobile node 1405 creates an x-MIP Deregistration request and sends it to SMG/x-HA 1404 with the following information:
 a. Source IP address=local-addr/x
 b. Destination IP address=x-HA-addr/x
 c. x-MIP Home Address=x-HoA-addr/x
 d. x-MIP Home Agent=x-HA-addr/x
 e. Care of address=local-addr/x
 f. Lifetime=0
 g. Authentication extension values for x-HA FIG. 14EE shows transmission of an x-MIP deregistration response. When SMG/x-HA 1404 receives x-MIP Deregistration request and, after successful of authentication, creates an x-MIP Deregistration reply and sends it to mobile node 1405 with the following information:
 a. Source IP address=x-HA-addr/x
 b. Destination IP address=local-addr/x
 c. Home Address=x-HoA-addr/x
 d. Home Agent=x-HA-addr/x When mobile node 1405 receives the x-MIP deregistration reply, mobile node 1405 deletes entries in routing table 1504 for Internal-network-addr/i, VPNgw-addr/x and changes the following information:
 a. Destination:default, Gateway/interface: local-router-addr/x FIGS. 14GG-14NN and 15U-15BB show a mobile node 1405 moving back to an internal network from an external network with a triple tunnel mode as shown in FIG. 14FF.

Figure 15U:
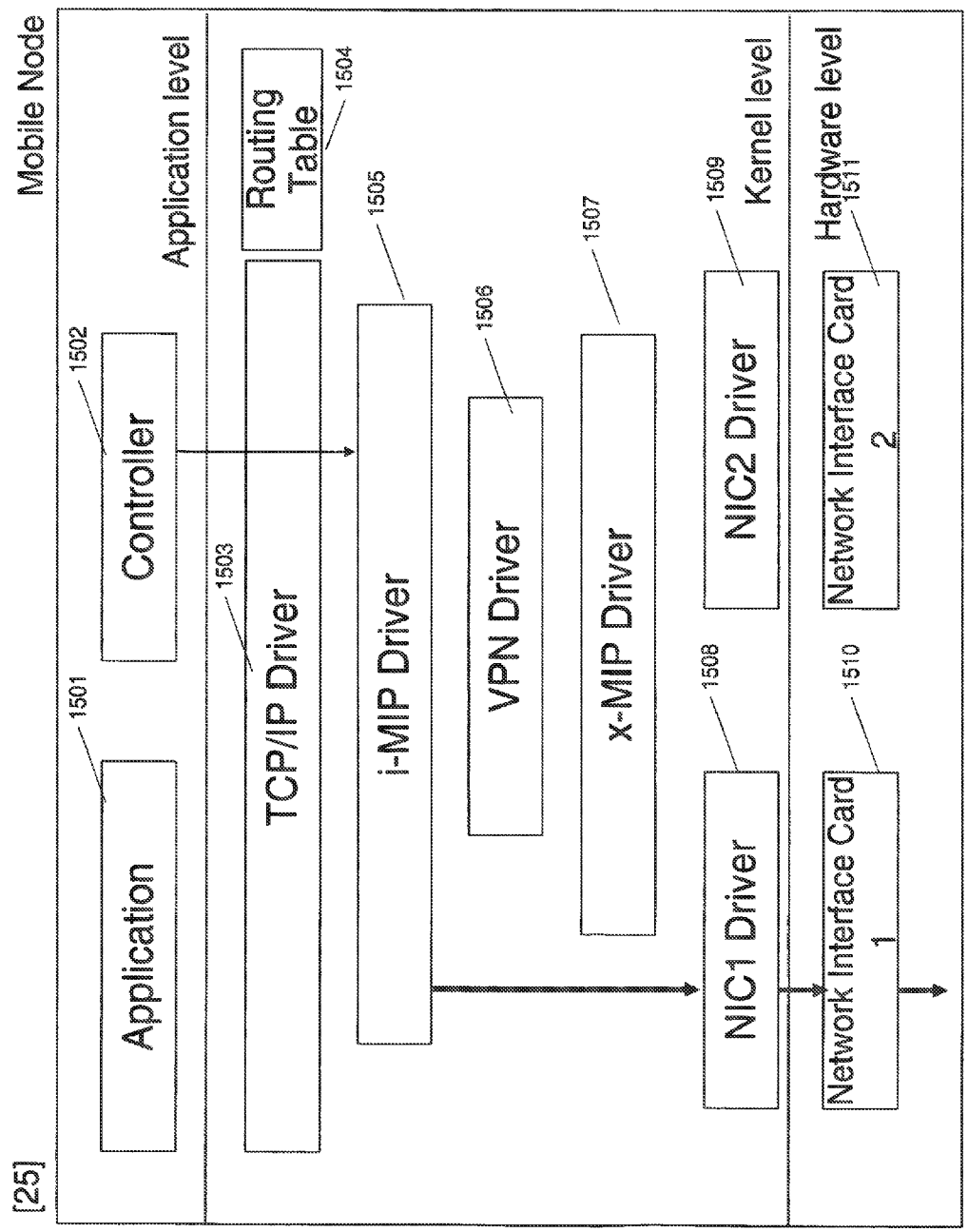
Figure 15V:
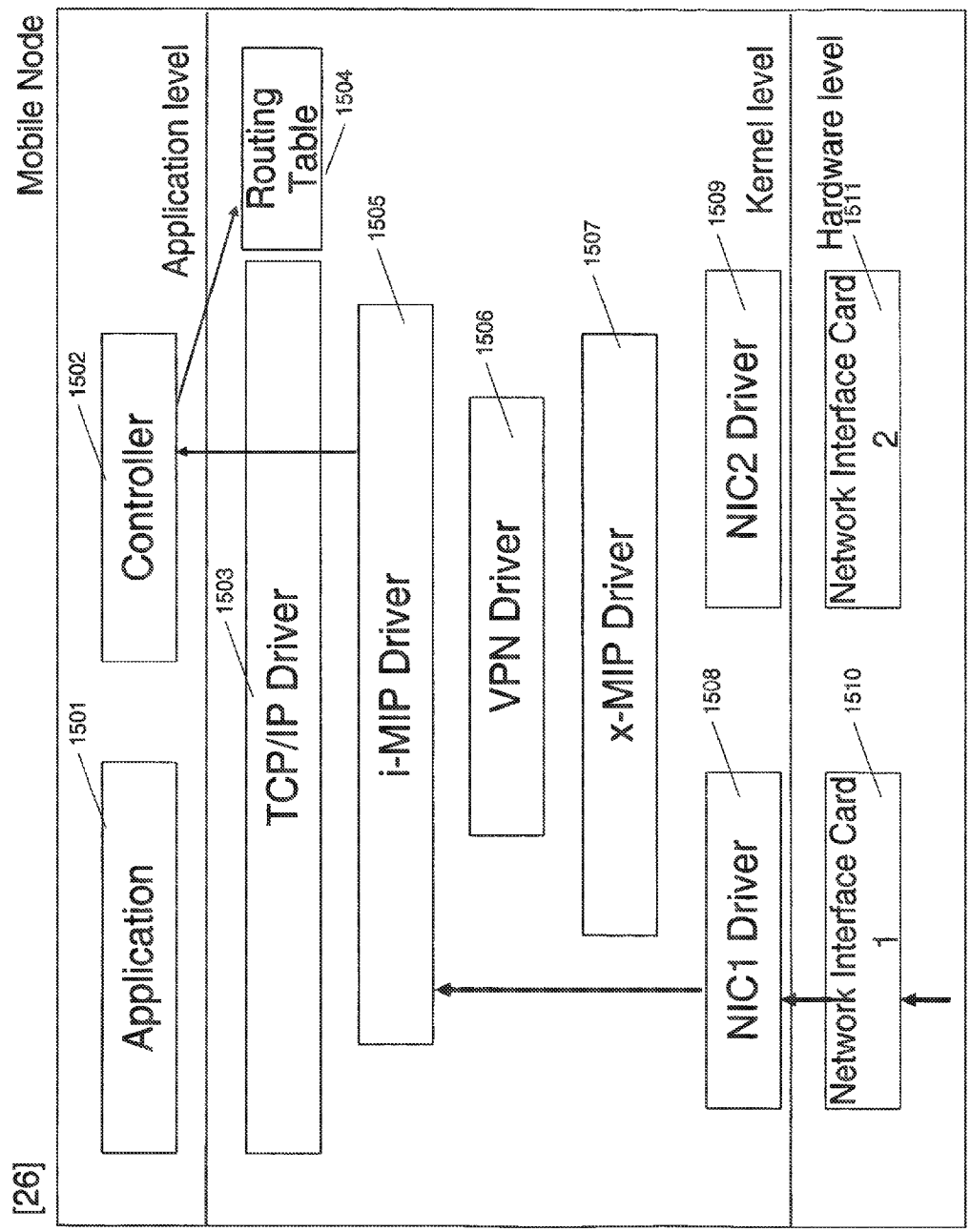
Figure 15W:
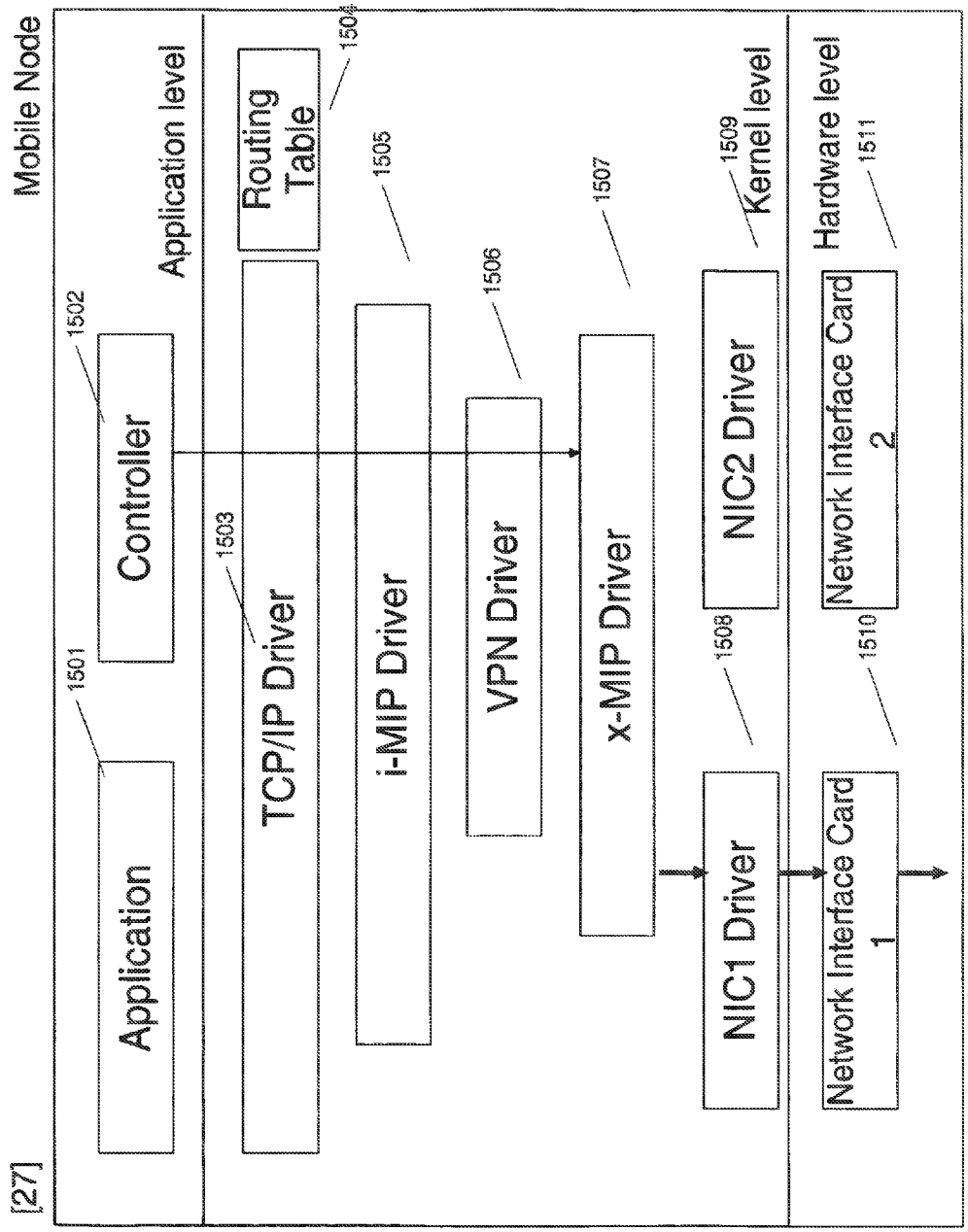
Figure 15X:
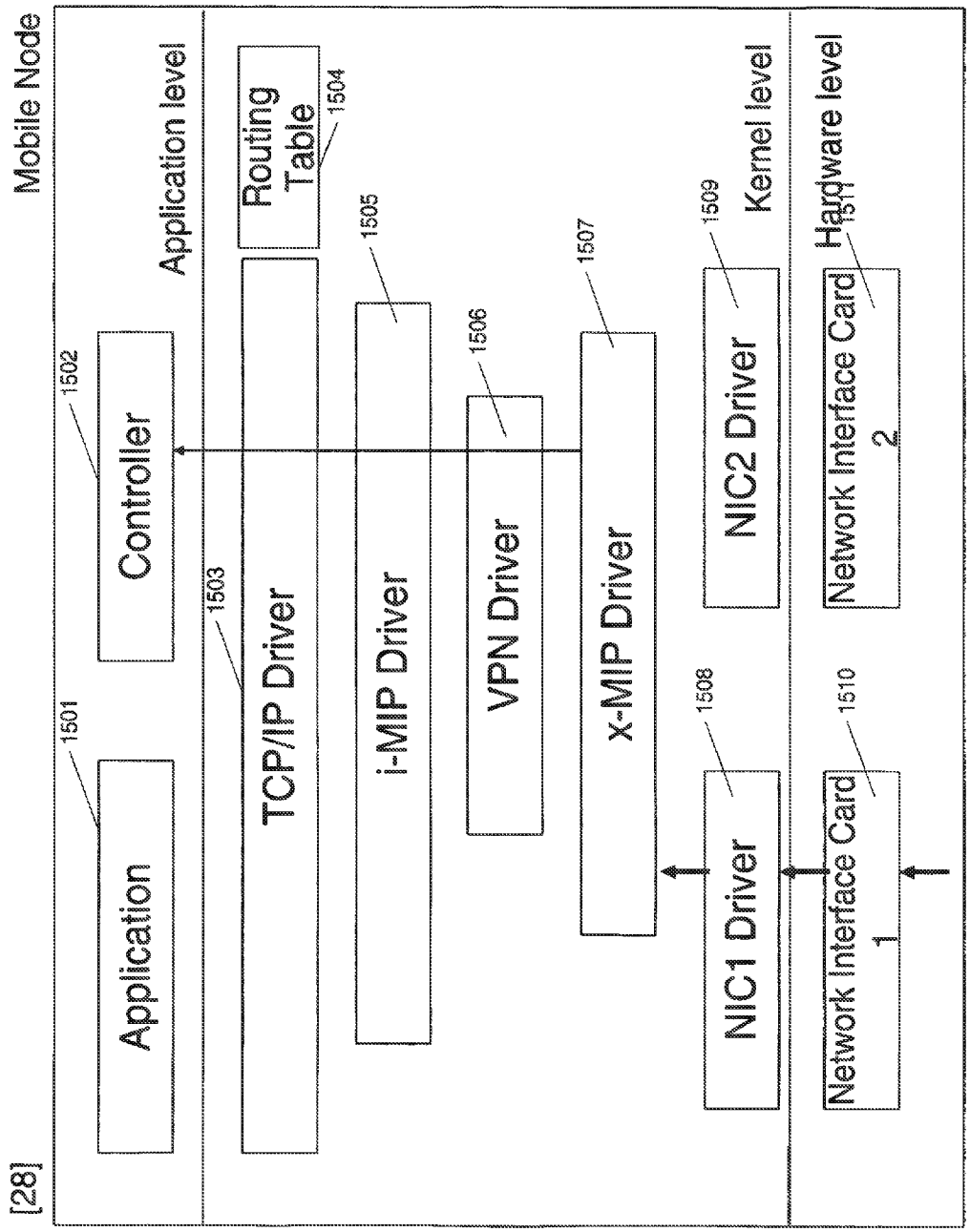
Figure 15Y:
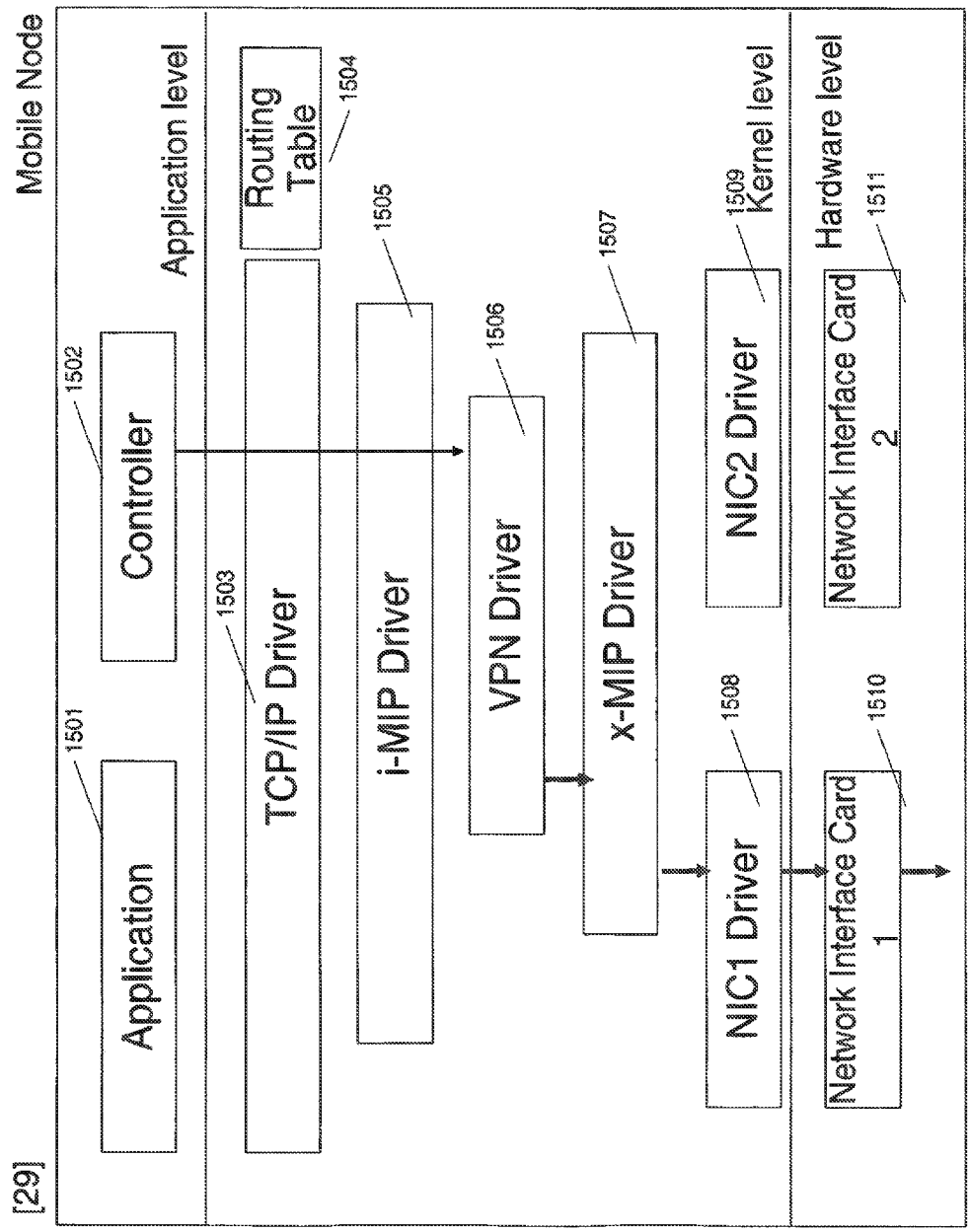
Figure 15Z:
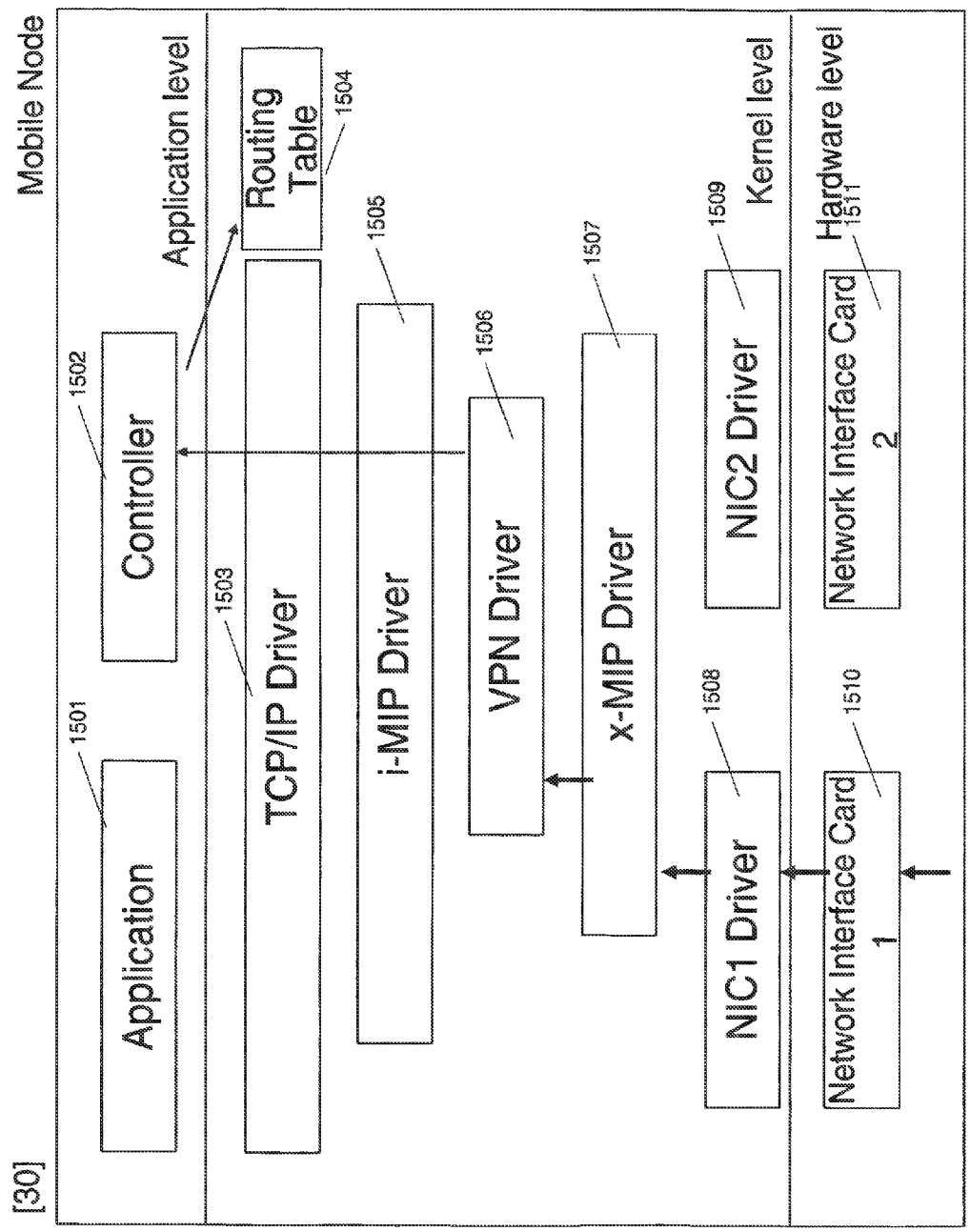
Figure 15A:
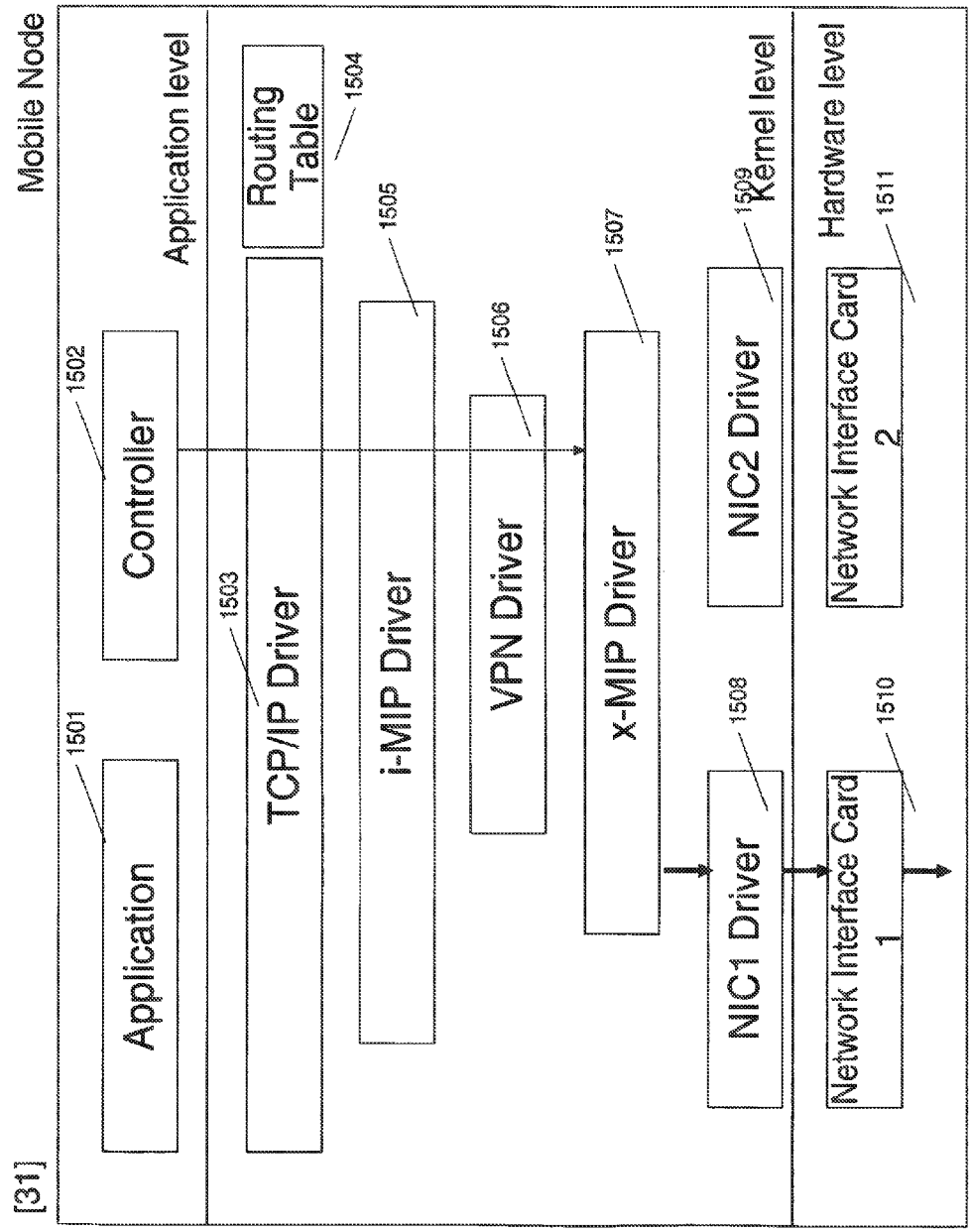
Figure 15B:
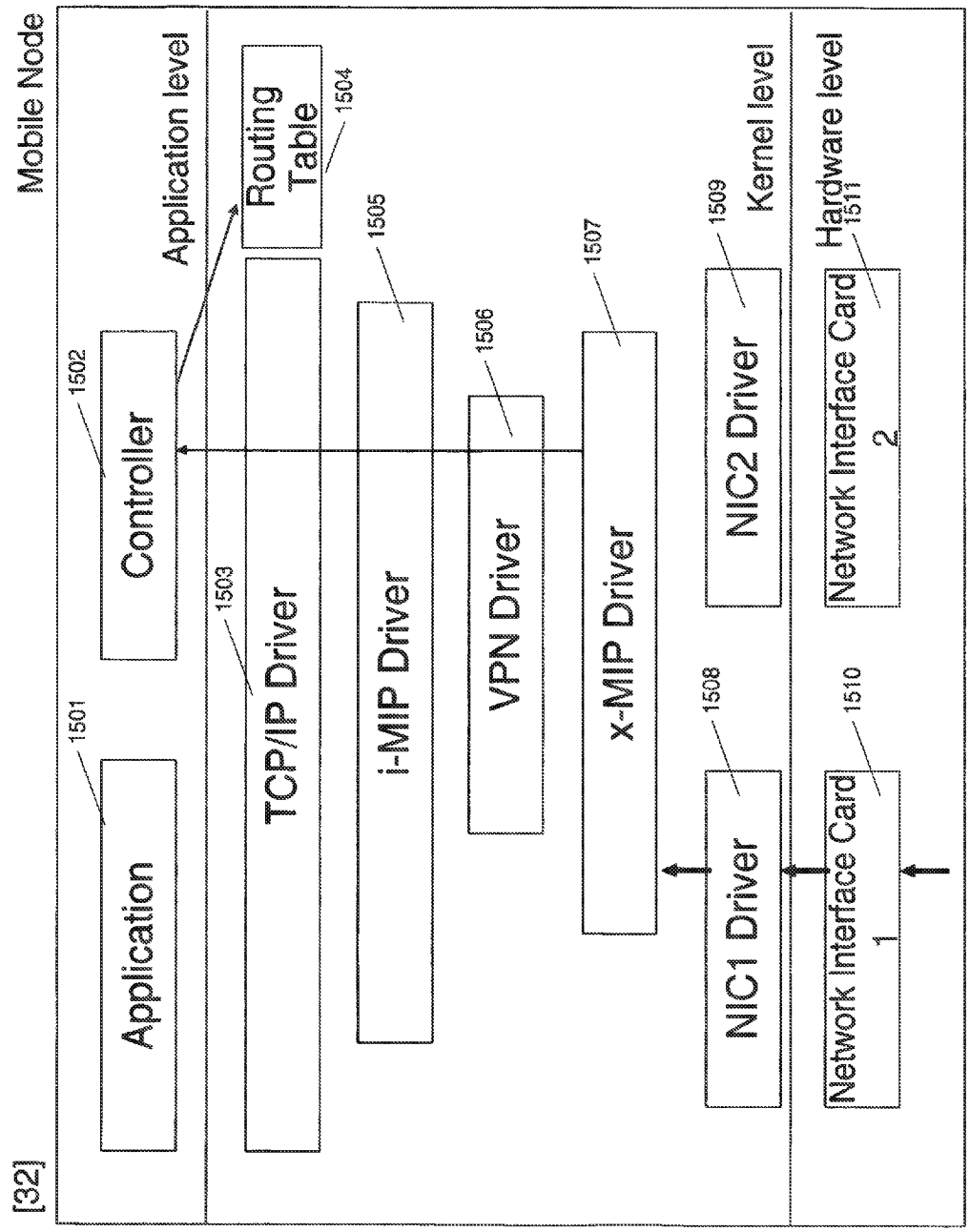

FIG. 15U shows mobile node 1405 moving to an internal visited network (with an i-MIP registration request). When mobile node 1405 moves to an internal visited network, routing table is changed for x-HA-addr/x and default to local-router-addr/i. Mobile node 1405 creates an i-MIP Registration request and sends it to i-HA 1402 with the following information:
 a. Source IP address=local-addr/i
 b. Destination IP address=i-HA-addr/i
 c. i-MIP Home Address=i-HoA-addr/i
 d. i-MIP Home Agent=i-HA-addr/i
 e. Care of Address=local-addr/i FIGS. 14HH and 15V shows the handing of an i-MIP registration response. Here, when i-HA 1402 receives an i-MIP Registration Request, it changes the mobility bindings with the following information:
 a. home address:i-HoA-addr/i, care-of-address:local-addr/i i-HA 1402 creates an i-MIP Registration reply and sends it to mobile node 1405 with the following information:
 a. Source IP address=i-HA-addr/i
 b. Destination IP address=local-addr/i
 c. i-MIP Home address=i-HoA-addr/i
 d. i-MIP Home agent=i-HA-addr/i When mobile node 1405 receives i-MIP Registration reply, it adds an entry in routing table 1504 with the following information:
 a. Destination:i-HA-addr/i, Gateway/interface: local-router-addr/i
 b. Destination:internal-network-addr/i, Gateway/interface:i-MIP-tun FIGS. 14II and 15W relate to an x-MIP registration request. Here, mobile node 1405 registers with x-HA 1404 to disconnect the VPN tunnel via the x-MIP tunnel.

Mobile node 1405 creates an x-MIP registration request and sends it to SMG/x-HA 1404 with the following information:
 a. Source IP address=local-addr/i
 b. Destination IP address=x-HA-addr/x
 c. x-MIP Home Address=x-HoA-addr/x
 d. x-MIP Home Agent=x-HA-addr/x
 e. Care of Address=local-addr/i FIGS. 14JJ and 15X relate to an x-MIP registration response. When SMG/x-HA 1404 receives an x-MIP registration request, it changes the mobility bindings with the following information:
 a. home address:x-HoA-addr/x, care-of-adress:local-addr/i Next, SMG/x-HA 1404 creates an x-MIP registration reply and sends it to mobile node 1405 with the following information:
 a. Source IP address=x-HA-addr/x
 b. Destination IP address=local-addr/i
 c. x-MIP Home Address=x-HoA-addr/x
 d. x-MIP Home Agent=x-HA-addr/x FIGS. 14KK and 15Y relate to the mobile node 1405 disconnecting from the VPN tunnel. Mobile node 1405 creates a VPN disconnection request and sends it to SMG/x-HA 1404 with the following information:
 a. x-MIP Source IP address=local-addr/i
 b. x-MIP Destination IP address=x-HA-addr/x
 c. Source IP address=x-HoA-addr/x
 d. Destination IP address=VPNgw-addr/x
 e. VPN disconnection request When SMG/x-HA 1404 receives the VPN disconnection request, it removes the x-MIP IP header and sends it to VPN-gw 1403.

FIGS. 14LL and 15Z show a response to the VPN disconnect request. When VPN-gw 1403 receives the VPN disconnection request, it creates a VPN disconnection response and sends the response it to SMG/x-HA 1404 with the following information:
- a. Source IP address=VPNgw-addr/x
- b. Destination IP address=x-HoA-addr/x
- c. VPN disconnection response When SMG/x-HA 1404 receives a VPN disconnection response, it adds an x-MIP IP header and sends the response to mobile node 1405 with the following information:
- a. x-MIP Source IP address=x-HA-addr/x
- b. x-MIP Destination IP address=local-addr/i When mobile node 1405 receives the VPN disconnection response, it deletes entry of routing table for VPNinnaddr2/i.

FIGS. 14MM and 15AA show an x-MIP deregistration request. Here, mobile node 1405 creates an x-MIP deregistration request and sends it to SMG/x-HA 1404 with the following information:
- a. Source IP address=local-addr/i
- b. Destination IP address=x-HA-addr/x
- c. x-MIP Home Address=x-HoA-addr/x
- d. x-MIP Home agent=x-HA-addr/x
- e. Care of address=local-addr/i
- f. lifetime=0
- g. authentication extension values for x-HA FIGS. 14NN and 15BB show an x-MIP deregistration response. When SMG/x-HA 1404 receives an x-MIP Deregistration request and, after success of authentication, deletes mobility bindings, creates an x-MIP Deregistration reply, and sends it to mobile node 1405 with the following information:
- a. Source IP address=x-HA-addr/x
- b. Destination IP address=local-addr/i
- c. x-MIP Home Address=x-HoA-addr/x
- d. x-MIP Home Agent=x-HA-addr/x When mobile node 1405 receives an x-MIP Deregistration reply, it deletes entry of routing table for VPNgwaddr/x Trigger Packets The following relates to trigger packet handing. A trigger packet is a kind of application traffic that, when x-MIP and i-MIP is established, begins the process of forming a VPN tunnel.

Examples of Trigger Packet Handling

The following shows examples of trigger packets and trigger packet handling. For example, trigger packets may relate to:
- a. Any packet the mobile node 1405 receives from correspondent host 1401 (in an internal network), such as TCP SYN packet, SIP INVITE packet, or a packet as depending on what the mobile node 1405 is using for application it depends on what Mobile node use for the application 1501.
- b. Any packet mobile node 1405 sends to the internal network. For instance, an i-MIP registration may be sent via a VPN tunnel to create the x-MIP and i-MIP tunnels.

FIGS. 16A-16D relate to the handling of trigger packets.

The following describes an example of handling trigger packet received mobile node 1405.

Figure 16A:
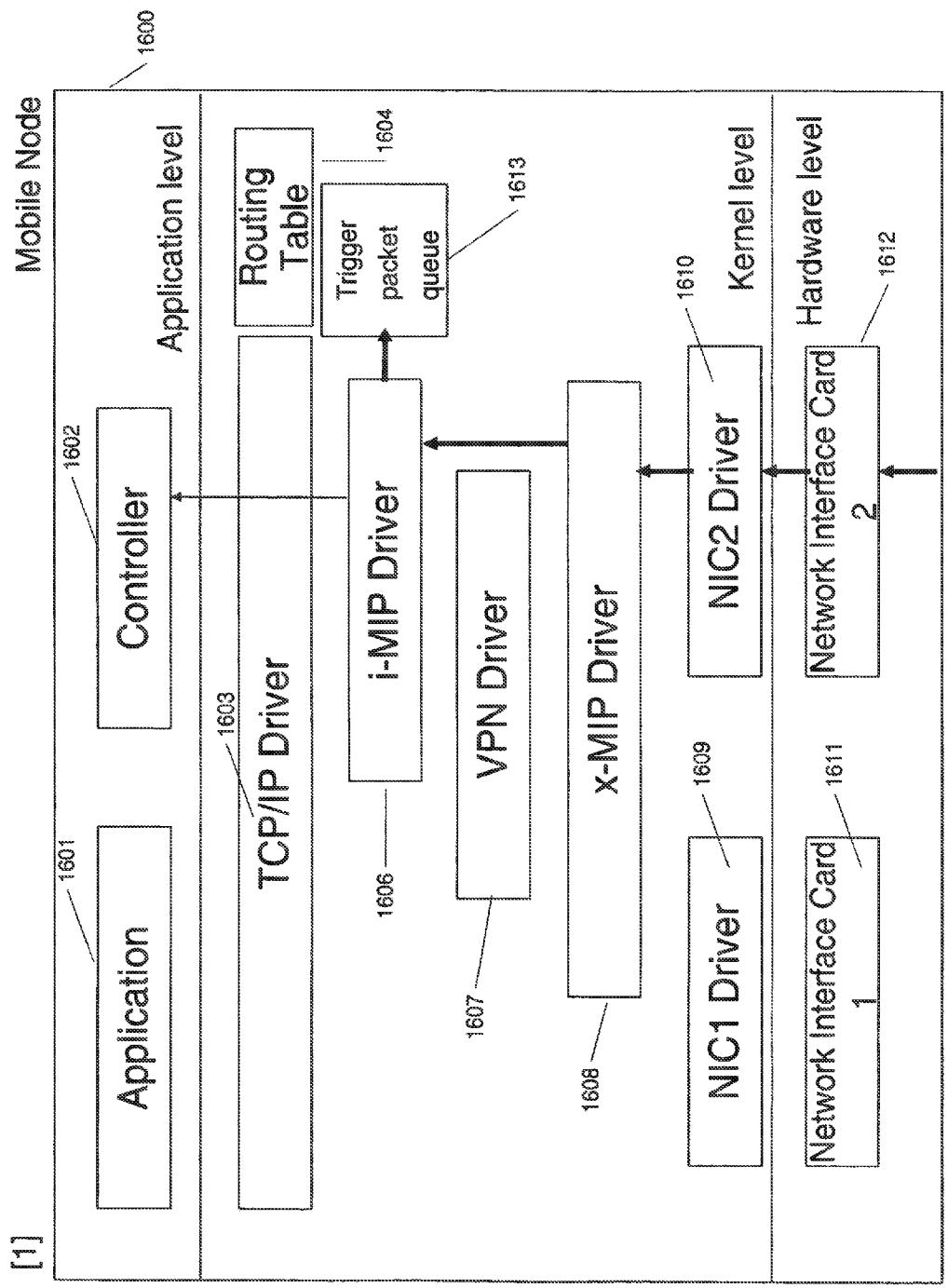
FIGS. 16A-16D show illustrative examples of illustrative trigger packet handling in accordance with aspects of the present invention.

In FIG. 16A, when mobile node 1600 receives a trigger packet, its internal signaling is described below. NIC2 1612 receives trigger packet and sends it to NIC2 Driver 1610. NIC2 Driver 1610 creates its specific packet for x-MIP Driver 1608 from the trigger packet and sends the specific packet to x-MIP Driver 1608. x-MIP Driver 1608 receives and sends the packet to i-MIP Driver 1606 after protocol processing. i-MIP Driver 1606 processes its protocol, recognizes the packet as being a trigger packet, then indicates to controller 1602, and forwards the trigger packet to trigger packet queue 1613.

Figure 16B:
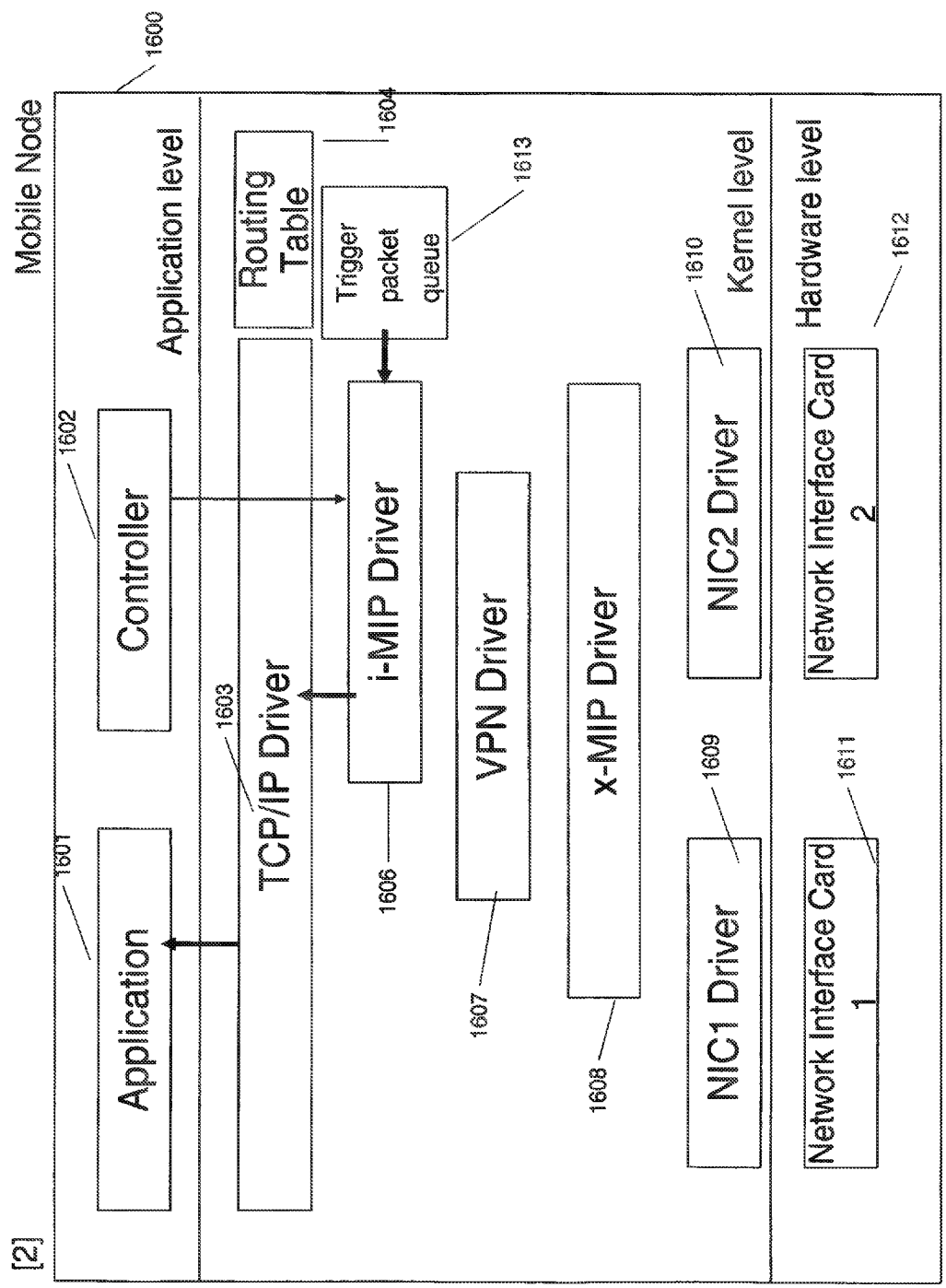

FIG. 16B shows the internal behavior of mobile node 1600 when establishing a VPN tunnel. Controller 1602 sends a message to i-MIP Driver 1606 requesting a VPN tunnel to be established. i-MIP Driver 1606 retrieves the trigger packet from queue 1613 and sends it to TCP/IP Driver 1603. TCP/IP Driver 1603 sends it to application 1601 after it process the protocol.

Figure 16C:
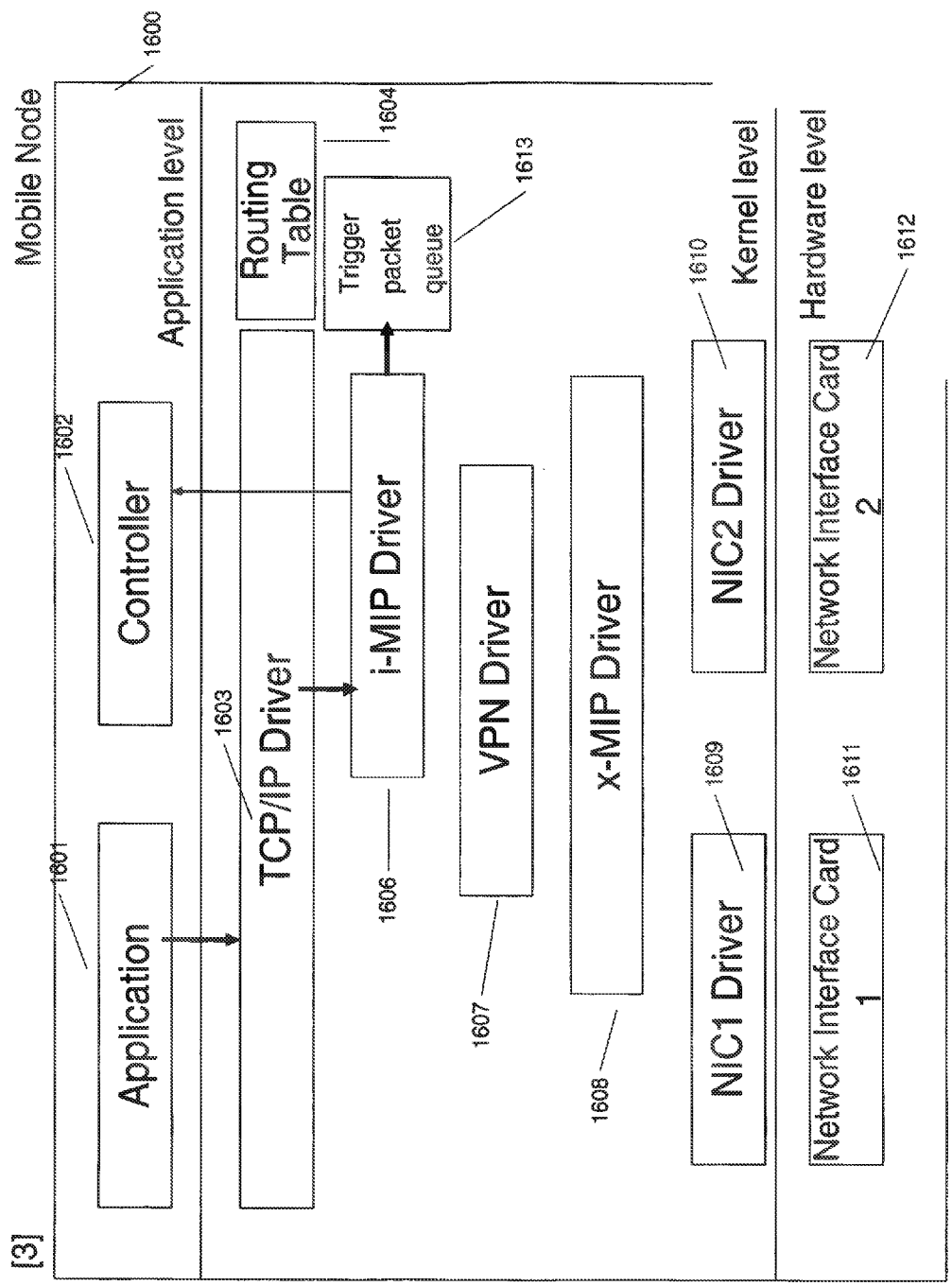

FIG. 16C describes the handling of a trigger packet transmitted by mobile node 1600. Application 1601 sends a trigger packet to TCP/IP Driver 1603. TCP/IP Driver 1603 sends it to i-MIP Driver 1606 after processing of the protocol. i-MIP Driver 1606 detects the packet is a trigger packet and indicate to controller 1602, and keeps the packet in the queue 1613.

Figure 16D:
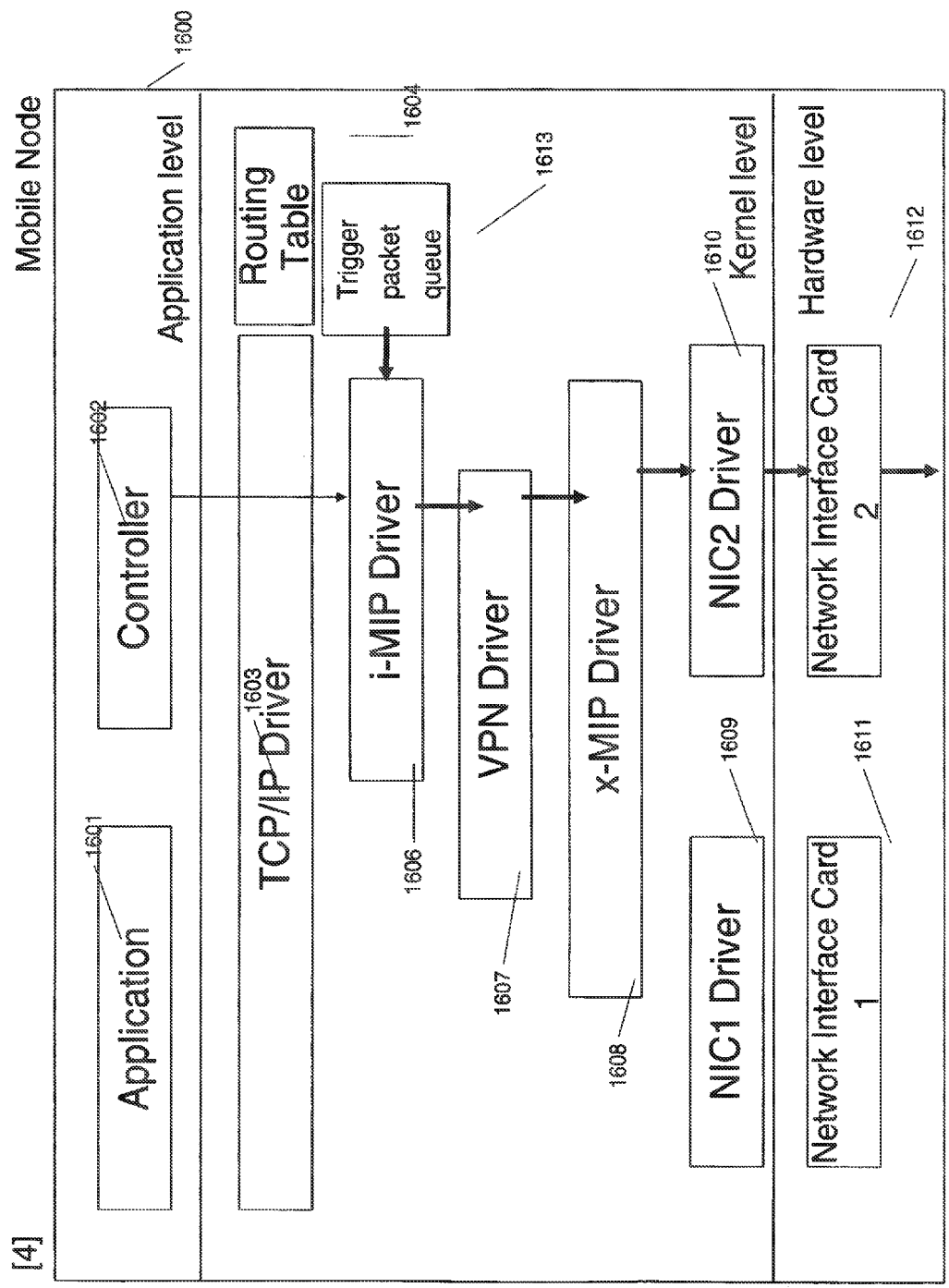

FIG. 16D shows the internal signaling when mobile node 1600 establishes a VPN tunnel. Controller 1601 sends a message about VPN tunnel is established to i-MIP Driver 1606. i-MIP Driver 1606 then retrieves the trigger packet from queue 1613 and sends it to VPN Driver 1607. VPN Driver 1607 sends it to x-MIP Driver 1608 after processing. x-MIP Driver 1608 then sends it to NIC Driver 1610 after processing. NIC Driver 1610 the sends it to NIC 1612 after processing. NIC 1612 then sends the packet to the network.

Example to Detect a Trigger Message in Sessions with Dynamically Assigned Ports

The following is an example where a trigger message is detected within sessions with dynamically assigned ports as opposed to conventional statically ports.

Figure 8:
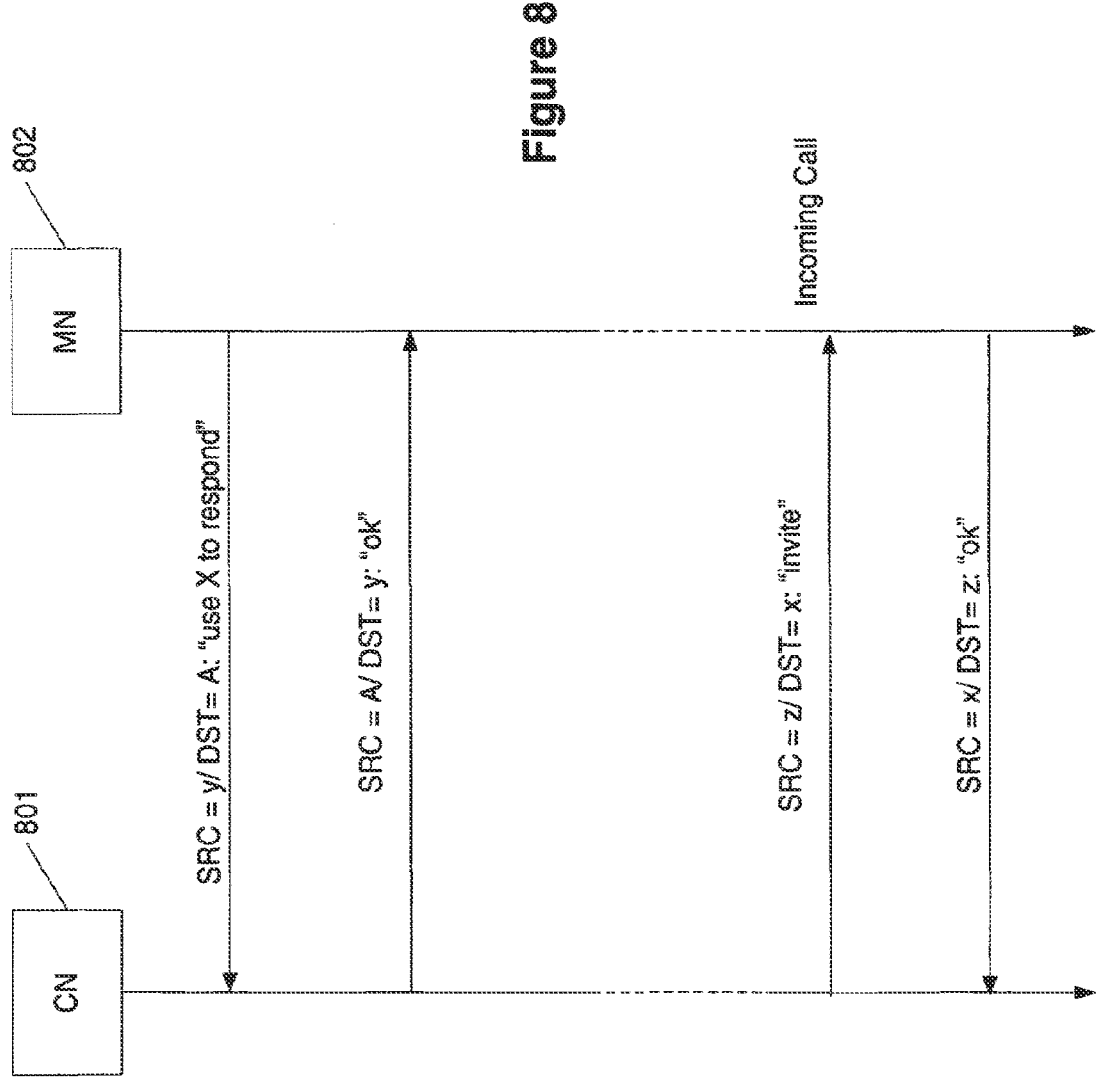
FIG. 8 shows data signals in accordance with aspects of the present invention.

For example, some SIP implementations work as shown in FIG. 8. The source SRC and destination DST descriptions denote an IP source address and destination address. A is a port preconfigured at a mobile node 802 and correspondent host 801. x, y and z are dynamically-assigned port numbers. As they are dynamic, it is not known what they are prior to a start of a session. Mobile node 802 sends an instruction to correspondent host 801 with source=y and destination=A with the instruction of "use X to respond". Correspondent host 801 responds with a message OK with source=A and destination=y. Later, during an incoming call, from source z, the destination is X with the payload "invite" for a call. The response is OK with source x and destination z.

If x is constant, network drivers can detect "invite" message easily. But x is dynamically assigned, so it is not easy for network drivers to detect triggers.

Figure 9:
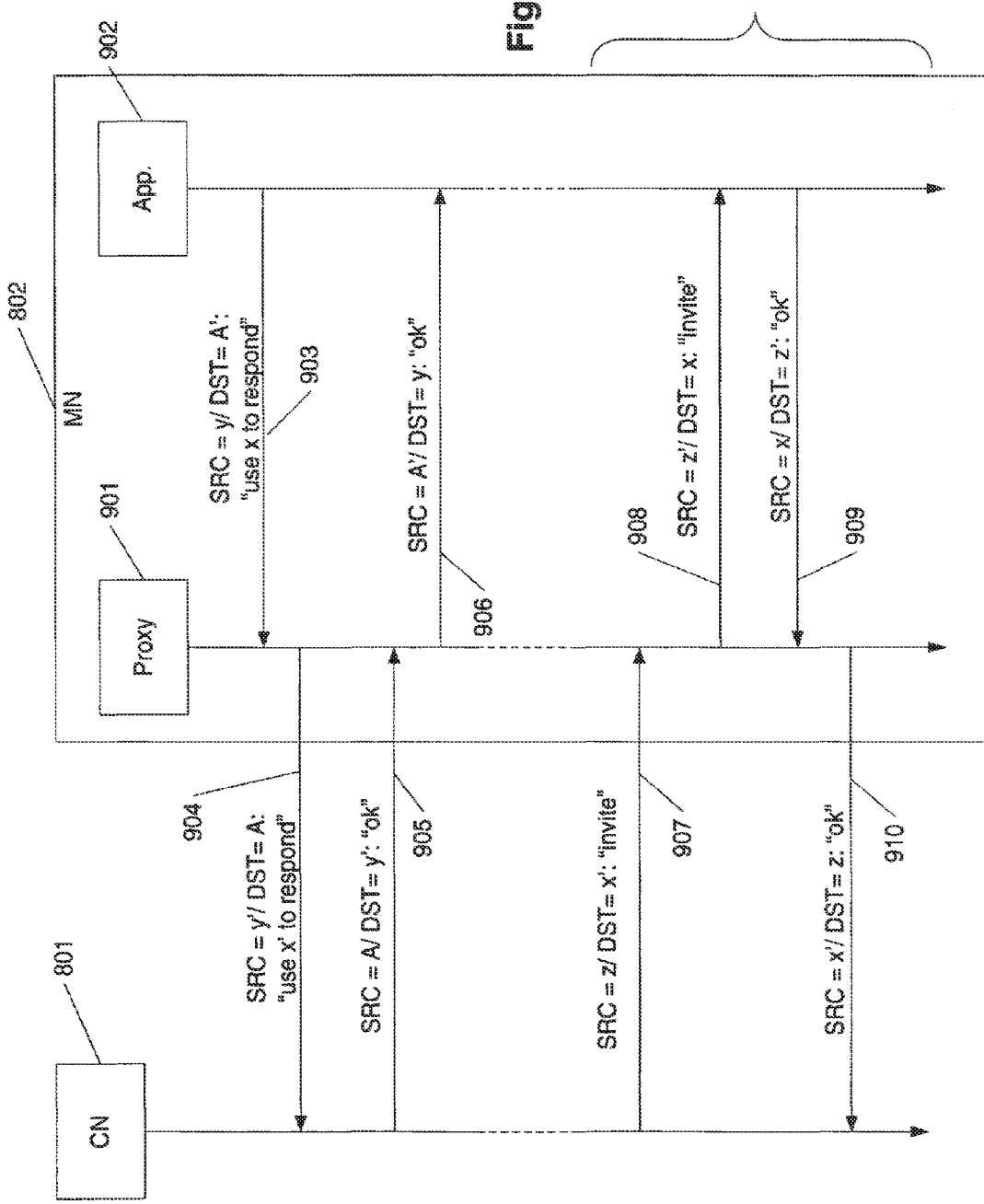
FIG. 9 shows data signals using a proxy in accordance with aspects of the present invention.

FIG. 9 addresses this issue. Here, a proxy server 901 is used. At first, application 902 may be configured to use the proxy server 901 by setting port A' as the server port and local host address as the server address.

When the application 902 sends "use x to respond" message 903, the proxy changes the message and sends "use x' to respond" 904 to the actual server correspondent host 801. OK messages 905 and 906 follow. This allows the proxy 901 to catch the connection 907 in the reverse direction. The connection follows through proxy 901 to application 902 as message 908. This is followed by two OK messages (from the application 902 to the proxy 901 and from the proxy 901 to the correspondent host 801).

Trigger to Switch from Triple to Double Mode

The following describes a trigger switching from a triple tunnel mode to a double tunnel mode. When an application is torn down or ended, the i-MIP Driver detects and indicates to controller to disconnect the VPN tunnel.

To detect whether an application has been torn down or finished, at least one of the following may be occur:

a. i-MIP Driver may include a timer that measures how long a data packet is not sent or received, and then a expiration of the timer triggers the VPN disconnection.
b. i-MIP Driver may detect some packets for closing of Application session, including but not limited to packets such as TCP FIN (of course other packets may be used for other protocols).

i-MIP Registration from an External Network

The following describes i-MIP registration from an external network. Various i-MIP registration methods are described. FIGS. 17A-17J, 18, and 19 relate to the various registration methods.

Here, FIGS. 17A-17J include i-HA 1701, VPN-gw 1702, SMG/x-HA 1703, and mobile node 1704.

When mobile node 1704 already has an i-MIP/VPN/x-MIP triple tunnel and is going to make an i-MIP/x-MIP double tunnel, mobile node 1704 registers x-HoA as CoA for i-MIP using an i-MIP registration message, and disconnects the VPN tunnel.

If the mobile node 1704 does not have any tunnel, the mobile node 1704 makes an x-MIP tunnel and then registers x-HoA as CoA for i-MIP.

The following Figures describe several ways to register i-MIP CoA for MN, and they are described below.

Method of I-MIP Registration Via SMG when SMG is Also an External MIP Home Agent FIGS. 17A-17J relate to various ways to perform i-MIP Registration via SMG when SMG is also an External MIP Home Agent.

Here, the example is based on:

a. Mobile node 1704 is in External (Public) network.
b. x-MIP tunnel has already been established except x-MIP and i-MIP have a piggyback registration (see FIGS. 17I-17J).
c. SMG/x-HA 1703 authenticates i-MIP registration request packet.

Figure 17A:
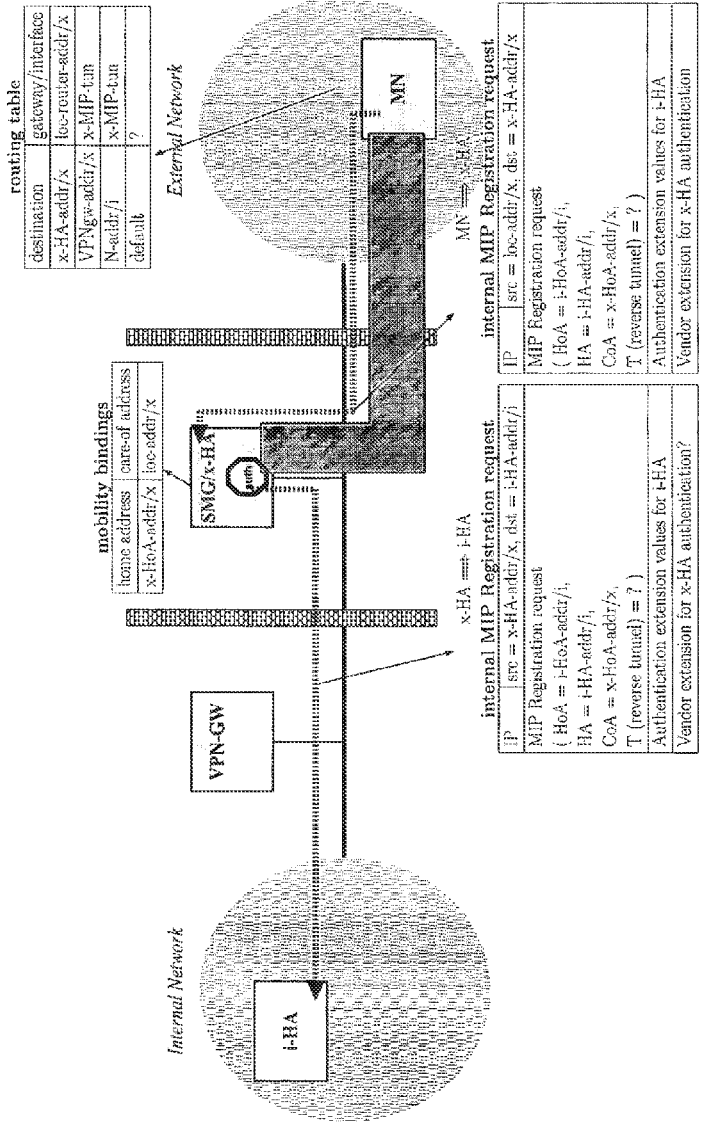
FIGS. 17A-17J shows registration from an external home agent in accordance with aspects of the present invention.

FIG. 17A shows registration using the SMG. The mobile node 1704 has routing table with the following information:

Pair of destination and gateway.
 a. Destination:x-HA-addr/x,Gateway:router of External network in which Mobile node exists.
 b. Destination:VPNgw-addr/x,Gateway:x-MIP tunnel.
 c. Destination:Internal Network, Gateway:x-MIP tunnel.

SMG/x-HA 1703 has a mobility bindings table for mobile node 1704 with the following information:
 a. home address=x-HoA-addr/x
 b. care-of address=local-addr/x Mobile node 1704 creates and sends to SMG/x-HA 1704 an i-MIP Registration Request with the following information:
 a. Source address of IP header=local-addr/x
 b. Destination address of IP header=x-HA-addr/x
 c. Home Address=i-HoA-addr/i
 d. Home Agent Address=i-HA-addr/i
 e. CoA address=x-HoA-adr/x The i-MIP Registration Request has authentication extension values for i-HA 1701 and vender extension for x-HA 1703 authentication.

When x-HA 1703 receives the i-MIP Registration Request, x-HA 1703 performs strong authentication with vender extension for x-HA authentication. SMG/x-HA 1703 changes the source address of an IP header from localaddr/x to x-HA-addr/x before it sends the i-MIP Registration Request to i-HA 1701. Vendor extensions for x-HA authentication may be removed by the SMG/x-HA 1703 before it sends them to i-HA 1701.

When i-HA 1701 receives the i-MIP Registration Request, i-HA 1701 authenticates it and creates an i-MIP Registration Response.

Figure 17B:
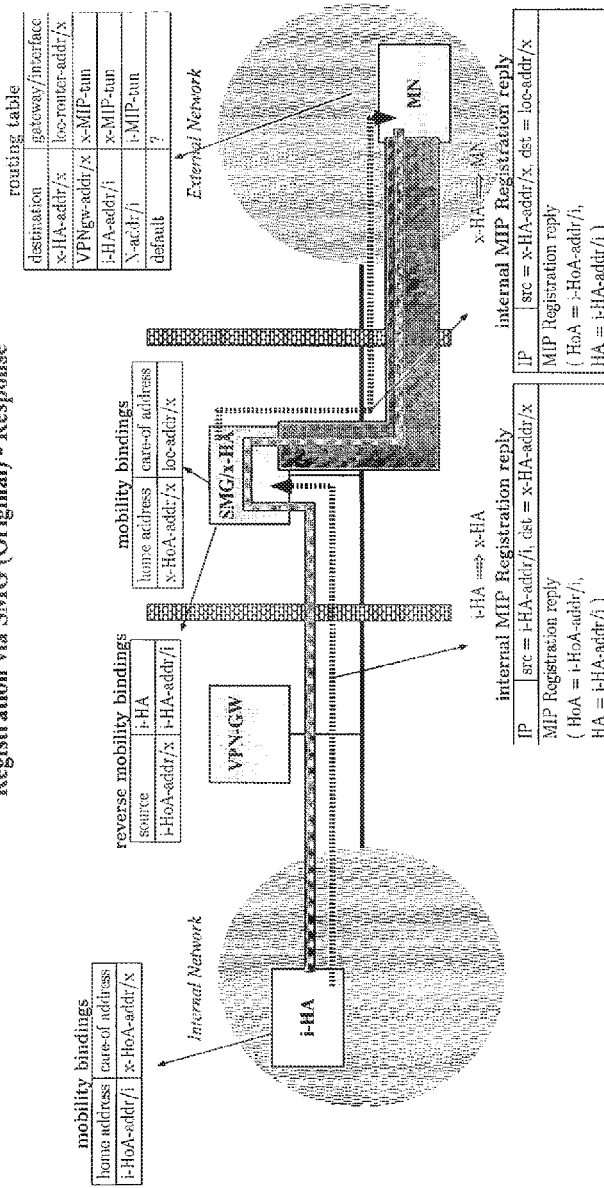

FIG. 17B shows a response. When i-HA 1701 creates the i-MIP Registration Reply, i-HA 1701 has mobility bindings table for the mobile node 1704 with the following information:
 a. Home Address=i-HoA-addr/i
 b. Care of Address=x-HoA-addr/x i-HA 1701 sends the i-MIP Registration Reply to SMG/x-HA 1703 with the following information:
 a. Source Address of IP header=i-HA-addr/i
 b. Destination Address of IP header=x-HA-adr/x
 c. Home Address=i-HoA-addr/i
 d. Home Agent Address=i-HA-addr/i When SMG/x-HA 1703 receives i-MIP Registration Reply, SMG/x-HA 1703 creates a reverse mobility binding table for the mobile node 1704 with the following information:
 a. Source Address=i-HoA-addr/i
 b. i-HA Address=i-HA-addr/i The reverse mobility bindings is needed by the split MIP tunnels. When SMG/x-HA 1703 receives the x-MIP data packet, SMG/x-HA 1703 makes an i-MIP header with reverse mobility bindings.

SMG/x-HA 1703 changes the Source Address of the IP header from i-HA-addr/i to x-HA-addr/x and Destination Address is changed from x-HA-addr/x to local-addr/x before sending it to mobile node 1704.

When mobile node 1704 receives the i-MIP Registration Reply, an entry in the routing table is added with the following information:
 a. Destination:i-HA-addr/i,Gateway:x-MIP tunnel
 b. Destination:Internal Network,Gateway:i-MIP tunnel.

Figure 17C:
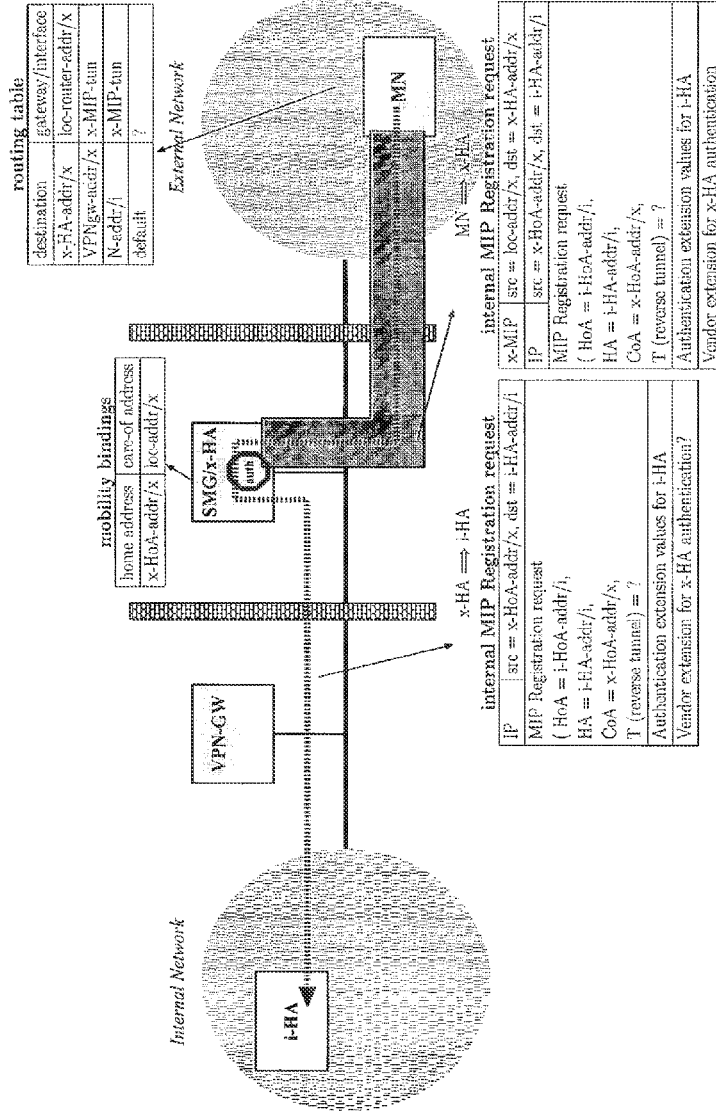

FIG. 17C shows registration through the x-MIP tunnel. mobile node 1704 sends an i-MIP registration packet encapsulated in x-MIP IP-in-IP header. Once SMG/x-HA 1703 receives it, SMG/x-HA 1703 decapsulates and forwards the i-MIP registration packet to i-HA 1701. Here, this example has i-HA 1701 with strong authentication, because the i-MIP registration packet may be transmitted in external networks without protection. The i-HA 1701 may check receives registration messages and authenticate them in a secure way.

Figure 17D:
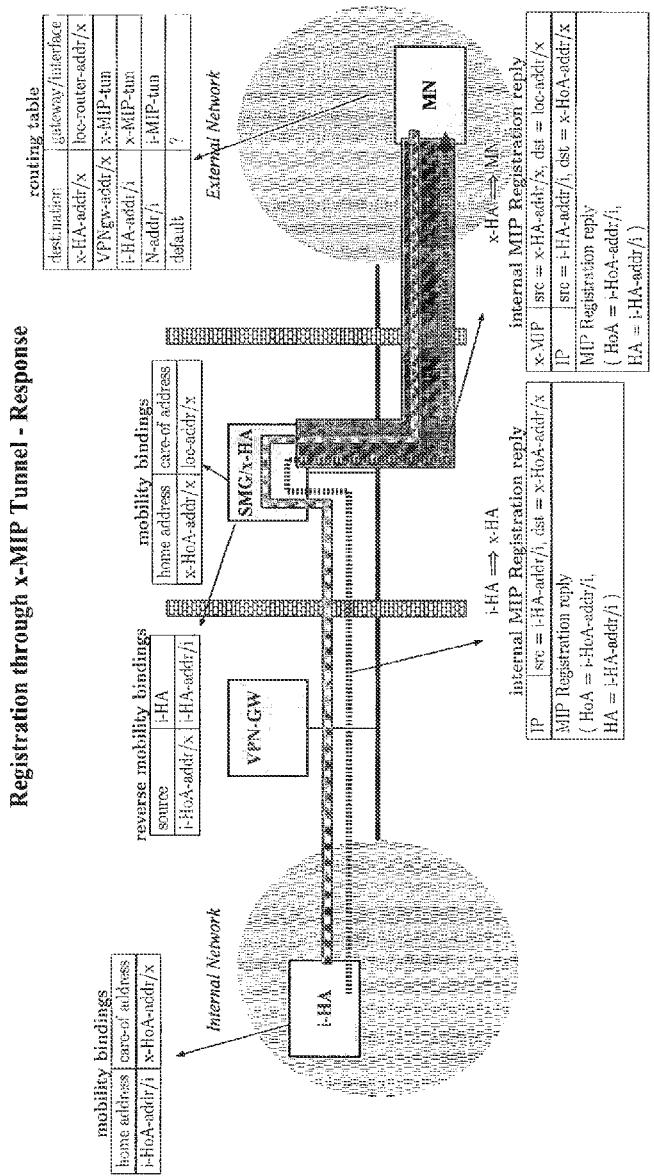

FIG. 17D shows a request for a tunnel. Mobile node 1704 includes a routing table with the following information.

For the pair of destination and gateway:
 a. Destination:x-HA-addr/x,Gateway:router of External network in which Mobile node exists.
 b. Destination:VPNgw-addr/x,Gateway:x-MIP tunnel.
 c. Destination:Internal Network, Gateway:x-MIP tunnel.

SMG/x-HA 1703 has mobility bindings table for the mobile node 1704 with the following information:
 a. home address=x-HoA-addr/x
 b. care-of address=local-addr/x The mobile node 1704 creates and sends to SMG/x-HA 1703 an i-MIP Registration Request with the following information:
 a. Source address of x-MIP IP header=local-addr/x
 b. Destination address of x-MIP IP header=x-HA-addr/x
 c. Source address of IP header=x-HoA-addr/x
 d. Destination address of IP header=i-HA-addr/i
 e. Home Address=i-HoA-addr/i
 f. Home Agent Address=i-HA-addr/i
 g. CoA address=x-HoA-adr/x The i-MIP Registration Request has authentication extension values for i-HA 1701 and Vender extensions for x-HA authentication.

When SMG/x-HA 1703 receives the i-MIP Registration Request, SMG/x-HA 1703 performs strong authentication with Vender extensions for x-HA authentication. SMG/x-HA 1703 removes the x-MIP IP header before it sends the i-MIP Registration Request to i-HA 1701. Vendor extensions for x-HA authentication may be removed by SMG/x-HA 1703 before sending the request to i-HA 1701.

When i-HA 1701 receives the i-MIP Registration Request, i-HA 1701 authenticates it and creates an i-MIP Registration Response.

FIG. 17D shows the creation and handling of a response. When i-HA 1701 creates an i-MIP Registration Reply, i-HA 1701 has mobility bindings table for the mobile node 1704 with the following information:
 a. Home Address=i-HoA-addr/i
 b. Care of Address=x-HoA-addr/x i-HA 1701 sends the i-MIP Registration Reply to SMG/x-HA 1703 with the following information:
 a. Source Address of IP header=i-HA-addr/i
 b. Destination Address of IP header=x-HA-adr/x
 c. Home Address=i-HoA-addr/i
 d. Home Agent Address=i-HA-addr/i When SMG/x-HA 1703 receives the i-MIP Registration Reply, SMG/x-HA 1703 creates a reverse mobility binding table for mobile node 1704 with the following information:
 a. Source Address=i-HoA-addr/i
 b. i-HA Address=i-HA-addr/i The reverse mobility bindings are needed by split MIP tunnels. When SMG/x-HA 1703 receives x-MIP data packet, SMG/x-HA 1703 creates an i-MIP header with reverse mobility bindings.

SMG/x-HA 1703 adds an x-MIP IP header before the IP header. The source x-MIP IP Address is x-HA-addr/x and the source x-MIP IP Address is local-addr/x. Next, SMG/x-HA 1703 sends the i-MIP Registration reply to mobile node 1704.

When mobile node 1704 receives the i-MIP Registration Reply, an entry in the mobile node 1704's routing table is added with the following information:
 a. Destination:i-HA-addr/i,Gateway:x-MIP tunnel
 b. Destination:Internal Network,Gateway:i-MIP tunnel.

Figure 17E:
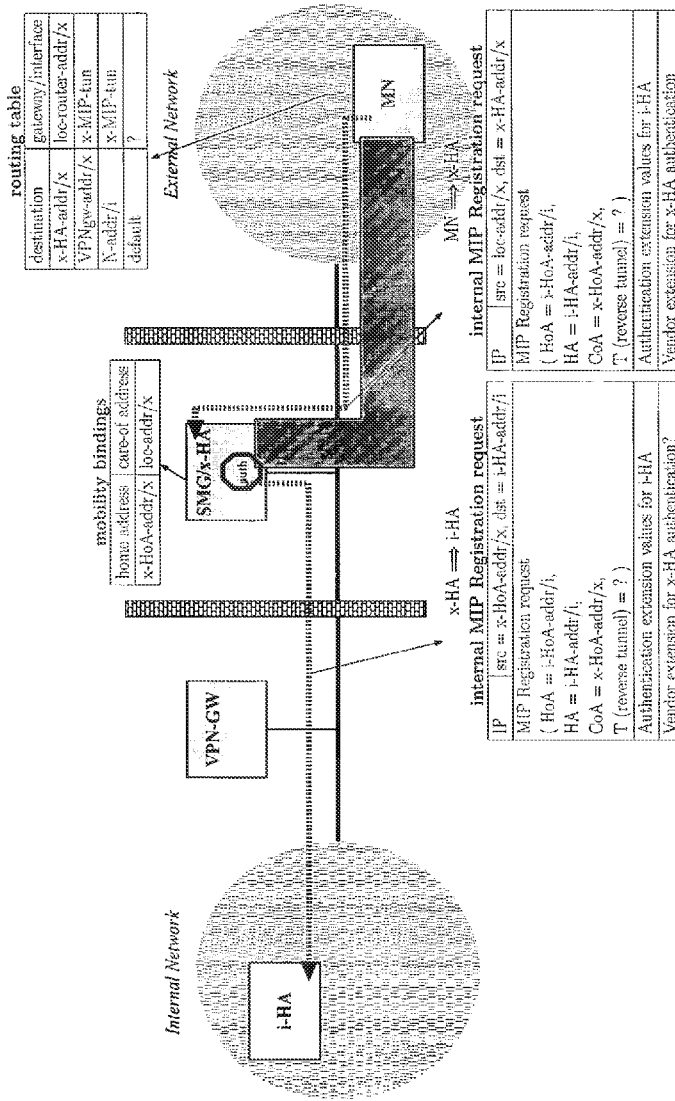
Figure 17F:
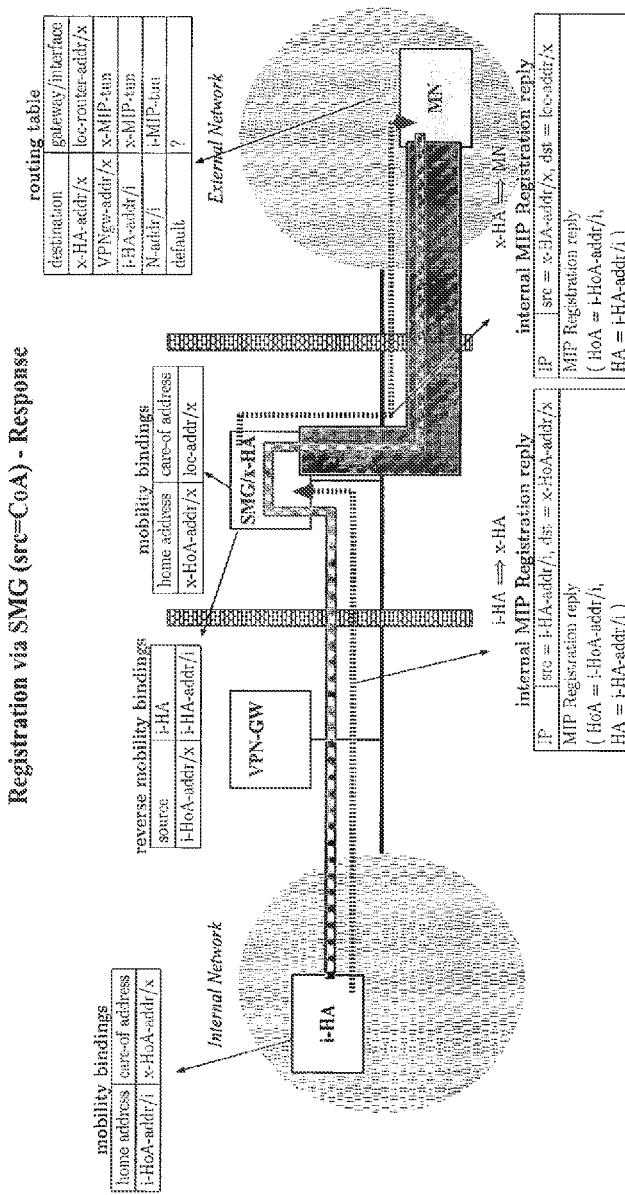

FIGS. 17E and 17F show registration via SMG (with the src=CoA).

In FIG. 17E, the mobile node 1704 includes a routing table with the following information: Pair of destination and gateway.
 a. Destination:x-HA-addr/x,Gateway:router of External network in which Mobile node exists.
 b. Destination:VPNgw-addr/x,Gateway:x-MIP tunnel.
 c. Destination:Internal Network, Gateway:x-MIP tunnel.

SMG/x-HA 1703 has mobility bindings table for the mobile node 1704 with the following information:
 a. home address=x-HoA-addr/x
 b. care-of address=local-addr/x The mobile node 1704 creates and sends to SMG/x-HA 1703 an i-MIP Registration Request with the following information:
 a. Source address of IP header=local-addr/x
 b. Destination address of IP header=x-HA-addr/x
 c. Home Address=i-HoA-addr/i
 d. Home Agent Address=i-HA-addr/i
 e. CoA address=x-HoA-addr/x The i-MIP Registration Request may have authentication extension values for i-HA 1701 and Vender extensions for x-HA authentication.

When SMG/x-HA 1703 receives the i-MIP Registration Request, SMG/x-HA 1703 performs strong authentication with Vender extensions for x-HA authentication. SMG/x-HA 1703 changes the source address of the IP header from local-addr/x to x-HoA-addr/x before sending the i-MIP Registration Request to i-HA 1701. Vendor extensions for x-HA authentication may be removed by SMG/x-HA 1703 before sending to i-HA 1701.

When i-HA 1701 receives the i-MIP Registration Request, i-HA 1701 authenticates it and creates i-MIP Registration Response.

The difference between FIGS. 17A and 17E is that the source address of the IP header for SMG/x-HA 1703 changes.

FIG. 17F shows a response. When i-HA 1701 creates an i-MIP Registration Reply, i-HA 1701 has a mobility bindings table for mobile node 1704 with the following information:
 a. Home Address=i-HoA-addr/i
 b. Care of Address=x-HoA-addr/x i-HA 1701 sends i-MIP Registration Reply to SMG/x-HA 1703 with the following information:
 a. Source Address of IP header=i-HA-addr/i
 b. Destination Address of IP header=x-HoA-adr/x
 c. Home Address=i-HoA-addr/i
 d. Home Agent Address=i-HA-addr/i When SMG/x-HA 1703 receives an i-MIP Registration Reply, SMG/x-HA 1703 creates a reverse mobility binding table for mobile node 1704 with the following information:
 a. Source Address=i-HoA-addr/i
 b. i-HA Address=i-HA-addr/i Reverse mobility bindings may be used by split MIP tunnels. When SMG/x-HA 1703 receives x-MIP data packet, SMG/x-HA 1703 makes an i-MIP header with reverse mobility bindings.

SMG/x-HA 1703 changes a source Address of an IP header from i-HA-addr/i to x-HA-addr/x and destination address is changed from x-HoA-addr/x to local-addr/x before sending it to mobile node 1704.

When mobile node 1704 receives the i-MIP Registration Reply, an entry in the routing table of the mobile node 1704 is added with the following information:
 a. Destination:i-HA-addr/i,Gateway:x-MIP tunnel
 b. Destination:Internal Network,Gateway:i-MIP tunnel.

The difference from FIG. 71B and FIG. 17F is the destination address of the IP header the i-HA 1701 sends.

Figure 17G:
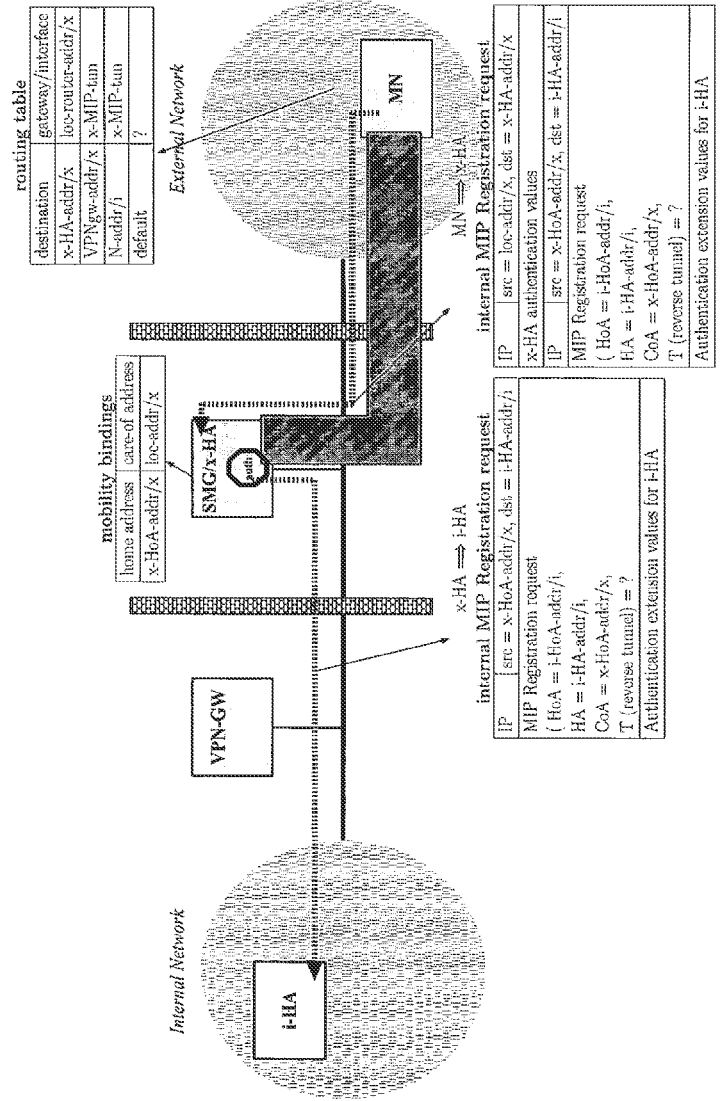
Figure 17H:
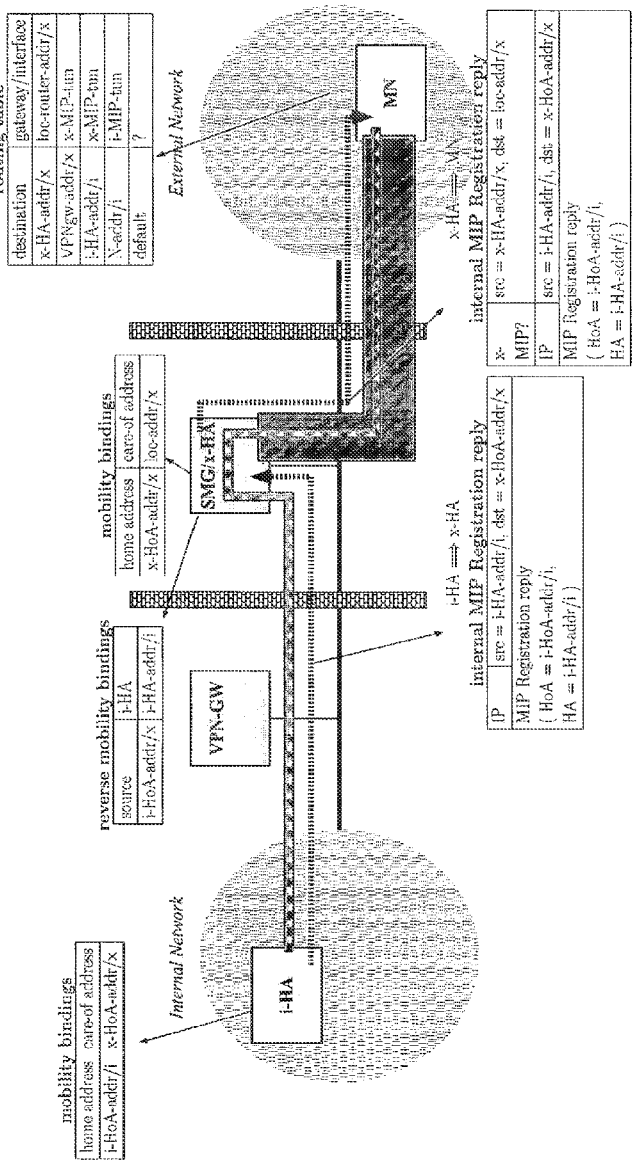

FIGS. 17G and 17H show registration with alternative encapsulation.

In FIG. 17G, mobile node 1704 has a routing table with the following information: Pair of destination and gateway.
 a. Destination:x-HA-addr/x,Gateway:router of External network in which Mobile node exists.
 b. Destination:VPNgw-addr/x,Gateway:x-MIP tunnel.
 c. Destination:Internal Network, Gateway:x-MIP tunnel.

SMG/x-HA 1703 has a mobility bindings table for mobile node 1704 with the following information:
 a. home address=x-HoA-addr/x
 b. care-of address=local-addr/x Mobile node 1704 creates and sends to SMG/x-HA 1703 an i-MIP Registration Request with the following information:
 a. Source address of x-MIP IP header=local-addr/x
 b. Destination address of x-MIP IP header=x-HA-addr/x
 c. x-HA authentication value.
 d. Source address of IP header=x-HoA-addr/x
 e. Destination address of IP header=i-HA-addr/i
 f. Home Address=i-HoA-addr/i g. Home Agent Address=i-HA-addr/i
h. CoA address=x-HoA-adr/x i-MIP Registration Request has Authentication extension values for i-HA.

The i-MIP Registration Request does not have an x-HA authentication value in the Vender Extension. When SMG/x-HA 1703 receives the i-MIP Registration Request SMG/x-HA 1703 performs strong authentication with the x-HA authentication value. SMG/x-HA 1703 removes the x-MIP IP header and the x-HA authentication value before sends the i-MIP Registration Request to i-HA 1701.

When i-HA 1701 receives the i-MIP Registration Request, i-HA 1701 authenticates it and creates the i-MIP Registration Response.

FIG. 17H is the same as FIG. 17D.

Figure 17I:
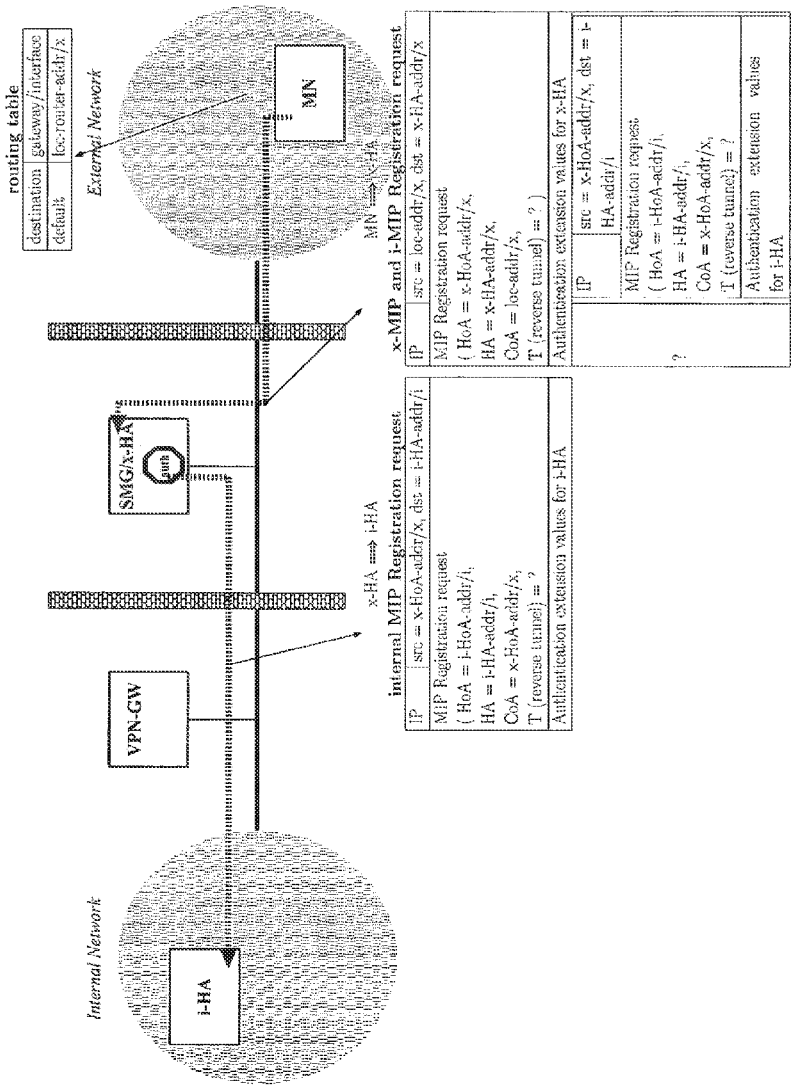
Figure 17J:
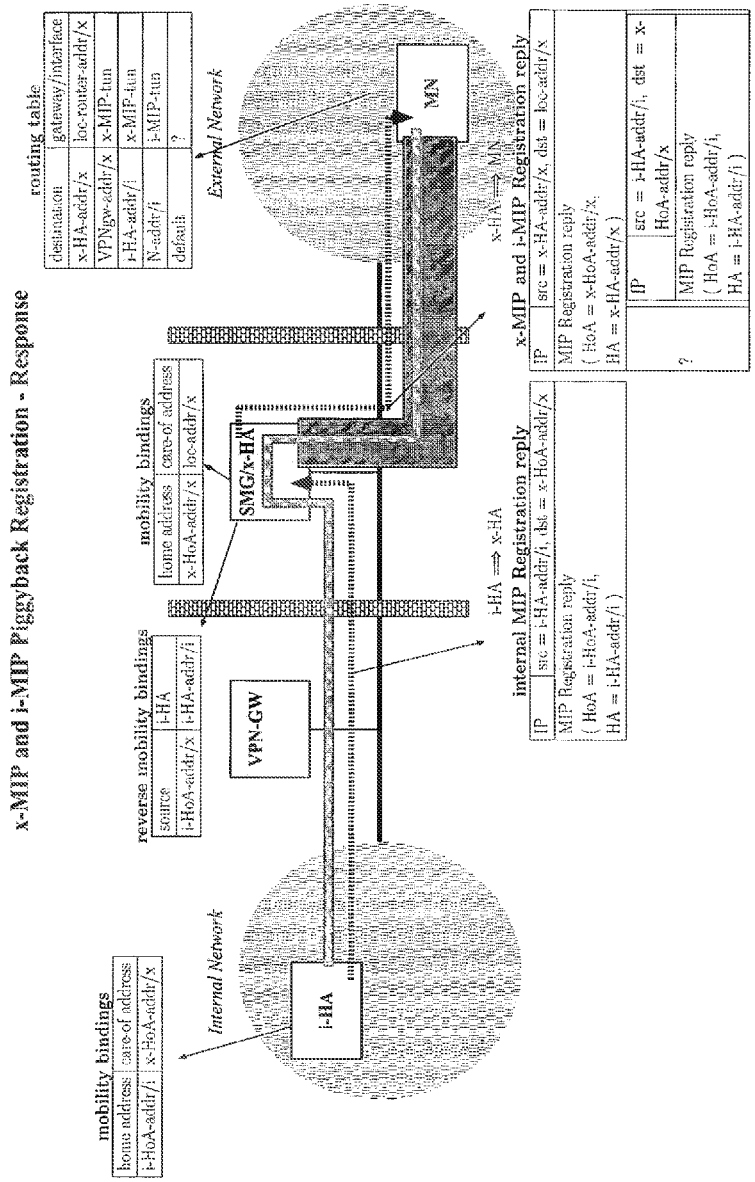

FIGS. 17I and 17J relate to x-MIP and i-MIP piggyback registration. Mobile node 1704 sends an i-MIP registration message included in an x-MIP registration message. Mobile node 1704 can use vendor extension fields of an x-MIP message as a container for i-MIP registration message. In other words, the i-MIP registration message is sent piggyback to the x-MIP message.

When SMG/x-HA 1703 receives the piggyback packet, SMG/x-HA 1703 authenticates the packet information in secure way, creates an i-MIP registration message, and sends it to i-HA 1701.

In this method, i-HA 1701 does not have to have a strong authentication feature because the registration message is authenticated by SMG/x-HA 1703.

FIG. 17I shows a request. Mobile node 1704 has a routing table as follows: Pair of destination and gateway.
  a. Destination:default, Gateway:router of External network in which Mobile node exists.

Mobile node 1704 creates and sends an x-MIP and i-MIP Registration Request with the following information:
  a. x-MIP source address of IP header=local-addr/x
  b. x-MIP destination address of IP header=x-HA-addr/x
  c. x-MIP Home Address=x-HoA-addr/x
  d. x-MIP Home Agent Address=x-HA-addr/x
  e. x-MIP CoA address local-addr/x
  f. x-MIP Authentication extension values for x-HA
  g. i-MIP source address of IP header=x-HoA-addr/x
  h. i-MIP destination address of IP header=i-HA-addr/i
  i. i-MIP Home Address=i-HoA-addr/i
  j. i-MIP Home Agent=i-HA-addr/i
  k. i-MIP CoA address=x-HoA-addr/x
  l. i-MIP Authentication extension values for i-HA When SMG/x-HA 1703 receives the x-MIP and i-MIP Registration Requests, SMG/x-HA 1703 performs strong authentication with authentication extension values for SMG/x-HA 1703. SMG/x-HA 1703 creates an i-MIP registration request having a second half with the following information:
  a. i-MIP source address of IP header=x-HoA-addr/x
  b. i-MIP destination address of IP header=i-HA-addr/i
  c. i-MIP Home Address=i-HoA-addr/i
  d. i-MIP Home Agent=i-HA-addr/i
  e. i-MIP CoA address=x-HoA-addr/x
  f. i-MIP Authentication extension values for i-HA When i-HA 1701 receives the i-MIP Registration Request, i-HA 1701 authenticates it and creates an i-MIP Registration Response.

In FIG. 17J, when i-HA 1701 creates an i-MIP Registration Reply, i-HA 1701 has a mobility bindings table for mobile node 1704 with the following information:
  a. Home Address=i-HoA-addr/i
  b. Care of Address=x-HoA-addr/x
i-HA 1701 sends an i-MIP Registration Reply to SMG/x-HA 1703 with the following information:
  a. IP Source Address of IP header=i-HA-addr/i
  b. IP Destination Address of IP header=x-HoA-adr/x
  c. i-MIP Home Address=i-HoA-addr/i
  d. i-MIP Home Agent Address=i-HA-addr/i When SMG/x-HA 1703 receives the i-MIP Registration Reply, SMG/x-HA 1703 creates a reverse mobility binding table for the mobile node 1704 with the following information:
  a. Source Address=i-HoA-addr/i
  b. i-HA Address=i-HA-addr/i A reverse mobility bindings may be used by split MIP tunnels. When SMG/x-HA 1703 receives the x-MIP data packet, SMG/x-HA 1703 makes an i-MIP header with reverse mobility bindings.

When SMG/x-HA 1703 creates an x-MIP and i-MIP registration replies, SMG/x-HA 1703 creates a mobility binding for mobile node 1704 with the following information:
  a. Home Address=x-HoA-addr/x
  b. Care of Address=local-addr/x
SMG/x-HA 1703 adds an x-MIP registration reply before i-MIP registration reply with the following information:
  a. Source Address of IP header=x-HA-addr/x
  b. Destination Address of IP header=local-addr/x
  c. x-MIP Home Address=x-HoA-addr/x
  d. x-MIP Home Agent Address=x-HA-addr/x When mobile node 1704 receives the x-MIP and i-MIP registration reply, an entry for the routing table is added with the following information:
  a. Destination:x-HA-addr/x,Gateway:router of External network in which Mobile node exists.
  b. Destination:VPNgw-addr/x,Gateway:x-MIP tunnel
  c. Destination:i-HA-addr/i,Gateway:x-MIP tunnel
  d. Destination:Internal Network, Gateway:i-MIP tunnel.

Method of i-MIP Registration Using VPN Tunnel

Figure 18:
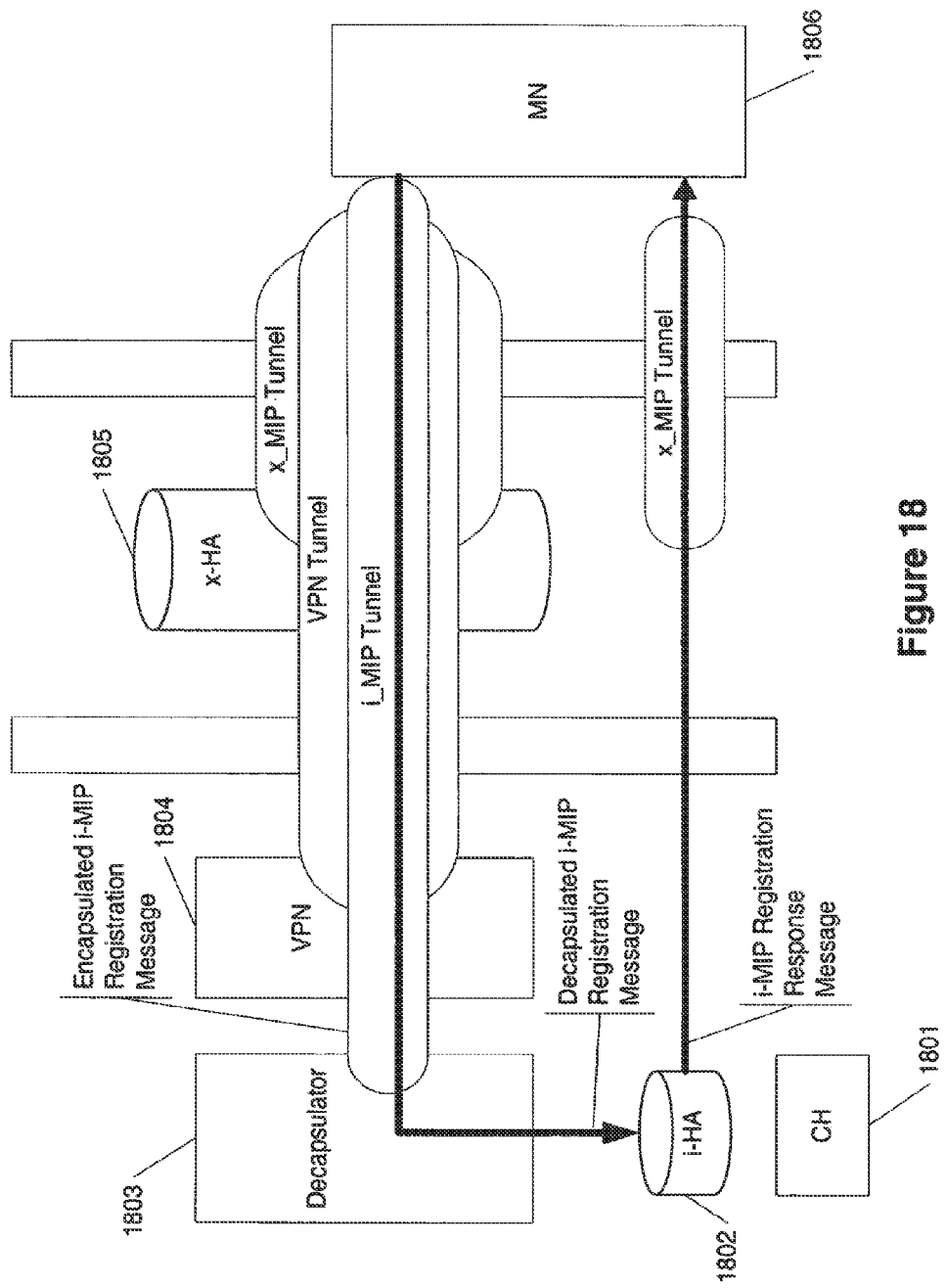
FIG. 18 shows data flows relating to a method of i-MIP registration using a VPN tunnel in accordance with aspects of the present invention.

FIG. 18 shows a method of i-MIP registration using a VPN tunnel. FIG. 18 includes a correspondent host 1801, an i-HA 1802, a decapsulator 1803, a VPN gateway 1804, an x-HA 1805, and a mobile node 1806.

To create an i-MIP/x-MIP tunnel, mobile node 1806 creates a VPN/x-MIP tunnel first and sends an i-MIP registration message using the VPN/x-MIP tunnel. If mobile node 1806 already has an i-MIP/VPN/x-MIP triple tunnel, mobile node 1806 does not have to create a new tunnel and can use the existing VPN/x-MIP tunnel.

When the VPN/x-MIP tunnel is ready, mobile node 1806 creates an i-MIP registration message where an IP source address and i-MIP CoA are x-HoA. If mobile node 1806 sends it simply through the VPN/x-MIP tunnel, existing the VPN gateway 1804 implementation may reject it because of unmatched addresses between the VPN tunnel inner address and the IP source address of it.

So mobile node 1806 encapsulates the i-MIP registration message with another IP header whose source address is the VPN tunnel inner address and destination address is the pre-configured address of decapsulater 1803. The encapsulated packet is transmitted through the VPN/x-MIP tunnel, and reaches to the decapsulater 1803. The decapsulater 1803 decapsulates the packet and forward the inner i-MIP registration message to i-HA 1802.

The i-HA 1802 and the decapsulater 1803 can be combined or remain separate.

In this method, i-HA 1802 does not have to have strong authentication feature because the registration message is transmitted through VPN gateway 1804 well-protected. Of course, as an alternative, it may have strong encryption.

Method of i-MP Registration Using an Internal Network

FIG. 19 shows a method of i-MIP registration using an internal network. FIG. 19 includes mobile node 1901, x-HA 1902, i-HA 1903, an internal network and an external network. The mobile node 1901 includes a WLAN interface and a cellular interface (as examples of networks).

When mobile node 1901 is moving from an internal network to an external network, mobile node 1901 can send an i-MIP registration message prior to going out.

Mobile node 1901 can have two or more network links simultaneously, one is to the internal network on which mobile node 1901 was located and the other is to the external network which mobile node 1901 is going. In this case, mobile node 1901 knows the location address for the external network, so mobile node 1901 can establish an x-MIP tunnel, while keeping the internal network link. Then, mobile node 1901 creates an i-MIP registration message which CoA is x-HoA and sends the i-MIP registration message via the internal network link.

In this method, i-HA 1903 does not have to have a strong authentication feature because the registration message is transmitted in the internal network. Alternatively, the i-HA 1903 may include a strong authentication feature as well.

The present invention has been described in terms of preferred and illustrative embodiments thereof. Numerous other embodiments, modifications and variations within the scope and spirit of the appended claims will occur to persons of ordinary skill in the art from a review of this disclosure.

What is claimed is:

1. A method for a mobile terminal to roam between a first network and a second network comprising the steps of:
    establishing a first network connection between a first network driver of said mobile terminal and said first network, wherein the first network comprises an internal network;
    detecting that a signal strength for the first network connection is below a threshold;
    establishing, based on the detected signal strength being below the threshold, a second network connection between second network driver of said mobile terminal and said second network, wherein the second network comprises an external network; and
    transitioning communications from said first network to said second network.

2. The method according to claim 1, further comprising the step of:
    establishing a VPN connection using said second network driver.

3. The method according to claim 1, further comprising:
    establishing a VPN connection using said second network driver.

4. The method according to claim 1,
    wherein the first network comprises a local area network and the second network comprises a cellular network.

5. The method according to claim 1,
    wherein establishing a second network connection further comprises:
    detecting that the first network comprises an internal network and the second network comprises an external network; and
    establishing, based on the detecting, a VPN connection over the second network connection.

6. A mobile terminal for roaming between a first network and a second network comprising:
    means for establishing a first network connection between a first network driver of a mobile terminal and said first network, wherein the first network comprises an internal network;
    means for detecting that a signal strength for the first network connection is below a threshold;
    means for establishing, based on the detected signal strength being below the threshold, a second network connection between second network driver of said mobile terminal and said second network, wherein the second network comprises an external network; and
    means for transitioning communications from said first network to said second network.

7. The mobile terminal according to claim 6, further comprising:
    means for establishing a VPN connection using said second network driver.

8. The mobile terminal according to claim 6, wherein the first network comprises a local area network and the second network comprises a cellular network.

9. The mobile terminal according to claim 6, wherein establishing a second network connection further comprises:
    means for detecting that the first network comprises an internal network and the second network comprises an external network; and
    means for establishing, based on the means for detecting, a VPN connection over the second network connection.

* * * * *

UNITED STATES PATENT AND TRADEMARK OFFICE
CERTIFICATE OF CORRECTION

| | |
|---|---|
| PATENT NO. | : 8,792,454 B2 |
| APPLICATION NO. | : 13/554711 |
| DATED | : July 29, 2014 |
| INVENTOR(S) | : Taniuchi et al. |

Page 1 of 5

It is certified that error appears in the above-identified patent and that said Letters Patent is hereby corrected as shown below:

On the title page, item (73), under "Assignees", in Column 1, Line 1, delete "Resesarch," and insert -- Research, --, therefor.

On the title page, under "Related U.S. Application Data", in Column 1, Line 1, delete item "(60)" and insert item -- (62) --, therefor.

On the title page, in the Figure, for Tag "610", delete "i_MIP" and insert -- i-MIP --, therefor.

On page 2, item (56), under "FOREIGN PATENT DOCUMENTS", in Column 1, Line 9, delete "2/2005" and insert -- 9/2005 --, therefor.

In the Drawings

Figure 1:
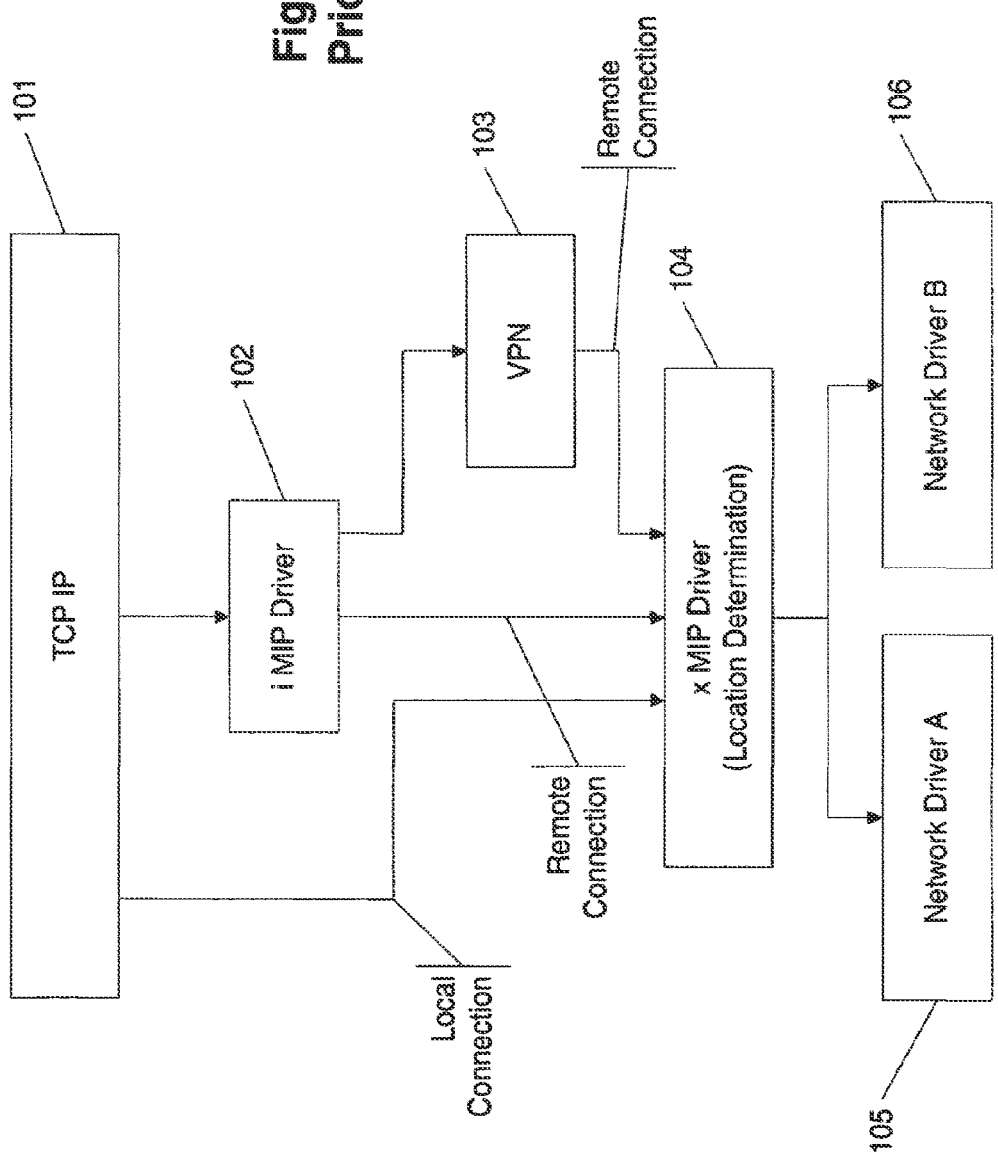
FIG. 1 shows a conventional tunneling system.

In Fig. 1, Sheet 1 of 143, for Tag "102", delete "i MIP" and insert -- i-MIP --, therefor at each occurrence throughout the Patent.

In Fig. 1, Sheet 1 of 143, for Tag "104", in Line 1, delete "x MIP" and insert -- x-MIP --, therefor at each occurrence throughout the Patent.

In Fig. 6, Sheet 6 of 143, for Tag "610", delete "i_MIP" and insert -- i-MIP --, therefor.

In Fig. 10c, Sheet 12 of 143, delete "x-MIP registeration is accepted." and insert -- x-MIP registration is accepted. --, therefor.

In Fig. 10e, Sheet 14 of 143, delete "(securlity" and insert -- (security --, therefor at each occurrence throughout the Figures.

Signed and Sealed this
Fourth Day of August, 2015

Michelle K. Lee
*Director of the United States Patent and Trademark Office*

CERTIFICATE OF CORRECTION (continued)
U.S. Pat. No. 8,792,454 B2

In Fig. 10f, Sheet 15 of 143, below Box "i-HA", Line 5, delete "request (" and insert -- request --, therefor.

In Fig. 10f, Sheet 15 of 143, below Box "SMG/x-HA", Line 8, delete "( HoA" and insert -- HoA --, therefor.

In Fig. 10f, Sheet 15 of 143, below Box "MN", Line 9, delete "( HoA" and insert -- HoA --, therefor.

In Fig. 12g, Sheet 34 of 143, delete "| x-MIP registration" and insert -- x-MIP registration --, therefor.

In Fig. 12i, Sheet 36 of 143, delete "| Data transfer" and insert -- Data transfer --, therefor.

In Fig. 12k, Sheet 38 of 143, below Box "MN", Line 5, delete "request (" and insert -- request --, therefor.

In Fig. 12k, Sheet 38 of 143, under " x-HA $\Rightarrow$ VPN ", Line 7, delete "( HoA" and insert -- HoA --, therefor.

In Fig. 12k, Sheet 38 of 143, under " MN $\Rightarrow$ x-HA ", Line 8, delete "( HoA" and insert -- HoA --, therefor.

In Fig. 14e, Sheet 64 of 143, delete "pairs of moblity" and insert -- pairs of mobility --, therefor.

In Fig. 14f, Sheet 65 of 143, below Box "SMG/x-HA", Line 5, delete "( HoA" and insert -- HoA --, therefor.

In Fig. 14f, Sheet 65 of 143, below Box "MN", Line 6, delete "( HoA" and insert -- HoA --, therefor.

In Fig. 14g, Sheet 66 of 143, delete "pairs of moblity" and insert -- pairs of mobility --, therefor.

In Fig. 14n, Sheet 73 of 143, below Box "i-HA", Line 5, delete "request (" and insert -- request --, therefor.

In Fig. 14n, Sheet 73 of 143, below Box "SMG/x-HA", Line 8, delete "( HoA" and insert -- HoA --, therefor.

In Fig. 14n, Sheet 73 of 143, below Box "MN", Line 9, delete "( HoA" and insert -- HoA --, therefor.

In Fig. 14u, Sheet 80 of 143, below Box "SMG/x-HA", Line 5, delete "( HoA" and insert -- HoA --, therefor.

In Fig. 14u, Sheet 80 of 143, below Box "MN", Line 6, delete "( HoA" and insert -- HoA --, therefor.

CERTIFICATE OF CORRECTION (continued)

In Fig. 14u, Sheet 80 of 143, delete "a registeration message" and insert -- a registration message --, therefor.

In Fig. 14v, Sheet 81 of 143, delete "pairs of moblity" and insert -- pairs of mobility --, therefor.

In Fig. 14w, Sheet 82 of 143, delete "pairs of moblity" and insert -- pairs of mobility --, therefor.

In Fig. 14aa, Sheet 86 of 143, below Box "SMG/x-HA", Line 5, delete "( HoA" and insert -- HoA --, therefor.

In Fig. 14aa, Sheet 86 of 143, below Box "MN", Line 6, delete "( HoA" and insert -- HoA --, therefor.

In Fig. 16c, Sheet 130 of 143, delete " 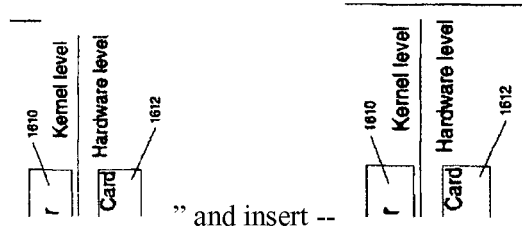 " and insert -- --, therefor.

In Fig. 17b, Sheet 133 of 143, delete "pairs of moblity" and insert -- pairs of mobility --, therefor.

In Fig. 17c, Sheet 134 of 143, below Box "SMG/x-HA", Line 5, delete "( HoA" and insert -- HoA --, therefor.

In Fig. 17c, Sheet 134 of 143, below Box "MN", Line 6, delete "( HoA" and insert -- HoA --, therefor.

In Fig. 17d, Sheet 135 of 143, delete "pairs of moblity" and insert -- pairs of mobility --, therefor.

In Fig. 17f, Sheet 137 of 143, delete "pairs of moblity" and insert -- pairs of mobility --, therefor.

In Fig. 17g, Sheet 138 of 143, below Box "SMG/x-HA", Line 5, delete "( HoA" and insert -- HoA --, therefor.

In Fig. 17g, Sheet 138 of 143, below Box "MN", Line 7, delete "( HoA" and insert -- HoA --, therefor.

In Fig. 17h, Sheet 139 of 143, delete "pairs of moblity" and insert -- pairs of mobility --, therefor.

In Fig. 17i, Sheet 140 of 143, below Box "SMG/x-HA", Line 5, delete "( HoA" and insert -- HoA --, therefor.

In Fig. 17i, Sheet 140 of 143, below Box "MN", Line 13, delete "( HoA" and insert -- HoA --, therefor.

In Fig. 17j, Sheet 141 of 143, delete "futher" and insert -- further --, therefor.

In Fig. 17j, Sheet 141 of 143, delete "pairs of moblity" and insert -- pairs of mobility --, therefor.

In Fig. 18, Sheet 142 of 143, delete "i_MIP" and insert -- i-MIP --, therefor.

In Fig. 18, Sheet 142 of 143, delete "x_MIP" and insert -- x-MIP --, therefor.

In the Specification

In Column 1, Line 60, delete "TCP IP" and insert -- TCP/IP --, therefor.

In Column 1, Line 63, delete "TCP IP" and insert -- TCP/IP --, therefor.

In Column 2, Line 50, delete "invention" and insert -- invention. --, therefor.

In Column 2, Line 54, delete "shows" and insert -- show --, therefor.

In Column 2, Line 58, delete "shows" and insert -- show --, therefor.

In Column 3, Line 1, delete "shows" and insert -- show --, therefor.

In Column 3, Line 41, delete ""A"" and insert -- "/i" --, therefor.

In Column 4, Line 35, delete "a i-MIP" and insert -- an i-MIP --, therefor at each occurrence throughout the specification.

In Column 5, Line 15, delete "TCP IP" and insert -- TCP/IP --, therefor.

In Column 5, Line 46, delete "607 x-HA" and insert -- 607, x-HA --, therefor.

In Column 8, Line 15, delete "strength)." and insert -- strength. --, therefor.

In Column 11, Line 23, delete "TCP/IO" and insert -- TCP/IP --, therefor.

In Column 11, Line 50, delete "1308." and insert -- 1309. --, therefor.

In Column 12, Line 24, delete "1303" and insert -- 1304 --, therefor.

In Column 15, Lines 30-31, delete "NIC1 131" and insert -- NIC1 1310 --, therefor.

In Column 17, Line 27, delete "Addrss=local-addr/x" and insert -- Address=local-addr/x --, therefor.

CERTIFICATE OF CORRECTION (continued)
U.S. Pat. No. 8,792,454 B2

In Column 26, Line 38, delete "Destination:dafault," and insert -- Destination:default, --, therefor.

In Column 27, Line 18, delete "FIG. 14B," and insert -- FIG. 14JJ, --, therefor.

In Column 27, Line 22, delete "care-of-adress:local-" and insert -- care-of-address:local- --, therefor.

In Column 28, Line 14, delete "waddr/x" and insert -- waddr/x. --, therefor.

In Column 37, Line 63, delete "Destination:dafault," and insert -- Destination:default, --, therefor.

In Column 38, Line 47, delete "care-of-adress:local-" and insert -- care-of-address:local- --, therefor.

In Column 40, Line 19, delete "Controller 1601" and insert -- Controller 1602 --, therefor.

In Column 40, Line 24, delete "NIC Driver 1610" and insert -- NIC2 Driver 1610 --, therefor.

In Column 40, Line 25, delete "NIC Driver 1610 the" and insert -- NIC2 Driver 1610 then --, therefor.

In Column 40, Line 25, delete "NIC 1612 after" and insert -- NIC2 1612 after --, therefor.

In Column 40, Line 26, delete "NIC 1612" and insert -- NIC2 1612 --, therefor.

In Column 42, Line 38, delete "tunnel." and insert -- tunnel, --, therefor.

In Column 44, Line 45, delete "FIG. 71B" and insert -- FIG. 17B --, therefor.

In Column 46, Line 53, delete "decapsulater 1803." and insert -- decapsulator 1803. --, therefor.

In Column 46, Line 55, delete "decapsulater 1803. The decapsulater" and insert -- decapsulator 1803. The decapsulator --, therefor.

In Column 46, Line 58, delete "decapsulater 1803" and insert -- decapsulator 1803 --, therefor.